United States Patent
Panicker et al.

(10) Patent No.: US 12,503,508 B2
(45) Date of Patent: Dec. 23, 2025

(54) SIRP ALPHA, SIRP BETA 1, AND SIRP GAMMA ANTIBODIES AND USES THEREOF

(71) Applicant: Electra Therapeutics, Inc., South San Francisco, CA (US)

(72) Inventors: Sandip Panicker, South San Francisco, CA (US); Adam David Rosenthal, South San Francisco, CA (US); Eileen Lingshu Rose, South San Francisco, CA (US)

(73) Assignee: Electra Therapeutics, Inc., South San Francisco, CA (US)

( * ) Notice: Subject to any disclaimer, the term of this patent is extended or adjusted under 35 U.S.C. 154(b) by 561 days.

(21) Appl. No.: 17/923,778

(22) PCT Filed: May 10, 2021

(86) PCT No.: PCT/US2021/031605
§ 371 (c)(1),
(2) Date: Nov. 7, 2022

(87) PCT Pub. No.: WO2021/226591
PCT Pub. Date: Nov. 11, 2021

(65) Prior Publication Data
US 2023/0303685 A1   Sep. 28, 2023

Related U.S. Application Data

(60) Provisional application No. 63/022,309, filed on May 8, 2020.

(51) Int. Cl.
C07K 16/28   (2006.01)
A61P 37/06   (2006.01)
C12N 15/63   (2006.01)

(52) U.S. Cl.
CPC .......... *C07K 16/2803* (2013.01); *A61P 37/06* (2018.01); *C12N 15/63* (2013.01); *C07K 2317/24* (2013.01); *C07K 2317/52* (2013.01); *C07K 2317/565* (2013.01); *C07K 2317/73* (2013.01); *C07K 2317/732* (2013.01); *C07K 2317/76* (2013.01); *C07K 2317/92* (2013.01)

(58) Field of Classification Search
USPC .......................................................... 424/130
See application file for complete search history.

(56) References Cited

U.S. PATENT DOCUMENTS

| | | | |
|---|---|---|---|
| 12,187,797 B2 * | 1/2025 | Panicker | A61P 37/06 |
| 2023/0174648 A1 | 6/2023 | Panicker et al. | |
| 2024/0239888 A1 | 7/2024 | Panicker et al. | |
| 2024/0400677 A1 | 12/2024 | Panicker et al. | |
| 2025/0197492 A1 | 6/2025 | Panicker et al. | |

FOREIGN PATENT DOCUMENTS

| | | |
|---|---|---|
| WO | WO-2018107058 A1 | 6/2018 |
| WO | WO-2018118887 A1 | 6/2018 |
| WO | WO-2018149938 A1 | 8/2018 |
| WO | WO-2018190719 A2 | 10/2018 |
| WO | WO-2019073080 A1 | 4/2019 |
| WO | WO-2020263793 A1 | 12/2020 |
| WO | WO-2021174127 A1 | 9/2021 |
| WO | WO-2021226576 A1 | 11/2021 |
| WO | WO-2021226591 A1 | 11/2021 |
| WO | WO-2023086906 A2 | 5/2023 |
| WO | WO-2025085854 A1 | 4/2025 |
| WO | WO-2025085857 A1 | 4/2025 |

OTHER PUBLICATIONS

Almagro, J. C., et al., "Humanization of antibodies," Frontiers in Bioscience-Landmark (2008); 13:1619-1633.

Casset, F., et al., "A peptide mimetic of an anti-CD4 monoclonal antibody by rational design," Biochemical and Biophysical Research Communications (2003); 307(1):198-205.

Chen, Y., et al., "Selection and analysis of an optimized anti-VEGF antibody: crystal structure of an affinity-matured Fab in complex with antigen," Journal of Molecular Biology (1999); 293(4):865-881.

Co-pending U.S. Appl. No. 18/660,086, inventor Sandip Panicker; et al., filed on May 9, 2024.

De Pascalis et al., "Grafting of 'Abbreviated' Complementarity-Determining Regions Containing Specificity-Determining Residues Essential for Ligand Contact to Engineer a Less Immunogenic Humanized Monoclonal Antibody," The Journal of Immunology, Sep. 2002, vol. 169, No. 6, pp. 3076-3084.

Lamminmaki U., et al., "Crystal structure of a recombinant anti-estradiol Fab fragment in complex with 17beta -estradiol," Journal of Biological Chemistry, Sep. 2001, vol. 276 (39), pp. 36687-36694.

MacCallum, R. M., et al., "Antibody-antigen interactions: contact analysis and binding site topography," Journal of Molecular Biology (1996); 262(5):732-745.

Padlan, E.A., et al., "Structure of an antibody-antigen complex: crystal structure of the HyHEL-10 Fab-lysozyme complex," PNAS USA; 86(15):5938-5942 (1989).

Rudikoff, S., et al., "Single amino acid substitution altering antigen-binding specificity," Proc Natl Acad Sci USA. Mar. 1982; 79(6):1979-83.

Vajdos, F.F., et al.; "Comprehensive functional maps of the antigen-binding site of an anti-ErbB2 antibody obtained with shotgun scanning mutagenesis," J. Mol. Biol. (2002); 320(2):415-428.

(Continued)

*Primary Examiner* — Misook Yu
(74) *Attorney, Agent, or Firm* — Cooley LLP

(57) ABSTRACT

Provided herein are antibodies that bind signal regulatory protein gamma (SIRPγ), as well as SIRPα and/or SIRPβ1, and methods of using such antibodies (referred to as SIRP antibodies). In some embodiments, the SIRP antibodies are human monoclonal antibodies that bind human SIRPγ as well as SIRPα and/or SIRPβ1. In some embodiments, the SIRP antibodies provided herein are useful for treating a disease or condition associated with overactivation and/or hyperproliferation of lymphocytes, myeloid cells, or a combination thereof, or a disease or condition associated with SIRPα, SIRPβ1 and/or SIRPγ activity.

44 Claims, 39 Drawing Sheets
Specification includes a Sequence Listing.

(56) References Cited

OTHER PUBLICATIONS

Wu, H., et al., "Humanization of a murine monoclonal antibody by simultaneous optimization of framework and CDR residues," Journal of Molecular Biology (1999); 294(1):151-162.

Absolute Antibody, (Jan. 1, 2023) "Anti-SIRP g [OX-119]," [online]. Retrieved from: https://absoluteantibody.com/product/a nti-sirp-g-ox-119/ [retrieved on Oct. 19, 2023], 2 pages.

Brooke et al., "Human lymphocytes interact directly with CD47 through a novel member of the signal regulatory protein (SIRP) family," The Journal of Immunology (2004); 173(4): 2562-2570.

ClinicalTrials.gov, ID NCT05416307. Evaluation of the Safety and Efficacy of ELA026 in Participants with Secondary Hemophagocytic Lymphohistiocytosis [online], Version 1, dated Jun. 8, 2022 [retrieved on Nov. 29, 2023]. Retrieved from the Internet: https://clinicaltrials.gov/study/NCT05416307?term=Electratherapeutics&intr=ELA026&rank=2&tab=history&a=1, 10 printed pages.

ClinicalTrials.gov, ID NCT05416307. Evaluation of the Safety and Efficacy of ELA026 in Participants with Secondary Hemophagocytic Lymphohistiocytosis [online], Version 7, dated Oct. 18, 2023 [retrieved on Nov. 29, 2023]. Retrieved from the Internet: https://clinicaltrials.gov/study/NCT05416307?term=Electratherapeutics&intr=ELA026&rank=2&tab=history&a=7, 11 printed pages.

Clinicaltrials.gov, ID NCT05556863. Evaluation of the Safety, Tolerability, Pharmacokinetics and Pharmacodynamics of ELA026 in Single and Multiple Doses in Healthy [online], Version 1, dated Sep. 23, 2022 [retrieved on Nov. 29, 2023]. Retrieved from the Internet: https://clinicaltrials.gov/study/NCT05556863?term=NCT05556863&rank=1&tab=history&a=1, 10 printed pages.

ClinicalTrials.gov, ID NCT05556863. Evaluation of the Safety, Tolerability, Pharmacokinetics and Pharmacodynamics of ELA026 in Single and Multiple Doses in Healthy [online], Version 2, dated Oct. 18, 2023 [retrieved on Nov. 29, 2023]. Retrieved from the Internet: https://clinicaltrials.gov/study/NCT05556863?term=NCT05556863&rank=1&tab=history& a=2, 10 printed pages.

Database GenBank Accession No. EHH65481.1 (Mar. 2015) "Signal-regulatory protein gamma [Macaca fascicularis]" National Library of Medicine, National Center for Biotechnology Information (NCBI) [online]. Retrieved from: https://www.ncbi.nlm.nih.gov/protein/EHH65481.1/; retrieved on Nov. 22, 2023, 5 printed pages.

Database UniProtKB ID Q9P1W8 (Jan. 23, 2007), "SIRPG_Human", including Isoform 1 , Isoform 2, Isoform 3, and Isoform 4. UniProt consortium [online]. Retrieved from: https://www.uniprot.org/uniprotkb/Q9P1W8/entry#sequences; retrieved on Nov. 22, 2023, 11 printed pages.

Hatherley et al., (Apr. 2014) "Polymorphisms in the human inhibitory signal-regulatory protein a do not affect binding to its ligand CD47," J Biol Chem, 289(14):10024-10028.

Henter, J-I. et al. "HLH-2004: Diagnostic and therapeutic guidelines for hemophagocytic lymphohistiocytosis" Pediatr Blood Cancer, vol. 48, p. 124-131 (2007).

Locatelli et al., (May 2020) "Emapalumab in Children with Primary Hemophagocytic Lymphohistiocytosis," The New England Journal of Medicine, 382(19):1811-1822.

PCT/US2021/031541 International Search Repot and Written Opinion mailed Oct. 5, 2021, 20 pages.

PCT/US2021/031605 International Search Report and Written Opinion mailed Sep. 30, 2021, 19 pages.

PCT/US2022/079668 International Search Report and Written Opinion dated May 16, 2023, 18 pages.

Piccio et al., "Adhesion of human T cells to antigen-presenting cells through SIRPβ2-CD47 interaction costimulates T-cell proliferation," Blood (2005); 105(6): 2421-2427.

Ring et al., "Anti-SIRP[alpha] antibody immunotherapy enhances neutrophil and macrophage antitumor activity," PNAS USA (Nov. 2017); 114(49):E10578-E10585, 8 pages.

Tabata et al. (Jan. 2012) "Possible prediction of underlying lymphoma by high sIL-2R/ferritin ratio in hemophagocytic syndrome." Annals of Hematology, 91(1):63-71. doi:10.1007/s00277-011-1239-7.

Zoref-Lorenz, et al., (Feb. 2022) "An improved index for diagnosis and mortality prediction in malignancy-associated hemophagocytic lymphohistiocytosis," Blood, 139(7):1098-1110.

Zou, et al. (Sep. 2023) "Serum sCD25/ferritin ratio combined with MCP-1 is a valid predictor for identifying LAHS with HLH as the first manifestation," J Cancer Res Clin Oncol, 149(11):8521-8533.

Champiat, S., et al.; "Safety, pharmacokinetics, efficacy, and preliminary biomarker data of first-in-class BI 765063, a selective SIRPa inhibitor: results of monotherapy dose escalation in Phase 1 study in patients with advanced solid tumors," Poster presented at the American Society of Clinical Oncology (ASCO) Annual Meeting, Virtual Format, Jun. 4-8, 2021 ; [retrieved online Jan. 27, 2025] URL: https://www.ose-immuno.com/wp- content/uploads/2021/10/SIRPa_mono_ASCO_poster_final.pdf; 1 page (2021).

Maiti, A., et al.; "A Phase 1b Study of ELA026, a Monoclonal Antibody Targeting Signal Regulatory Protein-a/β1/y, in Patients with Newly Diagnosed and Previously Treated Secondary Hemophagocytic Lymphohistiocytosis," ABSTRACT from the 39th Annual Meeting of the Histiocyte Society, held virtually and in person in Athens, Greece from Oct. 22-24, 2023; Pediatr Blood Cancer; 70:e30714; pp, S23-S24; doi: 10.1002/pbc.30714 (2023).

Maiti, A., et al.; Abstract: LB3442: "ELA026 Targeting Of Sirp(+) Immune Cells Results In A High Response Rate And Improved 2-Month Survival Of Treatment-Naïve Malignancy- Associated Hemophagocytic Lymphohistiocytosis In A Phase 1 Study," Abstract release date: Jun. 3, 2024 [retrieved online Jan. 27, 2025] URL: https://library.ehaweb.org/eha/2024/eha2024- congress/4136517/abhishek.maiti.ela026.targeting.of.sirp282B29.immune.cells.results.in.a.hig h.html; 2 pages (2024).

PCT/US2024/052123 International Search Report and Written Opinion, mailed Jan. 30, 2025, 16 pages.

PCT/US2024/052127 International Search Report and Written Opinion, mailed Jan. 30, 2025, 14 pages.

Sim, J., et al.; "Discovery of high affinity, pan-allelic, and pan-mammalian reactive antibodies against the myeloid checkpoint receptor SIRPa," Mabs; 11(6): 1036-1052 (Aug.-Sep. 2019).

Voets, E., et al.; "Functional characterization of the selective pan-allele anti-SIRPa antibody ADU-1805 that blocks the SIRPa-CD47 innate immune checkpoint," J Immunother Cancer; 7(1):340; pp. 1-15 (2019).

* cited by examiner

FIG. 2B
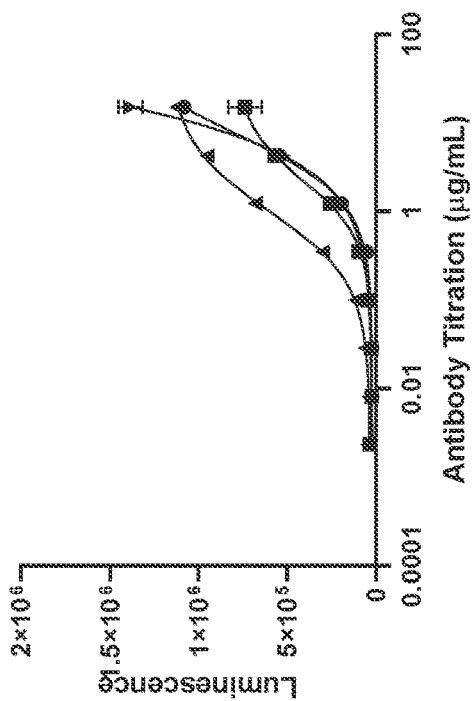
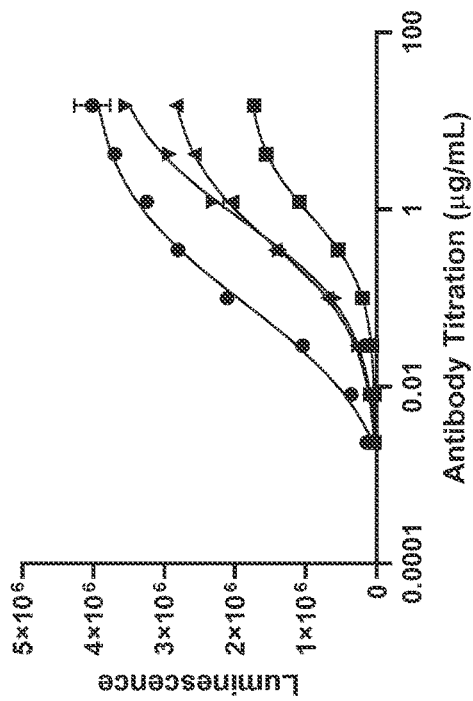

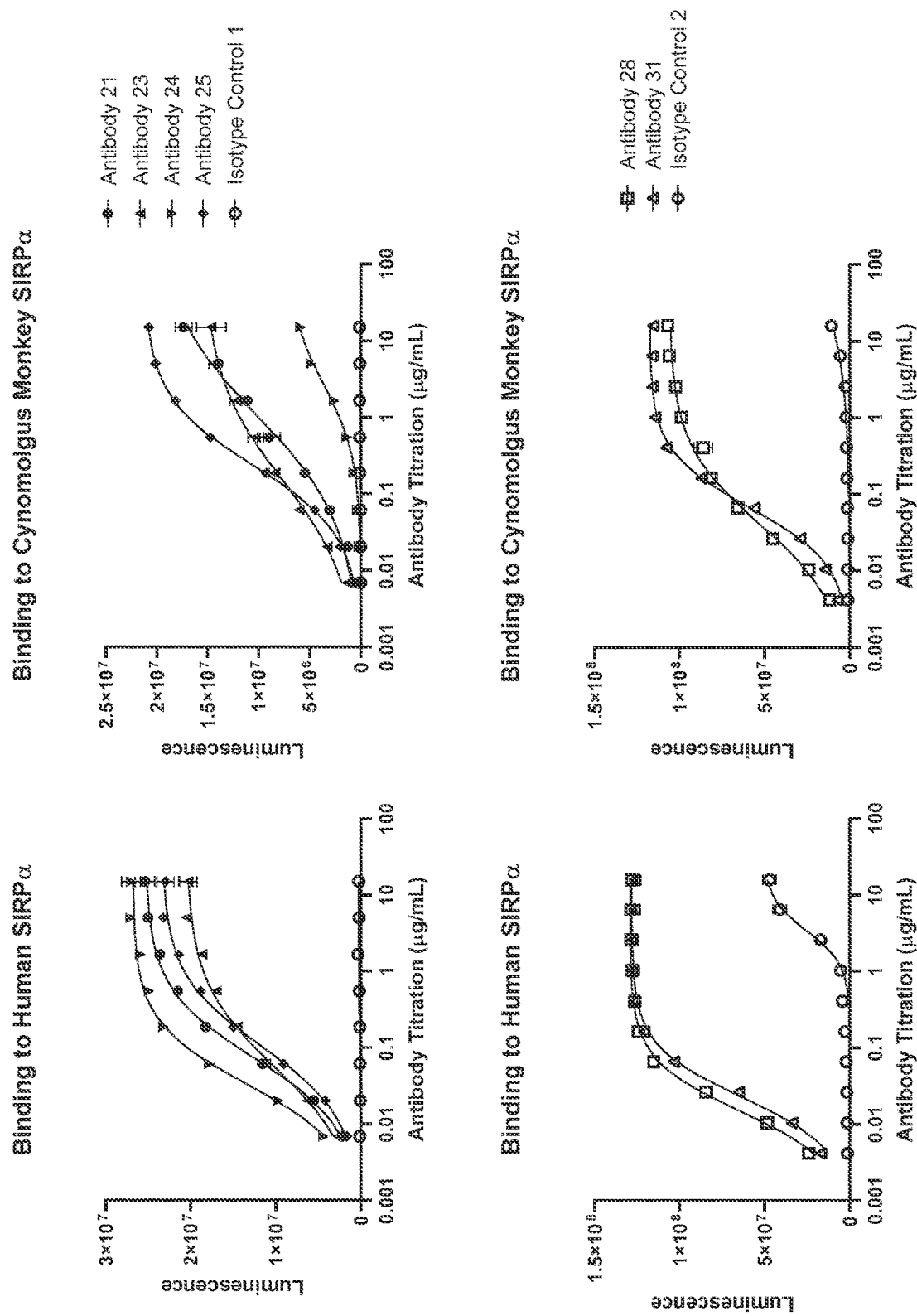

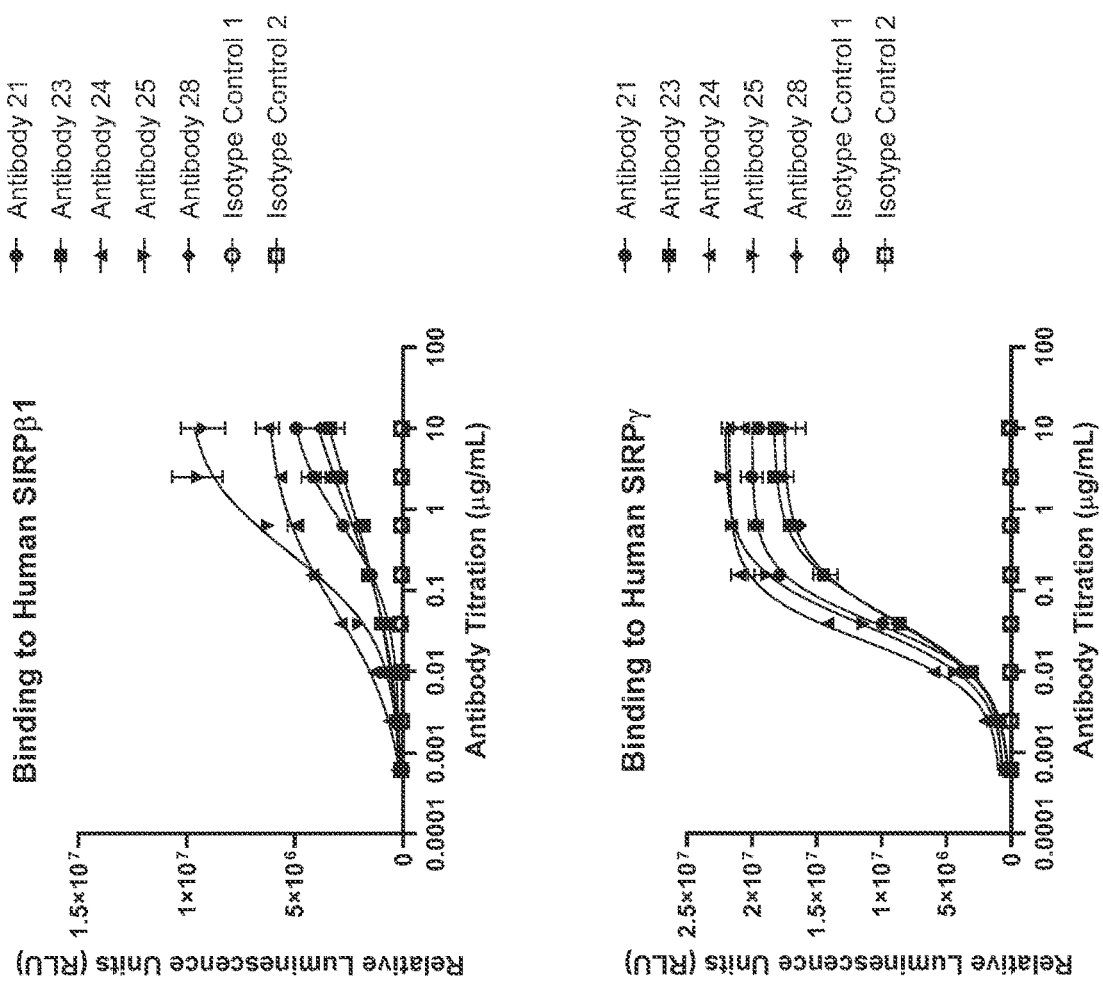

FIG. 3C
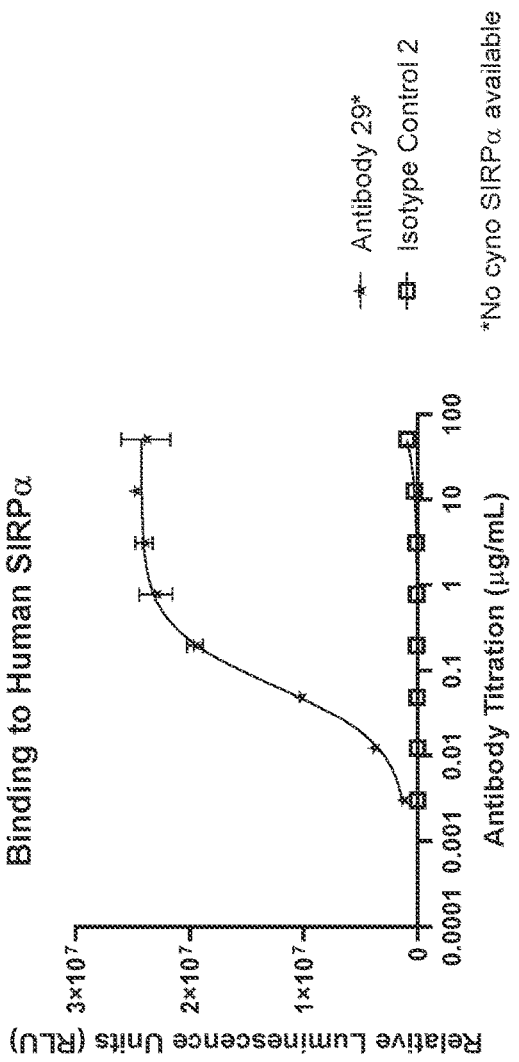
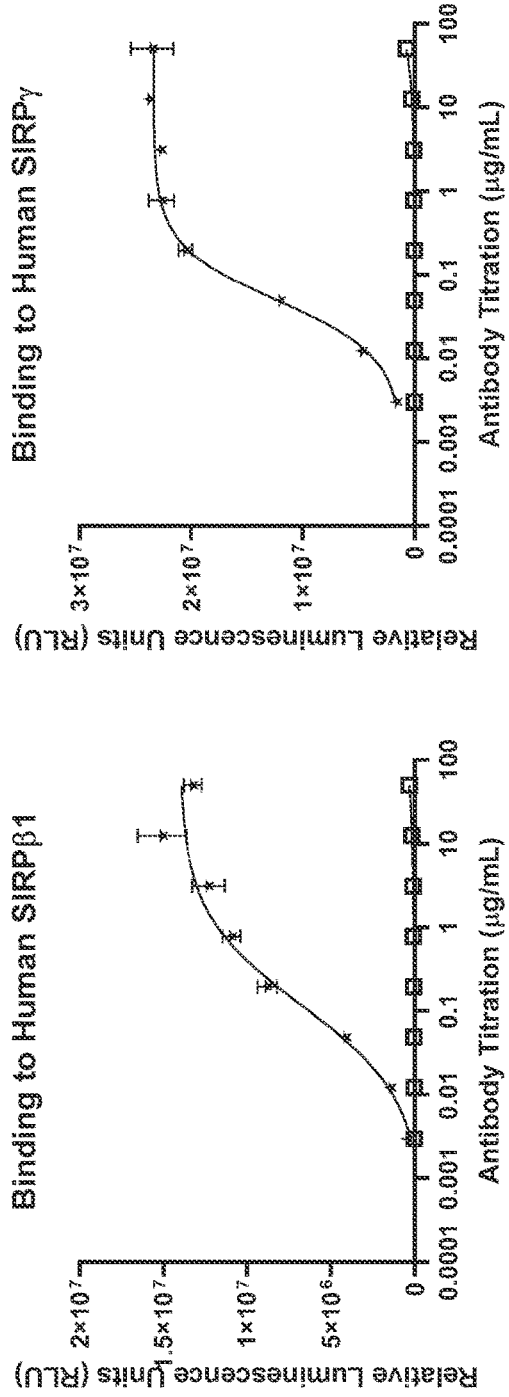

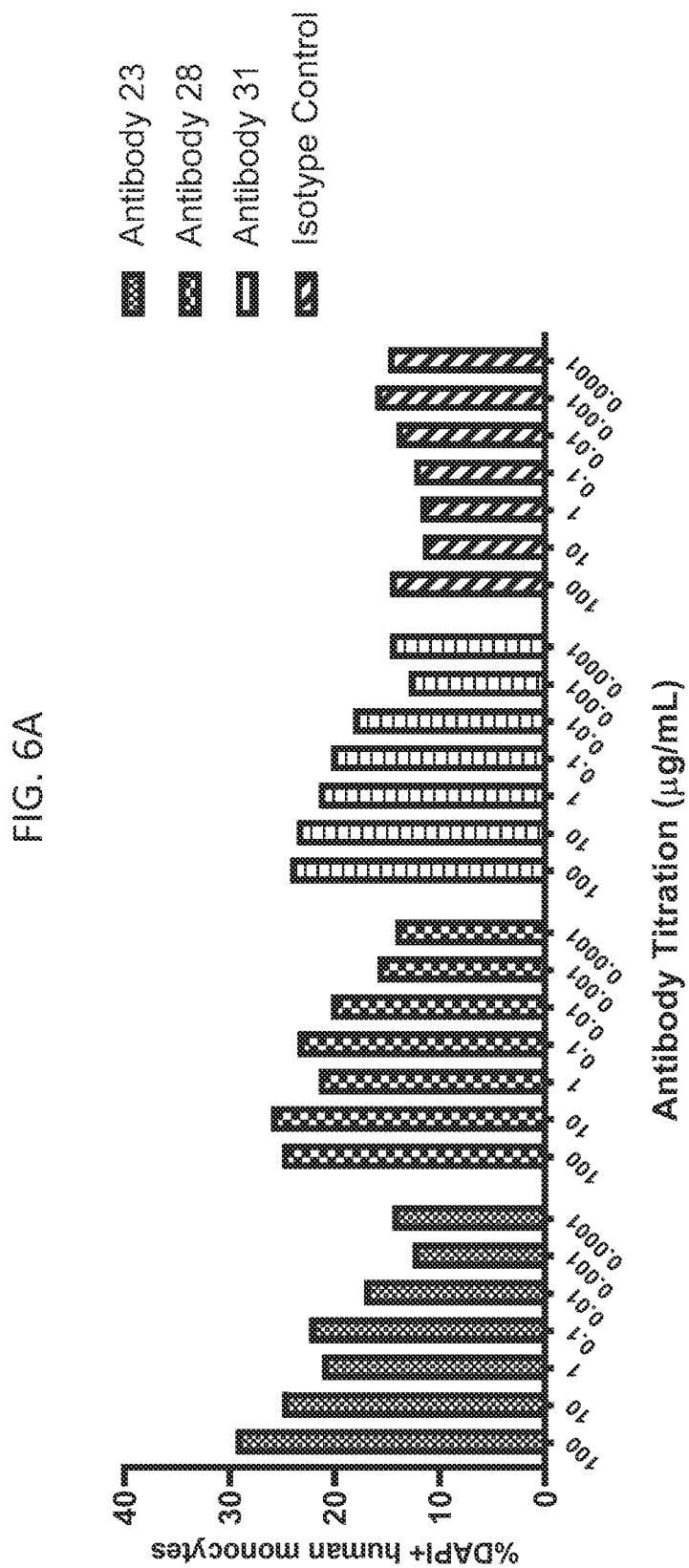

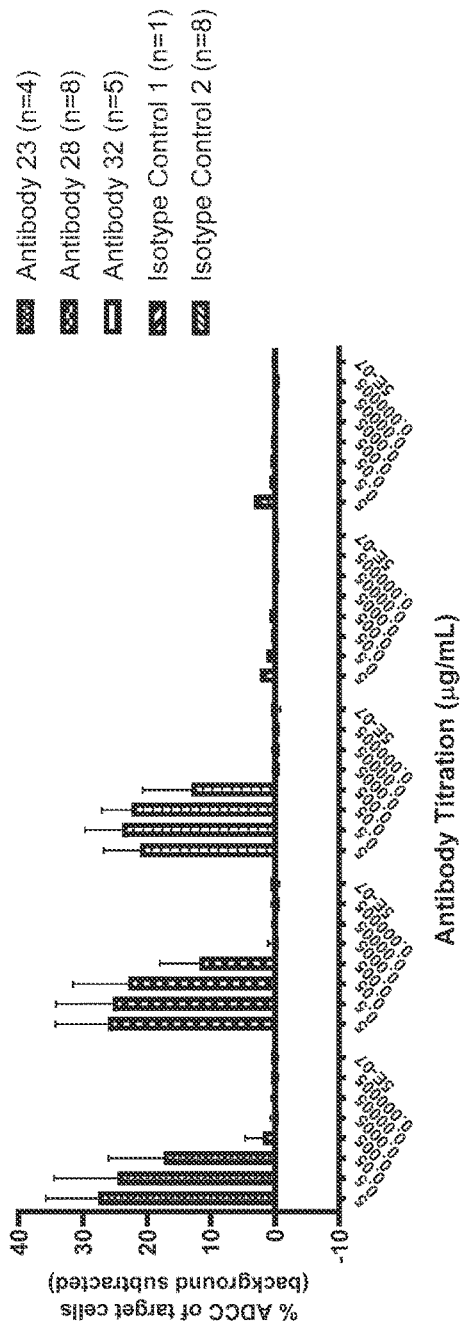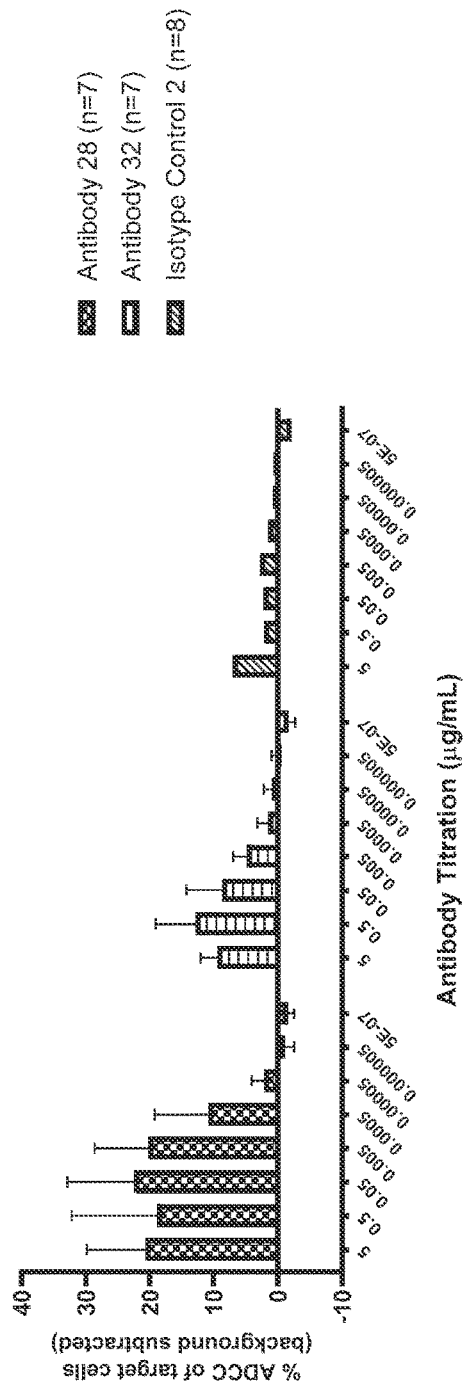
FIG. 6B

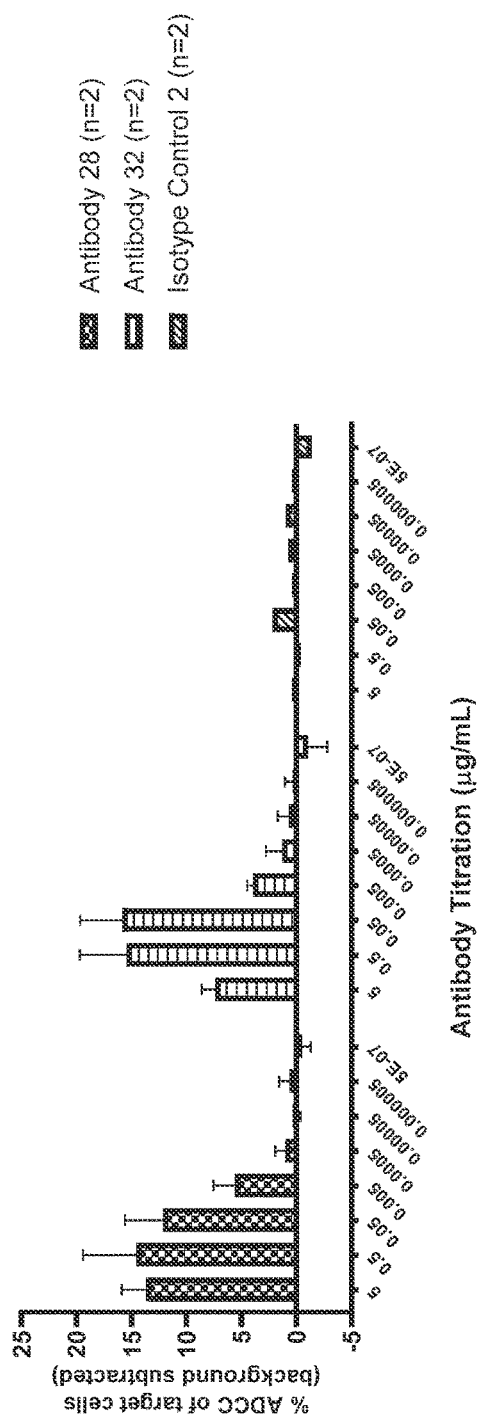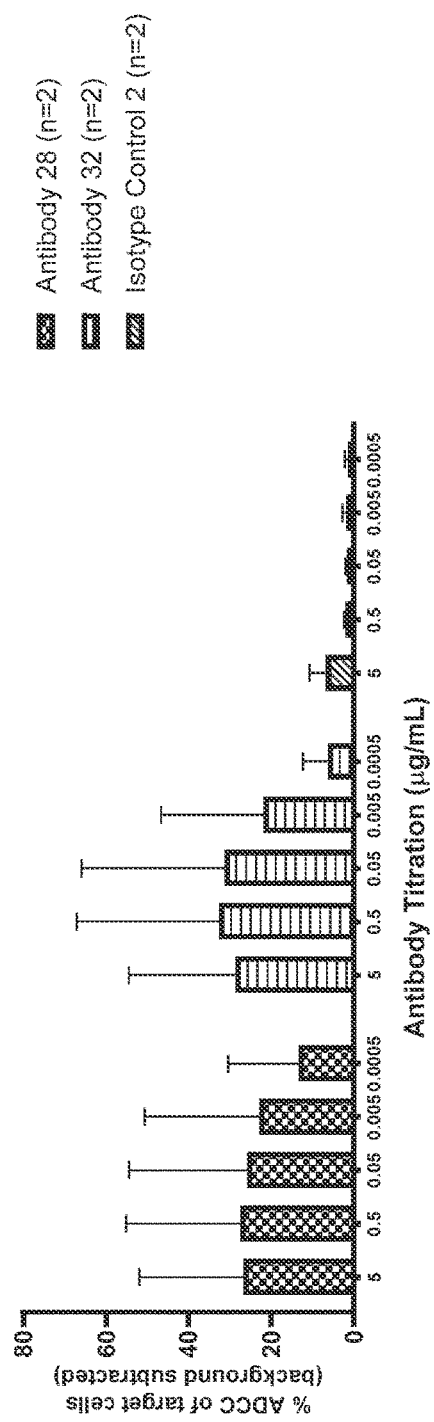
FIG. 6C

FIG. 6D
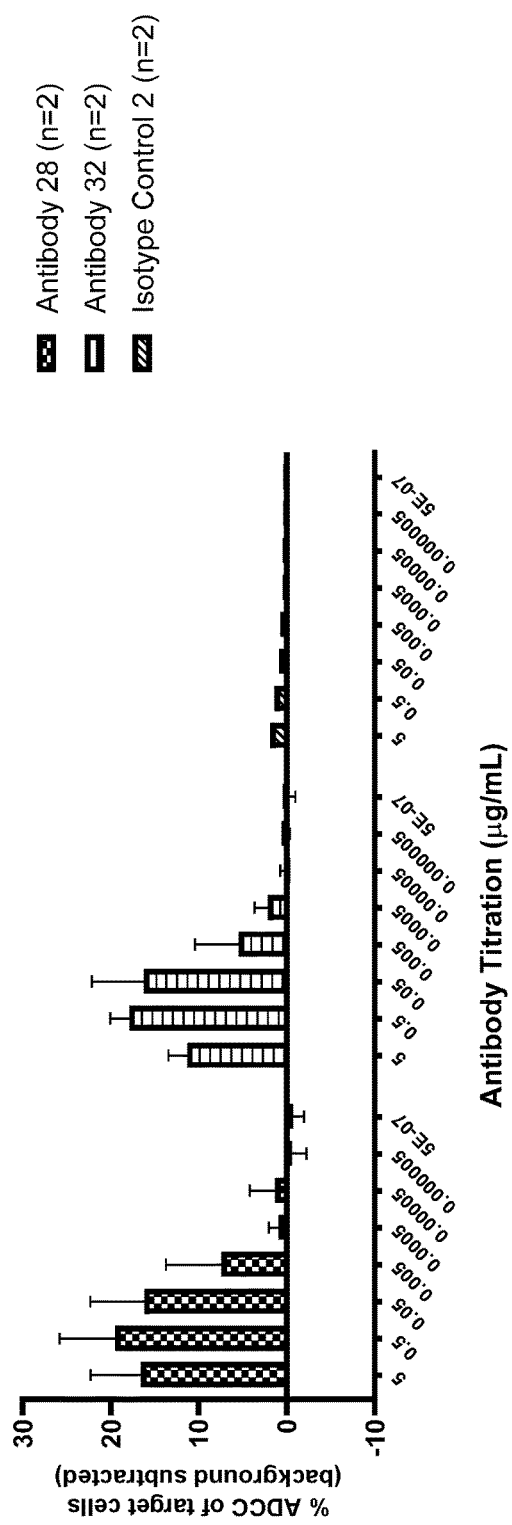
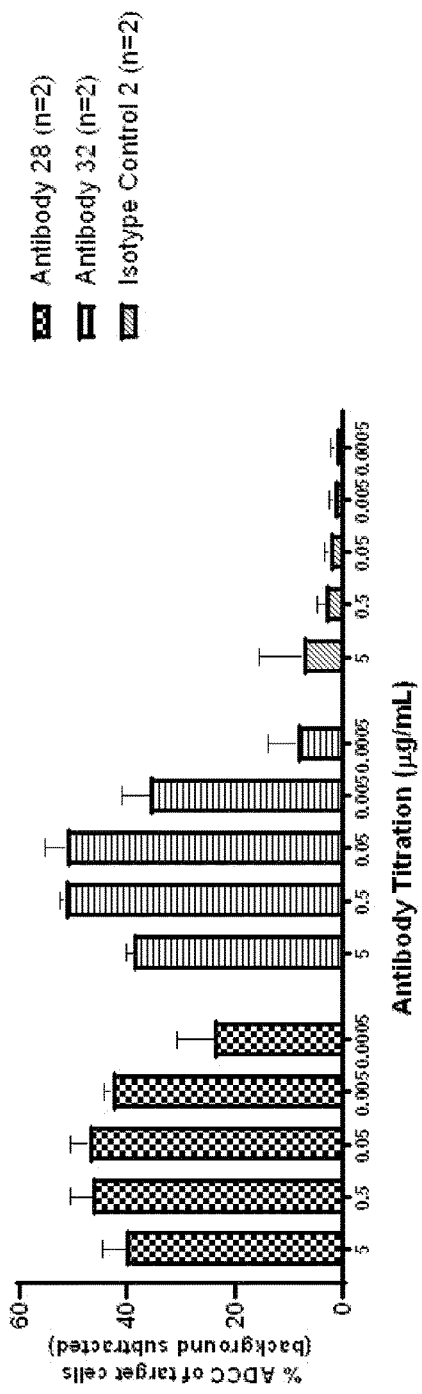

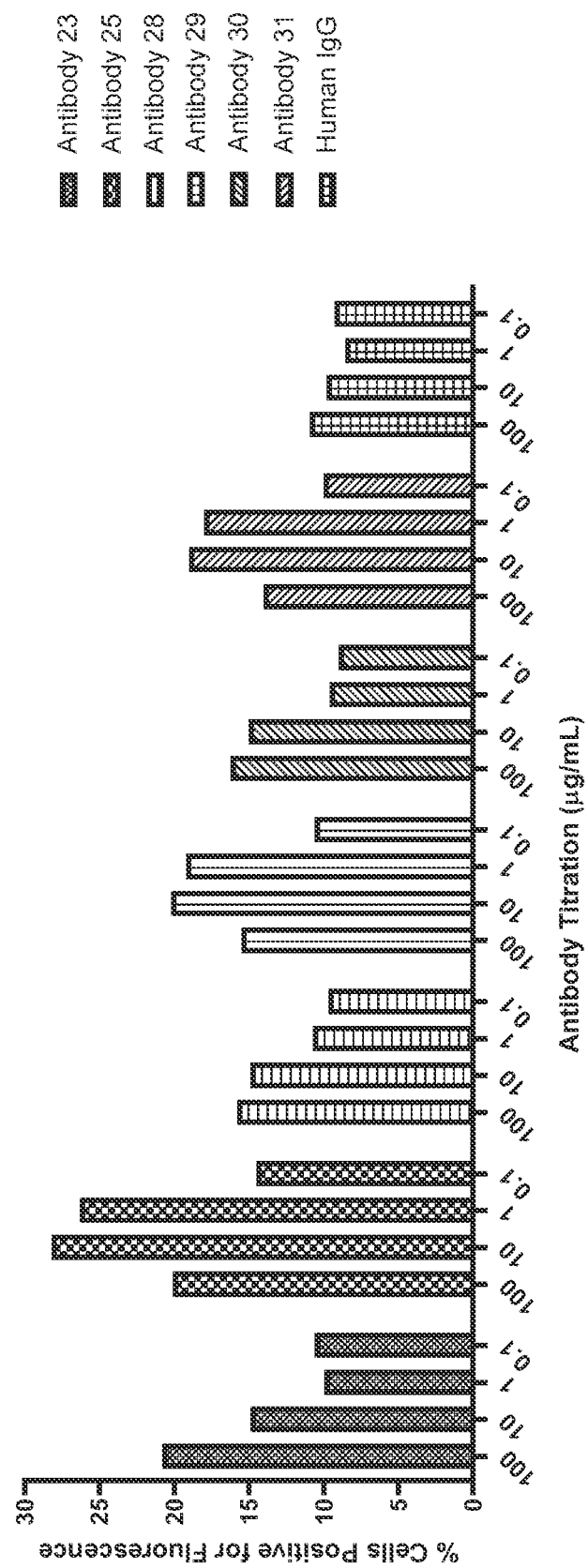

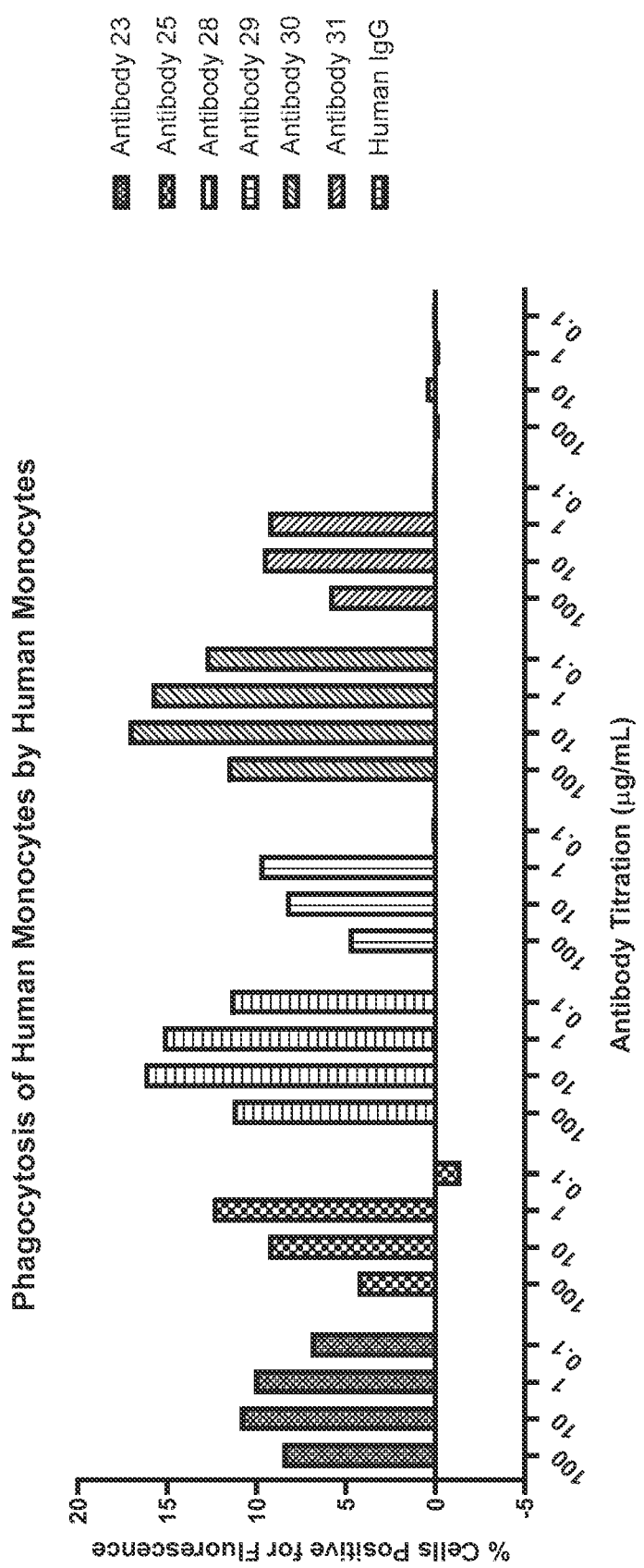

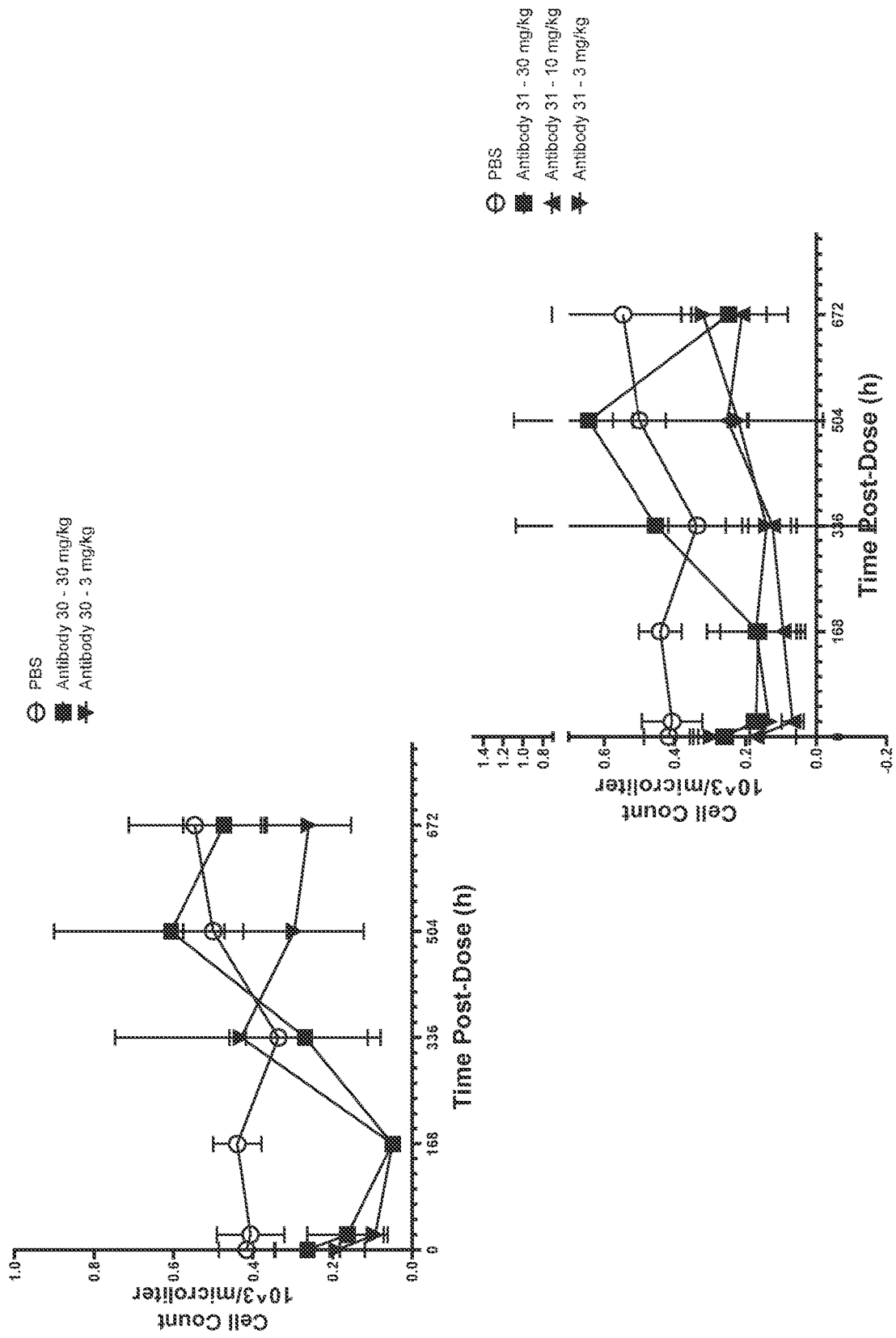

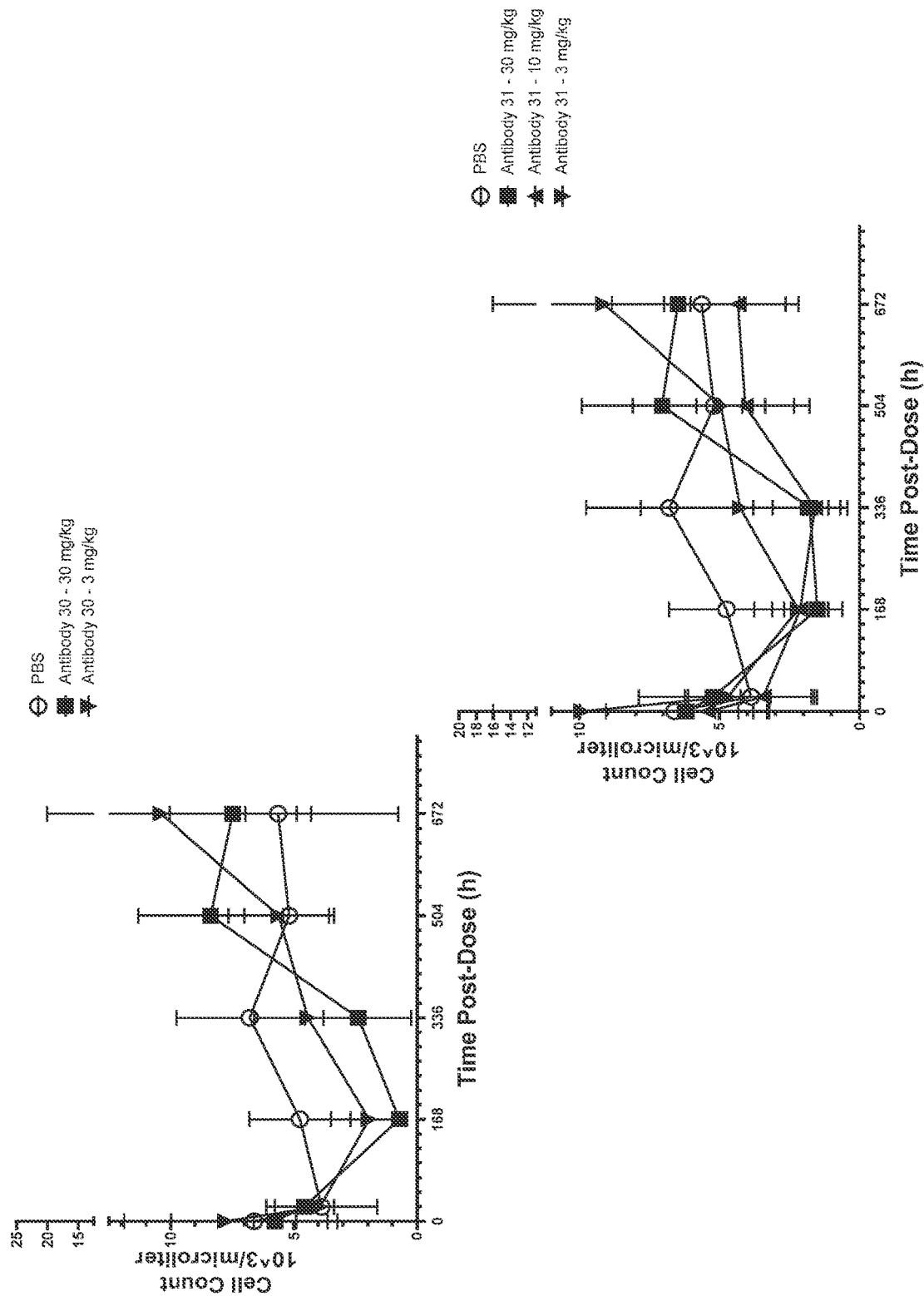

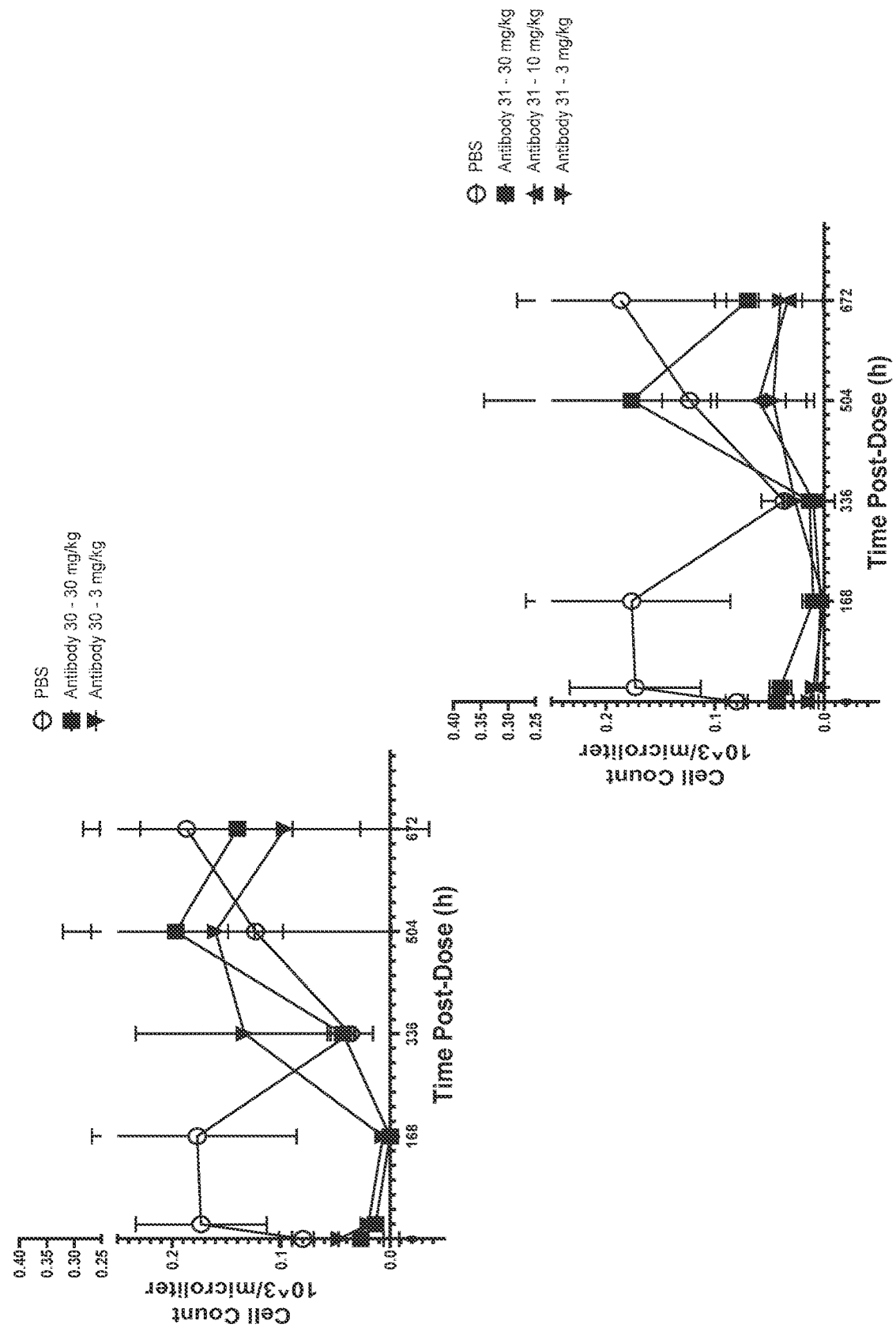

SIRP ALPHA, SIRP BETA 1, AND SIRP GAMMA ANTIBODIES AND USES THEREOF

CROSS REFERENCE TO RELATED APPLICATIONS

This application is a U.S. National Stage Application under 35 U.S.C. § 371 of International Application No. PCT/US2021/031605, filed on May 10, 2021, which claims priority to U.S. provisional patent application No. 63/022,309, filed on May 8, 2020, the contents of each of which are incorporated by reference herein in their entirety.

INCORPORATION OF SEQUENCE LISTING

The Sequence Listing associated with this application is provided electronically in TXT file format and is hereby incorporated by reference into the specification. The name of the TXT file containing the Sequence Listing is ELTH_001_01WO_SeqList_ST25. The TXT file is 167,738 bytes and was created on Jun. 30, 2021.

BACKGROUND

Signal regulatory proteins (SIRPs) are a family of cell-surface immune receptors with Ig-like extracellular domains. The SIRP family contains three inhibitory, activating, and non-signaling members, which have closely related extracellular regions, but differ in their cytoplasmic domains. SIRP family members play a role in immune regulation. Signal regulatory protein alpha (also known as SIRPα, SIRP alpha, CD172a, BIT, MFR, MYD-1, P84, PTPNS1, SHPS1) is a transmembrane glycoprotein and one member of the signal regulatory SIRP family of cell-surface receptors. SIRPα delivers an inhibitory signal via immunoreceptor tyrosine-based inhibition motifs (ITIMs) located in the cytoplasmic domain of the protein that downregulates myeloid cell phagocytic and pro-inflammatory activity. SIRPα on phagocytes interacts with CD47, also known as integrin-associated protein (IAP), a ubiquitously expressed cell surface protein that serves, among other things, as a marker of "self" on viable cells. Thus, CD47/SIRPα signaling acts as a "do not eat me" immune check point to negatively control innate immune cell phagocytosis. SIRPβ1 (also known as SIRPβ, SIRPB1, and CD172b) delivers an activating signal through association with the DNA polymerase III subunit tau (DNAX) activation protein of 12 kDa (DAP12, also known as transmembrane immune signaling adaptor TYROBP, or TYROBP), a transmembrane adaptor protein with an immunoreceptor tyrosine-based activation motif (ITAM). SIRPα and SIRPβ1 are expressed on myeloid cells of the immune system, as well as other cell types. SIRPγ (also called CD172-antigen-like family member B, CD172g, and SIRP-beta-2) is expressed by lymphocytes such as T cells, and also binds to CD47. There is a need for agents that bind to SIRPα, SIRPβ1, as well as SIRPγ expressing cells for the treatment of a variety of diseases and conditions.

SUMMARY

The disclosure provides Fc-containing antibodies that are specific for one or more of SIRPγ and SIRPβ1, and is also specific for SIRPγ, wherein binding of the antibody to one or more of SIRPγ, SIRPβ1, and SIRPγ on a cell induces depletion of the cell.

The disclosure provides antibodies that are specific for one or more of SIRPγ and SIRPβ1, and antibodies specific for SIRPγ, wherein the antibody comprises a heavy chain variable region and a light chain variable region, and wherein the heavy chain variable region comprises: (i) a complementarity determining region 1 (CDR-H1) sequence selected from the group consisting of SEQ ID NOS: 54, 56, and 59-65; (ii) a CDR-H2 sequence selected from the group consisting of SEQ ID NOS: 70, 72, and 75-81; and (iii) a CDR-H3 sequence selected from the group consisting of SEQ ID NOS: 86, 88-89, and 92-99; and/or wherein the light chain variable region comprises: (i) a light chain CDR 1 (CDR-L1) sequence selected from the group consisting of SEQ ID NOS: 5, 7-8, and 11-18; (ii) a CDR-L2 sequence selected from the group consisting of SEQ ID NOS: 23-24, and 27-33; and (iii) a CDR-H3 sequence selected from the group consisting of SEQ ID NOS: 36, 38-39, and 42-49.

In some embodiments of the antibodies of disclosure, the antibody comprises the heavy and light variable chain CDR sequence combination selected from the group consisting of: (a) SEQ ID NO: 5, SEQ ID NO: 23, SEQ ID NO: 36, SEQ ID NO: 54, SEQ ID NO: 70, and SEQ ID NO: 86; (b) SEQ ID NO: 7, SEQ ID NO: 24, SEQ ID NO: 38, SEQ ID NO: 54, SEQ ID NO: 72, and SEQ ID NO: 88; (c) SEQ ID NO: 8, SEQ ID NO: 24, SEQ ID NO: 39, SEQ ID NO: 56, SEQ ID NO: 72, and SEQ ID NO: 89; (d) SEQ ID NO: 11, SEQ ID NO: 27, SEQ ID NO: 42, SEQ ID NO: 59, SEQ ID NO: 75, and SEQ ID NO: 92; (e) SEQ ID NO: 12, SEQ ID NO: 28, SEQ ID NO: 43, SEQ ID NO: 60, SEQ ID NO: 76, and SEQ ID NO: 93; (f) SEQ ID NO: 13, SEQ ID NO: 29, SEQ ID NO: 44, SEQ ID NO: 61, SEQ ID NO: 76, and SEQ ID NO: 94; (g) SEQ ID NO: 13, SEQ ID NO: 30, SEQ ID NO: 45, SEQ ID NO: 62, SEQ ID NO: 77, and SEQ ID NO: 95; (h) SEQ ID NO: 14, SEQ ID NO: 31, SEQ ID NO: 46, SEQ ID NO: 63, SEQ ID NO: 78, and SEQ ID NO: 96; (i) SEQ ID NO: 15, SEQ ID NO: 31, SEQ ID NO: 47, SEQ ID NO: 62, SEQ ID NO: 79, and SEQ ID NO: 97; (j) SEQ ID NO: 16, SEQ ID NO: 31, SEQ ID NO: 47, SEQ ID NO: 62, SEQ ID NO: 79, and SEQ ID NO: 97; (k) SEQ ID NO: 17, SEQ ID NO: 32, SEQ ID NO: 48, SEQ ID NO: 64, SEQ ID NO: 80, and SEQ ID NO: 98; and (l) SEQ ID NO: 18, SEQ ID NO: 33, SEQ ID NO: 49, SEQ ID NO: 65, SEQ ID NO: 81, and SEQ ID NO: 99. In some embodiments, the heavy chain variable region comprises a sequence selected from the group consisting of SEQ ID NOS: 104, 106-107, and 110-118. In some embodiments, the light chain variable region comprises a sequence selected from the group consisting of SEQ ID NOS: 123, 125-126, and 129-137.

In some embodiments of the antibodies of the disclosure, the heavy chain variable region sequence and the light chain variable region sequence are selected from the group consisting of: (a) SEQ ID NO: 104 and SEQ ID NO: 123; (b) SEQ ID NO: 106 and SEQ ID NO: 125; (c) SEQ ID NO: 107 and SEQ ID NO: 126; (d) SEQ ID NO: 110 and SEQ ID NO: 129; (e) SEQ ID NO: 111 and SEQ ID NO: 130; (f) SEQ ID NO: 112 and SEQ ID NO: 131; (g) SEQ ID NO: 113 and SEQ ID NO: 132; (h) SEQ ID NO: 114 and SEQ ID NO: 133; (i) SEQ ID NO: 115 and SEQ ID NO: 134; (j) SEQ ID NO: 116 and SEQ ID NO: 135; (k) SEQ ID NO: 117 and SEQ ID NO: 136; and (l) SEQ ID NO: 118 and SEQ ID NO: 137.

In some embodiments of the antibodies of the disclosure, the heavy chain variable domain of the antibody comprises the amino acid sequence of SEQ ID NO: 104 or an amino acid sequence with at least 80% sequence identity thereto; and/or wherein the light chain variable domain of the antibody comprises the amino acid sequence of SEQ ID NO:

123, or an amino acid sequence with at least 80% sequence identity thereto. In some embodiments, the heavy chain variable domain of the antibody comprises the amino acid sequence of SEQ ID NO: 106 or an amino acid sequence with at least 80% sequence identity thereto; and/or wherein the light chain variable domain of the antibody comprises the amino acid sequence of SEQ ID NO: 125, or an amino acid sequence with at least 80% sequence identity thereto. In some embodiments, the heavy chain variable domain of the antibody comprises the amino acid sequence of SEQ ID NO: 107 or an amino acid sequence with at least 80% sequence identity thereto; and/or wherein the light chain variable domain of the antibody comprises the amino acid sequence of SEQ ID NO: 126, or an amino acid sequence with at least 80%, sequence identity thereto. In some embodiments, the heavy chain variable domain of the antibody comprises the amino acid sequence of SEQ ID NO: 110 or an amino acid sequence with at least 80% sequence identity thereto; and/or wherein the light chain variable domain of the antibody comprises the amino acid sequence of SEQ ID NO: 129, or an amino acid sequence with at least 80% sequence identity thereto. In some embodiments, the heavy chain variable domain of the antibody comprises the amino acid sequence of SEQ ID NO: 111 or an amino acid sequence with at least 80% sequence identity thereto; and/or wherein the light chain variable domain of the antibody comprises the amino acid sequence of SEQ ID NO: 130, or an amino acid sequence with at least 80% sequence identity thereto. In some embodiments, the heavy chain variable domain of the antibody comprises the amino acid sequence of SEQ ID NO: 112 or an amino acid sequence with at least 80% sequence identity thereto; and/or wherein the light chain variable domain of the antibody comprises the amino acid sequence of SEQ ID NO: 131, or an amino acid sequence with at least 80% sequence identity thereto. In some embodiments, the heavy chain variable domain of the antibody comprises the amino acid sequence of SEQ ID NO: 113 or an amino acid sequence with at least 80% sequence identity thereto; and/or wherein the light chain variable domain of the antibody comprises the amino acid sequence of SEQ ID NO: 132, or an amino acid sequence with at least 80% sequence identity thereto. In some embodiments, the heavy chain variable domain of the antibody comprises the amino acid sequence of SEQ ID NO: 114 or an amino acid sequence with at least 80% sequence identity thereto; and/or wherein the light chain variable domain of the antibody comprises the amino acid sequence of SEQ ID NO: 133, or an amino acid sequence with at least 80% sequence identity thereto. In some embodiments, the heavy chain variable domain of the antibody comprises the amino acid sequence of SEQ ID NO: 115 or an amino acid sequence with at least 80% sequence identity thereto; and/or wherein the light chain variable domain of the antibody comprises the amino acid sequence of SEQ ID NO: 134, or an amino acid sequence with at least 80% sequence identity thereto. In some embodiments, the heavy chain variable domain of the antibody comprises the amino acid sequence of SEQ ID NO: 116 or an amino acid sequence with at least 80% sequence identity thereto; and/or wherein the light chain variable domain of the antibody comprises the amino acid sequence of SEQ ID NO: 135, or an amino acid sequence with at least 80% sequence identity thereto. In some embodiments, the heavy chain variable domain of the antibody comprises the amino acid sequence of SEQ ID NO: 117 or an amino acid sequence with at least 80% sequence identity thereto; and/or wherein the light chain variable domain of the antibody comprises the amino acid sequence of SEQ ID NO: 136, or an amino acid sequence with at least 80% sequence identity thereto. In some embodiments, the heavy chain variable domain of the antibody comprises the amino acid sequence of SEQ ID NO: 118 or an amino acid sequence with at least 80% sequence identity thereto; and/or wherein the light chain variable domain of the antibody comprises the amino acid sequence of SEQ ID NO: 137, or an amino acid sequence with at least 80% sequence identity thereto. In some embodiments, the antibody comprises an Fc domain.

In some embodiments of the antibodies of the disclosure, the antibody is an Fc-containing antibody, and the binding of the antibody to one or more of SIRPα, SIRPβ1, and SIRPγ on a cell induces depletion of the cell. In some embodiments, the cell depletion involves antibody dependent cellular phagocytosis (ADCP). In some embodiments, the cell depletion involves antibody dependent cellular cytotoxicity (ADCC). In some embodiments, the cell depletion involves depletion of SIRPγ positive cells. In some embodiments, the SIRPγ cells are lymphocytes. In some embodiments, the lymphocytes are T cells or NK cells. In some embodiments, the T cells are cytotoxic T cells, helper T cells, memory T cells, regulatory T cells, natural killer T cells, mucosal associated invariant T cells, gamma delta T cells, or a combination thereof. In some embodiments, the cell depletion involves depletion of SIRPγ positive cells and SIRPα and/or SIRPβ1 positive cells. In some embodiments, the SIRPα and/or SIRPβ1 cells are myeloid cells or myeloid progenitor cells. In some embodiments, the SIRPα and/or SIRPβ1 cells are selected from the group consisting of monocytes, macrophages, dendritic cells, basophils, eosinophils, neutrophils, and mast cells.

In some embodiments of the antibodies of the disclosure, the antibody is a monoclonal antibody. In some embodiments, the antibody is an antibody fragment. In some embodiments, the antibody is a human antibody. In some embodiments, the antibody is a humanized antibody. In some embodiments, the antibody is a chimeric antibody. In some embodiments, the antibody is a full-length antibody.

In some embodiments of the antibodies of the disclosure, the Fc domain is selected from the group consisting of human IgG1, IgG2, IgG3, and IgG4. In some embodiments, the Fc domain comprises SEQ ID NO: 3, SEQ ID NO: 4 or SEQ ID NO: 26. In some embodiments, the Fc domain comprises one or more amino acid substitutions relative to SEQ ID NO: 3, SEQ ID NO: 4 or SEQ ID NO: 26. In some embodiments, the Fc domain of the antibody is human IgG1 and comprises at least one amino acid substitution at a position selected from the group consisting of: 214, 215, 221, 222, 228, 234, 235, 236, 239, 240, 241, 243, 244, 245, 247, 250, 252, 254, 256, 262, 263, 264, 265, 266, 267, 268, 269, 270, 292, 296, 297, 298, 299, 300, 305, 313, 324, 325, 326, 327, 328, 329, 330, 332, 333, 334, 345, 356, 358, 396, 428, 430, 433, 434, and 440 wherein the position numbers of the amino acid residues are of the EU numbering scheme. In some embodiments, the IgG1 Fc comprises a sequence selected from the group consisting of: (a) SEQ ID NO: 19; (b) SEQ ID NO: 20, wherein X1 is V or A; (c) SEQ ID NO: 21, wherein X1 is V or A; X2 is G or A; X3 is S or D; and X4 is I or E; (d) SEQ ID NO: 22, wherein X1 is V or A; (e) SEQ ID NO: 25, wherein X1 is V or A; X2 is M or L; and X3 is N or S; and (f) SEQ ID NO: 26, wherein X1 is K or R; X2 is D or E; and X3 is L or M. In some embodiments, the IgG4 Fc comprises a sequence of SEQ ID NO: 34, 35 or 37, wherein X1 in SEQ ID NO: 37 is S or P; and X2 in SEQ ID NO: 37 is L or E.

In some embodiments of the antibodies of the disclosure, the binding of the antibody does not disrupt the interaction between CD47 and SIRPα, and/or the interaction between CD47 and SIRPγ. In some embodiments, binding of the antibody disrupts the interaction between CD47 and SIRPα, and/or the interaction between CD47 and SIRPγ. In some embodiments, the antibody binds SIRPα, SIRPβ1 and SIRPγ. In some embodiments, the antibody binds SIRPα and SIRPγ and exhibits little or no binding to SIRPβ1. In some embodiments, the antibody binds SIRPβ1 and SIRPγ and exhibits little or no binding to SIRPα.

In some embodiments of the antibodies of the disclosure, the antibody comprises a binding affinity for SIRPα of about 100 μm, about 1 nM, about 5 nM, about 10 nM, about 50 nM, about 100 nM, about 500 nM, or about 1 μM. In some embodiments, the antibody comprises a binding affinity for SIRPβ1 of about 0.5 nM, about 0.1 nM, about 5 nM, about 10 nM, about 50 nM, about 100 nM, about 500 nM, about 1 μM, about 5 or about 10 μM. In some embodiments, the antibody comprises a binding affinity for SIRPγ of about 0.0001 nM, about 0.0005 nM, about 0.001 nM, about 0.005 nM, about 0.1 nM, about 0.05 nM, about 0.1 nM, about 0.5 nM, about 1 nM, about 5 nM, about 10 nM, about 50 nM, about 100 nM, about 500 nM, about 1 μM, about 2 μM, or about 3 μM.

The disclosure provides a pharmaceutical composition comprising an antibody of the disclosure, and optionally a pharmaceutically acceptable carrier.

The disclosure provides a nucleic acid encoding for the antibody of the disclosure. In some embodiments, the nucleic acid comprises nucleic acid sequence selected from the group consisting of SEQ ID NOS: 142, 144-145, 148-156, 161, 163-164, and 167-175. In some embodiments, the heavy chain variable domain is encoded by the nucleic acid sequence of SEQ ID NO: 142, or a nucleic acid sequence with at least 80% sequence identity thereto; and/or wherein the light chain variable domain is encoded by the nucleic acid sequence of SEQ ID NO: 161, or a nucleic acid sequence with at least 80% sequence identity thereto. In some embodiments, the heavy chain variable domain is encoded by the nucleic acid sequence of SEQ ID NO: 144, or a nucleic acid sequence with at least 80% sequence identity thereto; and/or wherein the light chain variable domain is encoded by the nucleic acid sequence of SEQ ID NO: 163, or a nucleic acid sequence with at least 80% sequence identity thereto. In some embodiments, the heavy chain variable domain is encoded by the nucleic acid sequence of SEQ ID NO: 145, or a nucleic acid sequence with at least 80% sequence identity thereto; and/or wherein the light chain variable domain is encoded by the nucleic acid sequence of SEQ ID NO: 164, or a nucleic acid sequence with at least 80% sequence identity thereto. In some embodiments, the heavy chain variable domain is encoded by the nucleic acid sequence of SEQ ID NO: 148, or a nucleic acid sequence with at least 80% sequence identity thereto; and/or wherein the light chain variable domain is encoded by the nucleic acid sequence of SEQ ID NO: 167, or a nucleic acid sequence with at least 80% sequence identity thereto. In some embodiments, the heavy chain variable domain is encoded by the nucleic acid sequence of SEQ ID NO: 149, or a nucleic acid sequence with at least 80% sequence identity thereto; and/or wherein the light chain variable domain is encoded by the nucleic acid sequence of SEQ ID NO: 168, or a nucleic acid sequence with at least 80% sequence identity thereto. In some embodiments, the heavy chain variable domain is encoded by the nucleic acid sequence of SEQ ID NO: 150, or a nucleic acid sequence with at least 80% sequence identity thereto; and/or wherein the light chain variable domain is encoded by the nucleic acid sequence of SEQ ID NO: 169, or a nucleic acid sequence with at least 80% sequence identity thereto. In some embodiments, the heavy chain variable domain is encoded by the nucleic acid sequence of SEQ ID NO: 151, or a nucleic acid sequence with at least 80% sequence identity thereto; and/or wherein the light chain variable domain is encoded by the nucleic acid sequence of SEQ ID NO: 170, or a nucleic acid sequence with at least 80% sequence identity thereto. In some embodiments, the heavy chain variable domain is encoded by the nucleic acid sequence of SEQ ID NO: 152, or a nucleic acid sequence with at least 80% sequence identity thereto; and/or wherein the light chain variable domain is encoded by the nucleic acid sequence of SEQ ID NO: 171, or a nucleic acid sequence with at least 80% sequence identity thereto. In some embodiments, the heavy chain variable domain is encoded by the nucleic acid sequence of SEQ ID NO: 153, or a nucleic acid sequence with at least 80% sequence identity thereto; and/or wherein the light chain variable domain is encoded by the nucleic acid sequence of SEQ ID NO: 172, or a nucleic acid sequence with at least 80% sequence identity thereto. In some embodiments, the heavy chain variable domain is encoded by the nucleic acid sequence of SEQ ID NO: 154, or a nucleic acid sequence with at least 80% sequence identity thereto; and/or wherein the light chain variable domain is encoded by the nucleic acid sequence of SEQ ID NO: 173, or a nucleic acid sequence with at least 80% sequence identity thereto. In some embodiments, the heavy chain variable domain is encoded by the nucleic acid sequence of SEQ ID NO: 155, or a nucleic acid sequence with at least 80% sequence identity thereto; and/or wherein the light chain variable domain is encoded by the nucleic acid sequence of SEQ ID NO: 174, or a nucleic acid sequence with at least 80% sequence identity thereto. In some embodiments, the heavy chain variable domain is encoded by the nucleic acid sequence of SEQ ID NO: 156, or a nucleic acid sequence with at least 80% sequence identity thereto; and/or wherein the light chain variable domain is encoded by the nucleic acid sequence of SEQ ID NO: 175, or a nucleic acid sequence with at least 80% sequence identity thereto.

The disclosure provides vectors comprising the nucleic acid of the disclosure.

The disclosure provides methods of inducing the depletion of a population of cells, the methods comprising contacting the population of cells with the antibody of the disclosure.

In some embodiments of the methods of the disclosure, at least a subset of the population of cells expresses SIRPγ. In some embodiments, the population of cells that express SIRPγ comprise lymphocytes. In some embodiments, the lymphocytes comprise T cells or NK cells. In some embodiments, at least a subset of the population of cells expresses SIRPα and/or SIRPβ1. In some embodiments, the population of cells that express SIRPα and/or SIRPβ1 comprise myeloid cells or myeloid progenitor cells. In some embodiments, the population of cells that express SIRPα and/or SIRPβ1 comprise monocytes, macrophages, dendritic cells, basophils, eosinophils, neutrophils, or mast cells. In some embodiments, the method is in vitro. In some embodiments, the method is in vivo. In some embodiments, the population of cells comprises tissue-resident cells. In some embodiments, the population of cells comprises circulating cells.

In some embodiments of the methods of the disclosure, the cell depletion involves ADCC. In some embodiments the cell depletion involves ADCP. In some embodiments, the cell depletion involves ADCC and ADCP.

The disclosure provides methods of treating a disease or condition in a subject in need thereof, comprising administering to the subject a therapeutically effective amount of the antibody or pharmaceutical composition of the disclosure.

In some embodiments of the methods of treating a disease or condition of the disclosure, the disease or condition is characterized by overactivation and/or hyperproliferation of lymphocytes, and the antibody induces depletion of lymphocytes. In some embodiments, the lymphocytes are T cells. In some embodiments, the disease or condition comprises aplastic anemia, cell mediated rejection of solid organ transplant, graft failure post-HSCT (hematopoietic stem cell transplant), lymphocyte-variant hypereosinophilia, atopic dermatitis, lymphocytic myocarditis, axial spondyloarthritis, celiac disease, or Rasmussen's encephalitis.

In some embodiments of the methods of treating a disease or condition of the disclosure, the disease or condition is characterized by overactivation and/or hyperproliferation of myeloid cells, and the antibody induces depletion of myeloid cells. In some embodiments, the myeloid cells comprise monocytes, macrophages, dendritic cells, basophils, eosinophils, neutrophils, or mast cells. In some embodiments, the myeloid cells comprise eosinophils, and the disease or condition comprises acute eosinophilic pneumonia, chronic eosinophilic pneumonia, eosinophilic esophagitis, eosinophilic gastritis, eosinophilic gastroenteritis, eosinophilic enteritis, eosinophilic colitis, lymphocyte-variant hypereosinophilia, eosinophilic cardiomyopathy/Loeffler endocarditis, Löffler syndrome or episodic angioedema with eosinophilia/Gleich syndrome. In some embodiments, the myeloid cells comprise mast cells, and the disease or condition comprises cutaneous mastocytosis, mastocytic enterocolitis, systemic mastocytosis, mast cell activation syndrome, hereditary alpha tryptasemia syndrome, chronic urticaria or severe allergic conjunctivitis. In some embodiments, the myeloid cells comprise neutrophils, and the disease or condition comprises neutrophilic dermatoses, psoriatic arthritis, generalized pustular psoriasis, pyoderma gangrenosum, Sweet's syndrome, subcorneal pustular dermatosis, neutrophilic eccrine hidradenitis, bowel-associated dermatosis-arthritis syndrome (BADAS), rheumatoid neutrophilic dermatitis, or Behcet's disease.

In some embodiments of the methods of treating a disease or condition of the disclosure, the disease or condition comprises a disease or disorder associated with both lymphocytes and myeloid cells. In some embodiments, the disease or disorder comprises histiocytosis. In some embodiments, the histiocytosis comprises hemophagocytic lymphohistiocytosis (HLH) (including primary and secondary HLH), macrophage activation syndrome, Langerhans cell histiocytosis (LCH), indeterminate cell histiocytosis, Erdheim-Chester disease (ECD), mixed LCH/ECD, Rosai Dorfman disease, malignant histiocytosis, cutaneous non-LCH histiocytoses, juvenile xanthogranuloma, infection-associated HLH, or malignancy-triggered HLH. In some embodiments, the malignancy-triggered HLH includes an HLH triggered by a hematological malignancy or solid tumor. In some embodiments, the disease or disorder comprises a non-mendelian secondary HLH (secondary HLH, or sHLH). In some embodiments, the secondary HLH comprises an infection-associated HLH. In some embodiments, the infection-associated HLH comprises virus-associated HLH, bacteria-associated HLH, parasite-associated HLH, or fungal-associated (fungal induced) HLH. In some embodiments, the sHLH is associated with a rheumatologic condition. In some embodiments, the sHLH is associated with a kidney transplant or hematologic stem cell transplant.

In some embodiments of the methods of treating a disease or condition of the disclosure, the disease or condition comprises sHLH or cytokine release syndrome (CRS). In some embodiments, the sHLH or CRS is associated with iatrogenic immune activation, infection, T cell therapy, chimeric antigen receptor—T cell therapy (CAR-T), T cell receptor T cell therapy (TCR-T), T cell activating bispecific antibody therapy, or iatrogenic immune suppression.

In some embodiments of the methods of treating a disease or condition of the disclosure, the disease or condition comprises a granulomatous disease or condition, or a disease characterized by the presence of multinucleated giant cells. In some embodiments, the disease or condition comprises sarcoidosis, Crohn's disease, Takayasu arteritis, giant cell arteritis, psoriatic arthritis, granulomatosis with polyangiitis (Wegener's Granulomatosis), giant cell myocarditis, chronic granulomatous disease, eosinophilic granulomatosis with polyangiitis (Churg-Strauss Syndrome), or chronic beryllium disease (berylliosis).

In some embodiments of the methods of treating a disease or condition of the disclosure, the disease or condition comprises an autoimmune disorder or an inflammatory disorder. In some embodiments, the autoimmune disorder comprises presentation of self antigens by antigen presenting myeloid cells (e.g. dendritic cells) in germinal centers of secondary lymphoid tissue of the subject.

In some embodiments, the disease or condition comprises Guillain-Barre syndrome, chronic inflammatory demyelinating polyneuropathy (CIDP), Lambert-Eaton myasthenic syndrome (LEMS), myasthenia gravis (MG), neuromyelitis optica (NMO), bullous pemphigoid, epidermolysis bullosa acquisita, pemphigus foliaceus, pemphigus vulgaris, anti-glomerular basement membrane disease (Goodpasture Syndrome), membranous nephropathy, ankylosing spondylitis, rheumatoid arthritis, rheumatoid vasculitis, lupus nephritis, lupus vasculitis, systemic lupus erythematosus (SLE), scleroderma (systemic sclerosis), Behcet's disease, granulomatosis with polyangiitis (Wegener's Granulomatosis), eosinophilic granulomatosis with polyangiitis (Churg-Strauss Syndrome), microscopic polyangiitis (MPA), Kawasaki disease, anti-glomerular basement membrane disease (Goodpasture Syndrome), antiphospholipid syndrome and catastrophic antiphospholipid syndrome, Graves ophthalmopathy, Castleman disease, and antibody-mediated rejection (AMR), Sjögren's syndrome, multiple sclerosis, Hashimoto's thyroiditis, primary sclerosing cholangitis, primary biliary cirrhosis, autoimmune neutropenia, systemic juvenile idiopathic arthritis, axial spondyloarthritis, celiac disease, autoimmune hepatitis, or psoriatic arthritis.

In some embodiments, the disease or condition comprises disseminated encephalomyelitis, acute respiratory distress syndrome, Addison's disease, Adult-Onset Still's disease, ankylosing spondylitis, antibody-mediated rejection (AMR), anti-glomerular basement membrane disease (Goodpasture Syndrome), antiphospholipid syndrome, aplastic anemia, atopic dermatitis, autoimmune hemolytic anemia, autoimmune hepatitis, autoimmune lymphoproliferative syndrome, axial spondyloarthritis, Behcet's disease, bullous pemphigoid, Castleman disease, catastrophic antiphospholipid syndrome, celiac disease, cell mediated rejection of solid organ transplant, Chediak-Higashi syndrome, chronic inflammatory demyelinating polyneuropathy (CIDP), chronic neutrophilic leukemia, chronic urticaria, coronary artery disease (CAD)/peripheral artery disease (PAD), COVID-19, cutaneous mastocytosis, eosinophilic cardiomyopathy/Loeffler endocarditis, epidermolysis bullosa acquisita, Evans syndrome, Felty's syndrome, general pustular psoriasis, giant cell myocarditis, graft failure post-HSCT (hematopoietic stem cell transplant), graft vs. host disease, Graves' disease, Graves ophthalmopathy, Guillain-Barre syndrome, Hashimoto's thyroiditis, hereditary alpha tryptasemia syndrome, hyper IgE syndrome, Idiopathic interstitial pneumonia, idiopathic pulmonary fibrosis, IgA nephropathy, immune/idiopathic thrombocytopenia purpura, inclusion body myositis, inflammatory bowel disease, Kawasaki disease, Lambert-Eaton myasthenic syndrome (LEMS), linear IgA disease, Löffler syndrome, lupus nephritis, lupus vasculitis, mast cell activation syndrome, mastocytic enterocolitis, membranous nephropathy, microscopic polyangiitis (MPA), multiple sclerosis, myasthenia gravis, myelodysplastic syndromes, myelofibrosis, myocarditis, neuromyelitis optica (NMO), neutrophilic dermatoses, paraneoplastic syndrome, pemphigus foliaceus, pemphigus vulgaris, primary biliary cholangitis, primary sclerosing cholangitis, pyoderma gangrenosum, Rasmussen's encephalitis, rheumatoid arthritis, rheumatoid vasculitis, Schmidt syndrome, scleroderma (systemic sclerosis), severe allergic conjunctivitis, Sjogren syndrome, Susac syndrome, systemic inflammatory response syndrome, systemic juvenile idiopathic arthritis, systemic lupus erythematosus, systemic mastocytosis, type 1 diabetes, ulcerative colitis, uveitis, vitiligo or X-linked lymphoproliferative disease.

In some embodiments of the methods of treating a disease or condition of the disclosure, the disease or disorder comprises a hematological malignancy. In some embodiments, the hematological malignancy comprises acute lymphoblastic leukemia, acute myelogenous leukemia, chronic myelogenous leukemia, chronic myelomonocytic leukemia, chronic neutrophilic leukemia, juvenile myelomonocytic leukemia, chronic eosinophilic leukemia, large granular lymphocyte leukemia, T-cell prolymphocytic leukemia, hepatosplenic lymphoma, Hodgkin's lymphomas, T-cell lymphoblastic lymphoma or leukemia, T-cell non-lymphoblastic lymphoma, NK-cell lymphoma/leukemia, myeloid neoplasia, or chronic neutrophilic leukemia.

In some embodiments of the methods of treating a disease or condition of the disclosure, the disease or disorder comprises hemophagocytic lymphohistiocytosis (HLH) (including primary and secondary HLH), macrophage activation syndrome, Langerhans cell histiocytosis (LCH), indeterminate cell histiocytosis, Erdheim-Chester disease (ECD), mixed LCH/ECD, Rosai Dorfman disease, malignant histiocytosis, cutaneous non-LCH histiocytosis, juvenile xanthogranuloma, virus-associated HLH, bacteria-associated HLH, parasite-associated HLH, fungal-associated/fungal-induced HLH, malignancy-triggered HLH, HLH occurring during chemotherapy, HLH associated with systemic-onset juvenile idiopathic arthritis (SoJIA), HLH associated with adult-onset Still's disease, HLH associated with systemic lupus erythematosus (SLE), HLH associated with vasculitis, HLH associated with auto-immune conditions, HLH associated with a kidney transplant, HLH associated with hematologic stem cell transplants, sHLH or CRS associated with checkpoint inhibitors for the treatment of malignancies, sHLH or CRS associated with associated with T cell therapy, sHLH or CRS associated with chimeric antigen receptor (CAR) T cell therapy, sHLH or CRS associated with T cell activating bispecific monoclonal antibody therapy, cytokine release syndrome (CRS), systemic mastocytosis, hypereosinophilic syndrome (including primary, secondary, and idiopathic), hyper IgE syndrome, X-linked lymphoproliferative disease, graft vs. host disease, type 1 diabetes, systemic lupus erythematosus, lupus nephritis, systemic inflammatory response syndrome, acute respiratory distress syndrome, autoimmune lymphoproliferative syndrome, X-linked hyper IgM syndrome, paraneoplastic syndrome, Susac syndrome, linear IgA disease, autoimmune neutropenia, idiopathic pulmonary fibrosis, inclusion body myositis, vitiligo, Addison's disease, Graves' disease, Hashimoto's thyroiditis, Schmidt syndrome, acute disseminated encephalomyelitis, sarcoidosis, ankylosing spondylitis, inflammatory bowel disease, ulcerative colitis, Crohn's disease, eosinophilic granulomatosis with polyangiitis, pyoderma gangrenosum, giant cell arteritis, rheumatoid arthritis, systemic juvenile idiopathic arthritis, Sjogren's syndrome, primary sclerosing cholangitis, primary biliary cholangitis, myasthenia gravis, multiple sclerosis, Guillain-Barre syndrome, acute lymphoblastic leukemia, acute myelogenous leukemia, chronic myelogenous leukemia, chronic myelomonocytic leukemia, juvenile myelomonocytic leukemia, chronic eosinophilic leukemia, large granular lymphocyte leukemia, T-cell prolymphocytic leukemia, hepatosplenic lymphoma, Hodgkin's lymphoma, T-cell lymphoblastic lymphoma/leukemia, T-cell non-lymphoblastic lymphoma, B-cell leukemia, B-cell lymphoma (non-Hodgkin's), NK-cell lymphoma or leukemia, myeloid neoplasia, autoimmune hemolytic anemia, immune/idiopathic thrombocytopenia purpura, Evans syndrome, Felty's syndrome, chronic inflammatory demyelinating polyneuropathy (CIDP), Lambert-Eaton myasthenic syndrome (LEMS), neuromyelitis optica (NMO), bullous pemphigoid, epidermolysis bullosa acquisita, pemphigus foliaceus, pemphigus vulgaris, membranous nephropathy, rheumatoid vasculitis, lupus vasculitis, scleroderma (systemic sclerosis), Behcet's disease, granulomatosis with polyangiitis (Wegener's Granulomatosis), eosinophilic granulomatosis with polyangiitis (Churg-Strauss Syndrome), microscopic polyangiitis (MPA), Kawasaki disease, anti-glomerular basement membrane disease (Goodpasture Syndrome), antiphospholipid syndrome, catastrophic antiphospholipid syndrome, Graves ophthalmopathy, Castleman disease, antibody-mediated rejection (AMR), acute eosinophilic pneumonia, chronic eosinophilic pneumonia, eosinophilic esophagitis, eosinophilic gastritis, eosinophilic gastroenteritis, eosinophilic enteritis, eosinophilic colitis, uveitis, giant cell myocarditis, cutaneous mastocytosis, mastocytic enterocolitis, mast cell activation syndrome, IgA nephropathy, Chediak-Higashi syndrome, eosinophilic cardiomyopathy/Loeffler endocarditis, acute kidney injury, chronic kidney disease, coronary artery disease (CAD)/peripheral artery disease (PAD), myelofibrosis, IgG4-related disease, Löffler syndrome, chronic neutrophilic leukemia, myocarditis, episodic angioedema with eosinophilia/Gleich syndrome, idiopathic interstitial pneumonia, hereditary alpha tryptasemia syndrome, chronic urticaria, severe allergic conjunctivitis, Adult-onset Still's, aplastic Anemia, cell mediated rejection of solid organ transplant, graft failure Post-hematopoietic stem cell transplant (HSCT), lymphocyte-variant hypereosinophilia, myelodysplastic syndromes, atopic dermatitis, axial spondyloarthritis, celiac disease, hyperthyroidism, Rasmussen's encephalitis, chronic beryllium disease (Berylliosis), Takayasu arteritis, autoimmune hepatitis, neutrophilic dermatoses, psoriatic arthritis, Corona Virus Disease 2019 (COVID-19), or general pustular psoriasis.

In some embodiments of the methods of treating a disease or condition of the disclosure, the subject is human.

In some embodiments of the methods of treating a disease or condition of the disclosure, the antibody or pharmaceutical composition is administered intravenously. In some embodiments, the antibody or pharmaceutical composition is administered subcutaneously.

The disclosure provides cells expressing SIRPγ, wherein the cells are bound to an antibody of the disclosure, wherein the antibody is bound to the SIRPγ.

The disclosure provides kits or articles of manufacture comprising the antibodies or pharmaceutical compositions of the disclosure.

The disclosure provides use of the antibodies or the pharmaceutical compositions of the disclosure for the treatment of a disease or disorder in a subject in need thereof.

The disclosure provides use of the antibodies or the pharmaceutical compositions of the disclosure for the manufacture of a medicament for the treatment of a disease or disorder in a subject in need thereof.

BRIEF DESCRIPTION OF THE DRAWINGS

FIGS. 2A-2B show binding curves of selected antibodies to human and cynomolgus monkey SIRPα by ELISA.

FIG. 3A shows binding curves of selected antibodies of the disclosure to human SIRPα and cynomolgus monkey SIRPα by ELISA.

FIG. 3B shows binding curves of selected antibodies of the disclosure to human SIRPβ1 and human SIRPγ by ELISA.

FIG. 3C shows binding curves of Antibody 29 to human SIRPα, SIRPβ1 and SIRPγ by ELISA.

FIG. 6A shows the effect of selected antibodies of the disclosure on ADCC of human monocytes in vitro.

FIG. 6B shows the effect of selected antibodies of the disclosure on ADCC of human and cynomolgus monkey (cyno) monocytes in vitro.

FIG. 6C shows the effect of selected antibodies of the disclosure on ADCC of human and cynomolgus monkey (cyno) CD4+ T cells in vitro.

FIG. 6D shows the effect of selected antibodies of the disclosure on ADCC of human and cynomolgus monkey (cyno) CD8+ T cells in vitro.

FIG. 7 shows the effect of selected antibodies of the disclosure on antibody dependent cellular phagocytosis (ADCP) of MOLM-13 cells by THP-1 cells in vitro.

FIG. 8 shows the effect of selected antibodies of the disclosure on ADCP of human monocytes by human monocytes in vitro.

FIGS. 9A-9B show the effect of selected antibodies of the disclosure on monocyte depletion in vivo.

FIGS. 10A-10B show the effect of selected antibodies of the disclosure on neutrophil depletion in vivo.

FIGS. 12A-12B show the effect of selected antibodies of the disclosure on eosinophil depletion in vivo.

DETAILED DESCRIPTION

Figure 1A:
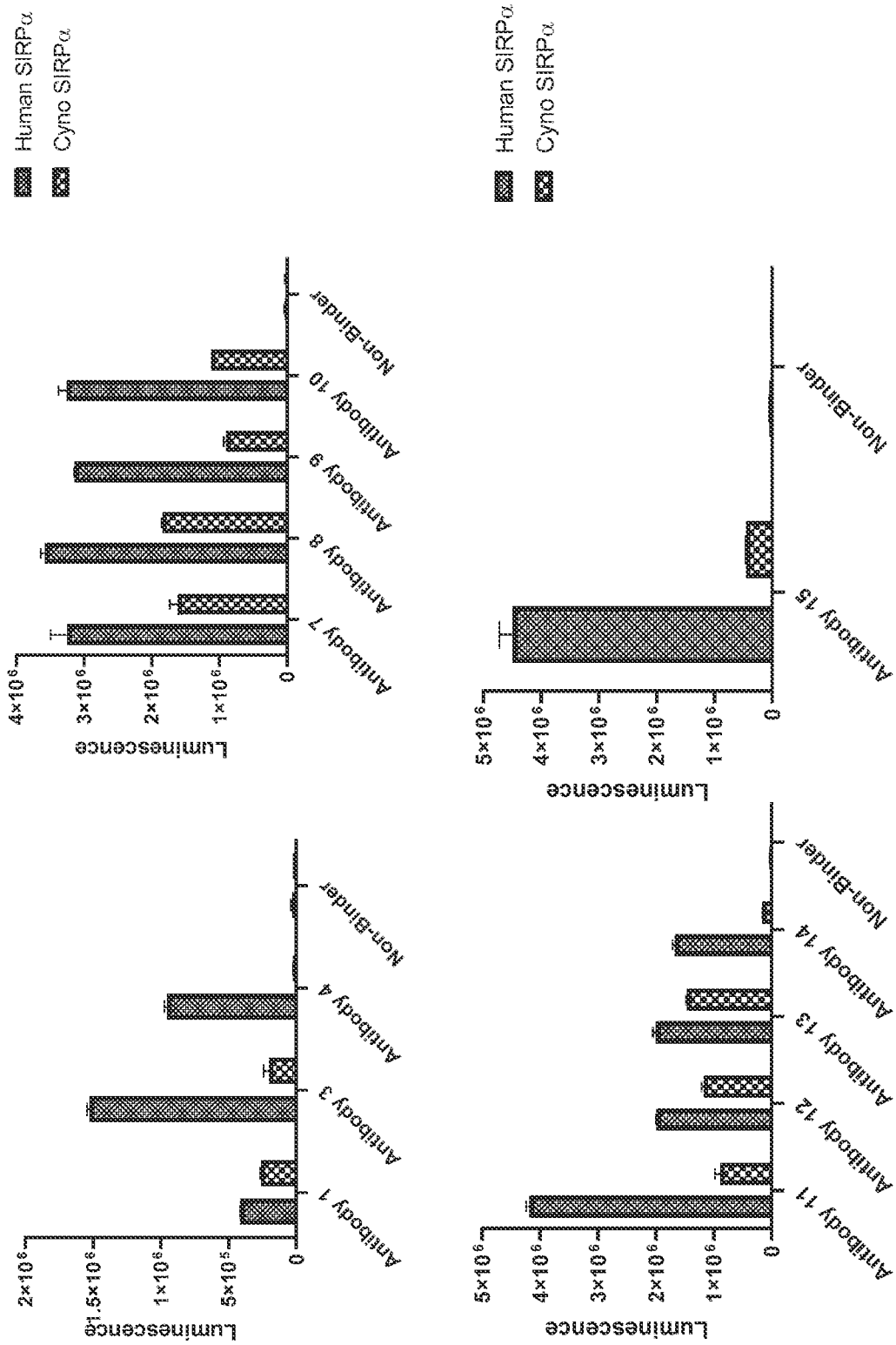
FIG. 1A shows binding of selected antibodies of the disclosure to human SIRPα and cynomolgus monkey (cyno) SIRPα by enzyme-linked immunosorbent assay (ELISA).

Provided herein are antibodies that bind to both (a) SIRPγ and (b) SIRPα and/or SIRPβ1. Also provided are methods of making and using such antibodies. The antibodies may be useful for treating diseases or conditions involving cells expressing SIRPγ, SIRPα and/or SIRPβ1. For example, in some embodiments, the antibodies may be used for treating diseases or conditions involving overactivation and/or hyperproliferation of SIRPα, SIRPβ1 (e.g., myeloid cells), or SIRPγ expressing cells (e.g. lymphocytes) as a part of the pathology.

Where elements are presented in a list format (e.g., in a Markush group), it should be understood that each possible subgroup of the elements is also disclosed, and that any one or more elements can be removed from the list or group.

It should be understood that, unless clearly indicated, in any method described or disclosed herein that includes more than one act, the order of the acts is not necessarily limited to the order in which the acts of the method are recited, but the disclosure encompasses exemplary embodiments in which the order of the acts is so limited.

The terms used throughout the specification are defined as follows unless otherwise limited in specific instances. As used in the specification and the claims, the singular forms "a," "an," and "the" include plural referents unless the context clearly dictates otherwise. All technical and scientific terms, acronyms, and abbreviates used in the specification and claims have the same meaning as commonly understood by one of ordinary skill in the art to which the disclosure pertains, unless defined or stated otherwise. All numerical ranges are inclusive of the values defining the range as well as all integer values in between, unless indicated or defined otherwise.

The terms "individual," "subject," and "patient" are used interchangeably herein and refer to any subject for whom treatment or therapy is desired. The subject may be a mammalian subject. Mammalian subjects include, e. g., humans, non-human primates, rodents, (e.g., rats, mice), lagomorphs (e.g., rabbits), ungulates (e.g., cows, sheep, pigs, horses, goats, and the like), etc. In some embodiments, the subject is a human. In some embodiments, the subject is a non-human primate, for example a cynomolgus monkey. In some embodiments, the subject is a companion animal (e.g. cats, dogs).

All publications, patents, and patent applications mentioned in this specification are herein incorporated by reference to the same extent as if each individual publication, patent, or patent application was specifically and individually indicated to be incorporated by reference.

I. Antibodies

A. SIRP Antibodies

Provided herein are antibodies that bind to SIRPγ, and also bind to SIRPα, SIRPβ1 or a combination of SIRPα and SIRPβ1. Thus, antibodies that bind to (a) SIRPγ and SIRPα, (b) SIRPγ and SIRPβ1, or (c) SIRPγ, SIRPα and SIRPβ1 are envisaged as within the scope of the instant disclosure, and are referred to herein collectively as "SIRP antibody," "SIRP antibodies" or "anti-SIRP antibodies" and the like. It is referred to throughout that the binding specificity of the SIRP antibodies of the disclosure is such that the SIRP antibodies show binding to SIRPγ, and one or more of SIRPα and/or SIRPβ1 (that is, the antibodies show binding to SIRPγ as well as SIRPα and/or SIRPβ1).

The skilled artisan will appreciate that, depending on context, a SIRP antibody of the disclosure that has the ability to bind to SIRPγ as well as SIRPα and/or SIRPβ1 will encounter a binding surface (e.g. a cell) that may express only a subset of the targets to which the antibody is capable of binding. For example, an antibody that can bind SIRPγ as well as SIRPα can bind to a cell expressing only SIRPγ, or a cell expressing only SIRPα. Alternatively, a binding surface, such as a cell, may express more than one, or all, of the targets to which the antibody can bind. In such a situation, the antibody is also expected to bind that surface. For example, an antibody that can bind to SIRPβ1 and SIRPγ can bind to a cell that expresses both SIRPβ1 and SIRPγ. Thus, although the SIRP antibodies of the disclosure bind SIRPγ as well as SIRPα and/or SIRPβ1, the binding of all of the targets simultaneously is not required for activity.

The term antibody as used herein throughout is used in the broadest sense and includes a monoclonal antibody, polyclonal antibody, human antibody, humanized antibody, non-human antibody, chimeric antibody, a monovalent antibody, and an antibody fragment.

In exemplary embodiments, the SIRP antibodies provided herein are monoclonal antibodies (mAbs). In exemplary embodiments, the SIRP antibodies provided herein are human antibodies. In exemplary embodiments, the SIRP antibodies provided herein are humanized antibodies. In exemplary embodiments, the SIRP antibodies provided herein are monoclonal human antibodies. In exemplary embodiments, the SIRP antibodies provided herein are chimeric antibodies. In exemplary embodiments, the SIRP antibodies provided herein are monoclonal chimeric antibodies.

In some embodiments, the SIRP antibodies provided herein are antibody fragments, retaining SIRPγ as well as SIRPβ1 and/or SIRPα antigen binding specificity. In some embodiments, the antibody fragments are antigen-binding fragments (Fab), variable fragments (Fv) containing VH and VL sequences, single chain variable fragments (scFv) containing VH and VL sequences linked together in one chain, single chain antibody fragments (scAb) or other antibody variable region fragments, such as Fab', F(ab')2, dsFv diabody, and Fd polypeptide fragments.

Also provided herein are SIRP antibody-drug conjugates, bispecific antibodies comprising at least one arm specific for SIRPγ as well as SIRPα and/or SIRPβ1, and multispecific antibodies that exhibit binding for SIRPγ as well as SIRPα and/or SIRPβ1.

The SIRPα protein has been characterized to be highly polymorphic but does not appear to affect ligand binding properties. At least thirteen variants (polymorphs) have been characterized in humans, Variants 1-13, with V1 and V2 the most common. (Hatherley et al. JBC 289: 10024-10028, 2014). SIRPα also has at least three isoforms. Accordingly, the term "SIRPα" as used herein is inclusive of all variants and isoforms of SIRPα.

The amino acid sequence of human SIRPα (hSIRPα) isoform 1, variant 1 (V1) is provided in SEQ ID NO: 1 and referred to herein as hSIRPα V1.

(SEQ ID NO: 1)

```
  1    MEPAGPAPGR  LGPLLCLLLA  ASCAWSGVAG  EEELQVIQPD  KSVLVAAGET  ATLRCTATSL

61    IPVGPIQWFR  GAGPGRELIY  NQKEGHFPRV  TTVSDLTKRN  NMDFSIRIGN  ITPADAGTYY

121    CVKFRKGSPD  DVEFKSGAGT  ELSVRAKPSA  PVVSGPAARA  TPQHTVSFTC  ESHGFSPRDI

181    TLKWFKNGNE  LSDFQTNVDP  VGESVSYSIH  STAKVVLTRE  DVHSQVICEV  AHVTLQGDPL

241    RGTANLSETI  RVPPTLEVTQ  QPVRAENQVN  VTCQVRKFYP  QRLQLTWLEN  GNVSRTETAS

301    TVTENKDGTY  NWMSWLLVNV  SAHRDDVKLT  CQVEHDGQPA  VSKSHDLKVS  AHPKEQGSNT

361    AAENTGSNER  NIYIVVGVVC  TLLVALLMAA  LYLVRIRQKK  AQGSTSSTRL  HEPEKNAREI

421    TQDTNDITYA  DLNLPKGKKP  APQAAEPNNH  TEYASIQTSP  QPASEDTLTY  ADLDMVHLNR

481    TPKQPAPKPE  PSFSEYASVQ  VPRK
```

The amino acid sequence of hSIRPα isoform 1, variant 2 (V2) is provided in SEQ ID NO: 2 and referred to herein as hSIRPα V2.

```
                                                             (SEQ ID NO: 2)
  1    MEPAGPAPGR LGPLLCLLLA ASCAWSGVAG EEELQVIQPD KSVSVAAGES AILHCTVTSL
 61    IPVGPIQWFR GAGPARELIY NQKEGHFPRV TTVSESTKRE NMDFSISISN ITPADAGTYY
121    CVKFRKGSPD TEFKSGAGTE LSVRAKPSAP VVSGPAARAT PQHTVSFTCE SHGFSPRDIT
181    LKWFKNGNEL SDFQTNVDPV GESVSYSIHS TAKVVLTRED VHSQVICEVA HVTLQGDPLR
241    GTANLSETIR VPPTLEVTQQ PVRAENQVNV TCQVRKFYPQ RLQLTWLENG NVSRTETAST
301    VTENKDGTYN WMSWLLVNVS AHRDDVKLTC QVEHDGQPAV SKSHDLKVSA HPKEQGSNTA
361    AENTGSNERN IYIVVGVVCT LLVALLMAAL YLVRIRQKKA QGSTSSTRLH EPEKNAREIT
421    QVQSLDTNDI TYADLNLPKG KKPAPQAAEP NNHTEYASIQ TSPQPASEDT LTYADLDMVH
481    LNRTPKQPAP KPEPSFSEYA SVQVPRK
```

The amino acid sequence of hSIRPα isoform 2 is provided herein as SEQ ID NO: 6.

```
                                                             (SEQ ID NO: 6)
  1    MEPAGPAPGR LGPLLCLLLA ASCAWSGVAG EEELQVIQPD KSVLVAAGET ATLRCTATSL
 61    IPVGPIQWFR GAGPGRELIY NQKEGHFPRV TTVSDLTKRN NMDFSIRIGN ITPADAGTYY
121    CVKFRKGSPD DVEFKSGAGT ELSVRAKPSA PVVSGPAARA TPQHTVSFTC ESHGFSPRDI
181    TLKWFKNGNE LSDFQTNVDP VGESVSYSIH STAKVVLTRE DVHSQVICEV AHVTLQGDPL
241    RGTANLSETI RVPPTLEVTQ QPVRAENQVN VTCQVRKFYP QRLQLTWLEN GNVSRTETAS
301    TVTENKDGTY NWMSWLLVNV SAHRDDVKLT CQVEHDGQPA VSKSHDLKVS AHPKEQGSNT
361    AAENTGSNER NIYIVVGVVC TLLVALLMAA LYLVRIRQKK AQGSTSSTRL HEPEKNAREI
421    TQVQSLDTND ITYADLNLPK GKKPAPQAAE PNNHTEYASI QTSPQPASED TLTYADLDMV
481    HLNRTPKQPA PKPEPSFSEY ASVQVPRK
```

The amino acid sequence of human SIRPα isoform 4 is provided in SEQ ID NO: 40.

```
                                                             (SEQ ID NO: 40)
  1    MEPAGPAPGR LGPLLCLLLA ASCAWSGVAG EEELQVIQPD KSVLVAAGET ATLRCTATSL
 61    IPVGPIQWFR GAGPGRELIY NQKEGHFPRV TTVSDLTKRN NMDFSIRIGN ITPADAGTYY
121    CVKFRKGSPD VEFKSGAGTE LSVRAKPSAP VVSGPAARAT PQHTVSFTCE SHGFSPRDIT
181    LKWFKNGNEL SDFQTNVDPV GESVSYSIHS TAKVVLTRED VHSQVICEVA HVTLQGDPLR
241    GTANLSETIR VPPTLEVTQQ PVRAENQVNV TCQVRKFYPQ RLQLTWLENG NVSRTETAST
301    VTENKDGTYN WMSWLLVNVS AHRDDVKLTC QVEHDGQPAV SKSHDLKVSA HPKEQGSNTA
361    AENTGSNERN IYIVVGVVCT LLVALLMAAL YLVRIRQKKA QGSTSSTRLH EPEKNAREIT
421    QDTNDITYAD LNLPKGKKPA PQAAEPNNHT EYASIQTSPQ PASEDTLTYA DLDMVHLNRT
481    PKQPAPKPEP SFSEYASVQV PRK
```

In some embodiments, the SIRP antibodies also bind to one or more variants or isoforms of a SIRPα of a single species. In some embodiments, the SIRP antibodies also bind to one or more variants or isoforms of a SIRPα of more than one species. In some embodiments, the SIRP antibodies also bind to one or more variants or isoforms of human SIRPα. In some embodiments, the SIRP antibodies also bind to one or more variants or isoforms of a non-human primate SIRPα, e.g. a cynomolgus monkey SIRPα.

In some embodiments, the SIRP antibodies also bind to a plurality of SIRPα variants found in a particular species, e.g. the SIRP antibodies bind to more than one of SIRPα human variants 1-13. In some embodiments the SIRP antibodies also bind to hSIRPα V1. In some embodiments, the SIRP antibodies also bind to hSIRPα V2. In some embodiments, the SIRP antibodies also bind to hSIRPα V1 and V2. In some embodiments, the SIRP antibodies also bind the extracellular domain of SIRPα, e.g. hSIRPα V1 (e.g. Met1-Arg370 of V1, Gly27-Arg370 of V1, or Glu31-Arg370 of V1), or e.g. hSIRPα V2 (Met1-Arg369).

In some embodiments, the SIRP antibodies of the disclosure bind a plurality of SIRPα isoforms. For example, the SIRP antibodies of the disclosure may bind to two or more SIRPα isoforms, or all SIRPα isoforms. In some embodiments, the SIRP antibodies bind to isoform 1, 2 and 4 of SIRPα.

In some embodiments, the SIRP antibodies also bind specifically to hSIRPα V1. In some embodiments, the SIRP antibodies also bind specifically to hSIRPα V2. In some embodiments, the SIRP antibodies also bind specifically to hSIRPα V1 and hSIRPα V2. In some embodiments, the SIRP antibodies also bind specifically to one or more variants of SIRPα, but show little or no binding to SIRPβ1.

Human SIRPβ1 (hSIRPβ1) has at least 3 isoforms. The amino acid sequence of hSIRPβ1 isoform 1 is provided in SEQ ID NO: 9.

In some embodiments, the SIRP antibodies bind to one or more variants or isoforms of a SIRPγ of a single species. In some embodiments, the SIRP antibodies bind to one or more variants or isoforms of a SIRPγ of more than one species. In some embodiments, the SIRP antibodies bind to one or more variants or isoforms of human SIRPγ. In some embodiments, the SIRP antibodies bind to one or more variants or isoforms of a non-human primate SIRPγ, e.g. a cynomolgus monkey SIRPγ.

In some embodiments, the SIRP antibodies bind to a plurality of SIRPγ variants or isoforms found in a particular species, e.g. the SIRP antibodies bind to more than one of SIRPγ human isoforms 1-3. In some embodiments, the SIRP antibodies bind the extracellular domain of SIRPγ (e.g. amino acids 1-360 of SEQ ID NO: 10).

The skilled artisan will recognize that antibodies that exhibit little or no binding to a target antigen can be described as having a low affinity, and a high equilibrium dissociation constant (KD) for the target antigen, for

```
                                                          (SEQ ID NO: 9)
  1    MPVPASWPHL  PSPFLLMTLL  LGRLTGVAGE  DELQVIQPEK  SVSVAAGESA  TLRCAMTSLI

61    PVGPIMWFRG  AGAGRELIYN  QKEGHFPRVT  TVSELTKRNN  LDFSISISNI  TPADAGTYYC

121    VKFRKGSPDD  VEFKSGAGTE  LSVRAKPSAP  VVSGPAVRAT  PEHTVSFTCE  SHGFSPRDIT

181    LKWFKNGNEL  SDFQTNVDPA  GDSVSYSIHS  TARVVLTRGD  VHSQVICEIA  HITLQGDPLR

241    GTANLSEAIR  VPPTLEVTQQ  PMRAENQANV  TCQVSNFYPR  GLQLTWLENG  NVSRTETAST

301    LIENKDGTYN  WMSWLLVNTC  AHRDDVVLTC  QVEHDGQQAV  SKSYALEISA  HQKEHGSDIT

361    HEAALAPTAP  LLVALLLGPK  LLLVVGVSAI  YICWKQKA
```

In some embodiments, the SIRP antibodies also bind to one or more variants or isoforms of a SIRPβ1 of a single species. In some embodiments, the SIRP antibodies also bind to one or more variants or isoforms of a SIRPβ1 of more than one species. In some embodiments, the SIRP antibodies also bind to one or more variants or isoforms of human SIRPβ1. In some embodiments, the SIRP antibodies also bind to one or more variants or isoforms of a non-human primate SIRPβ1, e.g. a cynomolgus monkey SIRPβ.

In some embodiments, the SIRP antibodies also bind to a plurality of SIRPβ1 variants or isoforms found in a particular species, e.g. the SIRP antibodies bind to more than one of SIRPβ1 human isoforms 1-3. In some embodiments, the SIRP antibodies also bind the extracellular domain of SIRPβ1 (e.g. amino acids 1-371 of SEQ ID NO: 9 SEQ ID NO: 8). In some embodiments, the SIRP antibodies also bind specifically to one or more variants or isoforms of SIRPα, in addition to binding to SIRPγ and SIRPβ1.

Human SIRPγ has at least 4 isoforms. The amino acid of hSIRPγ isoform 1 is provided as SEQ ID NO: 10.

example a KD of about 10 μM or greater, about 100 μM or greater, about 1 mM or greater, or about 10 mM or greater. For example, a SIRP antibody that binds to SIRPγ and SIRPα may bind to SIRPβ1 with low affinity. A SIRP antibody of the disclosure with low affinity for SIRPβ1 may bind to SIRPβ1 with a KD of about 10 μM or greater, about 100 μM or greater, about 1 mM or greater, or about 10 mM or greater but retain higher binding affinity for SIRPγ and SIRPα. As a further example, a SIRP antibody that binds to SIRPγ and SIRPβ1 may bind to SIRPα with low affinity.

In some embodiments, provided herein are SIRP antibodies comprising a binding affinity (KD) to SIRPα of about 0.05 nM, about 0.1 nM, about 0.5 nM, about 1 nM, about 5 nM, about 10 nM, about 50 nM, about 100 nM, about 500 nM, or about 1 μM.

In some embodiments, provided herein are SIRP antibodies comprising a binding affinity (KD) to SIRPα of between about 0.05 nM and 1 μM, between about 0.5 nM and 1 μM, between about 1 nM and 1 μM, between about 5 nM and 1

```
                                                          (SEQ ID NO: 10)
  1    MPVPASWPHP  PGPFLLLTLL  LGLTEVAGEE  ELQMIQPEKL  LLVTVGKTAT  LHCTVTSLLP

61    VGPVLWFRGV  GPGRELIYNQ  KEGHFPRVTT  VSDLTKRNNM  DFSIRISSIT  PADVGTYYCV

121    KFRKGSPENV  EFKSGPGTEM  ALGAKPSAPV  VLGPAARTTP  EHTVSFTCES  HGFSPRDITL

181    KWFKNGNELS  DFQTNVDPTG  QSVAYSIRST  ARVVLDPWDV  RSQVICEVAH  VTLQGDPLRG

241    TANLSEAIRV  PPTLEVTQQP  MRVGNQVNVT  CQVRKFYPQS  LQLTWSENGN  VCQRETASTL

301    TENKDGTYNW  TSWFLVNISD  QRDDVVLTCQ  VKHDGQLAVS  KRLALEVTVH  QKDQSSDATP

361    GPASSLTALL  LIAVLLGPIY  VPWKQKT
```

μM, between about 0.05 nM and 500 nM, between about 0.5 nM and 500 nM, between about 1 nM and 500 nM, between about 5 nM and 500 nM, between about 0.05 nM and 50 nM, between about 0.5 nM and 50 nM, between about 1 nM and 50 nM, or between about 5 nM and 50 nM.

In some embodiments, provided herein are SIRP antibodies comprising a binding affinity (KD) to SIRPβ1 of about 0.05 nM, about 0.1 nM, about 0.5 nM, about 1 nM, about 5 nM, about 10 nM, about 50 nM, about 100 nM, about 500 nM, about 1 μM, about 2 μM, about 3 μM, about 5 μM, or about 10 μM.

In some embodiments, provided herein are SIRP antibodies comprising a binding affinity (KD) to SIRPβ1 of between about 0.05 nM and 10 μM, between about 0.5 nM and 10 μM, between about 1 nM and 10 μM, between about 5 nM and 10 μM, between about 10 nM and 10 μM, between about 50 nM and 10 μM, between about 100 nM and 10 μM, between about 0.05 nM and 1 μM, between about 0.5 nM and 1 μM, between about 1 nM and 1 μM, between about 5 nM and 1 μM, between about 10 nM and 1 μM, between about 50 nM and 1 μM, between about 0.05 nM and 500 nM, between about 0.5 nM and 500 nM, between about 1 nM and 500 nM, between about 5 nM and 500 nM, between 10 nM and 500 nM, between about 0.001 nM and 50 nM, between about 0.005 nM and 50 nM, between about 0.05 nM and 50 nM, between about 0.5 nM and 50 nM, between about 1 nM and 50 nM, or between about 5 nM and 50 nM.

In some embodiments, provided herein are SIRP antibodies comprising a binding affinity (KD) to SIRPγ of about 0.0001 nM, about 0.0005 nM, about 0.001 nM, about 0.005 nM, about 0.1 nM, about 0.05 nM, about 0.1 nM, about 0.5 nM, about 1 nM, about 5 nM, about 10 nM, about 50 nM, about 100 nM, about 500 nM, about 1 μM, about 2 μM or about 3 μM.

In some embodiments, provided herein are SIRP antibodies comprising a binding affinity (KD) to SIRPγ of between about 0.0001 nM and 5 μM, between about 0.0005 nM and 5 μM, between about 0.05 nM and 5 μM, between about 0.5 nM and 5 μM, between about 1 nM and 5 μM, between about 5 nM and 5 μM, 0.0001 nM and 2 μM, between about 0.0005 nM and 2 μM, between about 0.05 nM and 2 μM, between about 0.5 nM and 2 μM, between about 1 nM and 2 μM, between about 5 nM and 2 μM, 0.0001 nM and 1 μM, between about 0.0005 nM and 1 μM, between about 0.05 nM and 1 μM, between about 0.5 nM and 1 μM, between about 1 nM and 1 μM, between about 5 nM and 1 μM, between about 0.0001 nM and 500 nM, between about 0.0005 nM and 500 nM, between about 0.05 nM and 500 nM, between about 0.5 nM and 500 nM, between about 1 nM and 500 nM, between about 5 nM and 500 nM, between about 0.0001 nM and 50 nM, between about 0.0005 nM and 50 nM, between about 0.05 nM and 50 nM, between about 0.5 nM and 50 nM, between about 1 nM and 50 nM, or between about 5 nM and 50 nM.

In some embodiments, a SIRP antibody of the disclosure competes with CD47 for binding to SIRPα or SIRPγ on a cell or other surface. In some embodiments, a SIRP antibody of the disclosure partially competes with CD47 for binding to SIRPα or SIRPγ on a cell or other surface. In other embodiments, a SIRP antibody of the disclosure does not compete with CD47 for binding to SIRPα or SIRPγ on a surface, e.g a cell. Exemplary antibodies of the disclosure that do not compete with CD47 binding of SIRPα include Antibodies 1 and 13 referring to Table 11. Exemplary antibodies of the disclosure that partially inhibit the binding of CD47 to SIRPα include Antibodies 3 and 7, referring to Table 11.

In some embodiments, the constant region of a SIRP antibody (referred to interchangeably as a Fc domain, a Fc sequence or simply as a Fc) is a human Fc domain. In some embodiments, the Fc domain of a SIRP antibody is human IgG1, human IgG2, human IgG3, or human IgG4. In some embodiments, the Fc domain of a SIRP antibody is that of a mouse. In some embodiments, the Fc domain of a SIRP antibody is mouse IgG1 or mouse IgG2a. In some embodiments, the Fc domain of a SIRP antibody is that of a rat. In some embodiments, the Fc domain of a SIRP antibody is rat IgG1 or rat IgG2b. In some embodiments, the Fc domain of a SIRP antibody is rat IgG2b. In embodiments, the Fc domain of a SIRP antibody is that of a non-human primate, e.g. it is a cynomolgus monkey Fc domain.

In some embodiments, the SIRP antibodies provided herein are full-length antibodies. In some embodiments, the constant region of a full-length antibody (referred to interchangeably as a Fc domain, a Fc sequence or simply as a Fc) of the full-length SIRP antibodies is a human Fc domain. In some embodiments, the Fc domain of a full-length SIRP antibody is human IgG1, human IgG2, human IgG3, or human IgG4. In some embodiments, the Fc domain of a full-length SIRP antibody is that of a mouse. In some embodiments, the Fc domain of a full-length SIRP antibody is mouse IgG1 or mouse IgG2a. In some embodiments, the Fc domain of a full-length SIRP antibody is that of a rat. In some embodiments, the Fc domain of a full-length SIRP antibody is rat IgG1 or rat IgG2b. In embodiments, the Fc domain of a full-length SIRP antibody is that of a non-human primate, e.g. it is a cynomolgus monkey Fc domain.

In some embodiments, the SIRP antibody contains an Fc domain, and the Fc domain of a SIRP antibody is a human IgG1 Fc. Exemplary, but non-limiting, human IgG1 Fc domain sequences are provided as SEQ ID NOS: 3-4, 19-22, 25-26, 41, 50-53, 55, 57-58, 66-69, 71, and 73-74.

```
                                                            (SEQ ID NO: 3)
   1    ASTKGPSVFP  LAPSSKSTSG  GTAALGCLVK  DYFPEPVTVS  WNSGALTSGV  HTFPAVLQSS

61    GLYSLSSVVT  VPSSSLGTQT  YICNVNHKPS  NTKVDKKVEP  KSCDKTHTCP  PCPAPELLGG

121    PSVFLFPPKP  KDTLMISRTP  EVTCVVVDVS  HEDPEVKFNW  YVDGVEVHNA  KTKPREEQYN

181    STYRVVSVLT  VLHQDWLNGK  EYKCKVSNKA  LPAPIEKTIS  KAKGQPREPQ  VYTLPPSRDE

241    LTKNQVSLTC  LVKGFYPSDI  AVEWESNGQP  ENNYKTTPPV  LDSDGSFFLY  SKLTVDKSRW

301    QQGNVFSCSV  MHEALHNHYT  QKSLSLSPGK
```

-continued (SEQ ID NO: 4)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKAEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

(SEQ ID NO: 19)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKAEP KSCDKTHTCP PCPAPELLAG
121  PDVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPEEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

(SEQ ID NO: 41)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLAG
121  PDVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPEEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

(SEQ ID NO: 50)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLGG
121  PDVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPEEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

(SEQ ID NO: 51)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPEEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

(SEQ ID NO: 52)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLGG
121  PDVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

-continued (SEQ ID NO: 53)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKAEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

(SEQ ID NO: 55)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV LHEALHNHYT QKSLSLSPGK
```

(SEQ ID NO: 57)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKVEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHSHYT QKSLSLSPGK
```

(SEQ ID NO: 58)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKAEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV LHEALHNHYT QKSLSLSPGK
```

(SEQ ID NO: 66)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKKAEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHSHYT QKSLSLSPGK
```

(SEQ ID NO: 67)
```
  1  ASTKGPSVFP LAPSSKSTSG GTAALGCLVK DYFPEPVTVS WNSGALTSGV HTFPAVLQSS
 61  GLYSLSSVVT VPSSSLGTQT YICNVNHKPS NTKVDKRVEP KSCDKTHTCP PCPAPELLGG
121  PSVFLFPPKP KDTLMISRTP EVTCVVVDVS HEDPEVKFNW YVDGVEVHNA KTKPREEQYN
181  STYRVVSVLT VLHQDWLNGK EYKCKVSNKA LPAPIEKTIS KAKGQPREPQ VYTLPPSRDE
241  LTKNQVSLTC LVKGFYPSDI AVEWESNGQP ENNYKTTPPV LDSDGSFFLY SKLTVDKSRW
301  QQGNVFSCSV MHEALHNHYT QKSLSLSPGK
```

```
                                                          (SEQ ID NO: 68)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKRVEP KSCDKTHTCP PCPAPELLGG

121    PSVFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPIEKTIS KAKGQPREPQ ENNYKTTPPV

241    LTKNQVSLTC LVKGFYPSDI AVEWESNGQP VYTLPPSREE LDSDGSFFLY SKLTVDKSRW

301    QQGNVFSCSV MHEALHNHYT QKSLSLSPGK (SEQ ID NO: 69)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKKVEP KSCDKTHTCP PCPAPELLGG

121    PSVFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPIEKTIS KAKGQPREPQ VYTLPPSREE

241    LTKNQVSLTC LVKGFYPSDI AVEWESNGQP ENNYKTTPPV LDSDGSFFLY SKLTVDKSRW

301    QQGNVFSCSV MHEALHNHYT QKSLSLSPGK (SEQ ID NO: 71)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKRVEP KSCDKTHTCP PCPAPELLGG

121    PSVFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPIEKTIS KAKGQPREPQ VYTLPPSRDE

241    MTKNQVSLTC LVKGFYPSDI AVEWESNGQP ENNYKTTPPV LDSDGSFFLY SKLTVDKSRW

301    QQGNVFSCSV MHEALHNHYT QKSLSLSPGK (SEQ ID NO: 73)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKKAEP KSCDKTHTCP PCPAPELLGG

121    PSVFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPIEKTIS KAKGQPREPQ VYTLPPSRDE

241    MTKNQVSLTC LVKGFYPSDI AVEWESNGQP ENNYKTTPPV LDSDGSFFLY SKLTVDKSRW

301    QQGNVFSCSV MHEALHNHYT QKSLSLSPGK (SEQ ID NO: 74)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKKAEP KSCDKTHTCP PCPAPELLGG

121    PSVFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPEEKTIS KAKGQPREPQ VYTLPPSRDE

241    LTKNQVSLTC LVKGFYPSDI AVEWESNGQP ENNYKTTPPV LDSDGSFFLY SKLTVDKSRW

301    QQGNVFSCSV MHEALHNHYT QKSLSLSPGK
```

In some embodiments, the human IgG1 Fc domain sequence is SEQ ID NO: 20, wherein $X_1$ is V or A.

```
                                                          (SEQ ID NO: 20)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKKX1EP KSCDKTHTCP PCPAPELLAG

121    PDVFLFPPKP KDTLMISRTP EVTCVVVDVS HEDPEVKFNW YVDGVEVHNA KTKPREEQYN
```

```
181    STYRVVSVLT VLHQDWLNGK EYKCKVSNKA LPAPEEKTIS KAKGQPREPQ VYTLPPSRDE

241    LTKNQVSLTC LVKGFYPSDI AVEWESNGQP ENNYKTTPPV LDSDGSFFLY SKLTVDKSRW

301    QQGNVFSCSV MHEALHNHYT QKSLSLSPGK
```

In some embodiments, the human IgG1 Fc domain sequence is SEQ ID NO: 21, wherein $X_1$ is V or A; X2 is G or A; X3 is S or D; and X4 is I or E.

```
                                                              (SEQ ID NO: 21)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKKX1EP KSCDKTHTCP PCPAPELLX2G

121    PX3VFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPX4EKTIS KAKGQPREPQ VYTLPPSRDE

241    LTKNQVSLTC LVKGFYPSDI AVEWESNGQP ENNYKTTPPV LDSDGSFFLY SKLTVDKSRW

301    QQGNVFSCSV MHEALHNHYT QKSLSLSPGK
```

In some embodiments, the human IgG1 Fc domain sequence is SEQ ID NO: 22, wherein $X_1$ is V or A.

```
                                                              (SEQ ID NO: 22)
  1    ASTKGPSVFP LAPSSKSTSG GTAALGCLVK DYFPEPVTVS WNSGALTSGV HTFPAVLQSS

61    GLYSLSSVVT VPSSSLGTQT YICNVNHKPS NTKVDKKX1EP KSCDKTHTCP PCPAPELLGG

121    PSVFLFPPKP KDTLMISRTP EVTCVVVDVS HEDPEVKFNW YVDGVEVHNA KTKPREEQYN

181    STYRVVSVLT VLHQDWLNGK EYKCKVSNKA LPAPIEKTIS KAKGQPREPQ VYTLPPSRDE

241    LTKNQVSLTC LVKGFYPSDI AVEWESNGQP ENNYKTTPPV LDSDGSFFLY SKLTVDKSRW

301    QQGNVFSCSV LHEALHSHYT QKSLSLSPGK
```

In some embodiments, the human IgG1 Fc domain sequence is SEQ ID NO: 25, wherein $X_1$ is V or A; X2 is M or L; and X3 is N or S.

```
                                         (SEQ ID NO: 25)
  1 ASTKGPSVFP LAPSSKSTSG GTAALGCLVK DYFPEPVTVS
    WNSGALTSGV HTFPAVLQSS

61 GLYSLSSVVT VPSSSLGTQT YICNVNHKPS NTKVDKKX1EP
    KSCDKTHTCP PCPAPELLGG

121 PSVFLFPPKP KDTLMISRTP EVTCVVVDVS HEDPEVKFNW
    YVDGVEVHNA KTKPREEQYN

181 STYRVVSVLT VLHQDWLNGK EYKCKVSNKA LPAPIEKTIS
    KAKGQPREPQ VYTLPPSRDE

241 LTKNQVSLTC LVKGFYPSDI AVEWESNGQP ENNYKTTPPV
    LDSDGSFFLY SKLTVDKSRW

301 QQGNVFSCSV X2HEALHX3HYT QKSLSLSPGK
```

In some embodiments, the human IgG1 Fc domain sequence is SEQ ID NO: 26, wherein $X_1$ is K or R; X2 is D or E; and X3 is L or M.

```
                                         (SEQ ID NO: 26)
  1 ASTKGPSVFP LAPSSKSTSG GTAALGCLVK DYFPEPVTVS
    WNSGALTSGV HTFPAVLQSS

61 GLYSLSSVVT VPSSSLGTQT YICNVNHKPS NTKVDKXVEP
    KSCDKTHTCP PCPAPELLGG

121 PSVFLFPPKP KDTLMISRTP EVTCVVVDVS HEDPEVKFNW
    YVDGVEVHNA KTKPREEQYN

181 STYRVVSVLT VLHQDWLNGK EYKCKVSNKA LPAPIEKTIS
    KAKGQPREPQ VYTLPPSRX2E

241 X3TKNQVSLTC LVKGFYPSDI AVEWESNGQP ENNYKTTPPV
    LDSDGSFFLY SKLTVDKSRW

301 QQGNVFSCSV MHEALHNHYT QKSLSLSPGK
```

In some embodiments, the SIRP antibody contains an Fc domain, and the Fc domain of a SIRP antibody is a human IgG4 Fc. Exemplary human IgG4 heavy chain Fc domain sequences are provided as SEQ ID NO: 34-35, 37, 82-85 and 87.

```
                                         (SEQ ID NO: 34)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPSCPAPEFLGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEG

NVFSCSVMHEALHNHYTQKSLSLSLGK
```

(SEQ ID NO: 35)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPPCPAPEFEGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEG

NVFSCSVMHEALHNHYTQKSLSLSLGK (SEQ ID NO: 82)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPSCPAPEFEGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEG

NVFSCSVMHEALHNHYTQKSLSLSLGK (SEQ ID NO: 83)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPPCPAPEFLGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEG

NVFSCSVMHEALHNHYTQKSLSLSLGK (SEQ ID NO: 84)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPSCPAPEALGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEG

NVFSCSVMHEALHNHYTQKSLSLSLGK (SEQ ID NO: 85)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPSCPAPEAAGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNQVSLTCLVK

GFYPSDIAVEWESNGQPENNYKTTPPVLDSDGSFFLYSRLTVDKSRWQEG

NVFSCSVMHEALHNHYTQKSLSLSLGK (SEQ ID NO: 87)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPSCPAPEFAGGPSVFLFPPKPKDTLMISRTPEVTCVVVDVSQED

PEVQFNWYVDGVEVHNAKTKPREEQFNSTYRVVSVLTVLHQDWLNGKEYK

CKVSNKGLPSSIEKTISKAKGQPREPQVYTLPPSQEEMTKNOVSLTCLVK

GFYPSDIAVEWESNGQPENNYKTTPPVLDSDGSFFLYSRLTVDKSRWQEG

NVFSCSVMHEALHNHYTQKSLSLSLGK

In some embodiments, the human IgG4 Fc domain sequence is SEQ ID NO: 37, wherein $X_1$ is S or P; AND X2 is L or E.

(SEQ ID NO: 37)
ASTKGPSVFPLAPCSRSTSESTAALGCLVKDYFPEPVTVSWNSGALTSGV

HTFPAVLQSSGLYSLSSVVTVPSSSLGTKTYTCNVDHKPSNTKVDKRVES

KYGPPCPX1CPAPEFX2GGPSVFLFPPKPKDTLMISRTPEVTCVVVDVSQ

EDPEVQFNWYVDGVEVHNAKTKPREEQFNSTYRVVSVLTVLHQDWLNGKE

YKCKVSNKGLPSSIEKTISKAKGQPREPQVYTLPPSQEEMTKNQVSLTCL

VKGFYPSDIAVEWESNGQPENNYKTTPPVLDSDGSFFLYSRLTVDKSRWQ

EGNVFSCSVMHEALHNHYTQKSLSLSLGK

In some embodiments, the SIRP antibodies provided herein are chimeric and comprise a variable region from one species, and a constant region from another species, e.g. comprise a human variable region and a rat constant region. In some embodiments, the rat constant region is rat IgG1 or IgG2b. In some embodiments, the rat constant region is IgG2b. In some embodiments, the antibodies comprise a human variable region and a mouse constant region. In some embodiments, the mouse constant region is mouse IgG2a. In some embodiments, the antibodies comprise a human variable region and a human constant region. In exemplary embodiments, the human constant region is human IgG1 or human IgG4.

The EU numbering scheme is one of many available antibody numbering schemes based on the residue numbers assigned to a canonical antibody sequence. Accordingly, a skilled artisan would understand that reference to a particular residue using the EU numbering scheme may or may not be exactly the residue in one of the SIRP antibodies of the disclosure. For example, if a SIRP antibody of the disclosure comprises a V215A substitution in the Fc, wherein the position number of the amino acid residue is of the EU numbering scheme, the residue may not be the actual residue 215 in that particular SIRP antibody. It may be actual residue number 213, or 214, or 215, or 216 or others. Accordingly, a skilled artisan will understand how to correspond the recited residue using the EU numbering scheme, to the actual residue in a SIRP antibody of the disclosure. The EU numbering system for antibodies is known in the art and is described, for example, at imgt.org/IMGTScientificChart/Numbering/Hu_IGHGnber.html.

In some embodiments, the Fc domain of a SIRP antibody is an IgG1 Fc domain (e.g. SEQ ID NOS: 3-4, 19-22 or 25-26) or IgG4 human Fc domain (e.g. SEQ ID NOS: 34, 35 or 37), and comprises at least one amino acid substitution at a position selected from the group consisting of: 214, 215, 221, 222, 228, 234, 235, 236, 239, 240, 241, 243, 244, 245, 247, 250, 252, 254, 256, 262, 263, 264, 265, 266, 267, 268, 269, 270, 292, 296, 297, 298, 299, 300, 305, 313, 324, 325, 326, 327, 328, 329, 330, 332, 333, 334, 345, 356, 358, 396, 428, 430, 433, 434, and 440 wherein the position numbers of the amino acid residues are of the EU numbering scheme.

In some embodiments, the Fc domain of a SIRP antibody comprises SEQ ID NOS: 3-4, 19-22 or 25-26, optionally with one or more Fc amino acid substitutions, for example at least one amino acid substitution at a position selected from the group consisting of: 214, 215, 221, 222, 228, 234, 235, 236, 239, 240, 241, 243, 244, 245, 247, 250, 252, 254, 256, 262, 263, 264, 265, 266, 267, 268, 269, 270, 292, 296, 297, 298, 299, 300, 305, 313, 324, 325, 326, 327, 328, 329, 330, 332, 333, 334, 345, 356, 358, 396, 428, 430, 433, 434, and 440 wherein the position numbers of the amino acid residues are of the EU numbering scheme. Exemplary substitutions include one or more of K214R, V215A, G236A, S239D, I332E, D356E, L358M, M428L, N434S, wherein the position numbers of the amino acid residues are of the EU numbering scheme.

In some embodiments, the Fc domain of a SIRP antibody is a human IgG1 (e.g. SEQ ID NO: 3-4, 19-22 or 25-26), and substitutions are introduced to increase effector function, selected from the group consisting of V215A, G236A, S239D, I332E, G236A/S239D, G236A/I332E, S239D/I332E, G236A/S239D, /I332E, K326W/E333S, S267E/H268F/S324T, and E345R/E430G/S440Y, F243L/R292P/Y300L/V3051/P396L, S239D/I332E, S298A/E333A/K334A, L234Y/L235Q/G236W/S239M/H268D/D270E/S298A, and D270E/K326D/A330M/K334E wherein the position numbers of the amino acid residues are of the EU numbering scheme.

In some embodiments, the Fc domain of a SIRP antibody is a human IgG1 (e.g. SEQ ID NO: 3-4, 19-22 or 25-26), and substitutions are introduced to reduce effector function, including one or more of N297A, N297Q, N297G, L235E, L234A, L235A, K214R, D356E, and L358M, wherein the position numbers of the amino acid residues are of the EU numbering scheme.

In some embodiments, the Fc domain of a SIRP antibody is human IgG4 (e.g. SEQ ID NOS: 34, 35 or 37), and substitutions are introduced to reduce effector function, including one or more of L235E, and F234A/L235A, wherein the position numbers of the amino acid residues are of the EU numbering scheme.

In some embodiments, the Fc domain of a SIRP antibody is human IgG2, and substitutions are introduced to reduce effector function, including H268Q/V309L/A330S/P331S and V234A/G237A/P238S/H268A/V309L/A330S/P331S, wherein the position numbers of the amino acid residues are of the EU numbering scheme.

In some embodiments, the Fc domain of a SIRP antibody is an IgG4 human Fc domain (e.g. SEQ ID NOS: 34, 35 or 37), and the antibody is prone to the dynamic process of Fab-arm exchange. Accordingly, in some embodiments the IgG4 Fc domain comprises a S228P substitution, resulting in the reduction of this process, wherein the position number of the amino acid residues are of the EU numbering scheme.

In some embodiments, the Fc domain of a SIRP antibody is human IgG4 (e.g. SEQ ID NO: 34, 35 or 37), and one or more of the following substitution are introduced: L235A, L235E, S228P, L235E/S228P, S228P/F234A, S228P/F234A/L235A, wherein the position numbers of the amino acid residues are of the EU numbering scheme.

In other embodiments, the Fc domain of a SIRP antibody is altered to increase its serum half-life. Such alterations include substitutions of a human IgG1, IgG2, IgG3 or IgG4 such as M428L, N343S, T250Q/M428L, M252Y/S254T/T256E, M428L/N434S, S267E/L328F, N325S/L328F, and H433K/N434F, wherein the position number of the amino acid residues are of the EU numbering scheme.

i. SIRP Antibody-Mediated Cell Depletion

The SIRP antibodies that contain Fc domains provided herein are capable of targeting a variety of cell types and inducing the depletion of those cells. An exemplary non-limiting list of antibodies of the disclosure that exhibit cell depletion include Antibodies 23, 25, and 28-31, as provided in Table 11.

In some embodiments, the SIRP antibodies containing Fc domains provided herein are capable of depleting SIRPγ expressing cells. In some embodiments, the SIRP antibodies provided herein are capable of inducing the depletion of lymphocytes. In some embodiments, the SIRP antibodies provided herein are capable of inducing the depletion of SIRPα- and/or SIRPβ1-expressing cells such as myeloid cells and myeloid progenitor cells, and include, but are not limited to, monocytes, macrophages, dendritic cells, mast cells, eosinophils, basophil, and neutrophils. In some embodiments, for example wherein the SIRP antibody binds to SIRPγ and SIRPα, the SIRP antibody is capable of inducing the depletion of SIRPα as well as SIRPγ expressing cells. In some embodiments, for example wherein the SIRP antibody binds to SIRPβ1, the SIRP antibody is capable of inducing the depletion of SIRPβ1 as well as SIRPγ expressing cells. In some embodiments, for example where the SIRP antibody binds to SIRPγ, SIRPα and SIRPβ1, the SIRP antibody is capable of inducing the depletion of SIRPα and SIRPβ1 expressing cells, as well as SIRPγ expressing cells.

Without being held to any theory, it is envisioned that the SIRP antigen binding domain allows for the antigen-binding fragments (Fab) of the antibody to bind to the SIRP expressing cell, and that the Fc portion of the antibody induces depletion. Accordingly in some embodiments, the cell depletion involves antibody dependent cellular cytotoxicity (ADCC). In some embodiments, the cell depletion involves antibody dependent cellular phagocytosis (ADCP). In some embodiments, the cell depletion involves ADCC and ADCP. An Fc-containing SIRP antibody of the disclosure includes a full-length antibody, or an antibody fragment that is linked to a Fc domain, e.g. a VH-VL-Fc single chain antibody.

ii. Exemplary SIRP Antibodies—Complementarity Determining Region (CDR) Sequences Provided herein are sequences for exemplary SIRP antibodies of the disclosure. Exemplary CDR-L1, L2, L3, H1, H2, and H3 sequences that make up the SIRP antigen binding domain are presented below in Tables 1-6. As referred below, a light chain variable (VL) domain CDR1 region is referred to as CDR-L1; a VL CDR2 region is referred to as CDR-L2; a VL CDR3 region is referred to as CDR-L3; a heavy chain variable (VH) domain CDR1 region is referred to as CDR-H1; a VH CDR2 region is referred to as CDR-H2; and a VH CDR3 region is referred to as CDR-H3. Tables 7 and 8 provide exemplary CDR triplets for the light chains and heavy chains of SIRPα antibodies of the disclosure. Table 9 provides exemplary CDR combinations of antibodies of the disclosure.

TABLE 1

Exemplary SIRP antibody CDR-L1 Sequences

| CDR-L1 | SEQ ID NO: |
|---|---|
| QSLLHGNGFNY | 5 |
| QGISGY | 7 |
| QDFSNY | 8 |

TABLE 1-continued

Exemplary SIRP antibody CDR-L1 Sequences

| CDR-L1 | SEQ ID NO: |
|---|---|
| NIGSKS | 11 |
| KLGDKY | 12 |
| KLGDRY | 13 |
| QDISSW | 14 |
| QSVSSN | 15 |
| QSVSRN | 16 |
| QTVLNSSNNKNY | 17 |
| QDINRY | 18 |

TABLE 2

Exemplary SIRP antibody CDR-L2 Sequences

| CDR-L2 | SEQ ID NO: |
|---|---|
| LGS | 23 |
| AAS | 24 |
| DDS | 27 |
| HDD | 28 |
| QDD | 29 |
| QDT | 30 |
| GAS | 31 |
| WAS | 32 |
| RAN | 33 |

TABLE 3

Exemplary SIRP antibody CDR-L3 Sequences

| CDR-L3 | SEQ ID NO: |
|---|---|
| MQGLQTPRT | 36 |
| QQFTSDLIT | 38 |
| QQYDNLPYT | 39 |
| QVWDSSSDHYV | 42 |
| QTWDSSTVV | 43 |
| QAWDSSTAV | 44 |
| QACDSSTAV | 45 |
| QEANSFPYT | 46 |
| QQYNNWPYT | 47 |
| QQYYNTPPWT | 48 |
| LQYDEFPFT | 49 |

TABLE 4

Exemplary SIRP antibody CDR-H1 Sequences

| CDR-H1 | SEQ ID NO: |
|---|---|
| GGSISSSNW | 54 |
| DYSISSGYY | 56 |
| GFTFSKFG | 59 |
| GGSFSGYY | 60 |
| GGSFSTYY | 61 |
| GFTFSSYA | 62 |
| GFTFSSYW | 63 |
| GFIFSNYG | 64 |
| GYTFRNFG | 65 |

TABLE 5

Exemplary SIRP antibody CDR-H2 Sequences

| CDR-H2 | SEQ ID NO: |
|---|---|
| IYHSGST | 70 |
| IYHSGNT | 72 |
| ISYDGNNK | 75 |
| INHSGST | 76 |
| ISGSGGDT | 77 |
| IHNDGSRT | 78 |
| ISGSGSST | 79 |
| ISYDGRNE | 80 |
| IDTNTGEP | 81 |

TABLE 6

Exemplary SIRP antibody CDR-H3 Sequences

| CDR-H3 | SEQ ID NO: |
|---|---|
| ARRGIWFGVGP | 86 |
| AREGIEGYYFYYGMDV | 88 |
| ARDKCSTTTCSFDY | 89 |
| WAAAGAFYI | 92 |
| SRVDSGSYPYYDGLDV | 93 |
| ASSHYGSGSFPDSYGMDV | 94 |
| AKDGGSYYPPFDY | 95 |
| TRDPPPYDILTGYPFDY | 96 |
| AAYSGSYYYYGMDV | 97 |
| AKGSGYYFDY | 98 |
| ARSRGNYFAMEY | 99 |

TABLE 7

Exemplary SIRP antibody Light Chain CDR Triplets

| CDR-L1 | SEQ ID NO: | CDR-L2 | SEQ ID NO: | CDR-L3 | SEQ ID NO: |
|---|---|---|---|---|---|
| QSLLHGNGFNY | 5 | LGS | 23 | MQGLQTPRT | 36 |
| QGISGY | 7 | AAS | 24 | QQFTSDLIT | 38 |
| QDFSNY | 8 | AAS | 24 | QQYDNLPYT | 39 |
| NIGSKS | 11 | DDS | 27 | QVWDSSSDHYV | 42 |
| KLGDKY | 12 | HDD | 28 | QTWDSSTVV | 43 |
| KLGDRY | 13 | QDD | 29 | QAWDSSTAV | 44 |
| KLGDRY | 13 | QDT | 30 | QACDSSTAV | 45 |
| QDISSW | 14 | GAS | 31 | QEANSFPYT | 46 |
| QSVSSN | 15 | GAS | 31 | QQYNNWPYT | 47 |
| QSVSRN | 16 | GAS | 31 | QQYNNWPYT | 47 |
| QTVLNSSNNKNY | 17 | WAS | 32 | QQYYNTPPWT | 48 |
| QDINRY | 18 | RAN | 33 | LQYDEFPFT | 49 |

TABLE 8

Exemplary SIRP antibody Heavy Chain CDR Triplets

| CDR-H1 | SEQ ID NO: | CDR-H2 | SEQ ID NO: | CDR-H3 | SEQ ID NO: |
|---|---|---|---|---|---|
| GGSISSSNW | 54 | IYHSGST | 70 | ARRGIWFGVGP | 86 |
| GGSISSSNW | 54 | IYHSGNT | 72 | AREGIEGYYFYYGMDV | 88 |
| DYSISSGYY | 56 | IYHSGNT | 72 | ARDKCSTTTCSFDY | 89 |
| GFTFSKFG | 59 | ISYDGNNK | 75 | WAAAGAFYI | 92 |
| GGSFSGYY | 60 | INHSGST | 76 | SRVDSGSYPYYDGLDV | 93 |
| GGSFSTYY | 61 | INHSGST | 76 | ASSHYGSGSFPDSYGMDV | 94 |
| GFTFSSYA | 62 | ISGSGGDT | 77 | AKDGGSYYPPFDY | 95 |
| GFTFSSYW | 63 | IHNDGSRT | 78 | TRDPPPYDILTGYPFDY | 96 |
| GFTFSSYA | 62 | ISGSGSST | 79 | AAYSGSYYYYGMDV | 97 |
| GFIFSNYG | 64 | ISYDGRNE | 80 | AKGSGSYYFDY | 98 |
| GYTFRNFG | 65 | IDTNTGEP | 81 | ARSRGNYFAMEY | 99 |

TABLE 9

Exemplary SIRP antibody CDR Combinations, Antibodies 1, 3-4 and 7-15

| Antibody No. | CDR-L1 | CDR-L2 | CDR-L3 | CDR-H1 | CDR-H2 | CDR-H3 |
|---|---|---|---|---|---|---|
| Antibody 1 | QSLLHGNGFNY (SEQ ID NO: 5) | LGS (SEQ ID NO: 23) | MQGLQTPRT (SEQ ID NO: 36) | GGSISSSNW (SEQ ID NO: 54) | IYHSGST (SEQ ID NO: 70) | ARRGIWFG VGP (SEQ ID NO: 86) |
| Antibody 3 | QGISGY (SEQ ID NO: 7) | AAS (SEQ ID NO: 24) | QQFTSDLIT (SEQ ID NO: 38) | GGSISSSNW (SEQ ID NO: 54) | IYHSGNT (SEQ ID NO: 72) | AREGIEGYYF YYGMDV (SEQ ID NO: 88) |

TABLE 9-continued

Exemplary SIRP antibody CDR Combinations, Antibodies 1, 3-4 and 7-15

| Antibody No. | CDR-L1 | CDR-L2 | CDR-L3 | CDR-H1 | CDR-H2 | CDR-H3 |
|---|---|---|---|---|---|---|
| Antibody 4 | QDFSNY (SEQ ID NO: 8) | AAS (SEQ ID NO: 24) | QQYDNLPYT (SEQ ID NO: 39 | DYSISSGYY (SEQ ID NO: 56) | IYHSGNT (SEQ ID NO: 72) | ARDKCSTTT CSFDY (SEQ ID NO: 89) |
| Antibody 7 | NIGSKS (SEQ ID NO: 11) | DDS (SEQ ID NO: 27) | QVWDSSSD HYV (SEQ ID NO: 42) | GFTFSKFG (SEQ ID NO: 59) | ISYDGNNK (SEQ ID NO: 75) | WAAAGAFYI (SEQ ID NO: 92) |
| Antibody 8 | KLGDKY (SEQ ID NO: 12) | HDD (SEQ ID NO: 28 | QTWDSSTVV (SEQ ID NO: 43) | GGSFSGYY (SEQ ID NO: 60) | INHSGST (SEQ ID NO: 76) | SRVDSGSYP YYDGLDV (SEQ ID NO: 93 |
| Antibody 9 | KLGDRY (SEQ ID NO: 13) | QDD (SEQ ID NO: 29) | QAWDSSTAV (SEQ ID NO: 44) | GGSFSTYY (SEQ ID NO: 61) | INHSGST (SEQ ID NO: 76) | ASSHYGSGS FPDSYGMDV (SEQ ID NO: 94) |
| Antibody 10 | KLGDRY (SEQ ID NO: 13) | QDT (SEQ ID NO: 30) | QACDSSTAV (SEQ ID NO: 45) | GFTFSSYA (SEQ ID NO: 62) | ISGSGGDT (SEQ ID NO: 77) | AKDGGSYYP PFDY (SEQ ID NO: 95 |
| Antibody 11 | QDISSW (SEQ ID NO: 14) | GAS (SEQ ID NO: 31) | QEANSFPYT (SEQ ID NO: 46) | GFTFSSYW (SEQ ID NO: 63) | IHNDGSRT (SEQ ID NO: 78) | TRDPPPYDIL TGYPFDY (SEQ ID NO: 96) |
| Antibody 12 | QSVSSN (SEQ ID NO: 15) | GAS (SEQ ID NO: 31) | QQYNNWPYT (SEQ ID NO: 47) | GFTFSSYA (SEQ ID NO: 62) | ISGSGSST (SEQ ID NO: 79) | AAYSGSYYY YGMDV (SEQ ID NO: 97) |
| Antibody 13 | QSVSRN (SEQ ID NO: 16) | GAS (SEQ ID NO: 31) | QQYNNWPYT (SEQ ID NO: 47) | GFTFSSYA (SEQ ID NO: 62) | ISGSGSST (SEQ ID NO: 79) | AAYSGSYYY YGMDV (SEQ ID NO: 97) |
| Antibody 14 | QTVLNSSNN KNY (SEQ ID NO: 17) | WAS (SEQ ID NO: 32) | QQYYNTPPWT (SEQ ID NO: 48) | GFIFSNYG (SEQ ID NO: 64) | ISYDGRNE (SEQ ID NO: 80) | AKGSGSYYF DY (SEQ ID NO: 98) |
| Antibody 15 | QDINRY (SEQ ID NO: 18) | RAN (SEQ ID NO: 33) | LQYDEFPFT (SEQ ID NO: 49) | GYTFRNFG (SEQ ID NO: 65) | IDTNTGEP (SEQ ID NO: 81) | ARSRGNYFA MEY (SEQ ID NO: 99) |

In some embodiments, the SIRP antibodies provided herein include any one or more of the amino acid sequences of the CDR sequences provided in Tables 1-6.

In some embodiments, provided herein is a SIRP antibody, wherein the antibody comprises:
(a) any one of the CDR-L1 amino acid sequences of SEQ ID NOS: 5, 7-8 or 11-18 as set forth in Table 1;
(b) any one of the CDR-L2 amino acid sequences of SEQ ID NOS: 23-24, or 27-33 as set forth in Table 2;
(c) any one of the CDR-L3 amino acid sequences of SEQ ID NOS: 36, 38-39 or 42-49 as set forth in Table 3;
(d) any one of the CDR-H1 amino acid sequences of SEQ ID NOS: 54, 56, or 59-65 as set forth in Table 4;
(e) any one of the CDR-H2 amino acid sequences of SEQ ID NOS: 70, 72, or 75-81 as set forth in Table 5; and/or
(f) any one of the CDR-H3 amino acid sequences of SEQ ID NOS: 86, 88-89 or 92-99 as set forth in Table 6.

In some embodiments, provided herein is a SIRP antibody, wherein the light chain variable domain of the antibody comprises:
(g) a CDR-L1 comprising any one of the amino acid sequences of SEQ ID NOs: 5, 7-8, or 11-18;
(h) a CDR-L2 comprising any one of the amino acid sequences of SEQ ID NOs: 23-24, or 27-33; and
(i) a CDR-L3 comprising any one of the amino acid sequences of SEQ ID NOs: 36, 38-39, or 42-49.

In some embodiments, provided herein is a SIRP antibody, wherein the heavy chain variable domain of the antibody comprises:
(j) a CDR-H1 comprising any one of the amino acid sequences of SEQ ID NOs: 54, 56, or 59-65;
(k) a CDR-H2 comprising any one of the amino acid sequences of SEQ ID NOs: 70, 72, or 75-81; and
(l) a CDR-H3 comprising any one of the amino acid sequences of SEQ ID NOs: 86, 88-89, or 92-99.

In some embodiments, provided herein is a SIRP antibody, wherein the light chain variable domain of the antibody comprises any one of the sequences provided in Tables 1-3, and wherein the heavy chain variable domain of the antibody comprises:
(m) a CDR-H1 comprising any one of the amino acid sequences of SEQ ID NOs: 54, 56, or 59-65;
(n) a CDR-H2 comprising any one of the amino acid sequences of SEQ ID NOs: 70, 72, or 75-81; and
(o) a CDR-H3 comprising any one of the amino acid sequences of SEQ ID NOs: 86, 88-89, or 92-99.

In some embodiments, provided herein is a SIRP antibody, wherein the heavy chain variable domain of the antibody comprises any one of the sequences provided in Tables 4-6, and wherein the light chain variable domain of the antibody comprises:
(p) a CDR-L1 comprising any one of the amino acid sequences of SEQ ID NOs: 5, 7-8, or 11-18;
(q) a CDR-L2 comprising any one of the amino acid sequences of SEQ ID NOs: 23-24, or 27-33; and
(r) a CDR-L3 comprising any one of the amino acid sequences of SEQ ID NOs: 36, 38-39, or 42-49.

In some embodiments, provided herein is a SIRP antibody, wherein the light chain of the antibody comprises the amino acid sequences of:
a. SEQ ID NO: 5, SEQ ID NO: 23, and SEQ ID NO: 36;
b. SEQ ID NO: 7, SEQ ID NO: 24, and SEQ ID NO: 38;
c. SEQ ID NO: 8, SEQ ID NO: 24, and SEQ ID NO: 39;
d. SEQ ID NO: 11, SEQ ID NO: 27, and SEQ ID NO: 42;
e. SEQ ID NO: 12, SEQ ID NO: 28, and SEQ ID NO: 43;
f. SEQ ID NO: 13, SEQ ID NO: 29, and SEQ ID NO: 44;
g. SEQ ID NO: 13, SEQ ID NO: 30, and SEQ ID NO: 45;
h. SEQ ID NO: 14, SEQ ID NO: 31, and SEQ ID NO: 46;
i. SEQ ID NO: 15, SEQ ID NO: 31, and SEQ ID NO: 47;
j. SEQ ID NO: 16, SEQ ID NO: 31, and SEQ ID NO: 47;
k. SEQ ID NO: 17, SEQ ID NO: 32, and SEQ ID NO: 48; or
l. SEQ ID NO: 18, SEQ ID NO: 33, and SEQ ID NO: 49.

In some embodiments, provided herein is a SIRP antibody, wherein the heavy chain of the antibody comprises the amino acid sequences of:
a. SEQ ID NO: 54, SEQ ID NO: 70, and SEQ ID NO: 86;
b. SEQ ID NO: 54, SEQ ID NO: 72, and SEQ ID NO: 88;
c. SEQ ID NO: 56, SEQ ID NO: 72, and SEQ ID NO: 89;
d. SEQ ID NO: 59, SEQ ID NO: 75, and SEQ ID NO: 92;
e. SEQ ID NO: 60, SEQ ID NO: 76, and SEQ ID NO: 93;
f. SEQ ID NO: 61, SEQ ID NO: 76, and SEQ ID NO: 94;
g. SEQ ID NO: 62, SEQ ID NO: 77, and SEQ ID NO: 95;
h. SEQ ID NO: 63, SEQ ID NO: 78, and SEQ ID NO: 96;
i. SEQ ID NO: 62, SEQ ID NO: 79, and SEQ ID NO: 97;
j. SEQ ID NO: 62, SEQ ID NO: 79, and SEQ ID NO: 97;
k. SEQ ID NO: 64, SEQ ID NO: 80, and SEQ ID NO: 98; or
l. SEQ ID NO: 65, SEQ ID NO: 81, and SEQ ID NO: 99.

In some embodiments, provided herein is a SIRP antibody, wherein the antibody comprises the amino acid sequences of:
a. SEQ ID NO: 5, SEQ ID NO: 23, SEQ ID NO: 36, SEQ ID NO: 54, SEQ ID NO: 70, and SEQ ID NO: 86;
b. SEQ ID NO: 7, SEQ ID NO: 24, SEQ ID NO: 38, SEQ ID NO: 54, SEQ ID NO: 72, and SEQ ID NO: 88;
c. SEQ ID NO: 8, SEQ ID NO: 24, SEQ ID NO: 39, SEQ ID NO: 56, SEQ ID NO: 72, and SEQ ID NO: 89;
d. SEQ ID NO: 11, SEQ ID NO: 27, SEQ ID NO: 42, SEQ ID NO: 59, SEQ ID NO: 75, and SEQ ID NO: 92;
e. SEQ ID NO: 12, SEQ ID NO: 28, SEQ ID NO: 43, SEQ ID NO: 60, SEQ ID NO: 76, and SEQ ID NO: 93;
f. SEQ ID NO: 13, SEQ ID NO: 29, SEQ ID NO: 44, SEQ ID NO: 61, SEQ ID NO: 76, and SEQ ID NO: 94;
g. SEQ ID NO: 13, SEQ ID NO: 30, SEQ ID NO: 45, SEQ ID NO: 62, SEQ ID NO: 77, and SEQ ID NO: 95;
h. SEQ ID NO: 14, SEQ ID NO: 31, SEQ ID NO: 46, SEQ ID NO: 63, SEQ ID NO: 78, and SEQ ID NO: 96;
i. SEQ ID NO: 15, SEQ ID NO: 31, SEQ ID NO: 47, SEQ ID NO: 62, SEQ ID NO: 79, and SEQ ID NO: 97;
j. SEQ ID NO: 16, SEQ ID NO: 31, SEQ ID NO: 47, SEQ ID NO: 62, SEQ ID NO: 79, and SEQ ID NO: 97;
k. SEQ ID NO: 17, SEQ ID NO: 32, SEQ ID NO: 48, SEQ ID NO: 64, SEQ ID NO: 80, and SEQ ID NO: 98; or
l. SEQ ID NO: 18, SEQ ID NO: 33, SEQ ID NO: 49, SEQ ID NO: 65, SEQ ID NO: 81, and SEQ ID NO: 99.

iv. Exemplary SIRP Antibodies—Variable Region Sequences

The term variable region and variable domain are used interchangeably and refer to the portions of the light and heavy chains of an antibody that include the complementarity determining regions and framework regions (FRs).

Table 10 provides amino acid sequences for the variable domains of exemplary SIRP antibodies of the disclosure. Accordingly, in some embodiments a SIRP antibody of the disclosure comprises a variable heavy chain comprising an amino acid sequence selected from SEQ ID NOS: 104, 106-107, and 110-118, or at least 80% sequence identity thereto. In some embodiments a SIRP antibody of the disclosure comprises a variable light chain comprising an amino acid sequence selected from SEQ ID NOS: 123, 125-126, and 129-137, or at least 80% sequence identity thereto. In some embodiments a SIRP antibody of the disclosure comprises a variable heavy chain comprising an amino acid sequence selected from SEQ ID NOS: 104, 106-107, and 110-118, or at least 80% sequence identity thereto and comprises a variable light chain comprising an amino acid sequence selected from SEQ ID NOS: 123, 125-126, and 129-137, or at least 80% sequence identity thereto.

In some embodiments, a SIRP antibody of the disclosure comprises the combination of VH/VL variable chain sequences of any one Antibodies 1, 3-4 and 7-15 presented in Table 10.

TABLE 10

Exemplary Variable Heavy Chain and Variable Light Chain Amino

| Antibody No. | Variable Heavy Chain Amino Acid Sequence | Variable Light Chain Amino Acid Sequence |
| --- | --- | --- |
| 1 | QVQLQESGPGLVKPSGTLSLTCAVSGG SISSSNWWSWVRQPPGKGLEWIGEIY HSGSTNYNPSLKSRVTISVDKSKNQFSL KLSSVTAADTAVYYCARRGIWFGVGP WGQGTLVTVSS (SEQ ID NO: 104) | DIVMTQSPLSLPVTPGEPASISCRSSQSLLHG NGFNYLDWYLQKPGQSPQLLIYLGSNRASG VPDRFTGSGSGTDPTLKISRVEAEDVGVYYC MQGLQTPRTFGQGTKVEIK (SEQ ID NO: 123) |
| 3 | QVQLQESGPGLVKPSGTLSLTCAVSGG SISSSNWWSWVRQPPGKGLEWIGEIY HSGNTNYNPSLKSRVTISVDKSKNQFS LKLSSVTAADTAVYYCAREGIEGYYFYY GMDVWGQGTTVTVSS (SEQ ID NO: 106) | DIQLTQSPSFLSASVGDRVTITCRASQGISGY LDWYQQKPGKAPKLLIYAASTLQRGVPSRFS GSGSGTDFNLTISSLOPEDFATYYCQQFTSD LITFGQGTRLEIK (SEQ ID NO: 125) |

TABLE 10-continued

Exemplary Variable Heavy Chain and Variable Light Chain Amino

| Antibody No. | Variable Heavy Chain Amino Acid Sequence | Variable Light Chain Amino Acid Sequence |
|---|---|---|
| 4 | QVQLQESGPGLLKPSETLSLTCAVSDYS ISSGYYWGWIRQPPGKGLEWIGSIYHS GNTYYNPSLKSRVTILVDTSKNQFSLKL SSVTAADTAVYYCARDKCSTTTCSFDY WGQGTLVTVSS (SEQ ID NO: 107) | DIQMTQSPSSLSASVGDRVTITCQASQDFS NYLNWYQQKPGKAPKLLIYAASNLETGVPS RFSGSGSGTDFTFTISSLQPEDIAVYYCQQYD NLPYTFGQGTKLEIK (SEQ ID NO: 126) |
| 7 | QVQLVESGGGVVQPGRSLRLSCAASG FTFSKFGMHWVRQAPGKGLEWVAVI SYDGNNKYYTDSVKGRFTISRDNSRNT LYLQMDSVKPEDTAVYYSWAAAGAFY IWGQGTMVTVSS (SEQ ID NO: 110) | SYVLTQPPSVSVAPGQTARITCGGYNIGSKS VHWYQQKAGQAPVLVVYDDSGRPSGIPER LSGSKSGNTATLTISRVEAGDEADYYCQVW DSSSDHYVFGTGTKVTVL (SEQ ID NO: 129) |
| 8 | QVQLQQWGAGLLKPSETLSLTCAVYG GSFSGYYWSWIRQPPGKGLEWIGEIN HSGSTNFNPSLKSRVTISVDTSKNQFSL KLRSVTAADTAVYYCSRVDSGSYPYYD GLDVWGQGTTVTVSS (SEQ ID NO: 111) | SSELTQPPSVSVSPGQTASITCSGDKLGDKY VYWYQQKPGQSPVLVIYHDDRRPAGIPERF AGSASGNTATLTISGTQAMDEADYYCQTW DSSTVVFGGGTKLTVL (SEQ ID NO: 130) |
| 9 | QVQLQQWGAGLLKPSETLSLTCAVYG GSFSTYYWNWIRQPPGKGLEWIGEIN HSGSTNYNPSLKSRVIISVDTSKNQFSL KLSSVTAADTAVYYCASSHYGSGSFPD SYGMDVWGQGTTVTVSA (SEQ ID NO: 112) | SYELTQSPSVSVSPGQTASITCSGDKLGDRY AWWYQQKPGQSPVLVIYQDDKRPSGIPER FSGSNSGNTATLTISGTQAMDEADYYCQA WDSSTAVFGGGTKLTVL (SEQ ID NO: 131) |
| 10 | EVQLLESGGGLVQPGGSLRLSCAASGF TFSSYAMSWVRQAPGKGLEWVSAISG SGGDTYYADSVKGRFTISRDNSKSTLYL QMNSLRAEDTAVYYCAKDGGSYYPPF DYWGQGTLVTVSS (SEQ ID NO: 113) | SYELTQPPSVSVSPGQTASITCSGDKLGDRY ACWYQQKPGQSPVLVIYQDTKRPSGIPERF SGSNSGNTATLTISGTQAMDEADYYCQACD SSTAVFGGGTKLTVL (SEQ ID NO: 132) |
| 11 | EVQLVESGGGLVQPGGSLRLSCAASGF TFSSYWMHWVRQAPGKGLVWVSRI HNDGSRTSYADSVKGRFTISRDNAKNT LYLQMSSLRAEDTAVYYCTRDPPPYDIL TGYPFDYWGQGTLVTVSS (SEQ ID NO: 114) | DIQMTQSPSSVSASVGDRVTITCRASQDISS WLAWFQQKPGKAPKLLIYGASSLQSGVPSR FSGSGSGTDFTLTISSLQPEDFATYYCQEANS FPYTFGQGTKLEIK (SEQ ID NO: 133) |
| 12 | EVQVLESGGGLVQPGGSLRLSCAASGF TFSSYAMSWVRQAPGKGLEWVSAISG SGSSTHYADSVKGRFTISRDNSKNTLYL QMNSLRAEDTAVYYCAAYSGSYYYYG MDVWGQGTTVTVSS (SEQ ID NO: 115) | EIVMTQSPATLSVSPGERATLSCRASQSVSS NLAWYQQKSGQAPRLLIYGASTRATGIPAR FSGSGSGTEFTLTISSLQSEDFAGYYCQQYN NWPYTFGQGTKLEIK (SEQ ID NO: 134) |
| 13 | EVQMLESGGGLVQPGGSLRLSCAASG FTFSSYAMSWVRQAPGKGLEWVSAIS GSGSSTHYADSVKGRFTISRDNSKNTL YLQMNSLRAEDTAVYYCAAYSGSYYYY GMDVWGQGTTVTVSS (SEQ ID NO: 116) | EIVMTQSPATLSVSPGERATLSCRASQSVSR NLAWYQQKSGQAPRLLIYGASTRATGIPAR FSGSGSGTEFTLTISSLQSEDFAGYYCQQYN NWPYTFGQGTKLEIK (SEQ ID NO: 135) |
| 14 | QVQLVESGGGVVQPGRSLRLSCVASG FIFSNYGMHWVRQAPGKGLEWVAVI SYDGRNEDHVDSVKGRFTISRDNSKN TLYLQMNSLRAEDTAVYYCAKGSGSYY FDYWGQGTLVTVSS (SEQ ID NO: 117) | DIVLTQSPDSLAVSLGERATINCKSSQTVLNS SNNKNYLAWYQQKPGQPPKLLIYWASIRES GVPDRFSGSGSGTDFTLTISSLQAEDVAVYY CQQYYNTPPWTFGQGTKVEIK (SEQ ID NO: 136) |
| 15 | QIQLVQSGPELKKPGETVKISCKGSGYT FRNFGMNWVKQAPGMGLKWMVWI DTNTGEPTYAEEFKGRFAFSLETSASTA YLQINNLKNEDTATYFCARSRGNYFA MEYWGQGTSVTVSS (SEQ ID NO: 118) | DIKMTQSPSSMYASLGERVTVTCKASQDIN RYLSWFQQKPGKSPKTLIYRANRLVDGVPSR FSGSGSGQDYSLTISSLEYEDMGFYYCLQYD EFPFTFGSGTKLEIK (SEQ ID NO: 137) |

In some embodiments, provided herein is a SIRP antibody, wherein the heavy chain variable domain of the antibody comprises the amino acid sequence of SEQ ID NO: 104 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 123, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 104, and the light chain variable domain of the antibody comprises the amino acid sequence of SEQ ID NO: 123. In some embodiments, the light chain variable domain comprises CDR sequences of SEQ ID NOS: 5, 23 and 36, and the heavy chain variable domain comprises CDR sequences of SEQ ID NOS: 54, 70 and 86.

In some embodiments, provided herein is a SIRP antibody, wherein the heavy chain variable domain of the antibody comprises the amino acid sequence of SEQ ID NO: 106 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 125, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 106, and the light chain variable domain of the antibody comprises the amino acid sequence of SEQ ID NO: 125. In some embodiments, the light chain variable domain comprises CDR sequences of SEQ ID NOS: 7, 24 and 38, and the heavy chain variable domain comprises CDR sequences of SEQ ID NOS: 54, 72 and 88.

In some embodiments, provided herein is a SIRP antibody, wherein the heavy chain variable domain of the antibody comprises the amino acid sequence of SEQ ID NO: 107 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 126, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 107, and the light chain variable domain of the antibody comprises the amino acid sequence of SEQ ID NO: 126. In some embodiments, the light chain variable domain comprises CDR sequences of SEQ ID NOS: 8, 24 and 39, and the heavy chain variable domain comprises CDR sequences of SEQ ID NOS: 56, 72 and 89.

In some embodiments, provided herein is a SIRP antibody, wherein the heavy chain variable domain of the antibody comprises the amino acid sequence of SEQ ID NO: 110 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 129, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 110, and the light chain variable domain of the antibody comprises the amino acid sequence of SEQ ID NO: 129. In some embodiments, the light chain variable domain comprises CDR sequences of SEQ ID NOS: 11, 27 and 42, and the heavy chain variable domain comprises CDR sequences of SEQ ID NOS: 59, 75 and 92.

In some embodiments, provided herein is a SIRP antibody, wherein the heavy chain variable domain of the antibody comprises the amino acid sequence of SEQ ID NO: 111 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 130, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 111, and the light chain variable domain of the antibody comprises the amino acid sequence of SEQ ID NO: 130. In some embodiments, the light chain variable domain comprises CDR sequences of SEQ ID NOS: 12, 28 and 43, and the heavy chain variable domain comprises CDR sequences of SEQ ID NOS: 560, 76 and 93.

In some embodiments, provided herein is a SIRP antibody, wherein the heavy chain variable domain of the antibody comprises the amino acid sequence of SEQ ID NO: 112 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 131, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 112, and the light chain variable domain of the antibody comprises the amino acid sequence of SEQ ID NO: 131. In some embodiments, the light chain variable domain comprises CDR sequences of SEQ ID NOS: 13, 29 and 44, and the heavy chain variable domain comprises CDR sequences of SEQ ID NOS: 61, 76 and 94.

In some embodiments, provided herein is a SIRP antibody, wherein the heavy chain variable domain of the antibody comprises the amino acid sequence of SEQ ID NO: 113 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 132, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 113, and the light chain variable domain of the antibody comprises the amino acid sequence of SEQ ID NO: 132. In some embodiments, the light chain variable domain comprises CDR sequences of SEQ ID NOS: 13, 30 and 45, and the heavy chain variable domain comprises CDR sequences of SEQ ID NOS: 62, 77 and 95.

In some embodiments, provided herein is a SIRP antibody, wherein the heavy chain variable domain of the antibody comprises the amino acid sequence of SEQ ID NO: 114 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 133, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 114, and the light chain variable domain of the antibody comprises the amino acid sequence of SEQ ID NO: 133. In some embodiments, the light chain variable domain comprises CDR sequences of SEQ ID NOS: 14, 31 and 46, and the heavy chain variable domain comprises CDR sequences of SEQ ID NOS: 63, 78 and 96.

In some embodiments, provided herein is a SIRP antibody, wherein the heavy chain variable domain of the antibody comprises the amino acid sequence of SEQ ID NO: 115 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 134, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 115, and the light chain variable domain of the antibody comprises the amino acid sequence of SEQ ID NO: 134. In some embodiments, the light chain variable domain comprises CDR sequences of SEQ ID NOS: 15, 31 and 47, and the heavy chain variable domain comprises CDR sequences of SEQ ID NOS: 62, 79 and 97.

In some embodiments, provided herein is a SIRP antibody, wherein the heavy chain variable domain of the antibody comprises the amino acid sequence of SEQ ID NO: 116 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 135, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 116, and the light chain variable domain of the antibody comprises the amino acid sequence of SEQ ID NO: 135. In some embodiments, the light chain variable domain comprises CDR sequences of SEQ ID NOS: 16, 31 and 47, and the heavy chain variable domain comprises CDR sequences of SEQ ID NOS: 62, 79 and 97.

In some embodiments, provided herein is a SIRP antibody, wherein the heavy chain variable domain of the antibody comprises the amino acid sequence of SEQ ID NO: 117 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 136, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 117, and the light chain variable domain of the antibody comprises the amino acid sequence of SEQ ID NO: 136. In some embodiments, the light chain variable domain comprises CDR sequences of SEQ ID NOS: 17, 32 and 48, and the heavy chain variable domain comprises CDR sequences of SEQ ID NOS: 64, 80 and 98.

In some embodiments, provided herein is a SIRP antibody, wherein the heavy chain variable domain of the antibody comprises the amino acid sequence of SEQ ID NO: 118 or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody comprises the amino acid sequence of SEQ ID NO: 137, or an amino acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody comprises the amino acid sequence of SEQ ID NO: 118, and the light chain variable domain of the antibody comprises the amino acid sequence of SEQ ID NO: 137. In some embodiments, the light chain variable domain comprises CDR sequences of SEQ ID NOS: 18, 33 and 49, and the heavy chain variable domain comprises CDR sequences of SEQ ID NOS: 65, 81 and 99.

Table 11 provides full-length exemplary SIRP antibodies of the disclosure.

TABLE 11

Exemplary Combinations of Amino Acid with Fc Regions of SIRP Antibodies

| Antibody No. | VH/VL Pair Amino Acid | Fc |
| --- | --- | --- |
| Antibody 1 | SEQ ID NO: 104/SEQ ID NO: 123 | Rat IgG2b Fc |
| Antibody 3 | SEQ ID NO: 106/SEQ ID NO: 125 | Rat IgG2b Fc |
| Antibody 4 | SEQ ID NO: 107/SEQ ID NO: 126 | Rat IgG2b Fc |
| Antibody 7 | SEQ ID NO: 110/SEQ ID NO: 129 | Rat IgG2b Fc |
| Antibody 8 | SEQ ID NO: 111/SEQ ID NO: 130 | Rat IgG2b Fc |
| Antibody 9 | SEQ ID NO: 112/SEQ ID NO: 131 | Rat IgG2b Fc |
| Antibody 10 | SEQ ID NO: 113/SEQ ID NO: 132 | Rat IgG2b Fc |
| Antibody 11 | SEQ ID NO: 114/SEQ ID NO: 133 | Rat IgG2b Fc |
| Antibody 12 | SEQ ID NO: 115/SEQ ID NO: 134 | Rat IgG2b Fc |
| Antibody 13 | SEQ ID NO: 116/SEQ ID NO: 135 | Rat IgG2b Fc |
| Antibody 14 | SEQ ID NO: 117/SEQ ID NO: 136 | Rat IgG2b Fc |
| Antibody 15 | SEQ ID NO: 118/SEQ ID NO: 137 | Mouse IgG2a Fc |
| Antibody 21 | SEQ ID NO: 110/SEQ ID NO: 129 | Human IgG1 Fc |
| Antibody 23 | SEQ ID NO: 104/SEQ ID NO: 123 | Human IgG1 Fc |
| Antibody 24 | SEQ ID NO: 106/SEQ ID NO: 125 | Human IgG1 Fc |
| Antibody 25 | SEQ ID NO: 116/SEQ ID NO: 135 | Human IgG1 Fc |
| Antibody 26 | SEQ ID NO: 110/SEQ ID NO: 129 | Human IgG1 Fc with increased affinity for FcγR |
| Antibody 28 | SEQ ID NO: 104/SEQ ID NO: 123 | Human IgG1 Fc with increased affinity for FcγR |
| Antibody 29 | SEQ ID NO: 116/SEQ ID NO: 135 | Human IgG1 Fc with increased affinity for FcγR |
| Antibody 30 | SEQ ID NO: 104/SEQ ID NO: 123 | Human IgG1 Fc with increased affinity for FcγR + extended half life |
| Antibody 31 | SEQ ID NO: 116/SEQ ID NO: 135 | Human IgG1 Fc with increased affinity for FcγR + extended half life |
| Antibody 32 | SEQ ID NO: 106/SEQ ID NO: 125 | Human IgG1 Fc with increased affinity for FcγR |

B. Generation of SIRP Antibodies

Production of the antibodies provided herein may be by use of any method known to those of ordinary skill in the art. In some embodiments, the antibodies are produced by hybridomas. In some embodiments, the antibodies are encoded by a nucleic acid and are expressed, purified, and isolated.

The terms polynucleotide and nucleic acid are used interchangeably herein, and refer to a polymeric form of nucleotides of any length, which may be ribonucleotides or deoxyribonucleotides. The terms include, but are not limited to, single-, double-, or multi-stranded DNA or RNA, genomic DNA, cDNA, DNA-RNA hybrids, or a polymer comprising purine and pyrimidine bases or other natural, chemically or biochemically modified, non-natural, or derivative nucleotide bases. The terms encompass nucleic acids containing known analogues of natural nucleotides and having similar binding properties, and are metabolized in a manner similar to naturally-occurring nucleotides, unless specifically limited or stated otherwise.

Accordingly, provided herein are nucleic acids encoding any of the antibodies disclosed herein, vectors comprising any of the nucleic acids encoding such antibodies, and host cells comprising any such vectors. Also provided herein are exemplary nucleic acid sequences encoding for the variable heavy chains and variable light chains of the SIRP antibodies disclosed herein.

Table 12 provides exemplary nucleic acid sequences for the SIRP antibodies of the disclosure. Accordingly, in some embodiments a nucleic acid sequence encoding for a SIRP antibody of the disclosure comprises a variable heavy chain nucleic acid sequence selected from SEQ ID NOS: 142, 144-145, and 148-156, or at least 80% sequence identity thereto. In some embodiments a nucleic acid sequence encoding for a SIRP antibody of the disclosure comprises a variable light chain nucleic acid sequence selected from SEQ ID NOS: 161, 163-164, and 167-175, or at least 80% sequence identity thereto. In some embodiments a nucleic acid sequence encoding for a SIRP antibody of the disclosure comprises a variable heavy chain nucleic acid sequence selected from SEQ ID NOS: 142, 144-145, and 148-156, or at least 80% sequence identity thereto, and a variable light chain nucleic acid sequence selected from SEQ ID NOS: 161, 163-164, 167-175, or at least 80% sequence identity thereto. The person of ordinary skill in the art will appreciate that, because of redundancy in the triplet code, multiple nucleic acids may encode the same amino acid sequence. Thus, nucleic acid sequences that are not identical to those set forth in Table 12 may still encode the amino acid sequences set forth in Table 10.

TABLE 12

Variable Heavy Chain and Variable Light Chain Nucleic Acid Sequences of Exemplary SIRP Antibodies

| Antibody No. | Variable Heavy Chain Nucleic Acid Sequence | Variable Light Chain Nucleic Acid Sequence |
| --- | --- | --- |
| 1 | CAGGTGCAGCTGCAGGAGTCGGGCCC AGGACTGGTGAAGCCTTCGGGGACCCT GTCCCTCACCTGCGCTGTCTCTGGTGG CTCCATCAGCAGTAGTAACTGGTGGAG TTGGGTCCGCCAGCCCCCAGGGAAGG GGCTGGAATGGATTGGGGAAATCTATC ATAGTGGGAGCACCAACTACAACCCGT CCCTCAAGAGTCGAGTCACCATATCAG TAGACAAGTCCAAGAACCAGTTCTCCC TGAAGCTGAGTTCTGTGACCGCCGCGG ACACGGCCGTGTATTACTGTGCGAGAA GGGGGATATGGTTCGGGGTCGGTCCC TGGGGCCAGGGAACCCTGGTCACCGTC TCCTCA (SEQ ID NO: 142) | GATATTGTGATGACTCAGTCTCCACTC TCCCTGCCCGTCACCCCTGGAGAGCC GGCCTCCATCTCCTGCAGGTCTAGTCA GAGCCTCCTACATGGTAATGGATTCA ACTATTTGGATTGGTACCTGCAGAAG CCAGGGCAGTCTCCACAGCTCCTGAT CTATTTGGGTTCTAATCGGGCCTCCGG GGTCCCTGACAGGTTCACTGGCAGTG GATCAGGCACAGATTTTACACTGAAA ATCAGCAGAGTGGAGGCTGAGGATG TTGGGGTTTATTACTGCATGCAAGGTC TACAAACTCCTCGGACGTTCGGCCAA GGGACCAAGGTGGAAATCAAA (SEQ ID NO: 161) |
| 3 | CAGGTGCAGCTGCAGGAGTCGGGCCC AGGACTGGTGAAGCCTTCGGGGACCCT GTCTCTCACCTGCGCTGTCTCTGGTGGC TCCATCAGCAGTAGTAACTGGTGGAGT TGGGTCCGCCAGCCCCCAGGGAAGGG GCTGGAGTGGATTGGGGAAATCTATCA TAGTGGGAACACCAACTACAACCCGTC CCTCAAGAGTCGAGTCACCATATCAGT AGACAAGTCCAAGAACCAGTTCTCCCT GAAGCTGAGCTCTGTGACCGCCGCGG ACACGGCCGTGTATTACTGTGCGAGAG AGGGTATAGAGGGGTACTACTTCTACT ACGGTATGGACGTCTGGGGCCAAGGG ACCACGGTCACCGTCTCCTCA (SEQ ID NO: 144) | GACATCCAGTTGACCCAGTCTCCATCC TTCCTGTCTGCATCTGTAGGAGACAG AGTCACCATCACTTGCCGGGCCAGTC AGGGCATTAGCGGTTATTTAGACTGG TATCAGCAAAAACCAGGGAAAGCCCC TAAGCTCCTGATCTATGCTGCATCCAC TTTACAAAGAGGGGTCCCATCAAGGT TCAGCGGCAGTGGATCTGGGACAGAT TTCAATCTCACAATCAGCAGCCTGCAG CCTGAAGATTTTGCAACTTATTACTGT CAACAGTTTACTAGTGACCTCATCACC TTCGGCCAAGGGACACGACTGGAGAT TAAA (SEQ ID NO: 163) |
| 4 | CAGGTGCAGCTGCAGGAGTCGGGCCC AGGACTGCTGAAGCCTTCGGAGACCCT GTCCCTCACCTGCGCTGTCTCTGATTAC TCCATCAGCAGTGGTTACTACTGGGC TGGATCCGGCAGCCCCCGGGGAAGGG GCTGGAGTGGATTGGGAGTATCTATCA TAGTGGGAATACCTATTATAACCCGTC CCTCAAGAGTCGAGTCACCATATTAGT AGACACGTCCAAGAACCAGTTCTCCCT | GACATCCAGATGACCCAGTCTCCATCC TCCCTGTCTGCATCTGTAGGAGACAG AGTCACCATCACTTGCCAGGCGAGTC AGGACTTTAGCAACTATTTAAATTGGT ATCAGCAGAAACCAGGGAAAGCCCCT AAGCTCCTGATCTACGCTGCATCCAAT TTGGAAACAGGGGTCCCATCGAGGTT CAGTGGAAGTGGATCTGGGACAGATT TTACTTTCACCATCAGCAGCCTGCAGC |

TABLE 12-continued

Variable Heavy Chain and Variable Light Chain Nucleic Acid Sequences of Exemplary SIRP Antibodies

| Antibody No. | Variable Heavy Chain Nucleic Acid Sequence | Variable Light Chain Nucleic Acid Sequence |
| --- | --- | --- |
| | GAAGCTGAGCTCTGTGACCGCCGCAGA CACGGCCGTGTATTACTGTGCGAGAGA TAAATGTAGTACTACAACCTGCTCCTTT GACTACTGGGGCCAGGGAACCCTGGT CACCGTCTCCTCA (SEQ ID NO: 145) | CTGAAGATATTGCAGTATATTACTGTC AACAGTATGATAATCTCCCGTACACTT TTGGCCAGGGGACCAAGCTGGAGATC AAA (SEQ ID NO: 164) |
| 7 | CAGGTGCAGCTGGTGGAGTCTGGGGG AGGCGTGGTCCAGCCTGGGAGGTCCCT GAGACTCTCCTGTGCAGCCTCTGGATT CACCTTCAGTAAATTTGGCATGCACTG GGTCCGCCAGGCTCCAGGCAAGGGGC TGGAGTGGGTGGCAGTTATATCATATG ATGGAAATAATAAATACTATACAGACT CCGTGAAGGGCCGATTCACCATCTCCA GAGACAATTCCAGGAACACGCTGTATC TGCAAATGGACAGCGTGAAACCTGAG GACACGGCTGTGTACTATTCCTGGGCA GCAGCTGGTGCTTTTTATATCTGGGGC CAAGGGACAATGGTCACCGTCTCTTCA (SEQ ID NO: 148) | TCCTATGTGCTGACTCAGCCACCCTCG GTGTCAGTGGCCCCAGGACAGACGGC CAGGATTACCTGTGGGGGATACAACA TTGGAAGTAAAAGTGTGCACTGGTAC CAGCAGAAGGCAGGCCAGGCCCCTGT GCTGGTCGTCTATGATGATAGCGGCC GGCCCTCAGGGATCCCTGAGCGATTG TCTGGCTCCAAGTCTGGGAACACGGC CACCCTGACCATCAGCAGGGTCGAAG CCGGGGATGAGGCCGACTATTACTGT CAGGTGTGGGATAGTAGTAGTGATCA TTATGTCTTCGGAACTGGGACCAAGG TCACCGTCCTA (SEQ ID NO: 167) |
| 8 | CAGGTGCAGCTACAGCAGTGGGGCGC AGGACTGTTGAAGCCTTCGGAGACCCT GTCCCTCACCTGCGCTGTCTATGGTGG GTCCTTCAGTGGTTACTACTGGAGCTG GATTCGCCAGCCCCCAGGGAAGGGGC TGGAGTGGATTGGGGAAATCAATCATA GTGGAAGCACCAACTTCAACCCGTCCC TCAAGAGTCGAGTCACCATATCAGTAG ACACGTCCAAGAACCAGTTCTCCCTGA AGCTGAGGTCTGTGACCGCCGCGGAC ACGGCTGTGTATTACTGTTCGAGAGTC GATAGTGGGAGCTATCCCTACTACGAC GGTTTGGACGTCTGGGGCCAAGGGAC CACGGTCACCGTCTCCTCA (SEQ ID NO: 149) | TCCTCTGAATTGACTCAGCCACCCTCA GTGTCCGTGTCCCCAGGACAGACAGC CAGCATCACCTGCTCTGGAGATAAATT GGGGGATAAATATGTTTACTGGTATC AACAGAAGCCAGGCCAGTCCCCTGTG TTGGTCATCTATGATGATCGGCG GCCCGCTGGGATCCCTGAGCGATTCG CTGGCTCCGCTTCTGGGAACACAGCC ACTCTGACCATCAGCGGGACCCAGGC TATGGATGAGGCTGACTATTACTGTC AGACGTGGGACAGCAGCACTGTGGTT TTCGGCGGAGGGACCAAGCTGACCGT CCTA (SEQ ID NO: 168) |
| 9 | CAGGTGCAGCTACAGCAGTGGGGCGC AGGACTGTTGAAGCCTTCGGAGACCCT GTCCCTCACCTGCGCTGTCTATGGTGG GTCCTTCAGTACTTACTACTGGAACTGG ATCCGCCAGCCCCCAGGGAAGGGGCT GGAGTGGATTGGGGAAATCAATCATA GTGGAAGCACCAACTACAACCCGTCCC TCAAGAGTCGAGTCATCATATCAGTAG ACACGTCCAAGAACCAGTTCTCCCTGA AGCTGAGCTCTGTGACCGCCGCGGACA CGGCTGTGTATTACTGTGCGAGCAGTC ATTATGGTTCGGGGAGTTTTCCCGACT CCTACGGTATGGACGTCTGGGGCCAAG GGACCACGGTCACCGTCTCCGCA (SEQ ID NO: 150) | TCCTATGAATTGACTCAGTCACCCTCA GTGTCCGTGTCCCCAGGACAGACAGC CAGCATCACCTGCTCTGGAGATAAATT GGGGGATAGATATGCTTGGTGGTATC AGCAGAAGCCAGGCCAGTCCCCTGTG CTGGTCATCTATCAAGATGACAAGCG GCCCTCAGGGATCCCTGAGCGATTCT CTGGCTCCAACTCTGGGAACACAGCC ACTCTGACCATCAGCGGGACCCAGGC TATGGATGAGGCTGACTATTACTGTC AGGCGTGGGACAGCAGCACTGCGGT ATTCGGCGGAGGGACCAAGCTGACC GTCCTA (SEQ ID NO: 169) |
| 10 | GAGGTGCAGCTGTTGGAGTCTGGGGG AGGCTTGGTACAGCCTGGGGGGTCCCT GAGACTCTCCTGTGCAGCCTCTGGATT CACGTTTAGCAGCTATGCCATGAGCTG GGTCCGCCAGGCTCCAGGGAAGGGGC TGGAGTGGGTCTCAGCTATTAGTGGTA GTGGTGGTGACACTTACTACGCAGACT CCGTGAAGGGCCGGTTCACCATCTCCA GAGACAATTCCAAGAGCACGCTGTATC TGCAAATGAACAGCCTGAGAGCCGAG GACACGGCCGTATATTACTGTGCGAAA GACGGTGGGAGCTACTACCCCCCCTTT GACTACTGGGGCCAGGGAACCCTGGT CACCGTCTCCTCA (SEQ ID NO: 151) | TCCTATGAGCTGACTCAGCCACCCTCA GTGTCCGTGTCCCCAGGACAGACAGC CAGCATCACCTGCTCTGGAGATAAATT GGGGGATAGATATGCTTGCTGGTATC AGCAGAAGCCAGGCCAGTCCCCTGTA CTGGTCATCTATCAAGATACCAAGCG GCCCTCAGGGATCCCTGAGCGATTCT CTGGCTCCAACTCTGGGAACACACC ACTCTGACCATCAGCGGGACCCAGGC TATGGATGAGGCTGACTATTACTGTC AGGCGTGCACAGCAGCACTGCGGT GTTCGGCGGAGGGACCAAGCTGACC GTCCTA (SEQ ID NO: 170) |
| 11 | GAGGTGCAGCTGGTGGAGTCCGGGGG AGGCTTAGTTCAGCCTGGGGGGTCCCT GAGACTCTCTTGTGCAGCCTCTGGATT CACCTTCAGTAGCTACTGGATGCACTG GGTCCGCCAAGCTCCAGGGAAGGGGC TGGTGTGGGTCTCACGTATTCATAATG | GACATCCAGATGACCCAGTCTCCGTCT TCCGTGTCTGCATCTGTAGGAGACAG AGTCACCATCACTTGTCGGGCGAGTC AGGATATTAGCAGCTGGTTAGCCTGG TTTCAGCAGAAACCAGGGAAAGCCCC TAAGCTCCTGATCTATGGTGCATCCAG |

TABLE 12-continued

Variable Heavy Chain and Variable Light Chain Nucleic Acid Sequences of Exemplary SIRP Antibodies

| Antibody No. | Variable Heavy Chain Nucleic Acid Sequence | Variable Light Chain Nucleic Acid Sequence |
|---|---|---|
|  | ATGGGAGTAGAACAAGTTACGCGGAC TCCGTGAAGGGCCGATTCACTATCTCC AGAGACAACGCCAAGAACACGCTGTAT CTGCAAATGAGCAGTCTGCGAGCCGA GGACACGGCTGTGTATTACTGTACAAG AGATCCCCCTCCTTACGATATTTTGACT GGTTACCCCTTTGACTACTGGGGCCAG GGAACCCTGGTCACCGTCTCCTCA (SEQ ID NO: 152) | TTTGCAAAGTGGGGTCCCATCAAGGT TCAGCGGCAGTGGATCTGGGACAGAT TTCACTCTCACCATCAGCAGCCTGCAG CCTGAAGATTTTGCAACTTACTATTGT CAAGAGGCTAACAGTTTCCCGTATACT TTTGGCCAGGGGACCAAGCTGGAGAT CAAA (SEQ ID NO: 171) |
| 12 | GAGGTGCAGGTGTTGGAGTCTGGGGG AGGCTTGGTACAGCCTGGGGGGTCCCT GAGACTCTCCTGTGCAGCCTCTGGATT CACCTTTAGCAGCTATGCCATGAGCTG GGTCCGCCAGGCTCCAGGGAAGGGGC TGGAGTGGGTCTCAGCTATTAGTGGTA GTGGTAGTAGCACACACTACGCAGACT CCGTGAAGGGCCGGTTCACCATCTCCA GAGACAATTCCAAGAACACGCTGTATC TGCAAATGAACAGCCTGAGAGCCGAG GACACGGCCGTATATTACTGTGCGGCG TATAGTGGGAGCTACTACTACTATGGA ATGGACGTCTGGGGACAAGGGACCAC GGTCACCGTCTCCTCA (SEQ ID NO: 153) | GAAATAGTGATGACGCAGTCTCCAGC CACCCTGTCTGTGTCTCCAGGGGAAA GAGCCACCCTCTCCTGCAGGGCCAGT CAGAGTGTTAGCAGCAACTTAGCCTG GTACCAGCAGAAATCTGGCCAGGCTC CCAGGCTCCTCATCTATGGTGCATCCA CCAGGGCCACTGGTATCCCAGCCAGG TTCAGTGGCAGTGGGTCTGGGACAGA GTTCACTCTCACCATCAGCAGCCTGCA GTCTGAAGATTTTGCAGGTTATTACTG CCAGCAGTATAATAACTGGCCGTACA CTTTTGGCCAGGGGACCAAGCTGGAG ATCAAA (SEQ ID NO: 172) |
| 13 | GAGGTGCAGATGTTGGAGTCTGGGGG AGGCTTGGTTCAGCCTGGGGGGTCCCT GAGACTCTCCTGTGCAGCCTCTGGATT CACCTTTAGCAGCTATGCCATGAGCTG GGTCCGCCAGGCTCCAGGGAAGGGGC TGGAGTGGGTCTCAGCTATTAGTGGTA GTGGTAGTAGCACACACTACGCAGACT CCGTGAAGGGCCGGTTCACCATCTCCA GAGACAATTCCAAGAACACGCTGTATC TGCAAATGAACAGCCTGAGAGCCGAG GACACGGCCGTTTATTACTGTGCGGCG TATAGTGGGAGCTACTACTACTATGGA ATGGACGTCTGGGGACAGGGGACCAC GGTCACCGTCTCCTCA (SEQ ID NO: 154) | GAAATAGTGATGACGCAGTCTCCAGC CACCCTGTCTGTGTCTCCAGGGGAAA GAGCCACCCTCTCCTGCAGGGCCAGT CAGAGTGTTAGTAGGAATTTAGCCTG GTACCAGCAGAAATCTGGCCAGGCTC CCAGGCTCCTCATCTATGGTGCATCCA CCAGGGCCACTGGTATCCCAGCCAGG TTCAGTGGCAGTGGGTCTGGGACAGA GTTCACTCTCACCATCAGCAGCCTGCA GTCTGAAGATTTTGCAGGTTATTACTG CCAGCAGTATAATAACTGGCCGTACA CTTTTGGCCAGGGGACCAAGCTGGAG ATCAAA (SEQ ID NO: 173) |
| 14 | CAGGTGCAGCTGGTGGAGTCTGGGGG AGGCGTGGTCCAGCCTGGGAGGTCCCT GAGACTCTCCTGTGTAGCCTCTGGATT CATCTTCAGTAACTATGGCATGCACTG GGTCCGCCAGGCTCCAGGCAAGGGGC TGGAGTGGGTGGCAGTTATATCATATG ATGGAAGAAATGAAGACCATGTAGAC TCCGTGAAGGGCCGATTCACCATCTCC AGAGACAATTCCAAGAACACGCTGTAT CTGCAAATGAACAGCCTGAGAGCTGA GGACACGGCTGTGTATTACTGTGCGAA AGGGTCGGGGAGCTACTACTTTGACTA CTGGGGCCAGGGAACCCTGGTCACCGT CTCCTCA (SEQ ID NO: 155) | GACATCGTGCTGACCCAGTCTCCAGA CTCCCTGGCTGTGTCTCTGGGCGAGA GGGCCACCATCAACTGCAAGTCCAGC CAGACTGTTTTAAACAGCTCCAACAAT AAGAACTACTAGCTTGGTACCAGCA GAAACCAGGACAGCCTCCTAAGCTGC TCATTTACTGGGCATCTATCCGGGAAT CCGGGGTCCCTGACCGATTCAGTGGC AGCGGGTCTGGGACAGATTTCACTCT CACCATCAGCAGCCTGCAGGCTGAAG ATGTGGCAGTTTATTACTGTCAGCAAT ATTATAATACTCCTCCGTGGACGTTCG GCCAAGGGACCAAGGTGGAAATCAA A (SEQ ID NO: 174) |
| 15 | CAGATCCAGTTGGTGCAGTCTGGACCT GAGCTGAAGAAGCCTGGAGAGACAGT CAAGATCTCCTGCAAGGGTTCTGGGTA TACCTTCAGAAACTTTGGAATGAATTG GGTGAAGCAGGCTCCAGGAATGGGTT TAAAGTGGATGGTGTGGATAGACACC AACACTGGAGAGCCAACATATGCTGAA GAGTTCAAGGGACGGTTTGCCTTCTCT TTGGAAACCTCTGCCAGCACTGCCTATT TGCAGATCAACAACCTCAAAAATGAGG ACACGGCTACATATTTCTGTGCAAGAT CGAGAGGTAACTACTTTGCTATGGAGT ATTGGGGGCAAGGAACCTCAGTCACC GTCTCCTCA (SEQ ID NO: 156) | GACATCAAGATGACCCAGTCTCCATCT TCCATGTATGCATCTCTAGGAGAGAG AGTCACTGTCACTTGCAAGGCGAGTC AGGACATTAATCGCTATTTAAGCTGGT TCCAGCAGAAACCAGGGAAATCTCCT AAGACCCTGATCTATCGTGCAAACAG ATTGGTAGATGGGGTCCCATCAAGGT TCAGTGGCAGTGGATCTGGGCAAGAT TATTCTCTCACCATCAGCAGCCTGGAG TATGAAGATATGGGATTTTATTATTGT CTACAGTATGATGAGTTTCCATTCACG TTCGGCTCGGGGACAAAGTTGGAAAT AAAA (SEQ ID NO: 175) |

In some embodiments, provided herein is a nucleic acid encoding any of the SIRP antibodies disclosed herein. In some embodiments, provided herein is a nucleic acid comprising any one or more of the nucleic acid sequences of Table 12. In some embodiments, the heavy and light chain variable domains of the SIRP antibodies disclosed herein are encoded by a nucleic acid comprising any one or more of the nucleic acid sequences of Table 12.

In some embodiments, the heavy chain variable domain of the SIRP antibodies of the disclosure are encoded by a nucleic acid by the nucleic acid sequence of SEQ ID NO: 142, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or the light chain variable domain of the antibody is encoded by the nucleic acid sequence of SEQ ID NO: 161, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 142, or a nucleic acid sequence with at least 97%, sequence identity thereto; and/or wherein the light chain variable domain of the antibody is encoded by the nucleic acid sequence of SEQ ID NO: 161, or a nucleic acid sequence with at least 97% sequence identity thereto. In some embodiments, the heavy chain variable domain of the antibody is encoded by the nucleic acid sequence of SEQ ID NO: 142, and the light chain variable domain of the antibody is encoded by the nucleic acid sequence of SEQ ID NO: 161.

In some embodiments, the heavy chain variable domain of the SIRP antibodies of the disclosure is encoded by the nucleic acid sequence of SEQ ID NO: 144, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or the light chain variable domain of the antibody is encoded by the nucleic acid sequence of SEQ ID NO: 163, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 144, or a nucleic acid sequence with at least 97%, sequence identity thereto; and/or wherein the light chain variable domain of the antibody is encoded by the nucleic acid sequence of SEQ ID NO: 163, or a nucleic acid sequence with at least 97% sequence identity thereto. In some embodiments, the heavy chain variable domain of the antibody is encoded by the nucleic acid sequence of SEQ ID NO: 144, and the light chain variable domain of the antibody is encoded by the nucleic acid sequence of SEQ ID NO: 163.

In some embodiments, the heavy chain variable domain of the SIRP antibodies of the disclosure is encoded by the nucleic acid sequence of SEQ ID NO: 145, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or the light chain variable domain of the antibody is encoded by the nucleic acid sequence of SEQ ID NO: 164, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 145, or a nucleic acid sequence with at least 97%, sequence identity thereto; and/or wherein the light chain variable domain of the antibody is encoded by the nucleic acid sequence of SEQ ID NO: 164, or a nucleic acid sequence with at least 97% sequence identity thereto. In some embodiments, the heavy chain variable domain of the antibody is encoded by the nucleic acid sequence of SEQ ID NO: 145, and the light chain variable domain of the antibody is encoded by the nucleic acid sequence of SEQ ID NO: 164.

In some embodiments, the heavy chain variable domain of the SIRP antibodies of the disclosure is encoded by the nucleic acid sequence of SEQ ID NO: 148, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 167, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 148, or a nucleic acid sequence with at least 97%, sequence identity thereto; and/or wherein the light chain variable domain of the antibody is encoded by the nucleic acid sequence of SEQ ID NO: 167, or a nucleic acid sequence with at least 97% sequence identity thereto. In some embodiments, the heavy chain variable domain of the antibody is encoded by the nucleic acid sequence of SEQ ID NO: 148, and the light chain variable domain of the antibody is encoded by the nucleic acid sequence of SEQ ID NO: 167.

In some embodiments, the heavy chain variable domain of the SIRP antibodies of the disclosure is encoded by the nucleic acid sequence of SEQ ID NO: 149, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 168, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 149, or a nucleic acid sequence with at least 97%, sequence identity thereto; and/or wherein the light chain variable domain of the antibody is encoded by the nucleic acid sequence of SEQ ID NO: 168, or a nucleic acid sequence with at least 97% sequence identity thereto. In some embodiments, the heavy chain variable domain of the antibody is encoded by the nucleic acid sequence of SEQ ID NO: 149, and the light chain variable domain of the antibody is encoded by the nucleic acid sequence of SEQ ID NO: 168.

In some embodiments, the heavy chain variable domain of the SIRP antibodies of the disclosure is encoded by the nucleic acid sequence of SEQ ID NO: 150, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 169, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 150, or a nucleic acid sequence with at least 97%, sequence identity thereto; and/or wherein the light chain variable domain of the antibody is encoded by the nucleic acid sequence of SEQ ID NO: 169, or a nucleic acid sequence with at least 97% sequence identity thereto. In some embodiments, the heavy chain variable domain of the antibody is encoded by the nucleic acid sequence of SEQ ID NO: 150, and the light chain variable domain of the antibody is encoded by the nucleic acid sequence of SEQ ID NO: 169.

In some embodiments, the heavy chain variable domain of the SIRP antibodies of the disclosure is encoded by the nucleic acid sequence of SEQ ID NO: 151, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 170, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 151, or a nucleic acid sequence with at least 97%, sequence identity thereto; and/or wherein the light chain variable domain of the antibody is encoded by the nucleic acid sequence of SEQ ID NO: 170 or a nucleic acid sequence with at least 97% sequence identity thereto. In some embodiments, the heavy chain variable domain of the antibody is encoded by the nucleic acid sequence of SEQ ID NO: 151, and the light chain variable domain of the antibody is encoded by the nucleic acid sequence of SEQ ID NO: 170.

In some embodiments, the heavy chain variable domain of the SIRP antibodies of the disclosure is encoded by the nucleic acid sequence of SEQ ID NO: 152, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 171, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 152, or a nucleic acid sequence with at least 97%, sequence identity thereto; and/or wherein the light chain variable domain of the antibody is encoded by the nucleic acid sequence of SEQ ID NO: 171, or a nucleic acid sequence with at least 97% sequence identity thereto. In some embodiments, the heavy chain variable domain of the antibody is encoded by the nucleic acid sequence of SEQ ID NO: 152, and the light chain variable domain of the antibody is encoded by the nucleic acid sequence of SEQ ID NO: 171.

In some embodiments, the heavy chain variable domain of the SIRP antibodies of the disclosure is encoded by the nucleic acid sequence of SEQ ID NO: 153, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 172, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 153, or a nucleic acid sequence with at least 97%, sequence identity thereto; and/or wherein the light chain variable domain of the antibody is encoded by the nucleic acid sequence of SEQ ID NO: 172, or a nucleic acid sequence with at least 97% sequence identity thereto. In some embodiments, the heavy chain variable domain of the antibody is encoded by the nucleic acid sequence of SEQ ID NO: 153, and the light chain variable domain of the antibody is encoded by the nucleic acid sequence of SEQ ID NO: 172.

In some embodiments, the heavy chain variable domain of the SIRP antibodies of the disclosure is encoded by the nucleic acid sequence of SEQ ID NO: 154, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 173, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 154, or a nucleic acid sequence with at least 97%, sequence identity thereto; and/or wherein the light chain variable domain of the antibody is encoded by the nucleic acid sequence of SEQ ID NO: 173, or a nucleic acid sequence with at least 97% sequence identity thereto. In some embodiments, the heavy chain variable domain of the antibody is encoded by the nucleic acid sequence of SEQ ID NO: 154, and the light chain variable domain of the antibody is encoded by the nucleic acid sequence of SEQ ID NO: 173.

In some embodiments, the heavy chain variable domain of the SIRP antibodies of the disclosure is encoded by the nucleic acid sequence of SEQ ID NO: 155, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 174, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 155, or a nucleic acid sequence with at least 97%, sequence identity thereto; and/or wherein the light chain variable domain of the antibody is encoded by the nucleic acid sequence of SEQ ID NO: 174, or a nucleic acid sequence with at least 97% sequence identity thereto. In some embodiments, the heavy chain variable domain of the antibody is encoded by the nucleic acid sequence of SEQ ID NO: 155, and the light chain variable domain of the antibody is encoded by the nucleic acid sequence of SEQ ID NO: 174.

In some embodiments, the heavy chain variable domain of the SIRP antibodies of the disclosure=is encoded by the nucleic acid sequence of SEQ ID NO: 156, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto; and/or wherein the light chain variable domain of the antibody is encoded by the nucleic acid sequence of SEQ ID NO: 175, or a nucleic acid sequence with at least 80%, 81%, 82%, 83%, 84%, 85%, 86%, 87%, 88%, 89%, 90%, 91%, 92%, 93%, 94%, 95%, 96%, 97%, 98%, or 99% sequence identity thereto. In some embodiments, the heavy chain variable domain of the antibody is encoded by the nucleic acid sequence of SEQ ID NO: 156, or a nucleic acid sequence with at least 97%, sequence identity thereto; and/or wherein the light chain variable domain of the antibody is encoded by the nucleic acid sequence of SEQ ID NO: 175, or a nucleic acid sequence with at least 97% sequence identity thereto. In some embodiments, the heavy chain variable domain of the antibody is encoded by the nucleic acid sequence of SEQ ID NO: 156, and the light chain variable domain of the antibody is encoded by the nucleic acid sequence of SEQ ID NO: 175.

The disclosure also provides vectors comprising any nucleic acid of the disclosure. In some embodiments, the nucleic acid of the vector comprises any one or more of the nucleic acid sequences selected from Table 12. In some embodiments, the vector is an expression vector or an expression construct. In some embodiments, the vector is a mammalian vector. In some embodiments, the vector is a viral vector.

In some embodiments, the SIRP antibodies provided herein are produced by culturing a cell under suitable conditions for leading to the expression of the SIRP antibody, wherein the cell comprises a vector.

II. Uses of SIRP Antibodies

A. SIRP Antibody-Mediated Cell Depletion

Provided herein are methods of inducing cell depletion, the method comprising contacting the cell with any of the Fc containing SIRP antibodies of the disclosure. The method may be carried out in vitro or in vivo. In some embodiments, the cell depletion involves ADCC. In some embodiments, the cell depletion involves ADCP. In some embodiments, the cell depletion involves both ADCC and ADCP.

In some embodiments, the cells are SIRPγ-expressing cells. In some embodiments, the cells comprise a first population of SIRPγ-expressing cells, and a second population of SIRPα- and/or SIRPβ1-expressing cells. In some embodiments, the cells comprise a first population of SIRPγ-expressing cells, second population of SIRPα-expressing cells, and a third population of SIRPβ1-expressing cells.

In some embodiments, the SIRPγ-expressing cells comprise lymphocytes. In some embodiments, the lymphocytes comprise B cells, T cells or natural killer (NK) cells. In some embodiments, the SIRPγ-expressing cell is a T cell. In some embodiments, the T cell is a cytotoxic T cell, helper T cell, a memory T cell, a regulatory T cell, a natural killer T cell, a mucosal associated invariant T cell or a gamma delta T cell. In some embodiments, the SIRPγ-expressing cell is an NK cell. In some embodiments, the SIRPγ-expressing cell is an activated T cell or an activated NK cell. In some embodiments, the SIRPγ-expressing cell is a fibroblast. In some embodiments, the SIRPγ-expressing cell is not a myeloid cell. Markers for identifying T cells, NK cells, and B cells, as well as specific populations of T cells, will be known to persons of ordinary skill in the art. For example, cytotoxic T cells express CD8, helper T cells express CD4, regulatory T cells express CD4 as well as additional markers such as CTLA-4, CCR4 or CXCR4, and memory T cells express CD8, as well as CD95. B cells express IgM and CD19, and activated B cells express CD19, CD25 and CD30. NK cells can be identified based on high CD56 expression.

In some embodiments, the SIRPα-expressing cell is a myeloid cell. Myeloid, or myelogenous, cells are blood cells that arise from progenitor cells for granulocytes, or monocytes. In some embodiments, the SIRPα-expressing cell is a monocyte, macrophage, dendritic cell, mast cell, eosinophil, basophil, or neutrophil. In some embodiments, the SIRPα-expressing cell is a myeloid progenitor cell.

In some embodiments, the SIRPβ1-expressing cells are myeloid cells. In some embodiments, the SIRPβ1-expressing cells are granulocytes, for example eosinophils or neutrophils. In some embodiments, the SIRPβ1-expressing cells are monocytes. In some embodiments, the monocytes are classical, intermediate, non-classical, or a combination thereof. In some embodiments, the SIRPβ1-expressing cells are macrophages. In some embodiments, the SIRPβ1-expressing cells are Kupffer cells or Hofbauer cells. In some embodiments, the SIRPβ1-expressing cells are dendritic cells. In some embodiments, the SIRPβ1-expressing cells are alveolar cells.

In some embodiments, the depleted cells comprise lymphocytes. In some embodiments, for example those embodiments where the antibody is specific to SIRPγ and SIRPα and/or SIRPβ1, the depleted cells comprise lymphocytes and at least one other cell type. In some embodiments, the depleted cells comprise lymphocytes and myeloid cells. In some embodiments, the depleted cells comprise lymphocytes and granulocytes, monocytes and/or dendritic cells. In some embodiments, cell depletion is antibody dose-dependent. Exemplary antibodies of the disclosure that induce cell depletion include Antibodies 23, 25, and 28-31, referring to Table 11.

Also provided herein are methods of depleting a population of cells in a subject, comprising administering to a subject any of the Fc containing SIRP antibodies of the disclosure. Exemplary antibodies of the disclosure that exhibit such an effect include Antibodies 23, and 28-31, referring to Table 11. In some embodiments, the cell depletion involves ADCC. In some embodiments, the cell depletion involves ADCP. In some embodiments, the cell depletion involves ADCP and ADCC. In some embodiments, the cells comprise SIRPγ-expressing cells. In some embodiments, the SIRPγ-expressing cells comprise lymphocytes. In some embodiments, the lymphocytes comprise B cells, T cells or NK cells. In some embodiments, the cells further comprise SIRPα-expressing cells. In some embodiments, the SIRPα-expressing cells are myeloid cells. In some embodiments, the SIRPα-expressing myeloid cell is a monocyte, macrophage, dendritic cell, mast cell, eosinophil, basophil, or neutrophil. In some embodiments, the SIRPα-expressing cell is a myeloid progenitor cell. In some embodiments, the cells are not SIRPα-expressing cells, e.g. lymphocytes, but are depleted by the SIRP antibodies of the disclosure. In some embodiments, the cells comprise SIRPβ1-expressing cells. In some embodiments, the SIRPβ1-expressing cells comprise myeloid cells. In some embodiments, the SIRPβ1-expressing cells comprise granulocytes, monocytes, macrophages or dendritic cells. In some embodiments, the granulocytes are eosinophils, basophils or neutrophils. In some embodiments, the SIRPβ1-expressing cells comprise macrophages. In some embodiments, the SIRPβ1-expressing cells comprise Kupffer cells or Hofbauer cells. In some embodiments, the cells are tissue-resident cells. In some embodiments, the cells are circulating cells. In some embodiments, the cell depletion is antibody dose-dependent.

In some embodiments, methods lead to ADCC in vitro, and the SIRP antibody increases ADCC by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. Exemplary antibodies of the disclosure that exhibit such an effect include Antibodies 23, 28, and 31-32, referring to Table 11.

In some embodiments, methods lead to ADCP in vitro, and the SIRP antibody increases ADCP by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. Exemplary antibodies of the disclosure that exhibit such an effect include Antibodies 23, 25, and 28-31, referring to Table 11.

In some embodiments, the methods lead to ADCC and/or ADCP in vitro, and the SIRP antibody increases ADCC and/or ADCP by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. Exemplary antibodies of the disclosure that exhibit such an effect include Antibodies 23, 25, and 28-32, referring to Table 11.

In some embodiments, SIRP antibodies of the disclosure induce ADCC of SIRPγ-expressing lymphocytes cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCP of SIRPγ-expressing lymphocytes in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCC and ADCP of SIRPγ-expressing lymphocytes in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCC of SIRPγ-expressing T cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCP of SIRPγ-expressing T cells in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCC and/or ADCP of SIRPγ-expressing T cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCC of SIRPγ-expressing NK cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCP of SIRPγ-expressing NK cells in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCC and/or ADCP of SIRPγ-expressing NK cells in vitro. In some embodiments, the ADCC and ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies bind SIRPα and also induce ADCC of SIRPα-expressing cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing myeloid cells in vitro. Exemplary antibodies of the disclosure that exhibit such an effect include Antibodies 23, 28, and 31-32, referring to Table 11. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing myeloid cells in vitro. Exemplary antibodies of the disclosure that exhibit such an effect include Antibodies 23, 25, and 28-31, referring to Table 11. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP and ADCC of SIRPα-expressing myeloid cells in vitro. Exemplary antibodies of the disclosure that exhibit such an effect include Antibodies 23, 25, and 28-32, referring to Table 11. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing monocyte cells in vitro. Exemplary antibodies of the disclosure that exhibit such an effect include Antibodies 23, 28, 31-32, referring to Table 11. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing monocyte cells in vitro. Exemplary antibodies of the disclosure that exhibit such an effect include Antibodies 23, 25, and 28-31, referring to Table 11. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing monocyte cells in vitro. Exemplary antibodies of the disclosure that exhibit such an effect include Antibodies 23, 25, and 28-32, referring to Table 11. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing myeloid progenitor cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing myeloid progenitor cells in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing myeloid progenitor cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing macrophages in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce ADCP of SIRPα-expressing macrophages in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing macrophages in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing dendritic cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing dendritic cells in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing dendritic cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing basophils in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing basophils in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing basophils in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing neutrophils in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing neutrophils in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing neutrophils in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing eosinophils in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing eosinophils in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP and ADCC of SIRPα-expressing eosinophils in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC of SIRPα-expressing mast cells in vitro. In some embodiments, the ADCC is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCP of SIRPα-expressing mast cells in vitro. In some embodiments, the ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce ADCC and ADCP of SIRPα-expressing mast cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce ADCC and/or ADCP of SIRPβ1-expressing cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce ADCC and/or ADCP of SIRPβ1-expressing myeloid cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce ADCC and/or ADCP of SIRPβ1-expressing granulocytes in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. In some embodiments, the granulocytes are eosinophils, neutrophils or a combination thereof.

In some embodiments, SIRP antibodies of the disclosure are also specific to SIRPβ1 and also induce ADCC and/or ADCP of SIRPβ1-expressing monocytes in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. In some embodiments, the monocytes are classical, intermediate, non-classical, or a combination thereof.

In some embodiments, SIRP antibodies of the disclosure are also specific to SIRPβ1 and also induce ADCC and/or ADCP of SIRPβ1-expressing dendritic cells in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce ADCC and/or ADCP of SIRPβ1-expressing macrophages in vitro. In some embodiments, the ADCC and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce antibody-mediated depletion of cells where the cells do not express SIRPα, or express SIRPα only under certain physiological conditions such as when activated (e.g. activated lymphocytes). In some embodiments, SIRP antibodies of the disclosure induce antibody-mediated depletion of cells where the cells do not express SIRPβ1, or express SIRPβ1 only under certain physiological conditions. In some embodiments, SIRP antibodies of the disclosure induce ADCC of lymphocytes in vitro. In some embodiments, SIRP antibodies of the disclosure induce ADCP of lymphocytes in vitro. In some embodiments, SIRP antibodies of the disclosure induce ADCC and ADCP of lymphocytes in vitro. In some embodiments, the ADCC, and/or ADCP is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, the methods lead to ADCC in vivo, and the SIRP antibody increases ADCC by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, the methods lead to ADCP in vivo, and the SIRP antibody increases ADCP by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, the methods lead to ADCC and/or ADCP in vivo, and the SIRP antibody increases ADCC and/or ADCP by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, the methods lead to cell depletion in vivo, and the SIRP antibody increases ADCC and ADCP by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. Exemplary antibodies of the disclosure that exhibit such an effect include Antibodies 23, and 28-31, referring to Table 11.

In some embodiments, SIRP antibodies of the disclosure induce cell depletion (e.g. ADCC and/or ADCP) of SIRPγ-expressing cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce cell depletion (e.g. ADCC and/or ADCP) of SIRPγ-expressing lymphocytes in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce cell depletion (e.g. ADCC and/or ADCP) of SIRPγ-expressing T cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce cell depletion (e.g. ADCC and/or ADCP) of SIRPγ-expressing NK cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing myeloid cells in vivo. Exemplary antibodies of the disclosure that exhibit such an effect include Antibodies 23, and 28-31, referring to Table 11. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing monocyte cells in vivo. Exemplary antibodies of the disclosure that exhibit such an effect include Antibodies 23, and 28-31, referring to Table 11. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing neutrophils in vivo. Exemplary antibodies of the disclosure that exhibit such an effect include Antibodies 23, and 28-31, referring to Table 11. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing eosinophils in vivo. Exemplary antibodies of the disclosure that exhibit such an effect include Antibodies 23, and 28-31, referring to Table 11. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing basophils in vivo. Exemplary antibodies of the disclosure that exhibit such an effect include Antibodies 23, and 28-31, referring to Table 11. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce antibody-mediated depletion of cells where the cells do not express SIRPα, or express SIRPα only under certain physiological conditions, for example such as when activated (e.g. lymphocytes). Accordingly, in some embodiments, SIRP antibodies of the disclosure induce cell depletion (e.g. ADCC and/or ADCP) of lymphocytes in vivo. Exemplary antibodies of the disclosure that exhibit such an effect include Antibodies 23, and 28-31, referring to Table 11. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure induce are also specific to SIRPα and also cell depletion (e.g. ADCC and/or ADCP) of SIRPα-expressing myeloid progenitor cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing macrophages in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing dendritic cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPα and also induce cell depletion (e.g. ADCC and/or ADCP) of SIRPα-expressing mast cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce cell depletion (e.g. ADCC and/or ADCP) of SIRPβ1-expressing cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce cell depletion (e.g. ADCC and/or ADCP) of SIRPβ1-expressing myeloid cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce cell depletion (e.g. ADCC and/or ADCP) of SIRPβ1-expressing granulocytes cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%. In some embodiments, the granulocytes comprise eosinophils, neutrophils or a combination thereof.

In some embodiments, SIRP antibodies of the disclosure are also specific to SIRPβ1 and also induce cell depletion (e.g. ADCC and/or ADCP) of SIRPβ1-expressing monocytes cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce cell depletion (e.g. ADCC and/or ADCP) of SIRPβ1-expressing macrophages in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

In some embodiments, SIRP antibodies of the disclosure are also specific to SIRPβ1 and also induce cell depletion (e.g. ADCC and/or ADCP) of SIRPβ1-expressing dendritic cells in vivo. In some embodiments, the cell depletion is increased by at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 99%.

B. Therapeutic SIRP Antibodies

As discussed in Section IA above, provided herein are antibodies that recognize and bind to SIRPγ, in combination with SIRPα and/or SIRPβ1. The antibodies disclosed herein may be used for therapeutics in a subject.

Accordingly, provided herein are methods of treating a disease or condition in a subject in need thereof, the method comprising administering to the subject a therapeutically effective amount of a SIRP antibody of the disclosure, or pharmaceutical compositions thereof. In some embodiments, the subject is a mammalian subject. In some embodiments, the mammalian subject is a human subject. In some embodiments, the mammalian subject is a non-human primate, e.g. a cynomolgus monkey.

i. Treatment of Diseases/Conditions

In some embodiments, the SIRP antibodies provided herein are useful for depleting a population of cells in the subject, for the treatment of a disease or condition in the subject. In some embodiments, the therapeutic SIRP antibodies provided herein are useful for treating a disease or condition involving the overactivation or hyperproliferation of certain cells, e.g. SIRPγ-expressing cells (e.g. lymphocyte cells), optionally in combination with SIRPα and/or SIRPβ1 expressing cells (e.g., myeloid cells) as a part of the pathology.

In some embodiments, a therapeutically effective amount of the antibody or the pharmaceutical composition is sufficient to deplete a population of cells in the subject, e.g. by ADCC and/or ADCP. In some embodiments, the cells are over activated or hyperproliferative. In some embodiments, the cells are SIRPγ-expressing cells. In some embodiments, the SIRPγ-expressing cells are lymphocytes. In some embodiments, the SIRPγ-expressing lymphocytes are selected from the group consisting of B cells, T cells and NK cells. In some embodiments, the cells are tissue resident cells. In other embodiments, the cells are circulating cells. In some embodiments, the cell depletion is antibody dose-dependent.

In some embodiments, a therapeutically effective amount of the antibody or the pharmaceutical composition is sufficient to deplete a population of SIRPα and/or SIRPβ1-expressing cells in a subject. In some embodiments, the cells are overactivated or hyperproliferative. In some embodiments, the SIRPα and/or SIRPβ1-expressing cells comprise myeloid cells. In some embodiments, the SIRPα and/or SIRPβ1-expressing cells comprise monocytes, macrophages, dendritic cells, mast cells, eosinophils, basophils and neutrophils.

In some embodiments, the disease or condition is characterized by overactivation and/or hyperproliferation of lymphocytes cells (including lymphoblast cells). In some embodiments, the disease or condition is characterized by overactivation and/or hyperproliferation of myeloid cells (including myeloid progenitor cells), and other SIRPα and/or SIRPβ1-expressing cells. Exemplary diseases associated with overactivation and/or hyperproliferation include, but are not limited to, histiocytic disorders, cytokine release syndrome (CRS), granulomatous diseases, autoimmune disorders, and hematological malignancies.

In some embodiments, the disease or disorder comprises a disease or disorder associated with lymphocytes. In some embodiments, the disease or disorder comprises a disease or disorder associated with myeloid cells. In some embodiments, the disease or disorder comprises a disease or disorder associated with both lymphocytes and myeloid cells.

In some embodiments, the disease or disorder comprises a disease or disorder associated with both lymphocytes and myeloid cells. In some embodiments, the disease or condition is a type of histiocytoses, for example hemophagocytic lymphohistiocytosis (HLH) (including primary and secondary HLH), macrophage activation syndrome, Langerhans cell histiocytosis (LCH), indeterminate cell histiocytosis, Erdheim-Chester disease (ECD), mixed LCH/ECD, Rosai Dorfman disease, malignant histiocytosis, cutaneous non-LCH histiocytoses, juvenile xanthogranuloma, virus-associated HLH, bacteria-associated HLH, parasite-associated HLH, fungal-associated (fungal induced) HLH, autoimmune disease associated HLH, or malignancy-triggered HLH.

In some embodiments, the disease or condition is associated with a non-mendelian secondary HLH (sHLH). In some embodiments, such sHLH is an infection-associated HLH, such as virus-associated HLH, bacteria-associated HLH, parasite-associated HLH, or fungal-associated HLH. Examples of virus-associated HLH include, but are not limited to, EBV-associated HLH, CMV-associated HLH, HLH associated with other defined herpes virus infections, HIV-associated HLH, Influenza-associated HLH, and HLH associated with other virus infections. In exemplary embodiments, the infection-associated sHLH is associated with an infection from a coronavirus (e.g. COVID19, SARS (SARS-CoV), MERS), or Ebola. Examples of bacteria-associated HLH include mycobacterium associated HLH. Examples of parasite-associated HLH include Leishmania-associated or Plasmodium-associated HLH. Examples of fungal-induced HLH include Histoplasmosis-associated HLH.

In other embodiments, such sHLH is a malignancy-associated HLH, such as a malignancy-triggered HLH (HLH at onset of malignancy) and include hematological malignancies (e.g. T-cell lymphoblastic lymphoma/leukemia, T-cell non-lymphoblastic lymphomas, B-cell leukemias, B-cell lymphomas (non-Hodgkin's), Hodgkin's lymphomas, NK-cell lymphomas/leukemias, myeloid neoplasia, other hematological malignancies), as well as solid tumors. In other embodiments, such sHLH is a HLH occurring during chemotherapy (not associated with initial diagnosis of malignancy).

In other embodiments, such sHLH is associated with defined rheumatologic conditions (e.g. Macrophage Activation Syndrome-HLH, or MAS-HLH). These include, but are not limited to HLH associated with systemic-onset juvenile idiopathic arthritis (SoJIA), HLH associated with adult-onset Still's disease, HLH associated with systemic lupus erythematosus (SLE), HLH associated with vasculitis, HLH associated with rheumatoid arthritis, as well as HLH associated with other defined autoimmune conditions and HLH associated with an undefined autoimmune condition.

In other embodiments, such sHLH is a transplant-related HLH, such as HLH associated with a kidney transplant, or hematologic stem cell transplants.

In some embodiments, the disease or condition comprises a sHLH or a cytokine release syndrome (CRS). In some embodiments, the disease or condition comprises CRS. In some embodiments, the sHLH or CRS is associated with iatrogenic immune activation, e.g. associated with checkpoint inhibitors for the treatment of malignancies, associated with T cell therapy, for example chimeric antigen receptor—T cell therapy (CAR-T) or T cell receptor T cell therapy (TCR-T), associated with NK cell activating bispecific monoclonal antibody therapy, or associated with T cell activating bispecific monoclonal antibody therapy. In other embodiments, such sHLH or CRS is associated with iatrogenic immune suppression. In other embodiments, the sHLH or CRS is associated with an infection, such as a viral infection, for example COVID-19.

In other embodiments, the therapeutic SIRP antibodies provided herein are useful for treating a granulomatous disease or condition, or a disease characterized by the presence of multinucleated giant cells. In some embodiments, the granulomatous diseases or conditions, or giant cell diseases or conditions, comprise sarcoidosis, inflammatory bowel disease (IBD), ulcerative colitis, Crohn's disease, Takayasu arteritis, giant cell arteritis, psoriatic arthritis, granulomatosis with polyangiitis (Wegener's Granulomatosis), giant cell myocarditis, chronic granulomatous disease, eosinophilic granulomatosis with polyangiitis (Churg-Strauss Syndrome), or chronic beryllium disease (berylliosis).

In some embodiments, the disease or condition comprises a T-cell mediated disorder, including, but not limited to, aplastic anemia, cell mediated rejection of solid organ transplant, graft failure post-HSCT (hematopoietic stem cell transplant), lymphocyte-variant hypereosinophilia, atopic dermatitis, lymphocytic myocarditis, axial spondyloarthritis, celiac disease, or Rasmussen's encephalitis.

In some embodiments, the disease or condition comprises a disease or condition characterized by the aberrant activity and/or proliferation of granulocytes. In some embodiments, the granulocytes comprise eosinophils, basophils, mast cells or neutrophils.

In some embodiments, the disease or condition comprises a disease or condition is characterized by the aberrant activity and/or proliferation of eosinophils. In some embodiments, the disease or condition comprises hypereosinophilic syndrome (including primary, secondary, and idiopathic), acute eosinophilic pneumonia, chronic eosinophilic pneumonia, eosinophilic esophagitis, eosinophilic gastritis, eosinophilic gastroenteritis, eosinophilic enteritis, eosinophilic colitis, lymphocyte-variant hypereosinophilia, eosinophilic granulomatosis with polyangiitis (Churg-Strauss Syndrome), eosinophilic cardiomyopathy/Loeffler endocarditis, Löffler syndrome or episodic angioedema with eosinophilia/Gleich syndrome or lymphocyte-variant hypereosinophilia.

In some embodiments, the disease or condition comprises a disease or condition that is characterized by the aberrant activity and/or proliferation of mast cells. In some embodiments, the disease or condition comprises cutaneous mastocytosis, mastocytic enterocolitis, systemic mastocytosis, mast cell activation syndrome, hereditary alpha tryptasemia syndrome, chronic urticaria or severe allergic conjunctivitis.

In some embodiments, the disease or condition comprises a disease or condition that is characterized by the aberrant activity and/or proliferation of neutrophils. In some embodiments, the disease or condition comprises neutrophilic dermatoses, psoriatic arthritis, generalized pustular psoriasis, pyoderma gangrenosum, Sweet's syndrome, subcorneal pustular dermatosis, neutrophilic eccrine hidradenitis, bowel-associated dermatosis-arthritis syndrome (BADAS), rheumatoid neutrophilic dermatitis, or Behcet's disease.

In some embodiments, the disease or condition comprises an autoimmune disorder. In some embodiments, the autoimmune disorder involves the presentation of self antigens by antigen presenting cells occurring in germinal centers of secondary lymphoid tissue that results in the activation of autoreactive T and B cells, the latter of which produce autoantibodies that mediate cytokine release and sometimes IgG-induced phagocytosis. By targeting and depleting these antigen presenting dendritic cells and autoreactive lymphocytes, the antibodies described here can treat these diseases by halting this process of self-antigen presentation.

In some embodiments, the therapeutic SIRP antibodies provided herein are useful for treating an autoimmune or inflammatory (chronic or acute) disorder such as acute disseminated encephalomyelitis, acute respiratory distress syndrome, Addison's disease, Adult-Onset Still's disease, ankylosing spondylitis, antibody-mediated rejection (AMR), anti-glomerular basement membrane disease (Goodpasture Syndrome), catastrophic antiphospholipid syndrome, antiphospholipid syndrome, aplastic anemia, allograft transplant rejection, atopic dermatitis, atherosclerosis, autoimmune hemolytic anemia, autoimmune hepatitis, autoimmune lymphoproliferative syndrome, autoimmune neutropenia, axial spondyloarthritis, Behcet's disease, bullous pemphigoid, Castleman disease, catastrophic antiphospholipid syndrome, celiac disease, cell mediated rejection of solid organ transplant, chronic obstructive pulmonary disease (COPD), Chediak-Higashi syndrome, chronic inflammatory demyelinating polyneuropathy (CIDP), chronic neutrophilic leukemia, chronic urticaria, coronary artery disease (CAD)/peripheral artery disease (PAD), COVID-19, cutaneous mastocytosis, eosinophilic cardiomyopathy/Loeffler endocarditis, Crohn's disease, epidermolysis bullosa acquisita, Evans syndrome, eosinophilic granulomatosis with polyangiitis (Churg-Strauss Syndrome), Felty's syndrome, general pustular psoriasis, giant cell myocarditis, graft failure post-HSCT (hematopoietic stem cell transplant), graft vs. host disease, Graves' disease, Graves ophthalmopathy, granulomatosis with polyangiitis (Wegener's Granulomatosis), Guillain-Barre syndrome, Hashimoto's thyroiditis, hereditary alpha tryptasemia syndrome, hyper IgE syndrome, Idiopathic interstitial pneumonia, idiopathic pulmonary fibrosis, IgA nephropathy, immune/idiopathic thrombocytopenia purpura, inclusion body myositis, inflammatory bowel disease, Kawasaki disease, Lambert-Eaton myasthenic syndrome (LEMS), myasthenia gravis (MG), linear IgA disease, Löffler syndrome, lupus nephritis, lupus vasculitis, systemic lupus erythematosus (SLE), mast cell activation syndrome, mastocytic enterocolitis, membranous nephropathy, microscopic polyangiitis (VIPA), multiple sclerosis, myelodysplastic syndromes, myelofibrosis, myocarditis, neuromyelitis optica (NMO), neutrophilic dermatoses, paraneoplastic syndrome, pemphigus foliaceus, pemphigus vulgaris, primary biliary cholangitis, primary biliary cirrhosis, primary sclerosing cholangitis, psoriatic arthritis, pyoderma gangrenosum, Rasmussen's encephalitis, rheumatoid arthritis, rheumatoid vasculitis, Schmidt syndrome, scleroderma (systemic sclerosis), Sjögren's syndrome, severe allergic conjunctivitis, Sjogren syndrome, Susac syndrome, systemic inflammatory response syndrome, systemic juvenile idiopathic arthritis, systemic lupus erythematosus, systemic mastocytosis, type 1 diabetes, ulcerative colitis, uveitis, vitiligo or X-linked lymphoproliferative disease.

In some embodiments, the therapeutic SIRP antibodies provided herein are useful for treating a hematological malignancy. In some embodiments, the hematological malignancy is selected from the group consisting of acute lymphoblastic leukemia, acute myelogenous leukemia, chronic myelogenous leukemia, chronic myelomonocytic leukemia, chronic neutrophilic leukemia, juvenile myelomonocytic leukemia, chronic eosinophilic leukemia, large granular lymphocyte leukemia, T-cell prolymphocytic leukemia, hepatosplenic lymphoma, Hodgkin's lymphomas, T-cell lymphoblastic lymphoma or leukemia, T-cell non-lymphoblastic lymphoma, NK-cell lymphoma/leukemia, myeloid neoplasia, chronic neutrophilic leukemia, and other hematological malignancies.

In other embodiments, the therapeutic SIRP antibodies provided herein are useful for treating a disease or condition associated with pathological alloantibodies or autoantibodies including myasthenia gravis, Guillain-Barre syndrome, autoimmune hemolytic anemia, immune/idiopathic thrombocytopenia purpura, Evans syndrome, Felty's syndrome, chronic inflammatory demyelinating polyneuropathy (CIDP), Lambert-Eaton myasthenic syndrome (LEMS), neuromyelitis optica (NMO), bullous pemphigoid, epidermolysis bullosa acquisita, pemphigus foliaceus, pemphigus vulgaris, anti-glomerular basement membrane disease (Goodpasture Syndrome), membranous nephropathy, rheumatoid vasculitis, lupus vasculitis, scleroderma (systemic sclerosis), Behcet's disease, microscopic polyangiitis (MPA), Kawasaki disease, antiphospholipid syndrome, catastrophic antiphospholipid syndrome, Graves ophthalmopathy, Castleman disease and antibody-mediated rejection (AMR).

In some embodiments, the disease or condition comprises the disease or condition comprises hemophagocytic lymphohistiocytosis (HLH) (including primary and secondary HLH), macrophage activation syndrome, Langerhans cell histiocytosis (LCH), indeterminate cell histiocytosis, Erdheim-Chester disease (ECD), mixed LCH/ECD, Rosai Dorfman disease, malignant histiocytosis, cutaneous non-LCH histiocytosis, juvenile xanthogranuloma, virus-associated HLH, bacteria-associated HLH, parasite-associated HLH, fungal-associated/fungal-induced HLH, malignancy-triggered HLH, HLH occurring during chemotherapy, HLH associated with systemic-onset juvenile idiopathic arthritis (SoJIA), HLH associated with adult-onset Still's disease, HLH associated with systemic lupus erythematosus (SLE), HLH associated with vasculitis, HLH associated with autoimmune conditions, HLH associated with a kidney transplant, HLH associated with hematologic stem cell transplants, sHLH or CRS associated with checkpoint inhibitors for the treatment of malignancies, sHLH or CRS associated with associated with T cell therapy, sHLH or CRS associated with chimeric antigen receptor (CAR) T cell therapy, sHLH or CRS associated with T cell activating bispecific monoclonal antibody therapy, cytokine release syndrome (CRS), systemic mastocytosis, hypereosinophilic syndrome (including primary, secondary, and idiopathic), hyper IgE syndrome, X-linked lymphoproliferative disease, graft vs. host disease, type 1 diabetes, systemic lupus erythematosus, lupus nephritis, systemic inflammatory response syndrome, acute respiratory distress syndrome, autoimmune lymphoproliferative syndrome, X-linked hyper IgM syndrome, paraneoplastic syndrome, Susac syndrome, linear IgA disease, autoimmune neutropenia, idiopathic pulmonary fibrosis, inclusion body myositis, vitiligo, Addison's disease, Graves' disease, Hashimoto's thyroiditis, Schmidt syndrome, acute disseminated encephalomyelitis, sarcoidosis, ankylosing spondylitis, inflammatory bowel disease, ulcerative colitis, Crohn's disease, eosinophilic granulomatosis with polyangiitis, pyoderma gangrenosum, giant cell arteritis, rheumatoid arthritis, systemic juvenile idiopathic arthritis, Sjogren's syndrome, primary sclerosing cholangitis, primary biliary cholangitis, myasthenia gravis, multiple sclerosis, Guillain-Barre syndrome, acute lymphoblastic leukemia, acute myelogenous leukemia, chronic myelogenous leukemia, chronic myelomonocytic leukemia, juvenile myelomonocytic leukemia, chronic eosinophilic leukemia, large granular lymphocyte leukemia, T-cell prolymphocytic leukemia, hepatosplenic lymphoma, Hodgkin's lymphoma, T-cell lymphoblastic lymphoma/leukemia, T-cell non-lymphoblastic lymphoma, B-cell leukemia, B-cell lymphoma (non-Hodgkin's), NK-cell lymphoma or leukemia, myeloid neoplasia, autoimmune hemolytic anemia, immune/idiopathic thrombocytopenia purpura, Evans syndrome, Felty's syndrome, chronic inflammatory demyelinating polyneuropathy (CIDP), Lambert-Eaton myasthenic syndrome (LEMS), neuromyelitis optica (NMO), bullous pemphigoid, epidermolysis bullosa acquisita, pemphigus foliaceus, pemphigus vulgaris, anti-glomerular basement membrane disease (Goodpasture Syndrome), membranous nephropathy, rheumatoid vasculitis, lupus vasculitis, scleroderma (systemic sclerosis), Behcet's disease, granulomatosis with polyangiitis (Wegener's Granulomatosis), eosinophilic granulomatosis with polyangiitis (Churg-Strauss Syndrome), microscopic polyangiitis (MPA), Kawasaki disease, antiphospholipid syndrome, catastrophic antiphospholipid syndrome, Graves ophthalmopathy, Castleman disease, antibody-mediated rejection (AMR), acute eosinophilic pneumonia, chronic eosinophilic pneumonia, eosinophilic esophagitis, eosinophilic gastritis, eosinophilic gastroenteritis, eosinophilic enteritis, eosinophilic colitis, uveitis, giant cell myocarditis, cutaneous mastocytosis, mastocytic enterocolitis, mast cell activation syndrome, IgA nephropathy, Chediak-Higashi syndrome, eosinophilic cardiomyopathy/Loeffler endocarditis, acute kidney injury, chronic kidney disease, coronary artery disease (CAD)/peripheral artery disease (PAD), myelofibrosis, IgG4-related disease, Löffler syndrome, chronic neutrophilic leukemia, myocarditis, episodic angioedema with eosinophilia/Gleich syndrome, idiopathic interstitial pneumonia, hereditary alpha tryptasemia syndrome, chronic urticaria, severe allergic conjunctivitis, Adult-onset Still's, aplastic Anemia, cell mediated rejection of solid organ transplant, graft failure Post-hematopoietic stem cell transplant (HSCT), lymphocyte-variant hypereosinophilia, myelodysplastic syndromes, atopic dermatitis, axial spondyloarthritis, celiac disease, hyperthyroidism, Rasmussen's encephalitis, chronic beryllium disease (Berylliosis), Takayasu arteritis, autoimmune hepatitis, neutrophilic dermatoses, psoriatic arthritis, Corona Virus Disease 2019 (COVID-19), or general pustular psoriasis.

D. Pharmaceutical Compositions

The disclosure also provides pharmaceutical compositions comprising any one of the SIRP antibodies disclosed herein, and optionally a pharmaceutical acceptable excipient or carrier. In some embodiments, the pharmaceutical composition is sterile. The pharmaceutical compositions may be formulated to be compatible with their intended routes of administration. In some embodiments, the pharmaceutical compositions of the disclosure are suitable for administration to a human subject.

E. Combination Therapies

The administration of any one of the therapeutic SIRP antibodies provided herein may be in combination with any other known drugs or treatments for diseases or conditions as described in IIC. In some embodiments, the disease or condition is associated with overactivation and/or hyperproliferation of myeloid cells, lymphocytes, or other cells expressing SIRPα, SIRPβ1, or SIRPγ. In some embodiments, the disease or condition is an autoimmune disease or condition. In some embodiments, the disease or condition is a neoplastic disorder or malignancy. In exemplary embodiments, the disease or condition being treated is a hyperinflammatory syndrome such as HLH, or CRS (e.g. an autoimmune related CRS, or CRS associated with adoptive cell therapy) in which a therapeutic SIRP antibody may be used in combination with corticosteroids (e.g. —dexamethasone).

In some embodiments, a therapeutic SIRP antibody is provided to treat a CRS or sHLH that occurs due to infections, in combination with the appropriate antiviral for the treatment of a viral infection, or in combination with the appropriate antibiotic therapy for the treatment of a bacterial infection. By way of example only, a therapeutic antibody of the disclosure could be administered in combination with an antiviral therapy for example, an antiviral therapy for COVID-19, SARS (SARS-CoV), MERS, Ebola, or Epstein Barr virus, or in combination with an antibiotic therapy, for example an antibiotic therapy for the treatment of sepsis. In some embodiments, the SIRP antibody is administered in combination with a standard therapy for the infection.

In some embodiments, a therapeutic SIRP antibody provided herein to treat a CRS or sHLH that occurs due to malignancies, is used in combination with the appropriate chemotherapeutic or malignancy-associated treatment of an oncological indication. In some embodiments, a therapeutic SIRP antibody provided herein to treat a CRS or sHLH that occurs due to an autoimmune disorder, such as a rheumatological disorder including systemic lupus erythematosus or rheumatoid arthritis, in combination with the appropriate treatment of such a disorder. Exemplary appropriate treatments include, but are not limited to, corticosteroids.

F. Administration of Therapeutic SIRP Antibodies

The in vivo administration of the therapeutic SIRP antibodies described herein may be carried out intravenously, intramuscularly, subcutaneously, topically, orally, transdermally, intraperitoneally, intraorbitally, intrathecally, intraventricularly, intranasally, transmucosally, through implantation, or through inhalation. Intravenous administration may be carried out via injection or infusion. In some embodiments, the SIRP antibodies of the disclosure are administered intravenously. In some embodiments, the SIRP antibodies of the disclosure are administered subcutaneously. Administration of the therapeutic SIRP antibodies may be performed with any suitable excipients, carriers, or other agents to provide suitable or improved tolerance, transfer, delivery, and the like.

G. Diagnostic Antibodies

The antibodies provided herein may also be used for diagnostic purposes. For example, for those SIRP antibodies which bind to SIRPα, diagnostic antibodies could be used for detecting the presence of a SIRPα mediated disorder, or for detecting SIRPα levels in a subject prior to dosing (e.g. as a companion diagnostic).

III. Kits and Articles of Manufacture

The disclosure also provides a kit or article of manufacture comprising any one of the antibodies disclosed herein, or any pharmaceutical composition disclosed herein. In some embodiments, the kits may further include instructional materials for carrying out any of the methods disclosed herein. In some embodiments, the kits may further include sterile containers or vials for holding the antibodies and/or pharmaceutical compositions disclosed herein. In some embodiments, the kits may further include sterile delivery devices for administering the antibodies and/or pharmaceutical compositions disclosed herein. In some embodiments, an article of manufacture comprises any pharmaceutical composition of the disclosure.

EXAMPLES

Example 1: Hybridoma Library Screens for Identification of Anti-Human SIRP Antibodies Anti-human SIRP monoclonal antibodies (referred to interchangeably in these examples as SIRP antibodies) were identified from various rodent models of immunization. Rodent strains were immunized with the extracellular domain of human SIRPα (hSIRPα). Using standard techniques, hybridoma libraries (six libraries) were generated from the splenocytes of immunized animals. Anti-hSIRPα antibody-producing clones were identified by flow cytometric analyses of hSIRPα-expressing cells incubated in the supernatant of individual clones. Twelve individual clones were identified (Antibodies 1, 3, 4, and 7-15). Antibodies 1, 3-4 and 7-14 have a human variable region and a rat IgG2b Fc domain. Antibody 15 has a mouse variable region and a mouse IgG2a Fc domain.

Example 2: Binding of SIRP Antibodies to SIRPα Protein

Selected hybridoma supernatants of Example 1 were further tested for binding to human SIRPα V1 and cynomolgus monkey SIRPα by enzyme-linked immunosorbent assay (ELISA). Briefly, 1 μg/mL of the extracellular domain of the SIRPα was coated onto high protein-binding plates and blocked. Supernatants were diluted 1:5 and added to coated plates. The antibodies were detected by anti-rat or anti-mouse IgG antibodies and a chemiluminescent substrate. FIG. 1A shows the results of binding of Antibodies 1, 3, 4, 7-15. The data depict the relative luminescence units read by a plate-reader capable of detecting chemiluminescence.

Figure 1B:
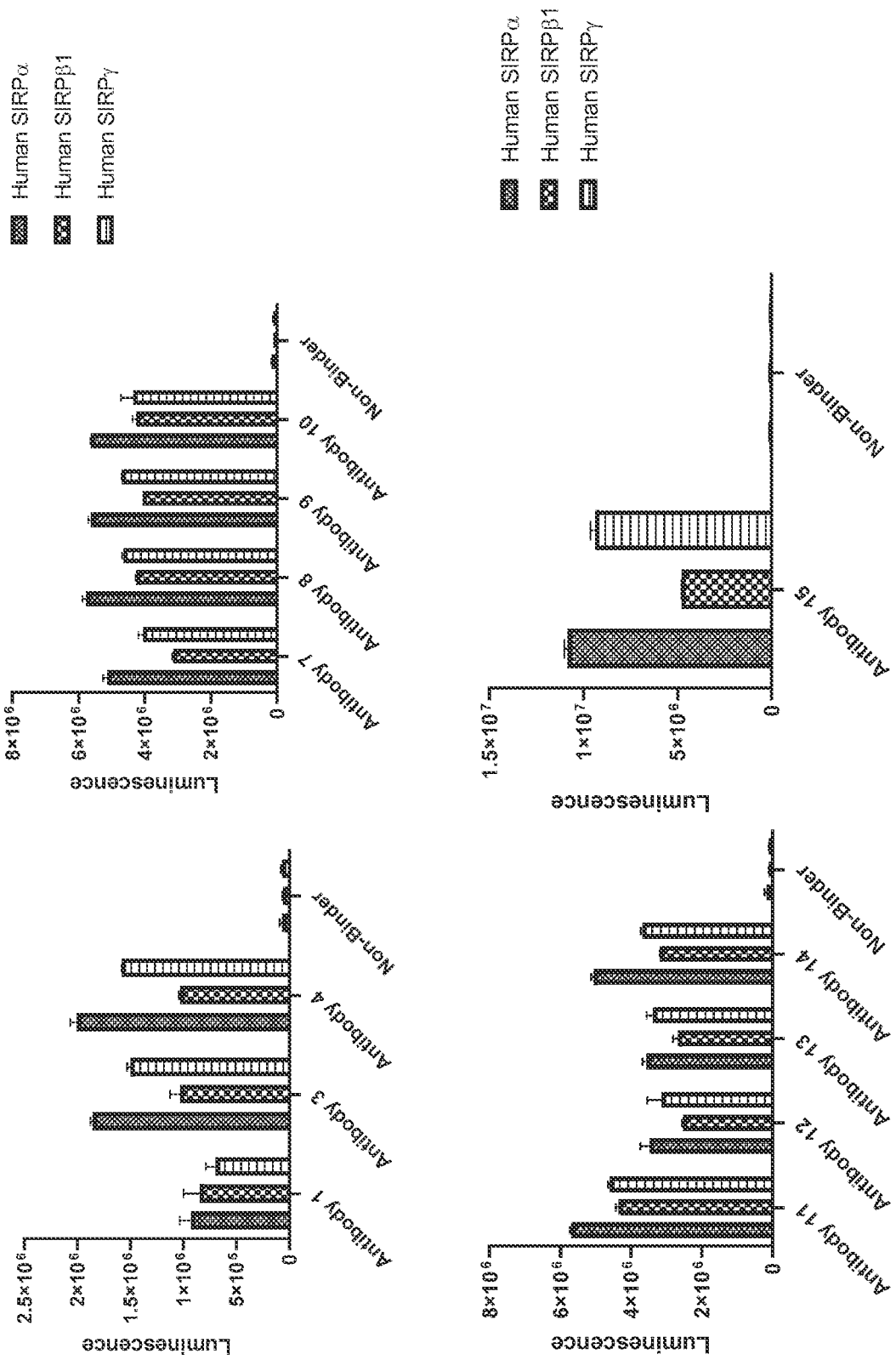
FIG. 1B shows binding of selected antibodies of the disclosure to human SIRPα, SIRPβ1 and SIRPγ by ELISA.

Selected hybridoma supernatants of Example 1 were further tested for binding to human SIRPα V1, SIRPβ1, and SIRPγ by enzyme-linked immunosorbent assay (ELISA). Briefly, 2 μg/mL of the extracellular domain of each of the SIRPs was coated onto high protein-binding plates and blocked. Supernatants were added undiluted to coated plates. The antibodies were detected by anti-rat or anti-mouse IgG antibodies and a chemiluminescent substrate. FIG. 1B shows the results of binding of Antibodies 1, 3, 4, 7-15. The data depict the relative luminescence units read by a plate-reader capable of detecting chemiluminescence.

Figure 2A:
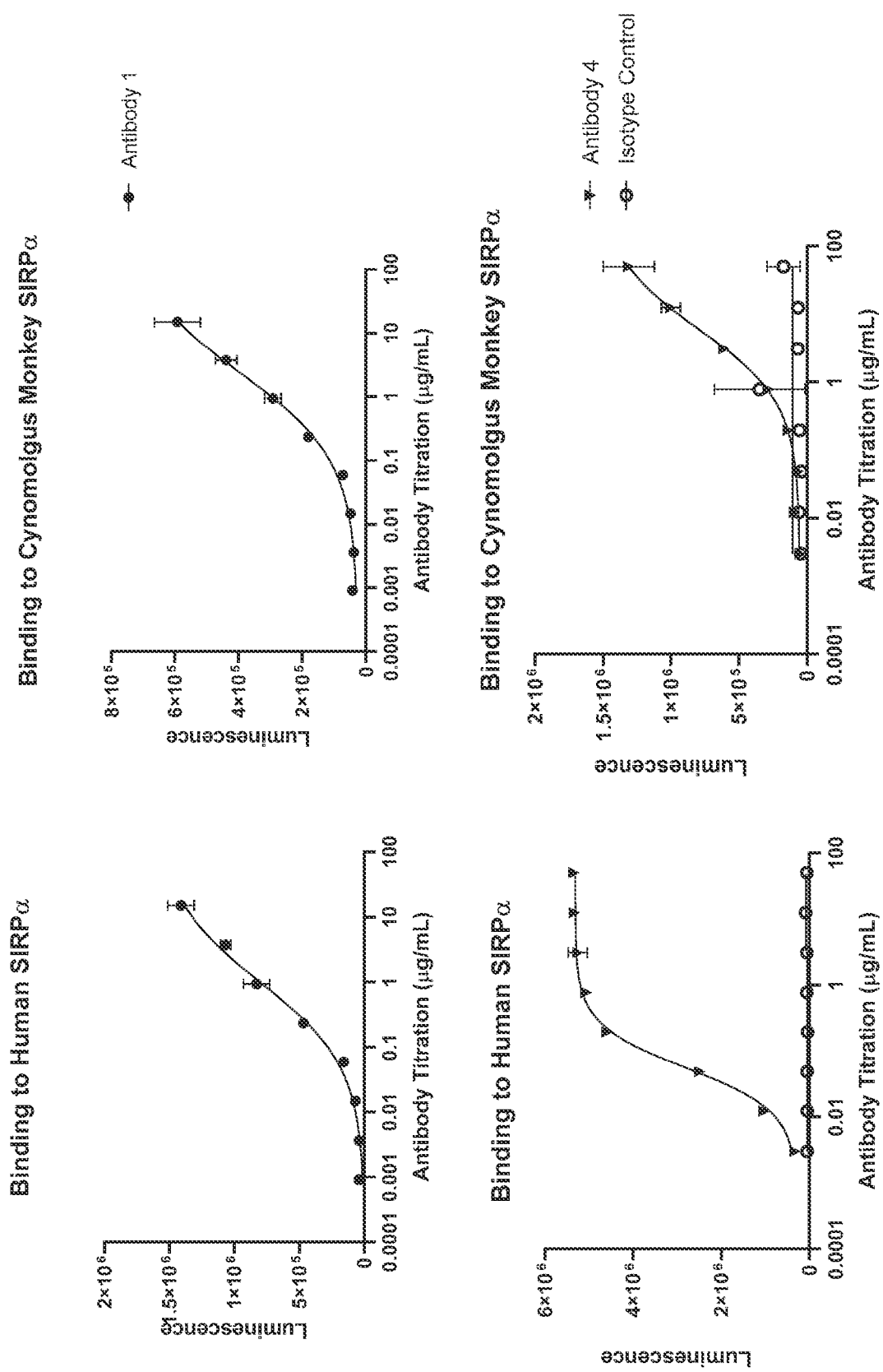
Figure 2C:
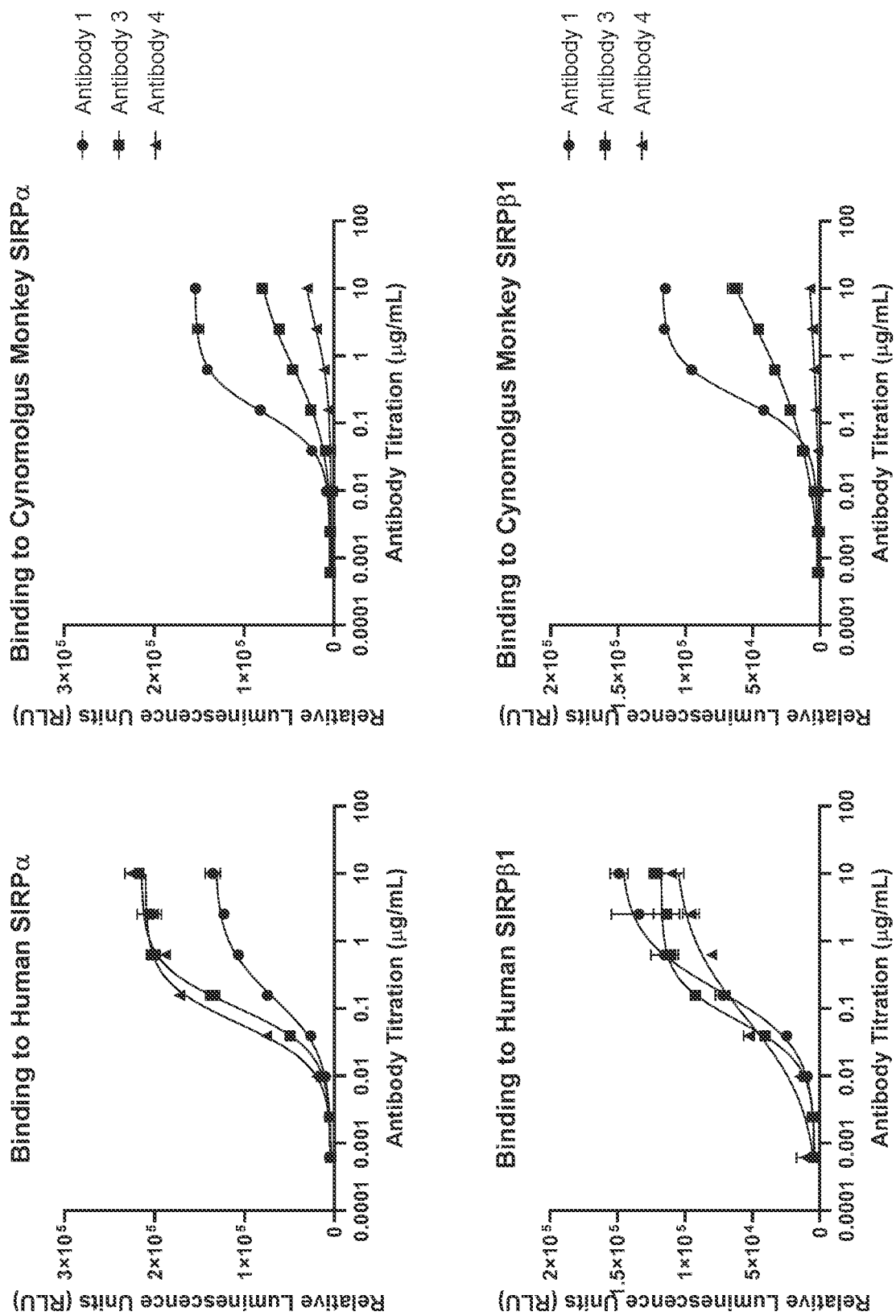
FIG. 2C shows binding curves of selected antibodies to human and cynomolgus monkey SIRPα (top row) and SIRPβ1 (bottom row) by ELISA.
Figure 2D:
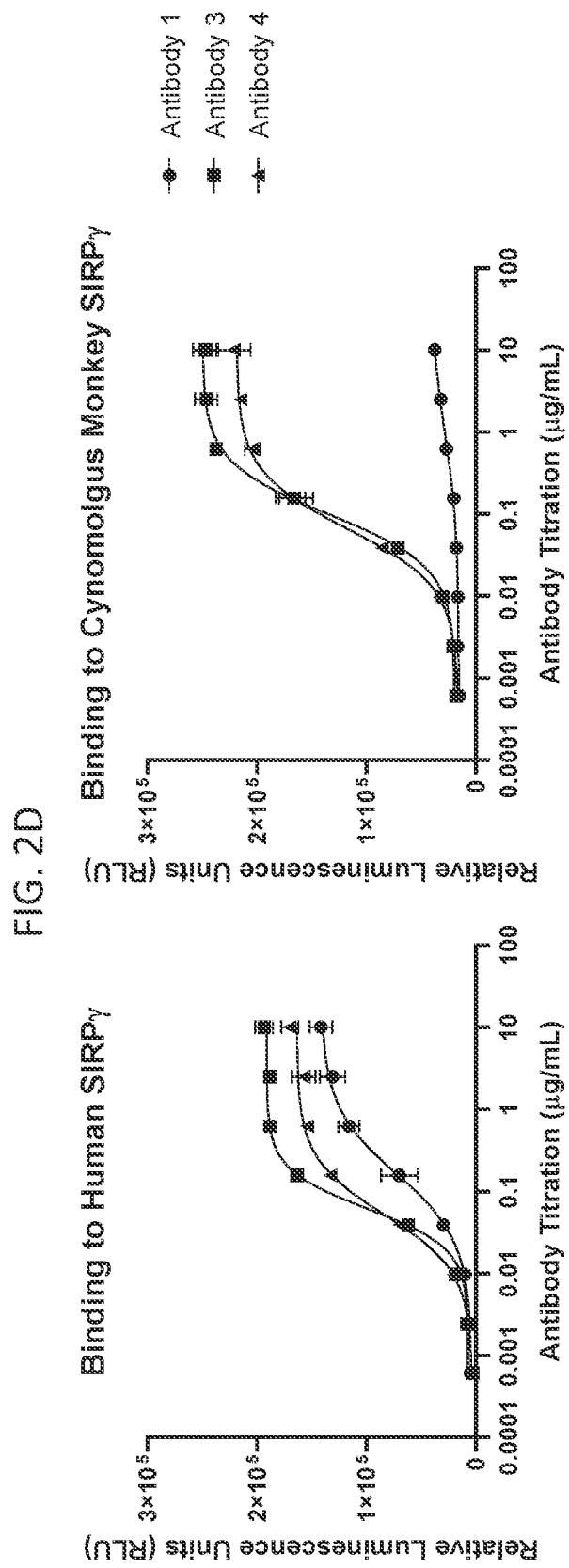
FIG. 2D shows binding curves of selected antibodies to human and cynomolgus monkey SIRPγ by ELISA.
Figure 2E:
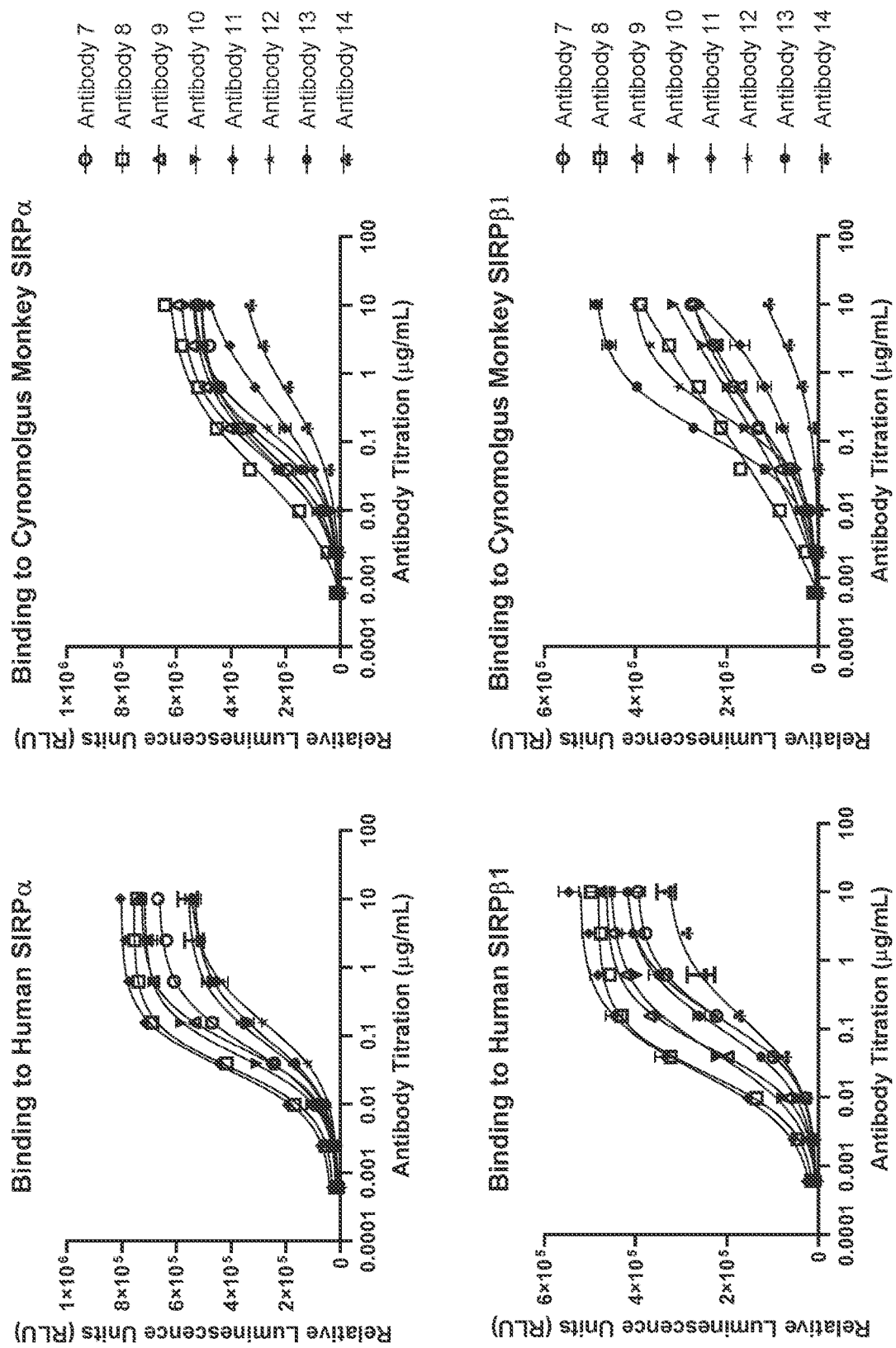
FIG. 2E shows binding curves of selected antibodies to human and cynomolgus monkey SIRPα (top row) and SIRPβ1 (bottom row) by ELISA.
Figure 2F:
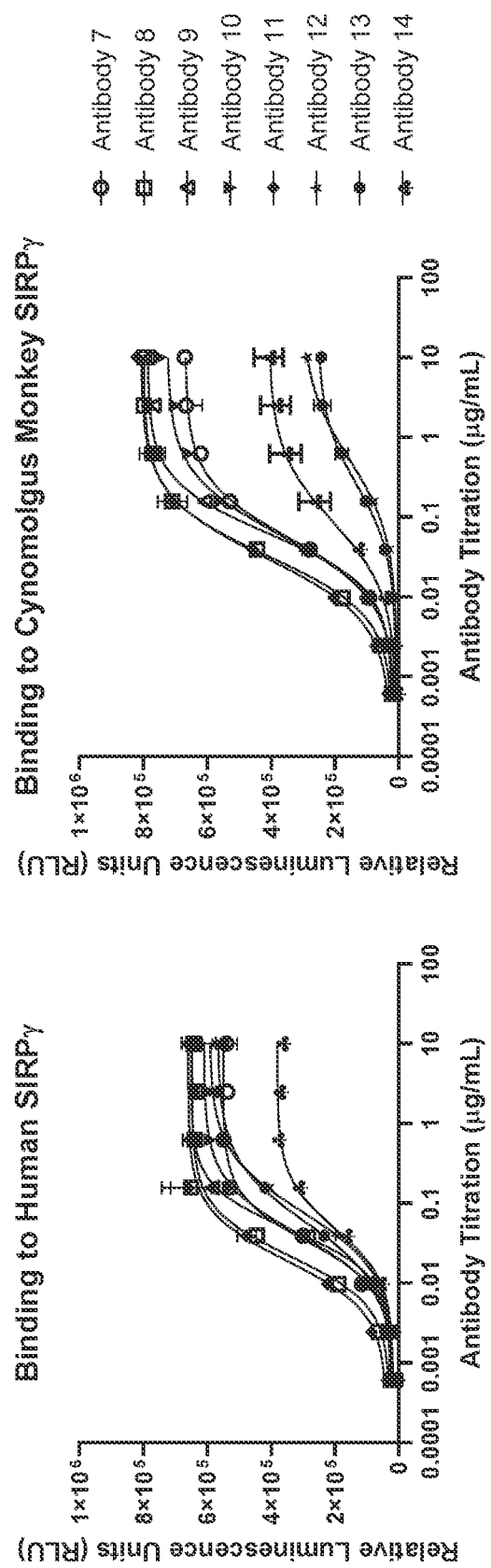
FIG. 2F shows binding curves of selected antibodies to human and cynomolgus monkey SIRPγ by ELISA.
Figure 2G:
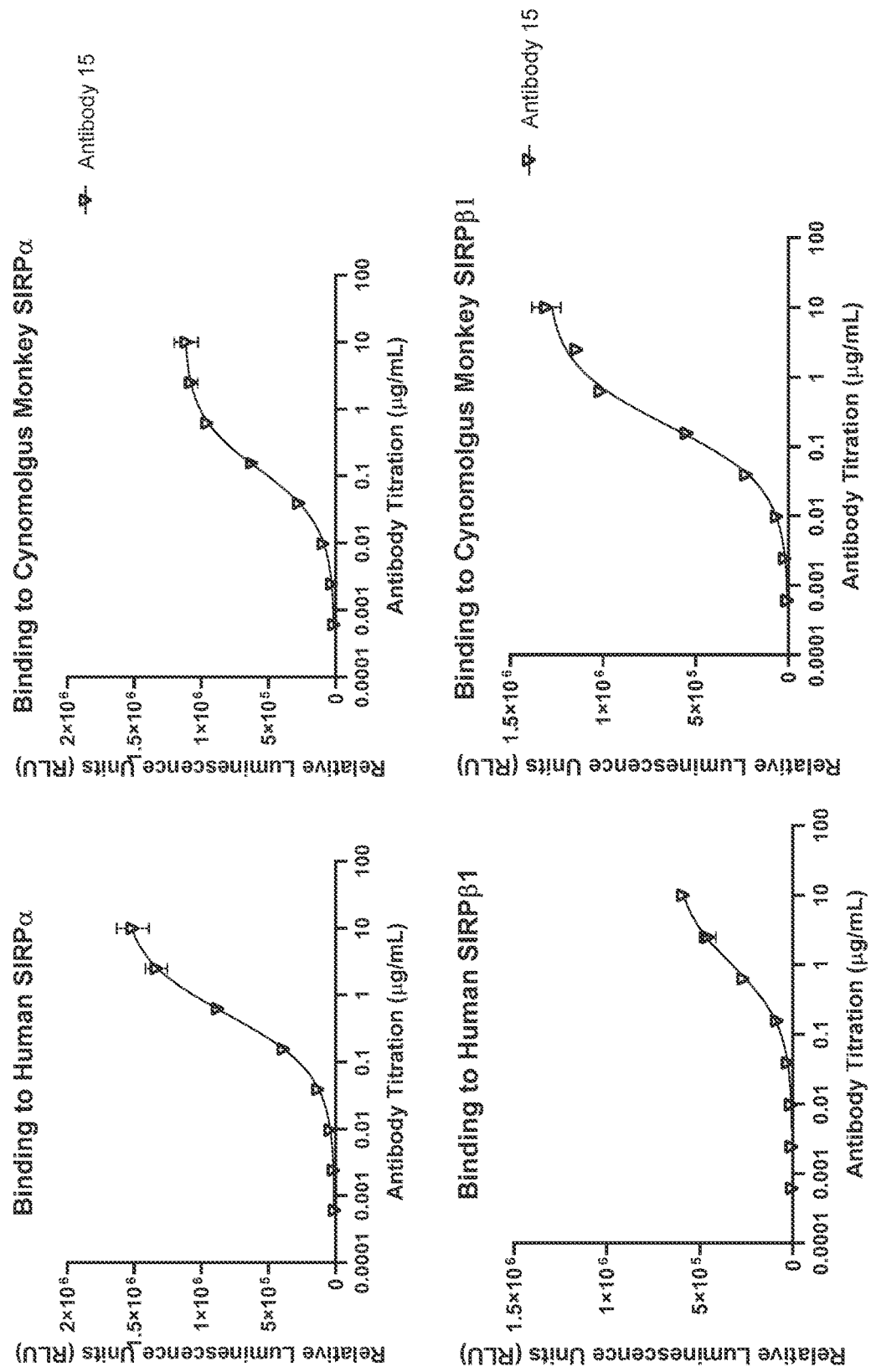
FIG. 2G shows binding curves of Antibody 15 to human and cynomolgus monkey SIRPα (top row) and SIRPβ1 (bottom row) by ELISA.
Figure 2H:
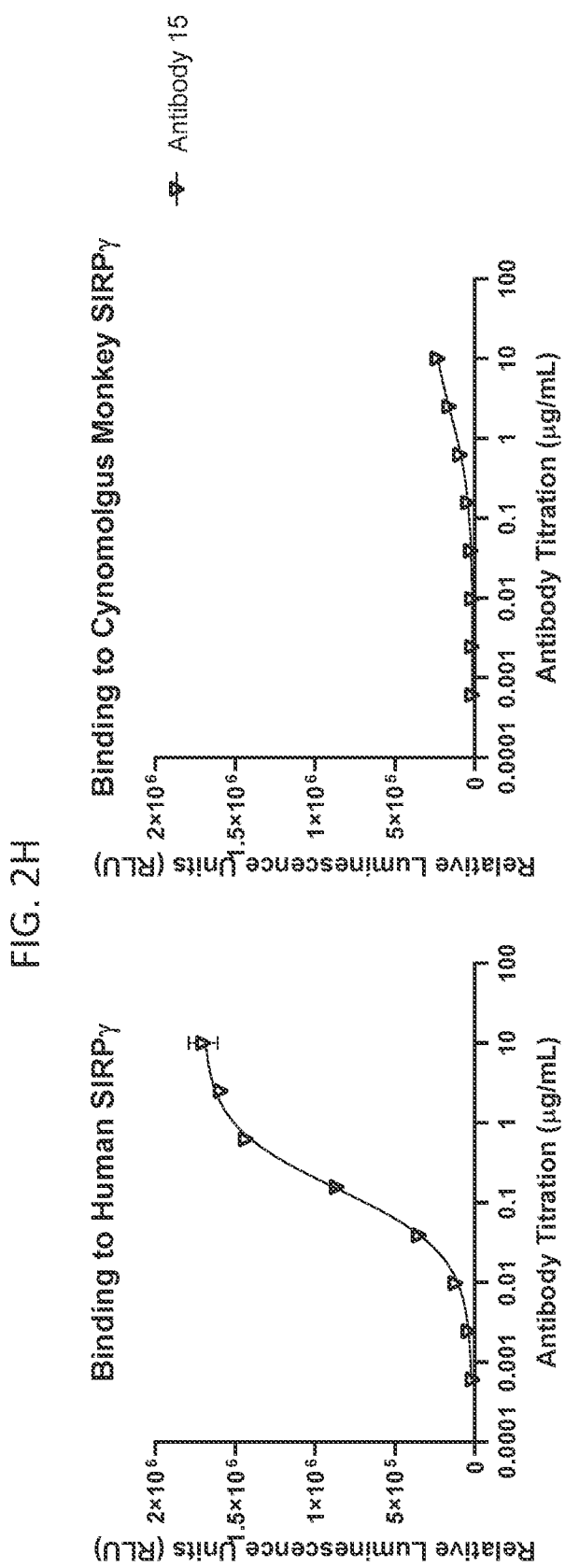
FIG. 2H shows binding curves of Antibody 15 to human and cynomolgus monkey SIRPγ by ELISA.

FIGS. 2A-2B shows binding curves of SIRP antibodies to human SIRPα V1 and cynomolgus monkey SIRPα by ELISA. Select SIRP antibodies were purified by Protein G from hybridoma supernatants and analyzed in a titration via ELISA. Briefly, 1 μg/mL of extracellular domain SIRPα was coated onto high protein-binding plates and blocked. Purified antibodies were added in a titration to the coated plates. The antibodies were detected by an anti-rat IgG antibody and a chemiluminescent substrate.

FIGS. 2C-2H shows binding curves of SIRP antibodies to human SIRPα V1, human SIRPβ1, human SIRPγ, cynomolgus monkey SIRPα, cynomolgus monkey SIRPβ1, and cynomolgus monkey SIRPγ by ELISA. Select SIRP antibodies were purified by Protein G from hybridoma supernatants and analyzed in a titration via ELISA. Briefly, 2 μg/mL of extracellular domain of each of the SIRPs was coated onto high protein-binding plates and blocked. Purified antibodies were added in a titration to the coated plates. The antibodies were detected by an anti-rat IgG or an anti-mouse IgG antibody and a chemiluminescent substrate.

FIGS. 3A-3C show binding curves of SIRP antibodies and two isotype controls with human Fc to human SIRPα V1, human SIRPβ1, human SIRPγ and cynomolgus monkey SIRPα by ELISA. Select SIRP antibodies from Example 1 were fully made human. Isotype control 1 was an unrelated human IgG1 antibody with irrelevant CDRs. Isotype control 2 was the same as isotype control 1 but contained the same amino acid substitutions in the Fc region as some of the selected SIRP antibodies for increased FcγR binding (referring to Table 11). DNA was transiently transfected into CHO cells for 7 days. Antibodies were purified by Protein A from cell supernatants and analyzed in a titration via ELISA as previously described in FIGS. 2A-2B using an anti-human IgG antibody as the detection antibody.

Figure 3D:
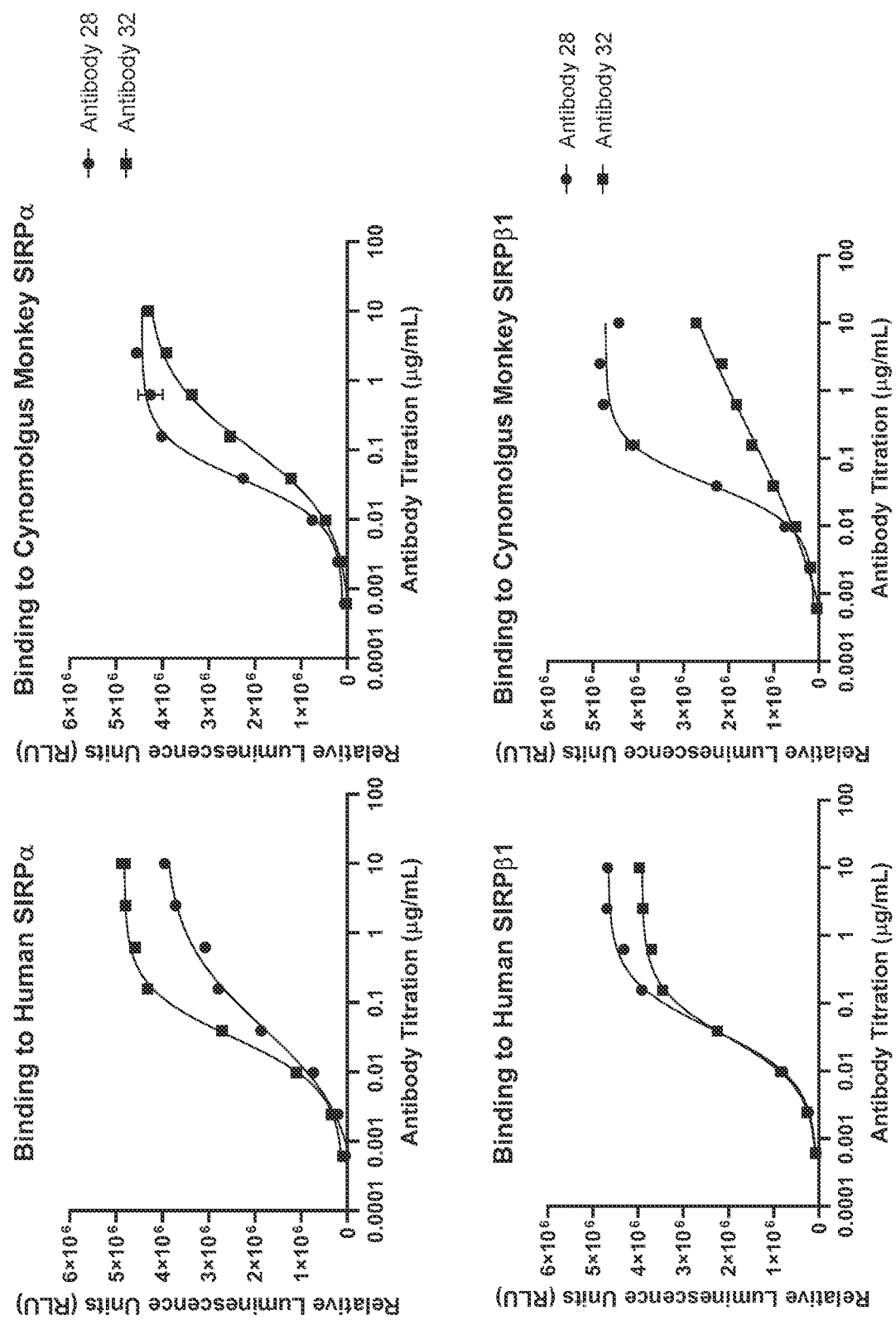
FIG. 3D shows binding curves of selected antibodies of the disclosure to human and cynomolgus monkey SIRPα (top row) and SIRPβ1 (bottom row) by ELISA.
Figure 3E:
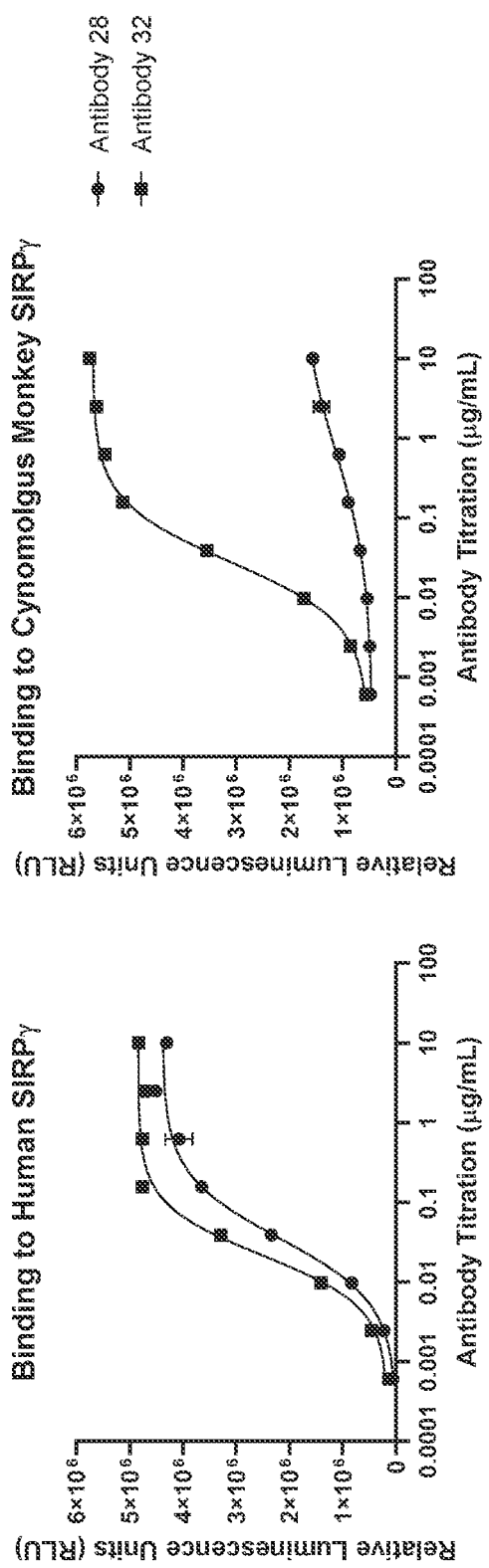
FIG. 3E shows binding curves of selected antibodies of the disclosure to human and cynomolgus monkey SIRPγ by ELISA.

FIGS. 3D-3E shows binding curves of SIRP antibodies with human Fc to human SIRPα V1, human SIRPβ1, human SIRPγ, cynomolgus monkey SIRPα, cynomolgus monkey SIRPβ, and cynomolgus monkey SIRPγ by ELISA. Select SIRP antibodies from Example 1 were fully made human. DNA was transiently transfected into CHO cells for 7 days. Antibodies were purified by Protein A from cell supernatants and analyzed in a titration via ELISA as previously described in FIG. 2C-2H using an anti-human IgG antibody as the detection antibody.

Selected antibodies were tested for their affinities to two hSIRPα variants (V1 and V2), and to cynomolgus monkey (herein referred to as "cyno") SIRPα. The composition of these antibodies is presented in Tables 10 and 11. The affinities of these SIRP antibodies were determined using surface plasmon resonance. The SIRP antibodies were flowed onto a chip and captured by an anti-mouse IgG or an anti-human IgG covalently coupled to the surface of the chip. A three-point titration of the extracellular binding domain of hSIRPα was performed per the manufacturer's recommended protocols. The resulting kinetic data were analyzed and fitted globally using a 1:1 binding model and calculated affinities are presented in Table 13 and Table 14 below. The tables show the KD (affinity) of binding of selected antibodies to monomeric human SIRPα and monomeric cynomolgus monkey SIRPα, as assayed by BIACORE.

Select SIRP antibodies were tested for their affinities to human SIRPα, SIRPβ1, and SIRPγ using a biolayer interferometry (BLI) Octet system (Pall ForteBio). The composition of these antibodies is presented in Tables 10 and 11. Each SIRP antibody with rat or mouse Fc was immobilized on a biosensor tip by an anti-mouse IgG capture (AMC). Antibodies with human Fc were digested with gingipain K enzyme to yield monomeric F(ab'), biotinylated, then coated onto streptavidin biosensors. SIRP-His monomer protein at three concentrations (100 nM, 33.3 nM, 11.1 nM) were exposed to the biosensor to measure on-rate kinetics of SIRP antibodies binding to SIRP-His protein. The biosensors were then exposed to wash buffer to measure off-rate kinetics. The resulting kinetic data were analyzed and fitted using a 1:1 binding model with $k_{on}$ and $k_{dis}$ fitted separately at each SIRP-His protein concentration. $K_D$ affinities were calculated as $k_{dis}$ to $k_{on}$ ratio at each concentration of SIRP-His and averaged. This average of the $K_D$ affinities for each antibody is presented in Table 15 below. The table shows the $K_D$ of binding of selected antibodies to monomeric human SIRPα, SIRPβ1, and SIRPγ, as assayed by ForteBio Octet.

TABLE 13

Affinities ($K_D$) of SIRP Antibodies with rat Fc to Human SIRPα V1 and Cyno SIRPα

| Antibody No. | Human SIRPα V1 (M) | Cyno SIRPα (M) |
| --- | --- | --- |
| 1 | 5.79E−07 | 5.81E−07 |
| 3 | 4.57E−09 | 5.13E−07 |
| 7 | 4.98E−08 | 5.61E−08 |
| 13 | 1.26E−08 | 1.67E−08 |

TABLE 14

Affinities ($K_D$) of SIRP Antibodies with human Fc to Human SIRPα V1 and Cyno SIRPα

| Antibody No. | Human SIRPα V1 (M) | Human SIRPα V2 (M) | Cyno SIRPα (M) |
|---|---|---|---|
| 21 | 3.01E−08 | 3.66E−08 | 7.54E−08 |
| 23 | 3.23E−08 | 3.74E−07 | 3.84E−07 |
| 24 | 2.89E−09 | 2.26E−08 | 1.50E−08 |
| 25 | 1.14E−08 | 9.09E−09 | 1.26E−08 |
| 26 | 3.89E−08 | not tested | 6.60E−08 |
| 28 | 3.11E−07 | 3.73E−07 | 3.61E−07 |
| 29 | 8.32E−9 | 1.03E−08 | 1.11E−08 |

TABLE 15

Affinities ($K_D$) of SIRP Antibodies with rat, mouse, or human Fcs to Human SIRPα V1, SIRPβ1, and SIRPγ

| Antibody No. | Human SIRPα V1 (M) | Human SIRPβ1 (M) | Human SIRPγ (M) |
|---|---|---|---|
| 1 | 3.71E−08 | 3.52E−06 | 9.73E−07 |
| 3 | 3.10E−09 | 7.50E−06 | 1.03E−07 |
| 4 | 4.61E−08 | N/A | 2.41E−08 |
| 7 | 3.83E−08 | N/A | 3.27E−07 |
| 8 | 4.66E−08 | 7.89E−08 | 5.00E−08 |
| 9 | 1.24E−09 | 1.36E−08 | 8.05E−09 |
| 10 | 5.76E−08 | N/A | 1.37E−09 |
| 11 | 3.74E−09 | 6.19E−08 | 1.33E−08 |
| 12 | 5.31E−09 | N/A | <1.0E−12 + |
| 13 | 9.22E−10 | 2.99E−06 | <1.0E−12 + |
| 14 | 9.84E−06 | N/A | 3.87E−08 |
| 15 | 2.44E−10 | N/A | 5.44E−08 |
| 28 | 1.49E−08 | 5.55E−07 | 1.34E−06 |

Figure 4A:
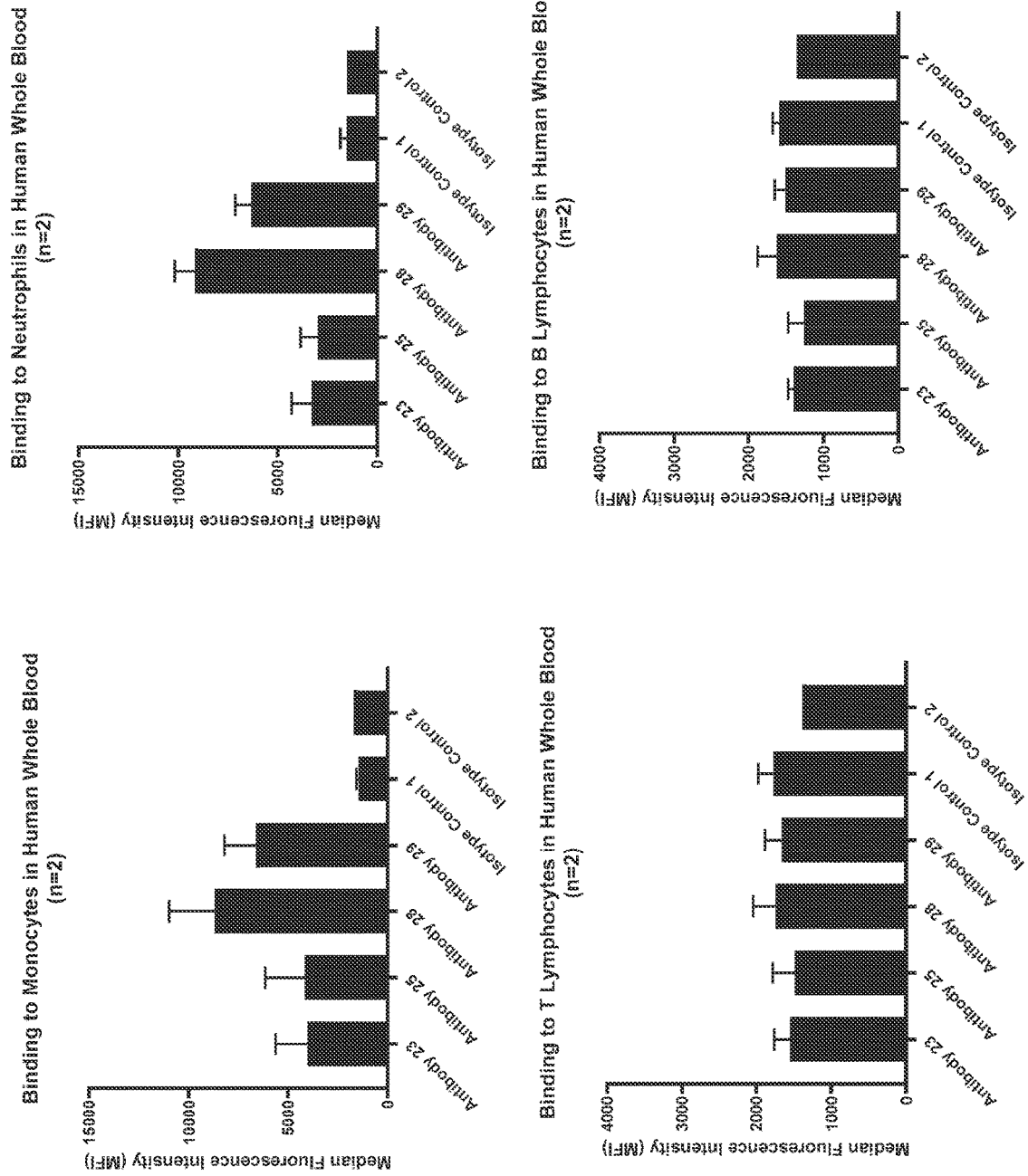
FIG. 4A shows the binding curves of selected antibodies of the disclosure to monocytes, neutrophils, T lymphocytes and B lymphocytes in human whole blood by flow cytometry.
Figure 4B:
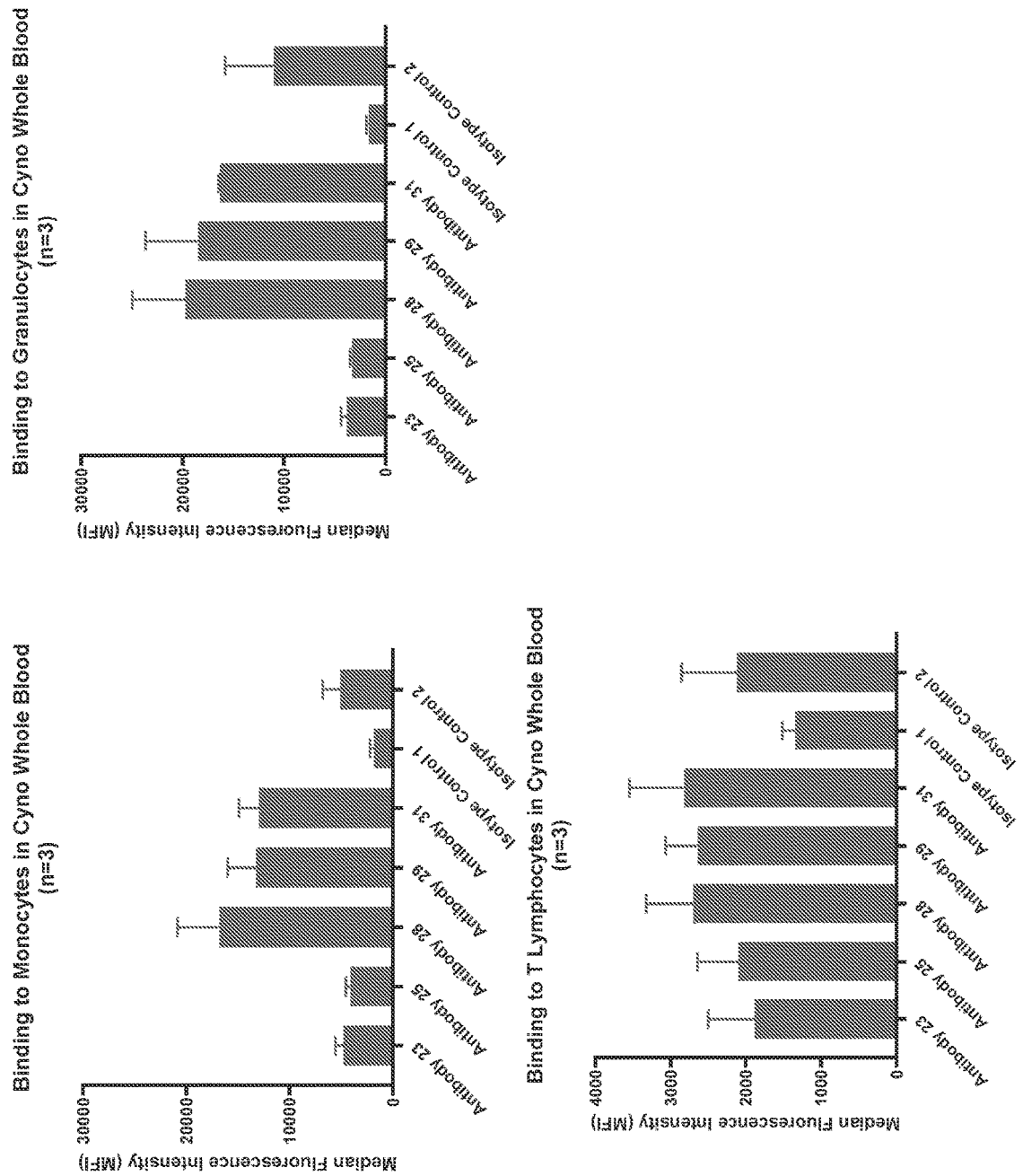
FIG. 4B shows the binding curves of selected antibodies of the disclosure to monocytes, granulocytes and T lymphocytes in cynomolgus monkey (cyno) whole blood by flow cytometry.

N/A = Not applicable, fit $R^2$ < 0.75
+ No dissociation was seen in the time frame (600 seconds) of the assay Example 3: Binding of SIRP Antibodies to Cells In Vitro Via Flow Cytometry Selected antibodies and two isotype controls were tested for binding to human monocytes, neutrophils, T lymphocytes, and B lymphocytes. FIG. 4A shows the results of binding studies performed with SIRP antibodies to monocytes, neutrophils, T lymphocytes, and B lymphocytes in human whole blood compared to two isotype controls. 50 µg/mL fluorescent dye-conjugated SIRP antibodies or isotype controls were incubated with whole blood from two normal donors. Positive signal was detected on monocytes and neutrophils via flow cytometry. No signal was detected for T lymphocytes and B lymphocytes when compared to isotype controls. Monocytes were identified as the CD45+ and CD14+ population. Neutrophils were identified as the CD45+, CD14−, CD19−, $SSC^{high}$, and CD16+ population. T lymphocytes were identified as the CD45+, CD14−, CD19−, $SSC^{low}$, CD3+, and CD16− population. B lymphocytes were identified as the CD45+, $SSC^{low}$, and CD19+ population. Graphs depict the median fluorescence intensity (MFI) of each population. Selected antibodies and two isotype controls were tested for binding to cynomolgus monkey monocytes, granulocytes, and T lymphocytes. Isotype controls used were the same as for human binding experiments. FIG. 4B shows the results of binding studies performed with SIRP antibodies and isotype controls to monocytes, granulocytes, and T lymphocytes in cyno whole blood. 50 µg/mL fluorescent dye-conjugated SIRP antibodies were incubated with whole blood from three normal donors. Positive signal was detected on monocytes, granulocytes, and T lymphocytes via flow cytometry. Monocytes were identified as the CD45+ and CD14+ population. Granulocytes were identified as the CD45+, CD14−, CD19−, and $SSC^{high}$ population. T lymphocytes were identified as the CD45+, CD14−, CD19−, CD3+, and CD16− population. Graph depicts the median fluorescence intensity (MFI) of each population.

Figure 4C:
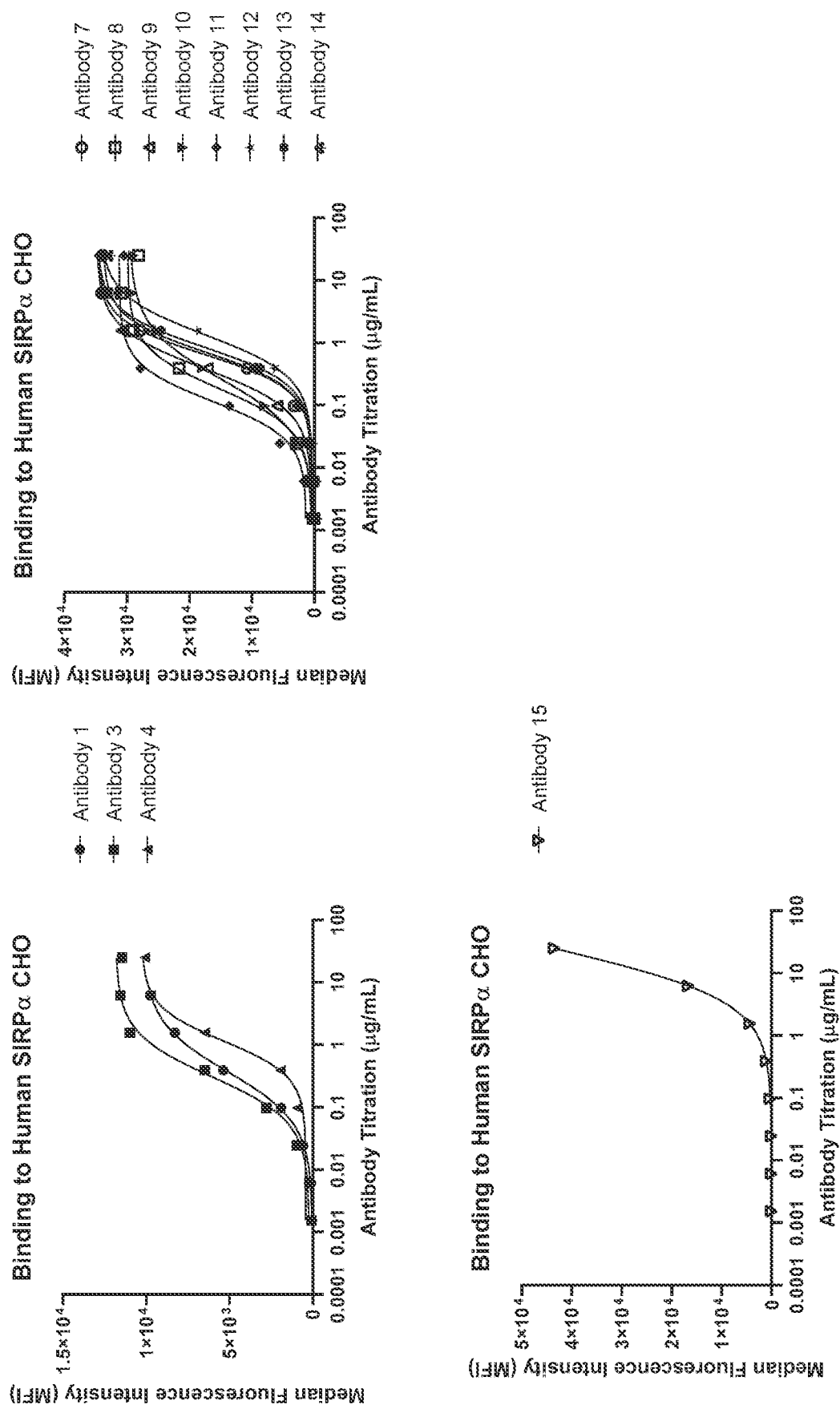
FIG. 4C shows binding curves of selected antibodies of the disclosure to human SIRPα-expressing CHO cells by flow cytometry.
Figure 4D:
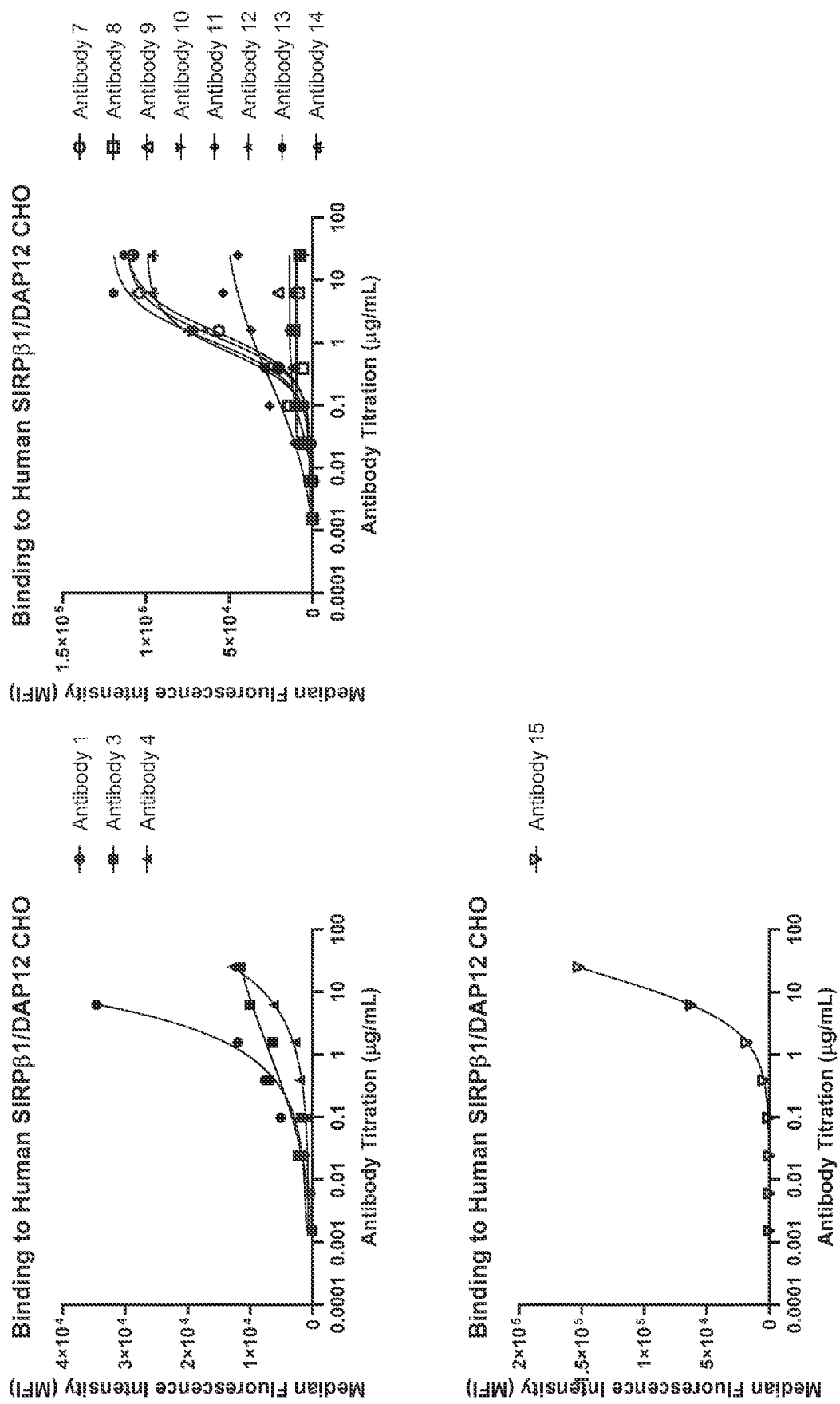
FIG. 4D shows binding curves of selected antibodies of the disclosure to human SIRPβ1/DAP12-expressing CHO cells by flow cytometry.
Figure 4E:
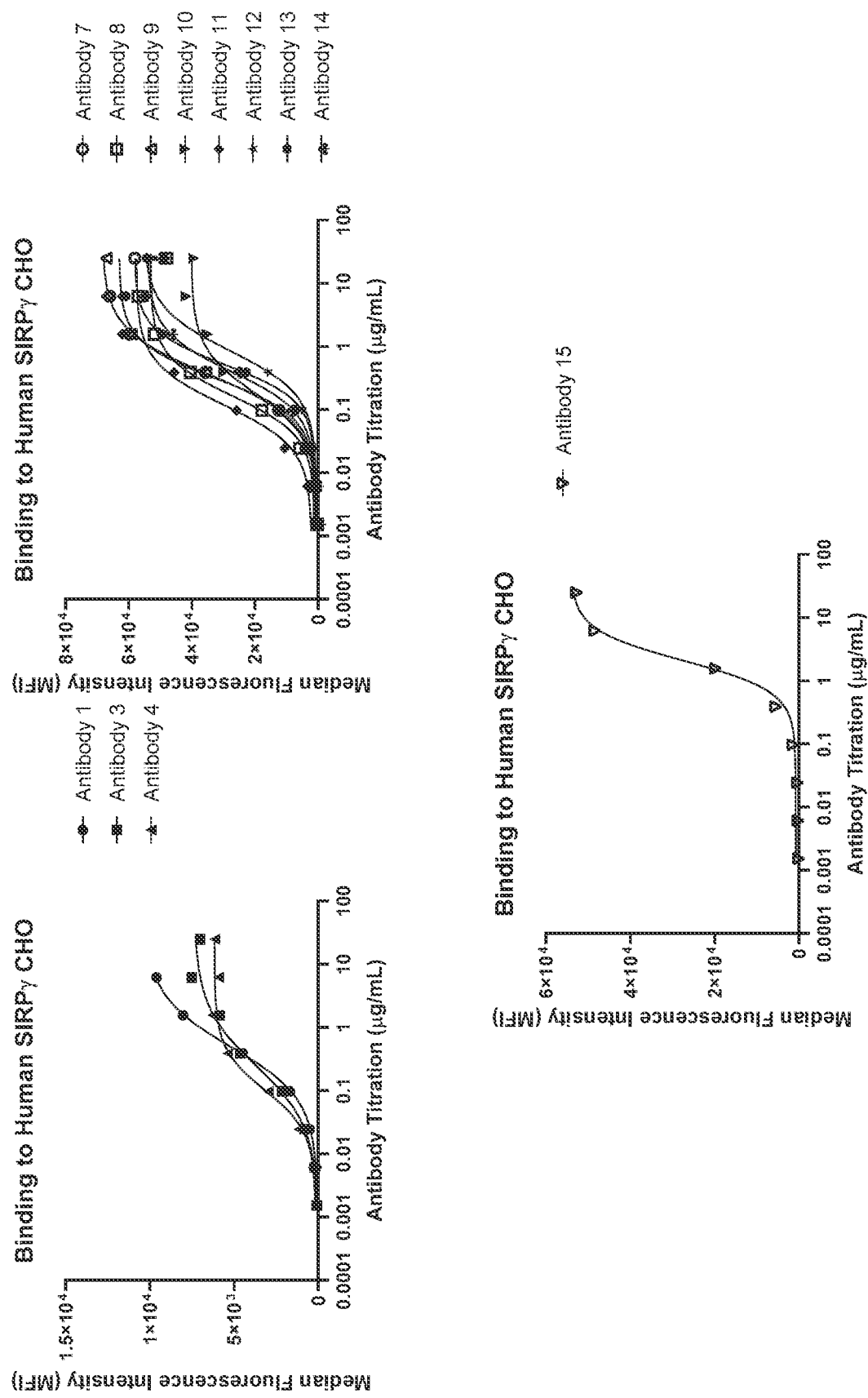
FIG. 4E shows binding curves of selected antibodies of the disclosure to human SIRPγ-expressing CHO cells by flow cytometry.
Figure 4F:
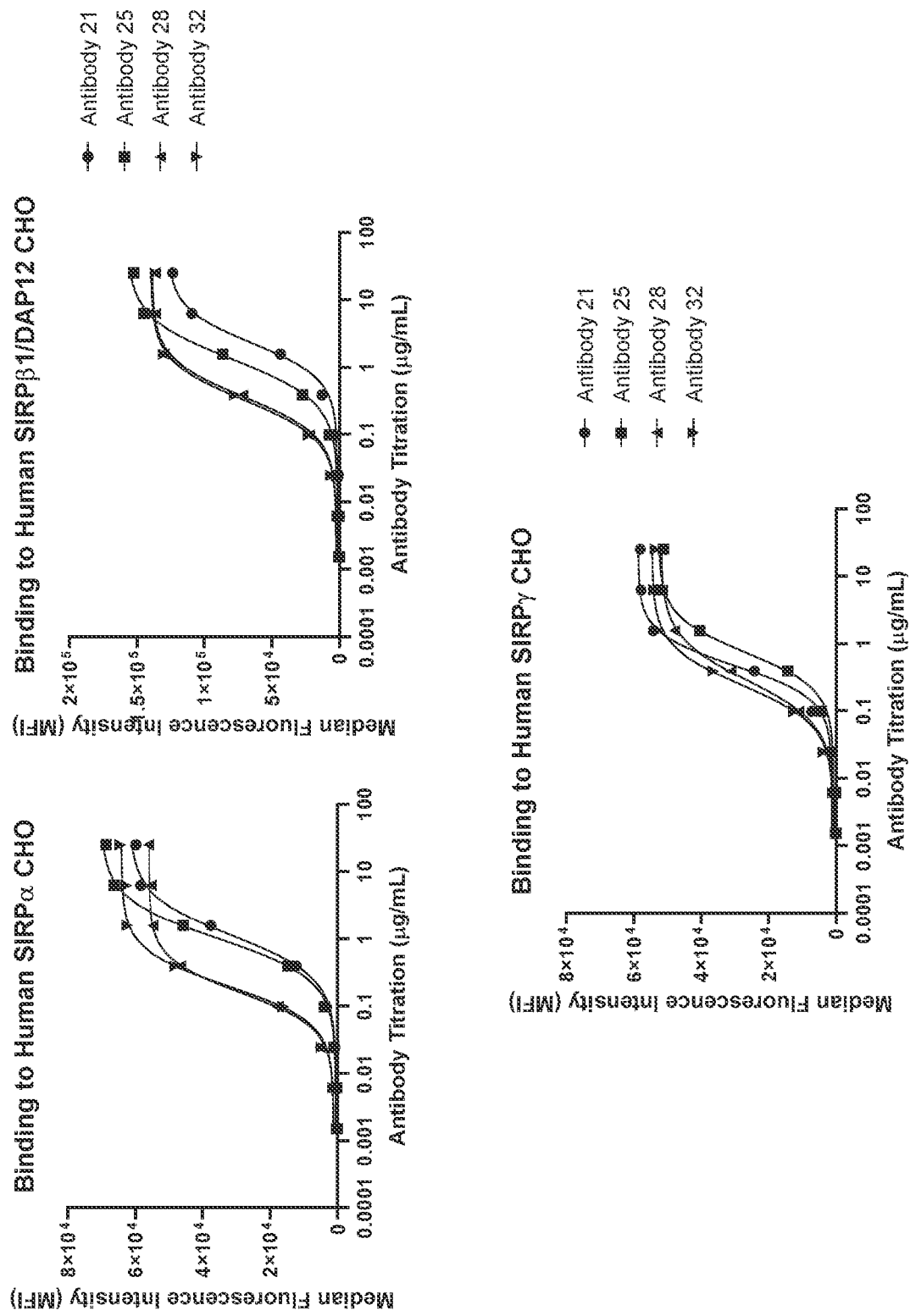
FIG. 4F shows binding curves of selected antibodies of the disclosure to human SIRPα, SIRPβ1/DAP12 or SIRPγ-expressing CHO cells by flow cytometry.

Selected antibodies were tested for binding to stably transfected human SIRPα, SIRPβ1 (co-transfected with DAP12), or SIRPγ Chinese hamster ovary (CHO) cells via flow cytometry. A titration of SIRP antibodies was added to the cells and detected using a fluorescently labelled secondary antibody. Graph depicts the median fluorescence intensity (MFI) at each concentration. FIGS. 4C-4E shows the binding curves of SIRP antibodies to human SIRPα, SIRPβ, or SIRPγ-expressing CHO cells detected using an anti-rat or anti-mouse IgG antibody. FIG. 4F shows the binding curves of SIRP antibodies to human SIRPα, SIRPβ, or SIRPγ-expressing CHO cells detected using an anti-human IgG antibody.

Example 4: Effect of SIRP Antibodies on ADCC

Figure 5:
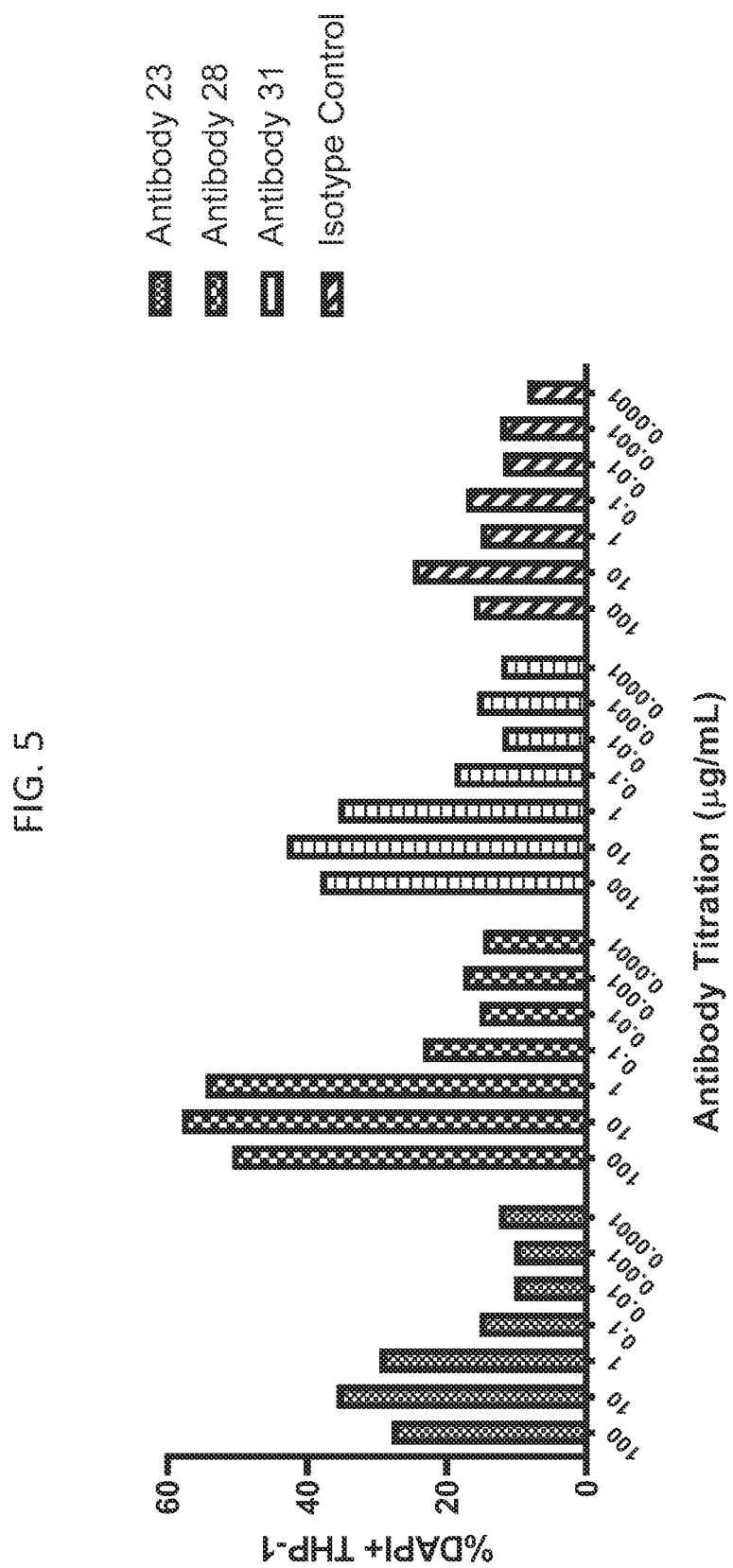
FIG. 5 shows the effect of selected antibodies of the disclosure on antibody dependent cellular cytotoxicity (ADCC) of THP-1 cells in vitro.

Antibody-dependent cell-mediated cytotoxicity (ADCC) induced by selected SIRP antibodies of a SIRPα-expressing human monocyte cell line was evaluated. An immortalized human monocyte-like cell line, THP-1, was stained using an intracellular dye (CellTracker™) and exposed to test article (SIRPα antibodies or isotype control) at various concentrations. Human NK (effector) cells were then co-incubated with the SIRP antibody-opsonized THP-1 (target) cells at an effector cell to target cell ratio of 1:1 for 4 hours at 37° C. Dead cells were stained using DAPI and samples analyzed via flow cytometry. FIG. 5 depicts percent of dual DAPI+ and CellTracker+ THP-1 cells. The data show ADCC of THP-1 cells induced by selected antibodies of the disclosure. The ADCC effect is antibody-dose dependent. The results are presented as compared to an isotype control, an unrelated IgG1 antibody with an irrelevant CDR.

Antibody-dependent cell-mediated cytotoxicity (ADCC) induced by selected SIRP antibodies on primary monocytes was evaluated. SIRPα expressing-human primary monocyte (target) cells were exposed to test article at various concentrations, washed, and then co-incubated with human NK (effector) cells at an effector cell to target cell ratio of 1:1 for 4 hours at 37° C. Samples were stained with anti-CD14 antibody followed by DAPI and analyzed via flow cytometry. The graphs in FIG. 6A depicts percent of dual DAPI+ and CD14+ cells. FIG. 6A shows ADCC of human monocytes induced by selected antibodies of the disclosure. The ADCC effect is antibody-dose dependent. The results are presented as compared to an isotype control, 1, an unrelated IgG1 antibody with an irrelevant CDR.

ADCC induced by selected SIRP antibodies on primary human and cynomolgus monkey monocytes and resting T lymphocytes were evaluated. SIRP expressing-human and cynomolgus monkey primary monocyte or resting T lymphocytes (target) cells were stained with intracellular CellTracker™ Green, washed, and exposed to SIRP antibodies at various concentrations. The target cells were incubated with human NK (effector) cells at an effector-cell to target-cell ratio of 2:1 for 4 hours at 37° C. Samples were stained with Zombie Violet dye and analyzed via flow cytometry. The graph in FIGS. 6B-6D depict percent of cells positive for Zombie Violet dye with respect to total cells positive for CellTracker™ Green (% ADCC). FIG. 6B shows ADCC of human and cyno monocytes induced by selected antibodies of the disclosure. FIG. 6C shows ADCC of human and cyno CD4+ T cells induced by selected antibodies. FIG. 6D shows ADCC of human and cyno CD8+ T cells induced by selected antibodies. The ADCC effect is antibody-dose dependent. The results are presented as compared to isotype controls. Isotype control 1 was an unrelated IgG1 antibody with an irrelevant CDR. Isotype control 2 was the same as isotype control 1 but contained the same high affinity substitutions in the Fc region as some of the selected SIRP antibodies.

Example 5: Effect of SIRP Antibodies on ADCP

The antibody-dependent cellular phagocytosis (ADCP) of a monocytic cell line induced by selected SIRPα antibodies was evaluated. Two human monocytic cell lines, MOLM-13 and THP-1, were labelled with different colored intracellular dyes (CellTracker™ Green and CellTracker™ Deep Red). MOLM-13 (target) cells were opsonized with SIRP antibodies at the indicated concentrations and co-incubated with THP-1 (phagocytes) at a target cell to phagocyte ratio of 1:1 for 2 hours at 37° C. Cells were analyzed by flow cytometry. Graph depicts percent of THP-1 cells positive for two colors. FIG. 7 shows ADCP of MOLM-13 cells by THP-1 cells induced by selected antibodies of the disclosure.

The antibody-dependent cellular phagocytosis (ADCP) of primary monocytes induced by SIRPα antibodies was evaluated. Primary human CD14+ monocytes were split into two sets and labelled with different colored intracellular dyes (CellTracker™ Green and CellTracker™ Deep Red). One set (target cells) was opsonized with SIRP antibodies at the indicated concentrations and co-incubated with the other set (phagocytes) at a target cell to phagocyte ratio of 1:1 for 2 hours at 37° C. Cells were analyzed by flow cytometry. Graph depicts percent of phagocytes positive for two colors. FIG. 8 shows ADCP of human monocytes by human monocytes induced by selected antibodies of the disclosure.

Figure 9A:
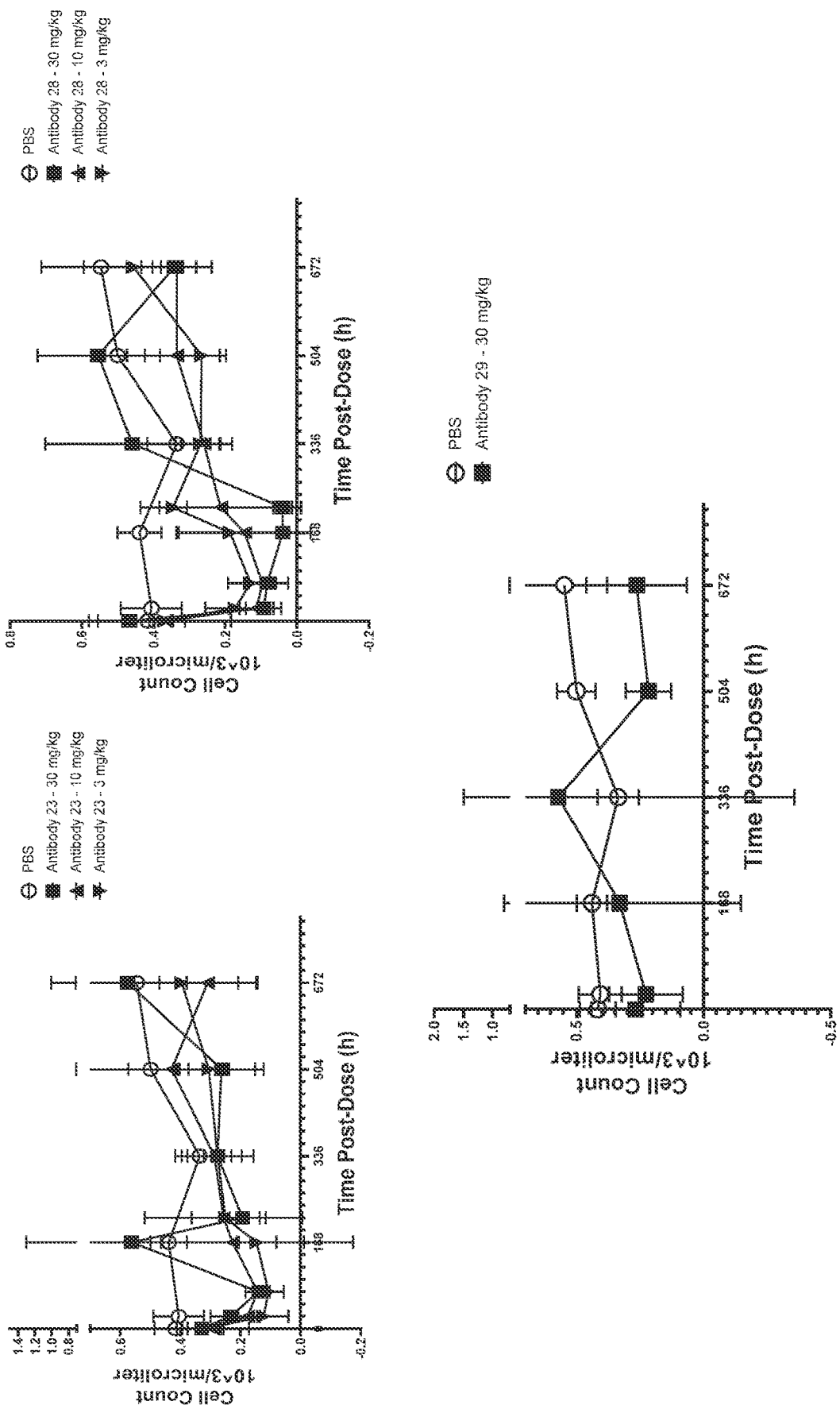

Example 6: Effect of SIRP Antibodies on In Vivo Depletion of Selected Cell Types The effect on monocytes in cynomolgus monkeys dosed intravenously with selected SIRP antibodies was evaluated. Data were generated from whole blood samples collected at different times post-dose and processed according to test facility's Standard Operating Procedures (SOPs). Samples were analyzed on an automated hematology analyzer. Graph depicts average (n=3 monkeys) of absolute monocyte number per microliter of whole blood sample plotted against time. Depletion of monocytes was observed. The effect was transient, but reversible. FIG. 9 shows that intravenous administration of selected antibodies of the disclosure resulted in transient in vivo monocyte depletion in cynomolgus monkeys at the doses indicated.

Figure 10A:
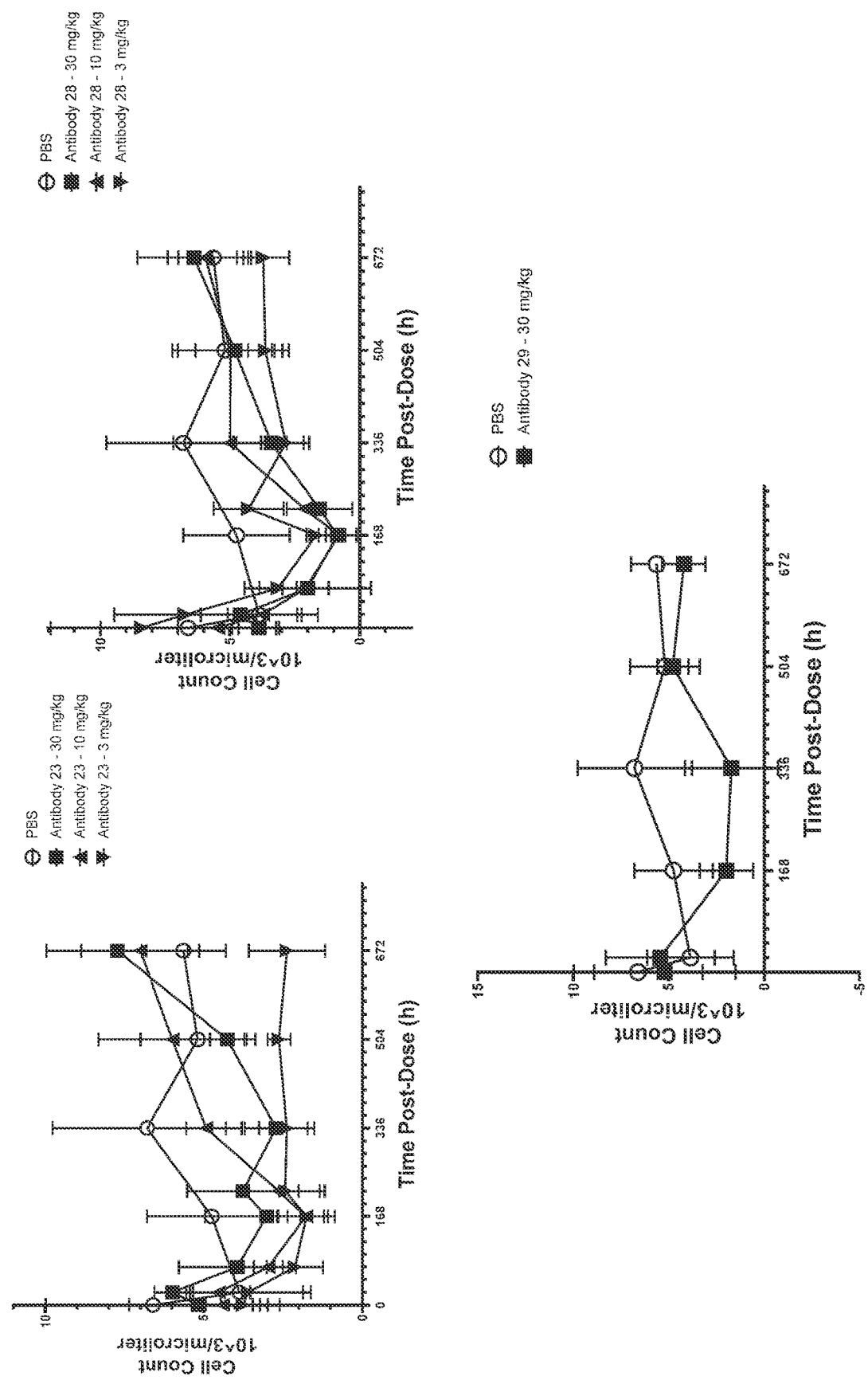

The effect on neutrophils in cynomolgus monkeys dosed intravenously with selected SIRP antibodies was evaluated. Data were generated from whole blood samples collected at different times post-dose and processed according to test facility's Standard Operating Protocols (SOPs). Samples were analyzed on an automated hematology analyzer. Graph depicts average (n=3 monkeys) of absolute neutrophil number per microliter of whole blood sample plotted against time. FIG. 10 shows that intravenous administration of selected antibodies of the disclosure resulted in transient in vivo neutrophil depletion in cynomolgus monkeys at the doses indicated.

Figure 11A:
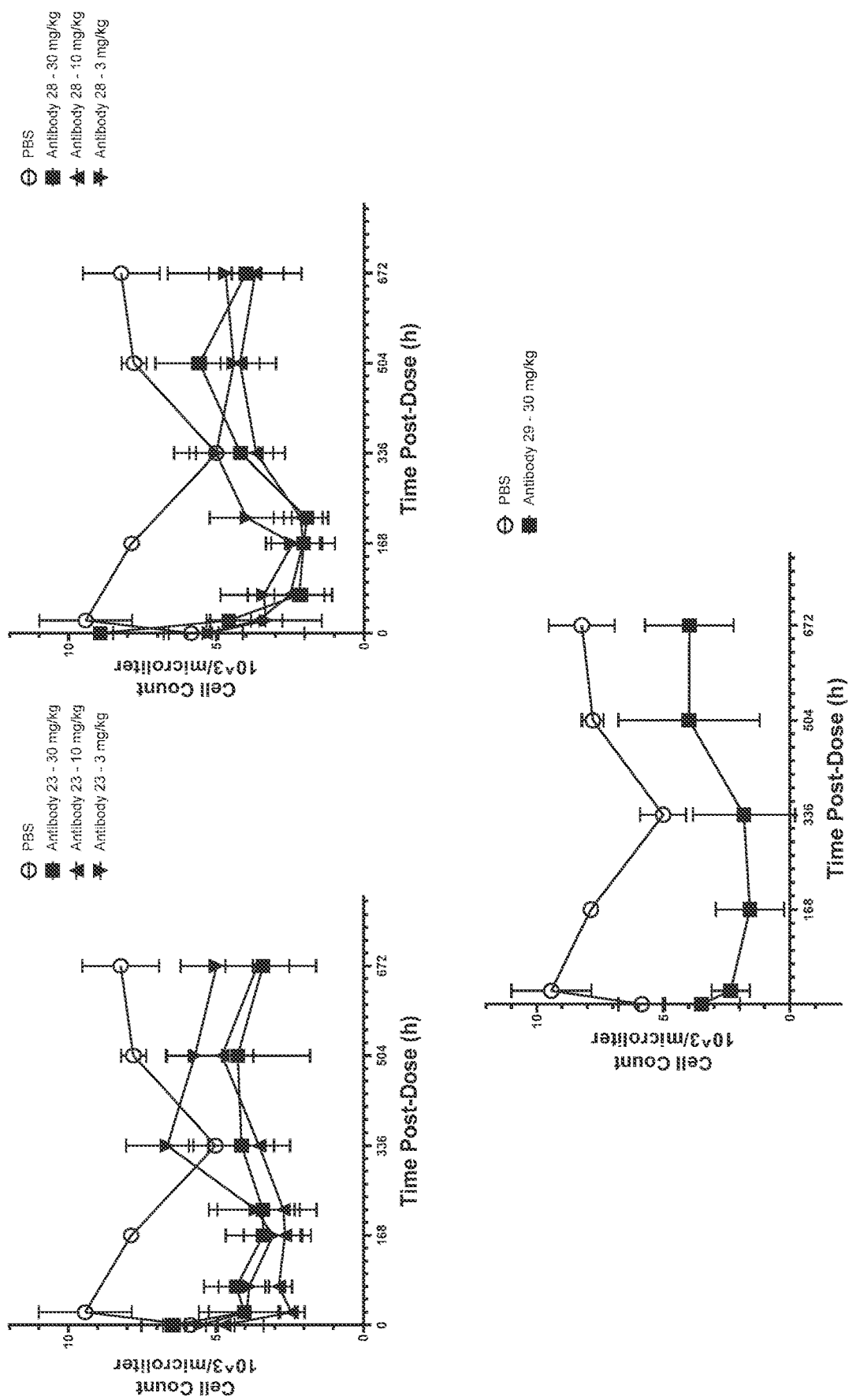
FIGS. 11A-11B show the effect of selected antibodies of the disclosure on lymphocyte depletion in vivo.
Figure 11B:
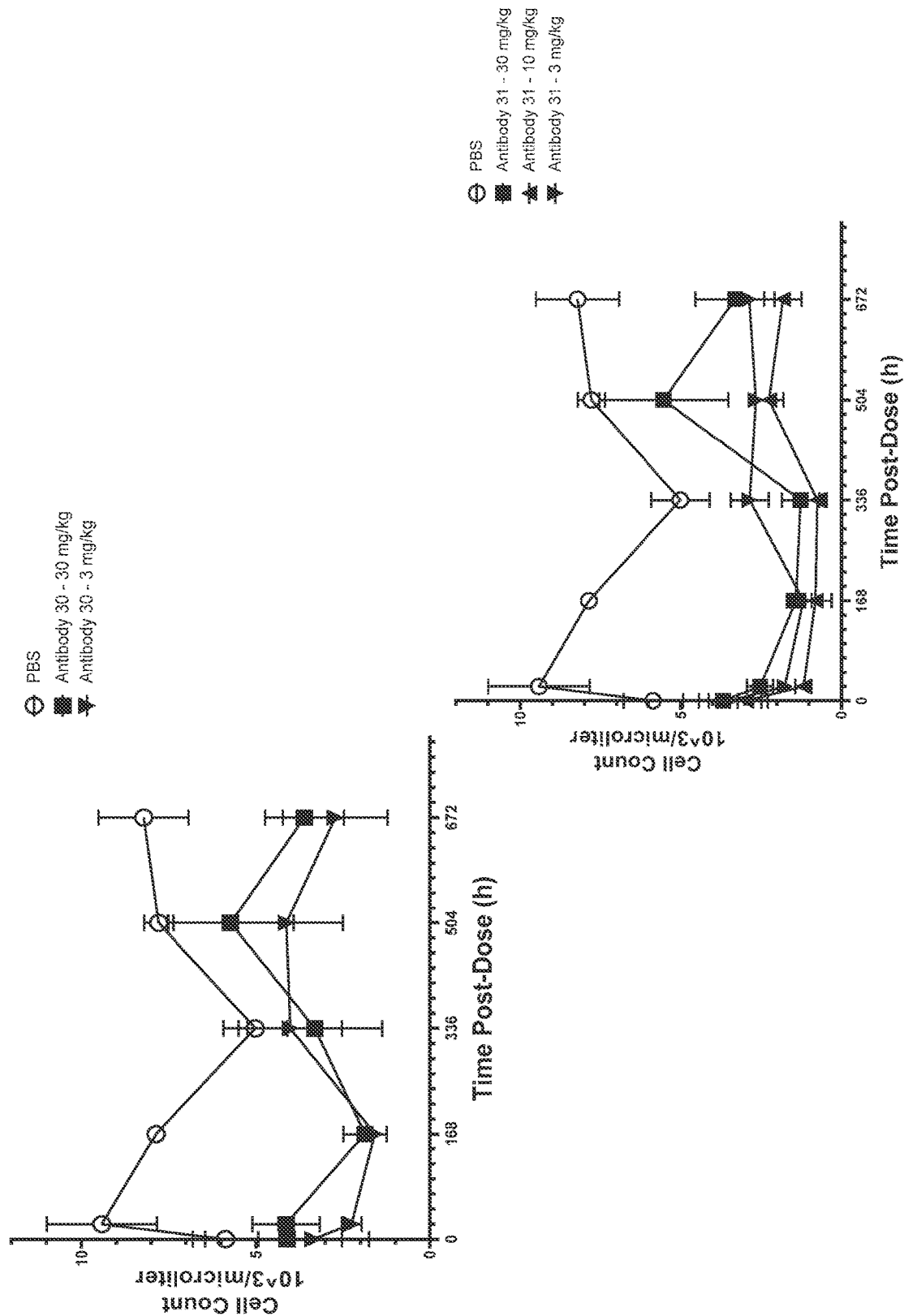

The effect on lymphocytes in cynomolgus monkeys dosed intravenously with selected SIRP antibodies was evaluated. Data were generated from whole blood samples collected at different times post-dose and processed according to test facility's Standard Operating Protocols (SOPs). Samples were analyzed on an automated hematology analyzer. Graph depicts average (n=3 monkeys) of absolute lymphocyte number per microliter of whole blood sample plotted against time. FIG. 11 shows that intravenous administration of selected antibodies of the disclosure resulted in transient in vivo lymphocyte depletion in cynomolgus monkeys at the doses indicated.

Figure 12A:
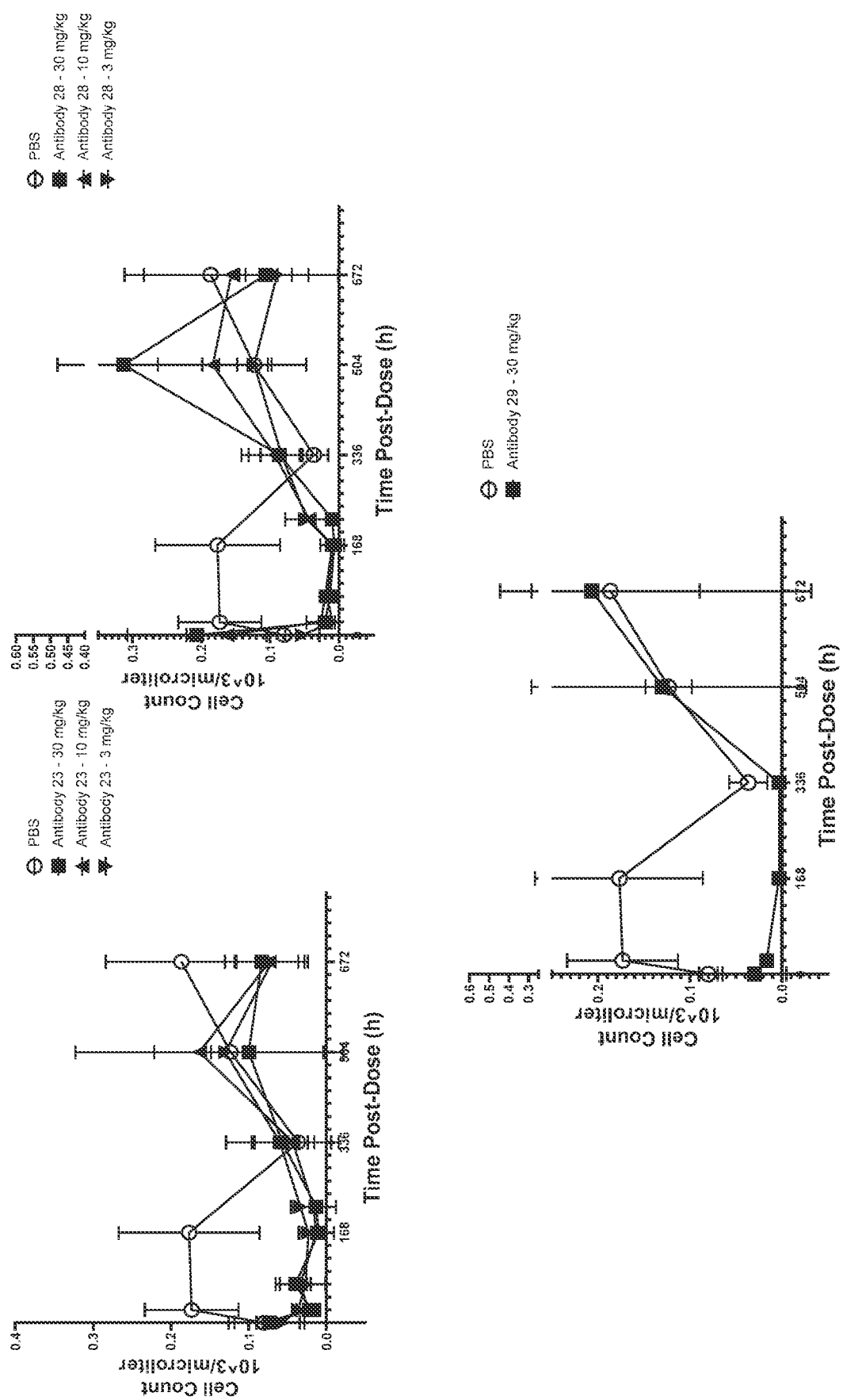

The effect on eosinophils in cynomolgus monkeys dosed intravenously with selected SIRP antibodies was evaluated. Data was generated from whole blood samples collected at different times post-dose and processed according to test facility's Standard Operating Protocols (SOPs). Samples were analyzed on an automated hematology analyzer. Graph depicts average (n=3 monkeys) of absolute eosinophil number per microliter of whole blood sample plotted against time. FIG. 12 shows that intravenous administration of selected antibodies of the disclosure resulted in transient in vivo eosinophil depletion in cynomolgus monkeys at the doses indicated.

Figure 13A:
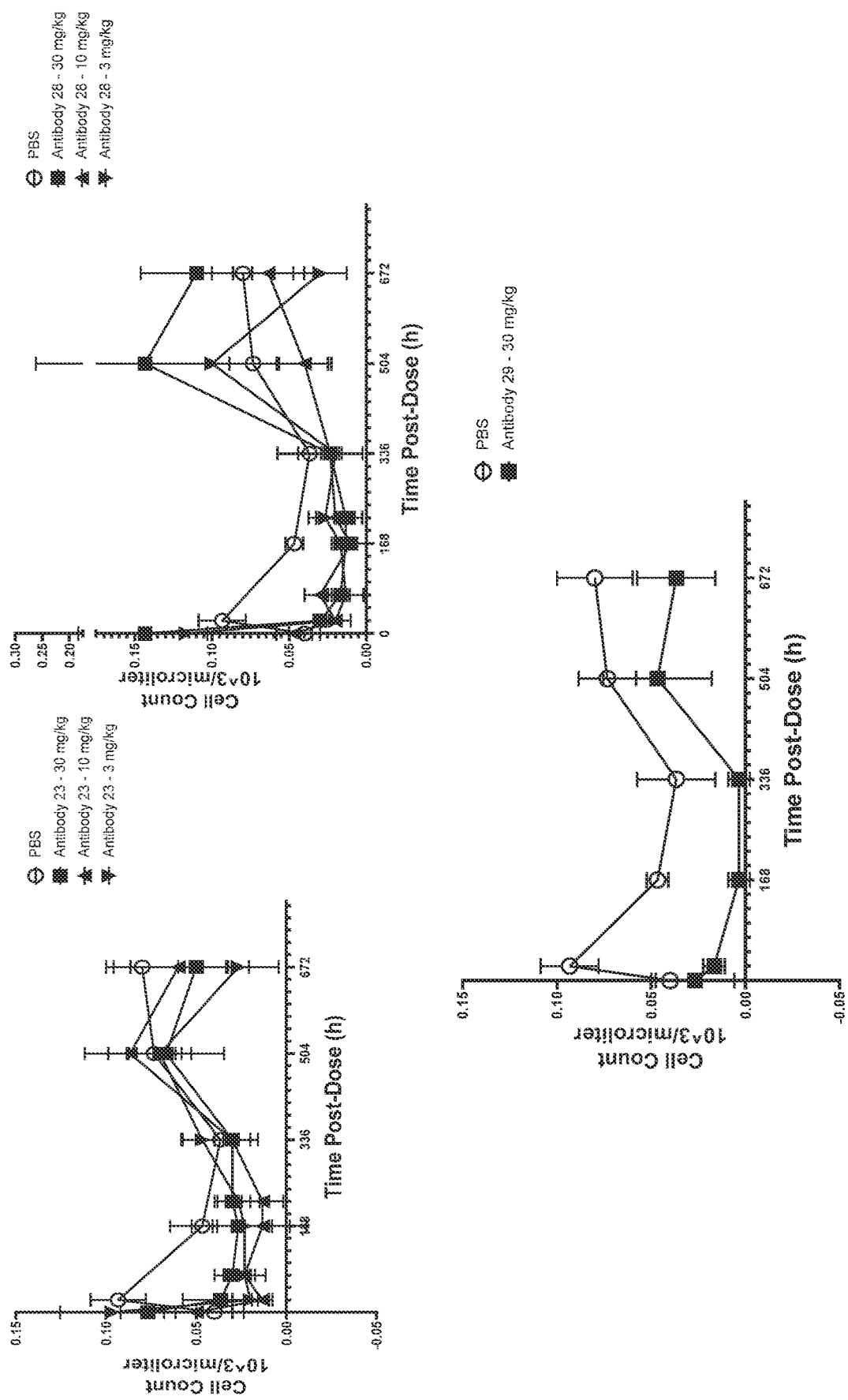
FIGS. 13A-13B show the effect of selected antibodies of the disclosure on basophil depletion in vivo.
Figure 13B:
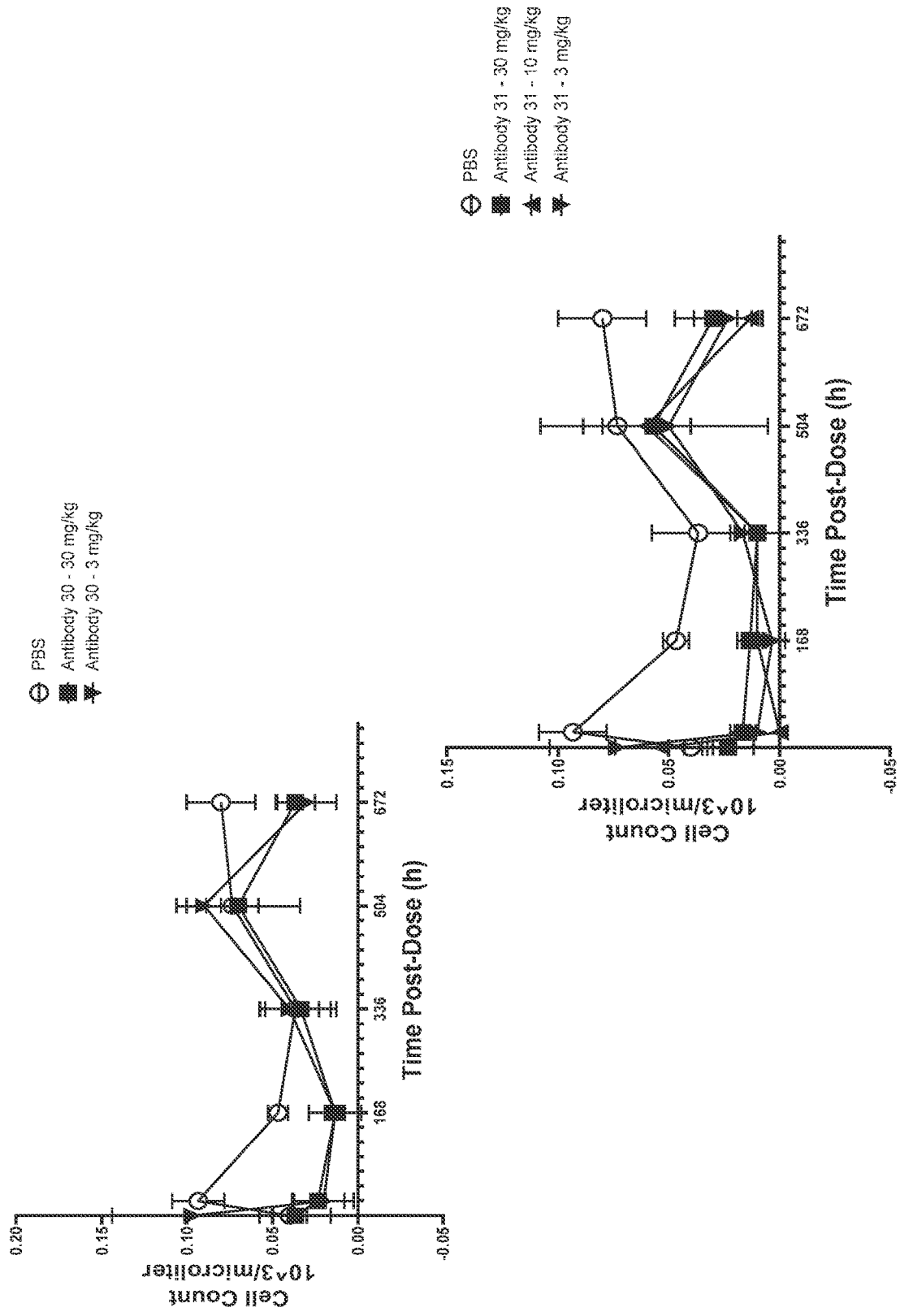

The effect on basophils in cynomolgus monkeys dosed intravenously with selected SIRP antibodies was evaluated. Data were generated from whole blood samples collected at different times post-dose and processed according to test facility's Standard Operating Protocols (SOPs). Samples were analyzed on an automated hematology analyzer. Graph depicts average (n=3 monkeys) of absolute basophil number per microliter of whole blood sample plotted against time. FIG. 13 shows that intravenous administration of selected antibodies of the disclosure resulted in transient in vivo basophil depletion in cynomolgus monkeys at the doses indicated.

Example 7: Determination of SIRP Antibody Competition with CD47 for Binding to SIRPα

Figure 14:
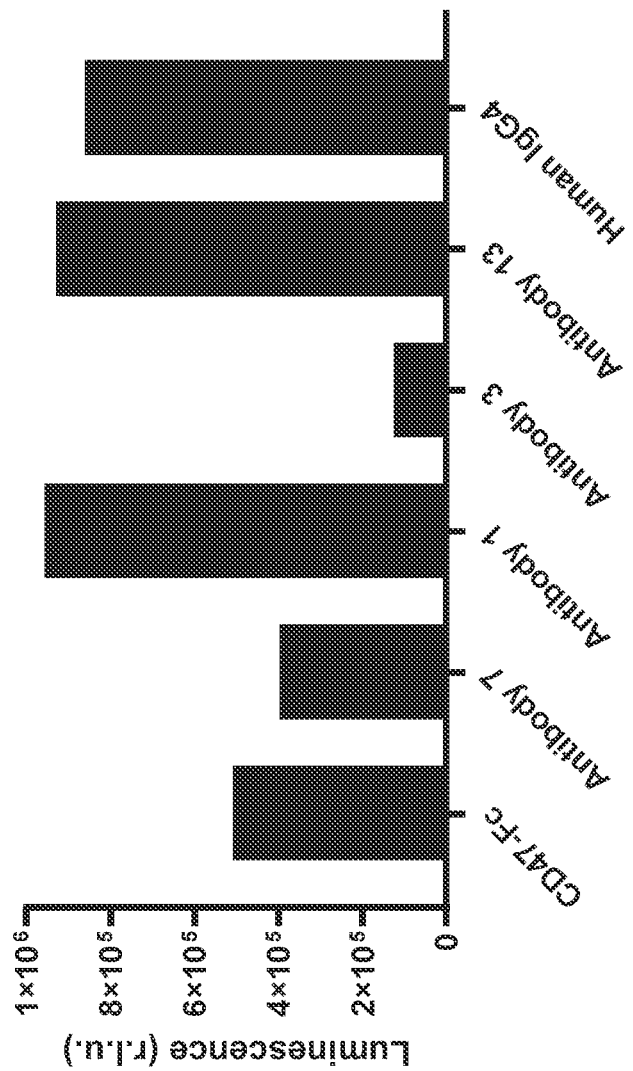
FIG. 14 is a graph depicting the results of an ELISA experiment assessing the ability of various antibodies to compete with CD47 for binding to human SIRPα.

ELISA analyses were performed to assess whether the SIRP antibodies of the disclosure compete with CD47-Fc for binding to hSIRPα, and whether any of the SIRP antibodies could displace CD47-Fc from binding to hSIRPα. To carry out the competition experiments, the extracellular binding domain of SIRPα was coated onto a 384-well plate and allowed to incubate overnight. Next, blocking solution was added. Next, each SIRP antibody at a concentration of 10 μg/mL was incubated on the plate for 1 hour. Biotinylated CD47-Fc at a concentration of 2.5 μg/mL was next added and allowed to equilibrate for 1 hour. Next, following a wash, streptavidin-HRP was added, and the plate was washed again, and next developed using substrate, following standard protocols. The plate was then read on a plate reader to assess the luminescence. A non-SIRPα-binding human IgG4 monoclonal antibody was used as a negative binding control. Non-biotinylated CD47-Fc was used as a positive control. A subset of the antibodies tested and shown in FIG. 14 showed significant disruption of the CD47-Fc binding to hSIRPα. A subset of the antibodies tested and shown in FIG. 14 show no or negligible disruption of the CD47-Fc binding to hSIRPα. Antibodies 1, and 13 do not disrupt the binding of CD47, they do not compete with CD47. Antibodies 3 and 7 inhibit the binding of CD47 to SIRPα at least partially. The competition data shown in FIG. 14 show varying degrees of luminescence for the antibodies tested, suggesting some antibodies bind to different regions on SIRPα.

SIRP antibodies were tested for their ability to interfere with SIRP-CD47 binding using the biolayer interferometry (BLI) Octet system (Pall ForteBio). Streptavidin (SA) biosensors were coated with biotinylated recombinant CD47-His. Human SIRPα or SIRPγ, conjugated to an Fc region, were tested to determine their ability to bind to CD47 immobilized on the biosensors and a response value during association is generated for each. To test for inhibition of SIRP-CD47 binding, select SIRP antibodies (200 nM) were each pre-incubated at a 10-fold molar excess with SIRP-Fc protein (20 nM) and then tested for their ability to block binding of SIRPα-Fc or SIRPγ-Fc to CD47-His-biotin immobilized on the biosensors. Table 16 shows total response values calculated during association for each antibody-SIRPα-Fc or SIRPγ-Fc complex measured and compared, as percent of response, to the binding of SIRPα-Fc or SIRPγ-Fc alone to CD47. A greater than or equal to 100% response indicates no blocking of the binding of the Antibody:SIRP antigen complex to the CD47 receptor. A less than 100% Response indicates blocking or partial blocking of Antibody:SIRP antigen complex to the CD47 receptor.

TABLE 16

Assessment of SIRP Antibodies to Block SIRPα-CD47 or SIRPγ-CD47 Interaction

| Antibody No. | SIRPα-CD47 Response (%) | SIRPγ-CD47 Response (%) |
|---|---|---|
| 1 | 130.00 | 109.56 |
| 3 | −4.69 | −7.23 |
| 4 | −4.60 | −6.94 |
| 7 | 62.40 | 51.68 |
| 8 | −3.27 | −4.94 |
| 9 | −1.77 | −4.72 |
| 10 | −3.65 | −4.29 |
| 11 | −3.86 | −3.80 |
| 12 | 126.87 | 120.02 |

TABLE 16-continued

Assessment of SIRP Antibodies to Block SIRPα-CD47 or SIRPγ-CD47 Interaction

| Antibody No. | SIRPα-CD47 Response (%) | SIRPγ-CD47 Response (%) |
|---|---|---|
| 13 | 126.98 | 110.72 |
| 14 | 52.17 | 14.41 |
| 15 | 115.26 | 129.39 |
| 24 | −7.55 | −37.86 |
| 28 | 173.16 | 144.06 |

Example 8: Effect of SIRP Antibodies on Germinal Centers

Preliminary histological data from non-human primate studies indicate that in vivo administration of a SIRP antibody resulted in decreased germinal center cellularity in the spleen, characterized by decreased size of active germinal centers, fewer numbers of larger lymphocytes and tingible body macrophages, or complete absence of germinal centers. These observations are consistent with the mechanisms of action of the antibodies described herein that are capable of depleting SIRP-expressing cells found in the germinal centers, namely dendritic cells (SIRPα and SIRPβ1) and lymphocytes (SIRPγ). These observations suggest that the antibodies described herein may provide therapeutic effect in diseases where ectopic germinal centers or ectopic lymphoid like structures contribute to pathology including autoimmune disorders such as systemic lupus erythematosus, rheumatoid arthritis, Sjögren's syndrome, multiple sclerosis, Hashimoto's thyroiditis, primary sclerosing cholangitis and primary biliary cirrhosis, and Myasthenia gravis.

---

What is claimed is:

1. An antibody that is specific for one or more of SIRPα and SIRPβ1, and is also specific for SIRPγ, wherein the antibody comprises the heavy and light variable chain CDR sequence combination selected from the group consisting of:
   a. SEQ ID NO: 7, SEQ ID NO: 24, SEQ ID NO: 38, SEQ ID NO: 54, SEQ ID NO: 72, and SEQ ID NO: 88;
   b. SEQ ID NO: 8, SEQ ID NO: 24, SEQ ID NO: 39, SEQ ID NO: 56, SEQ ID NO: 72, and SEQ ID NO: 89;
   c. SEQ ID NO: 11, SEQ ID NO: 27, SEQ ID NO: 42, SEQ ID NO: 59, SEQ ID NO: 75, and SEQ ID NO: 92;
   d. SEQ ID NO: 12, SEQ ID NO: 28, SEQ ID NO: 43, SEQ ID NO: 60, SEQ ID NO: 76, and SEQ ID NO: 93;
   e. SEQ ID NO: 13, SEQ ID NO: 29, SEQ ID NO: 44, SEQ ID NO: 61, SEQ ID NO: 76, and SEQ ID NO: 94;
   f. SEQ ID NO: 13, SEQ ID NO: 30, SEQ ID NO: 45, SEQ ID NO: 62, SEQ ID NO: 77, and SEQ ID NO: 95;
   g. SEQ ID NO: 14, SEQ ID NO: 31, SEQ ID NO: 46, SEQ ID NO: 63, SEQ ID NO: 78, and SEQ ID NO: 96;
   h. SEQ ID NO: 15, SEQ ID NO: 31, SEQ ID NO: 47, SEQ ID NO: 62, SEQ ID NO: 79, and SEQ ID NO: 97;
   i. SEQ ID NO: 17, SEQ ID NO: 32, SEQ ID NO: 48, SEQ ID NO: 64, SEQ ID NO: 80, and SEQ ID NO: 98; and
   j. SEQ ID NO: 18, SEQ ID NO: 33, SEQ ID NO: 49, SEQ ID NO: 65, SEQ ID NO: 81, and SEQ ID NO: 99.

2. The antibody of claim 1, wherein the heavy chain variable region sequence and the light chain variable region sequence are selected from the group consisting of:
   a. SEQ ID NO: 106 or an amino acid sequence with at least 80% sequence identity thereto and SEQ ID NO: 125 or an amino acid sequence with at least 80% sequence identity thereto;
   b. SEQ ID NO: 107 or an amino acid sequence with at least 80% sequence identity thereto and SEQ ID NO: 126 or an amino acid sequence with at least 80% sequence identity thereto;
   c. SEQ ID NO: 110 or an amino acid sequence with at least 80% sequence identity thereto and SEQ ID NO: 129 or an amino acid sequence with at least 80% sequence identity thereto;
   d. SEQ ID NO: 111 or an amino acid sequence with at least 80% sequence identity thereto and SEQ ID NO: 130 or an amino acid sequence with at least 80% sequence identity thereto;

e. SEQ ID NO: 112 or an amino acid sequence with at least 80% sequence identity thereto and SEQ ID NO: 131 or an amino acid sequence with at least 80% sequence identity thereto;
f. SEQ ID NO: 113 or an amino acid sequence with at least 80% sequence identity thereto and SEQ ID NO: 132 or an amino acid sequence with at least 80% sequence identity thereto;
g. SEQ ID NO: 114 or an amino acid sequence with at least 80% sequence identity thereto and SEQ ID NO: 133 or an amino acid sequence with at least 80% sequence identity thereto;
h. SEQ ID NO: 115 or an amino acid sequence with at least 80% sequence identity thereto and SEQ ID NO: 134 or an amino acid sequence with at least 80% sequence identity thereto;
i. SEQ ID NO: 117 or an amino acid sequence with at least 80% sequence identity thereto and SEQ ID NO: 136 or an amino acid sequence with at least 80% sequence identity thereto; and
j. SEQ ID NO: 118 or an amino acid sequence with at least 80% sequence identity thereto and SEQ ID NO: 137 or an amino acid sequence with at least 80% sequence identity thereto.

3. The antibody of claim 1, wherein the antibody comprises an Fc domain.

4. The antibody of claim 1, wherein the antibody is an antibody fragment.

5. The antibody of claim 1, wherein the antibody comprises an Fc domain selected from the group consisting of human IgG1, IgG2, IgG3, and IgG4.

6. The antibody of claim 5, wherein the Fc domain comprises SEQ ID NO: 3, SEQ ID NO: 4 or SEQ ID NO: 26 or one or more amino acid substitutions relative to SEQ ID NO: 3, SEQ ID NO: 4 or SEQ ID NO: 26.

7. The antibody of 5, wherein the Fc domain of the antibody is human IgG1 and comprises at least one amino acid substitution at a position selected from the group consisting of: 214, 215, 221, 222, 228, 234, 235, 236, 239, 240, 241, 243, 244, 245, 247, 250, 252, 254, 256, 262, 263, 264, 265, 266, 267, 268, 269, 270, 292, 296, 297, 298, 299, 300, 305, 313, 324, 325, 326, 327, 328, 329, 330, 332, 333, 334, 345, 356, 358, 396, 428, 430, 433, 434, and 440 wherein the position numbers of the amino acid residues are of the EU numbering scheme.

8. The antibody of claim 1, wherein the binding of the antibody does not disrupt the interaction between CD47 and SIRPα, and/or the interaction between CD47 and SIRPγ.

9. The antibody of claim 1, wherein the binding of the antibody disrupts the interaction between CD47 and SIRPα, and/or between CD47 and SIRPγ.

10. The antibody of claim 1, wherein the antibody:
(a) binds SIRPα, SIRPβ1 and SIRPγ;
(b) binds SIRPα and SIRPγ and exhibits little or no binding to SIRPβ1; or
(c) binds SIRPβ1 and SIRPγ and exhibits little or no binding to SIRPα.

11. A pharmaceutical composition comprising the antibody of claim 1, and optionally a pharmaceutically acceptable carrier.

12. A nucleic acid encoding for the antibody of claim 1.

13. The nucleic acid of claim 12, wherein the heavy chain variable domain and the light chain variable domain are encoded by a nucleic acid sequence selected from the group consisting of:

a. SEQ ID NO: 144, or a nucleic acid sequence with at least 80% sequence identity thereto, and SEQ ID NO: 163, or a nucleic acid sequence with at least 80% sequence identity thereto;
b. SEQ ID NO: 145, or a nucleic acid sequence with at least 80% sequence identity thereto and SEQ ID NO: 164, or a nucleic acid sequence with at least 80% sequence identity thereto;
c. SEQ ID NO: 148, or a nucleic acid sequence with at least 80% sequence identity thereto and SEQ ID NO: 167, or a nucleic acid sequence with at least 80% sequence identity thereto;
d. SEQ ID NO: 149, or a nucleic acid sequence with at least 80% sequence identity thereto and SEQ ID NO: 168, or a nucleic acid sequence with at least 80% sequence identity thereto;
e. SEQ ID NO: 150, or a nucleic acid sequence with at least 80% sequence identity thereto and SEQ ID NO: 169, or a nucleic acid sequence with at least 80% sequence identity thereto;
f. SEQ ID NO: 151, or a nucleic acid sequence with at least 80% sequence identity thereto and SEQ ID NO: 170, or a nucleic acid sequence with at least 80% sequence identity thereto;
g. SEQ ID NO: 152, or a nucleic acid sequence with at least 80% sequence identity thereto and SEQ ID NO: 171, or a nucleic acid sequence with at least 80% sequence identity thereto;
h. SEQ ID NO: 153, or a nucleic acid sequence with at least 80% sequence identity thereto and SEQ ID NO: 172, or a nucleic acid sequence with at least 80% sequence identity thereto;
i. SEQ ID NO: 155, or a nucleic acid sequence with at least 80% sequence identity thereto and SEQ ID NO: 174, or a nucleic acid sequence with at least 80% sequence identity thereto; and
j. SEQ ID NO: 156, or a nucleic acid sequence with at least 80% sequence identity thereto and SEQ ID NO: 175, or a nucleic acid sequence with at least 80% sequence identity thereto.

14. A vector comprising the nucleic acid of claim 13.

15. A method of inducing the depletion of a population of cells, the method comprising contacting the population of cells with the antibody of claim 1.

16. The method of claim 15, wherein the population of cells that express SIRPγ comprise lymphocytes including T cells or NK cells.

17. The method of claim 15, wherein the population of cells that express SIRPα and/or SIRPβ1 comprise myeloid cells or myeloid progenitor cells.

18. The method of claim 15, wherein the population of cells that express SIRP and/or SIRPβ1 comprise monocytes, macrophages, dendritic cells, basophils, eosinophils, neutrophils, or mast cells.

19. The method of claim 15, wherein the method is in vitro.

20. The method of claim 15, wherein the method is in vivo.

21. The method of claim 15, wherein the population of cells comprises tissue-resident cells.

22. The method of claim 15, wherein the population of cells comprises circulating cells.

23. The method of claim 15, wherein the cell depletion involves ADCC and/or ADCP.

24. A method of treating a disease or condition in a subject in need thereof, comprising administering to the subject a therapeutically effective amount of the pharmaceutical composition of claim 11.

25. The method of claim 24, wherein the disease or condition is characterized by overactivation and/or hyperproliferation of lymphocytes, and the antibody induces depletion of lymphocytes.

26. The method of claim 25, wherein the lymphocytes are T cells.

27. The method of claim 24, wherein the disease or condition is characterized by overactivation and/or hyperproliferation of myeloid cells, and the antibody induces depletion of myeloid cells.

28. The method of claim 27, wherein the myeloid cells comprise monocytes, macrophages, dendritic cells, basophils, eosinophils, neutrophils, or mast cells.

29. The method of claim 24, wherein the disease or condition comprises a disease or disorder associated with both lymphocytes and myeloid cells.

30. The method of claim 29, wherein the disease or disorder comprises histiocytosis.

31. The method of claim 30, wherein the histiocytosis comprises hemophagocytic lymphohistiocytosis (HLH) (including primary and secondary HLH), macrophage activation syndrome, Langerhans cell histiocytosis (LCH), indeterminate cell histiocytosis, Erdheim-Chester disease (ECD), mixed LCH/ECD, Rosai Dorfman disease, malignant histiocytosis, cutaneous non-LCH histiocytoses, juvenile xanthogranuloma, virus-associated HLH, bacteria-associated HLH, parasite-associated HLH, fungal-associated (fungal induced) HLH, autoimmune disease mediated HLH, or malignancy-triggered HLH.

32. The method of claim 24, wherein the disease or disorder comprises a granulomatous disease or condition, or a disease characterized by the presence of multinucleated giant cells.

33. The method of claim 24, wherein the disease or condition comprises an autoimmune disorder or an inflammatory disorder.

34. The method of claim 24, wherein the disease or condition is associated with pathological alloantibodies or autoantibodies.

35. The method of claim 24, wherein the disease or disorder comprises a hematological malignancy.

36. The method of claim 24 wherein the subject is human.

37. The method of claim 24, wherein the antibody or pharmaceutical composition is administered intravenously.

38. The method of claim 24, wherein the antibody or pharmaceutical composition is administered subcutaneously.

39. The method of claim 24, wherein the disease or condition is cytokine release syndrome (CRS).

40. The method of claim 39, wherein the CRS is associated with iatrogenic immune activation, infection, T cell therapy, chimeric antigen receptor T cell (CAR-T) therapy, T cell receptor T cell therapy (TCR-T), T cell activating bispecific antibody therapy, or iatrogenic immune suppression.

41. The method of claim 32, wherein the granulomatous disease or condition or the disease characterized by the presence of multinucleated giant cells is selected from the group consisting of sarcoidosis, inflammatory bowel disease (IBD), ulcerative colitis, Crohn's disease, Takayasu arteritis, giant cell arteritis, granulomatosis with polyangiitis (Wegener's Granulomatosis), giant cell myocarditis, chronic granulomatous disease, eosinophilic granulomatosis with polyangiitis (Churg-Strauss Syndrome), and chronic beryllium disease (berylliosis).

42. The method of claim 33, wherein the autoimmune disorder comprises presentation of self antigens by antigen presenting dendritic cells in germinal centers of secondary lymphoid tissue of the subject.

43. The method of claim 33, wherein the autoimmune disorder or a chronic or acute inflammatory disorder is selected from the group consisting of acute disseminated encephalomyelitis, acute respiratory distress syndrome, Addison's disease, Adult-Onset Still's disease, ankylosing spondylitis, antibody-mediated rejection (AMR), anti-glomerular basement membrane disease (Goodpasture Syndrome), catastrophic antiphospholipid syndrome, antiphospholipid syndrome, allograft transplant rejection, atherosclerosis, autoimmune hemolytic anemia, autoimmune hepatitis, autoimmune neutropenia, bullous pemphigoid, Castleman disease, catastrophic antiphospholipid syndrome, chronic obstructive pulmonary disease (COPD), Chediak-Higashi syndrome, chronic inflammatory demyelinating polyneuropathy (CIDP), coronary artery disease (CAD)/peripheral artery disease (PAD), COVID-19, Crohn's disease, epidermolysis bullosa acquisita, Evans syndrome, eosinophilic granulomatosis with polyangiitis (Churg-Strauss Syndrome), Felty's syndrome, giant cell myocarditis, graft vs. host disease, Graves' disease, Graves ophthalmopathy, granulomatosis with polyangiitis (Wegener's Granulomatosis), Guillain-Barre syndrome, Hashimoto's thyroiditis, hyper IgE syndrome, Idiopathic interstitial pneumonia, idiopathic pulmonary fibrosis, IgA nephropathy, immune/idiopathic thrombocytopenia purpura, inclusion body myositis, inflammatory bowel disease, Kawasaki disease, Lambert-Eaton myasthenic syndrome (LEMS), myasthenia gravis (MG), linear IgA disease, lupus nephritis, lupus vasculitis, systemic lupus erythematosus (SLE), membranous nephropathy, microscopic polyangiitis (MPA), multiple sclerosis, myelodysplastic syndromes, myocarditis, neuromyelitis optica (NMO), paraneoplastic syndrome, pemphigus foliaceus, pemphigus vulgaris, primary biliary cholangitis, primary biliary cirrhosis, primary sclerosing cholangitis, rheumatoid arthritis, rheumatoid vasculitis, Schmidt syndrome, scleroderma (systemic sclerosis), Sjögren's syndrome, Sjogren syndrome, Susac syndrome, systemic inflammatory response syndrome, systemic juvenile idiopathic arthritis, systemic lupus erythematosus, type 1 diabetes, uveitis, and vitiligo.

44. The method of claim 34, wherein the disease or condition associated with pathological alloantibodies or autoantibodies is selected from the group consisting of myasthenia gravis, Guillain-Barre syndrome, autoimmune hemolytic anemia, immune/idiopathic thrombocytopenia purpura, Evans syndrome, Felty's syndrome, chronic inflammatory demyelinating polyneuropathy (CIDP), Lambert-Eaton myasthenic syndrome (LEMS), neuromyelitis optica (NMO), bullous pemphigoid, epidermolysis bullosa acquisita, pemphigus foliaceus, pemphigus vulgaris, anti-glomerular basement membrane disease (Goodpasture Syndrome), membranous nephropathy, rheumatoid vasculitis, lupus vasculitis, scleroderma (systemic sclerosis), microscopic polyangiitis (MPA), Kawasaki disease, antiphospholipid syndrome, catastrophic antiphospholipid syndrome, Graves ophthalmopathy, Castleman disease, and antibody-mediated rejection (AMR).

* * * * *

SEQUENCE LISTING

<160> NUMBER OF SEQ ID NOS: 175

<210> SEQ ID NO 1
<211> LENGTH: 504
<212> TYPE: PRT
<213> ORGANISM: Homo sapiens

<400> SEQUENCE: 1

Met Glu Pro Ala Gly Pro Ala Pro Gly Arg Leu Gly Pro Leu Leu Cys
1               5                   10                  15

Leu Leu Leu Ala Ala Ser Cys Ala Trp Ser Gly Val Ala Gly Glu Glu
            20                  25                  30

Glu Leu Gln Val Ile Gln Pro Asp Lys Ser Val Leu Val Ala Ala Gly
        35                  40                  45

Glu Thr Ala Thr Leu Arg Cys Thr Ala Thr Ser Leu Ile Pro Val Gly
    50                  55                  60

Pro Ile Gln Trp Phe Arg Gly Ala Gly Pro Gly Arg Glu Leu Ile Tyr
65                  70                  75                  80

Asn Gln Lys Glu Gly His Phe Pro Arg Val Thr Thr Val Ser Asp Leu
                85                  90                  95

Thr Lys Arg Asn Asn Met Asp Phe Ser Ile Arg Ile Gly Asn Ile Thr
            100                 105                 110

Pro Ala Asp Ala Gly Thr Tyr Tyr Cys Val Lys Phe Arg Lys Gly Ser
        115                 120                 125

Pro Asp Asp Val Glu Phe Lys Ser Gly Ala Gly Thr Glu Leu Ser Val
    130                 135                 140

Arg Ala Lys Pro Ser Ala Pro Val Val Ser Gly Pro Ala Arg Ala
145                 150                 155                 160

Thr Pro Gln His Thr Val Ser Phe Thr Cys Glu Ser His Gly Phe Ser
            165                 170                 175

Pro Arg Asp Ile Thr Leu Lys Trp Phe Lys Asn Gly Asn Glu Leu Ser
            180                 185                 190

Asp Phe Gln Thr Asn Val Asp Pro Val Gly Glu Ser Val Ser Tyr Ser
            195                 200                 205

Ile His Ser Thr Ala Lys Val Val Leu Thr Arg Glu Asp Val His Ser
210                 215                 220

Gln Val Ile Cys Glu Val Ala His Val Thr Leu Gln Gly Asp Pro Leu
225                 230                 235                 240

Arg Gly Thr Ala Asn Leu Ser Glu Thr Ile Arg Val Pro Pro Thr Leu
                245                 250                 255

Glu Val Thr Gln Gln Pro Val Arg Ala Glu Asn Gln Val Asn Val Thr
            260                 265                 270

Cys Gln Val Arg Lys Phe Tyr Pro Gln Arg Leu Gln Leu Thr Trp Leu
            275                 280                 285

Glu Asn Gly Asn Val Ser Arg Thr Glu Thr Ala Ser Thr Val Thr Glu
290                 295                 300

Asn Lys Asp Gly Thr Tyr Asn Trp Met Ser Trp Leu Leu Val Asn Val
305                 310                 315                 320

Ser Ala His Arg Asp Asp Val Lys Leu Thr Cys Gln Val Glu His Asp
                325                 330                 335

Gly Gln Pro Ala Val Ser Lys Ser His Asp Leu Lys Val Ser Ala His
            340                 345                 350

Pro Lys Glu Gln Gly Ser Asn Thr Ala Ala Glu Asn Thr Gly Ser Asn
            355                 360                 365

Glu Arg Asn Ile Tyr Ile Val Val Gly Val Val Cys Thr Leu Leu Val
370                 375                 380

Ala Leu Leu Met Ala Ala Leu Tyr Leu Val Arg Ile Arg Gln Lys Lys
385                 390                 395                 400

Ala Gln Gly Ser Thr Ser Ser Thr Arg Leu His Glu Pro Glu Lys Asn
                405                 410                 415

Ala Arg Glu Ile Thr Gln Asp Thr Asn Asp Ile Thr Tyr Ala Asp Leu
            420                 425                 430

Asn Leu Pro Lys Gly Lys Lys Pro Ala Pro Gln Ala Ala Glu Pro Asn
            435                 440                 445

Asn His Thr Glu Tyr Ala Ser Ile Gln Thr Ser Pro Gln Pro Ala Ser
            450                 455                 460

Glu Asp Thr Leu Thr Tyr Ala Asp Leu Asp Met Val His Leu Asn Arg
465                 470                 475                 480

Thr Pro Lys Gln Pro Ala Pro Lys Pro Glu Pro Ser Phe Ser Glu Tyr
                485                 490                 495

Ala Ser Val Gln Val Pro Arg Lys
            500

<210> SEQ ID NO 2
<211> LENGTH: 507
<212> TYPE: PRT
<213> ORGANISM: Homo sapiens

<400> SEQUENCE: 2

Met Glu Pro Ala Gly Pro Ala Pro Gly Arg Leu Gly Pro Leu Leu Cys

```
  1               5                    10                   15
Leu Leu Leu Ala Ala Ser Cys Ala Trp Ser Gly Val Ala Gly Glu Glu
            20                  25                  30
Glu Leu Gln Val Ile Gln Pro Asp Lys Ser Val Ser Val Ala Ala Gly
            35                  40                  45
Glu Ser Ala Ile Leu His Cys Thr Val Thr Ser Leu Ile Pro Val Gly
            50                  55                  60
Pro Ile Gln Trp Phe Arg Gly Ala Gly Pro Ala Arg Glu Leu Ile Tyr
65                      70                  75                  80
Asn Gln Lys Glu Gly His Phe Pro Arg Val Thr Thr Val Ser Glu Ser
                    85                  90                  95
Thr Lys Arg Glu Asn Met Asp Phe Ser Ile Ser Ile Ser Asn Ile Thr
                100                 105                 110
Pro Ala Asp Ala Gly Thr Tyr Tyr Cys Val Lys Phe Arg Lys Gly Ser
                115                 120                 125
Pro Asp Thr Glu Phe Lys Ser Gly Ala Gly Thr Glu Leu Ser Val Arg
                130                 135                 140
Ala Lys Pro Ser Ala Pro Val Val Ser Gly Pro Ala Ala Arg Ala Thr
145                 150                 155                 160
Pro Gln His Thr Val Ser Phe Thr Cys Glu Ser His Gly Phe Ser Pro
                165                 170                 175
Arg Asp Ile Thr Leu Lys Trp Phe Lys Asn Gly Asn Glu Leu Ser Asp
                180                 185                 190
Phe Gln Thr Asn Val Asp Pro Val Gly Glu Ser Val Ser Tyr Ser Ile
                195                 200                 205
His Ser Thr Ala Lys Val Val Leu Thr Arg Glu Asp Val His Ser Gln
                210                 215                 220
Val Ile Cys Glu Val Ala His Val Thr Leu Gln Gly Asp Pro Leu Arg
225                 230                 235                 240
Gly Thr Ala Asn Leu Ser Glu Thr Ile Arg Val Pro Pro Thr Leu Glu
                245                 250                 255
Val Thr Gln Gln Pro Val Arg Ala Glu Asn Gln Val Asn Val Thr Cys
                260                 265                 270
Gln Val Arg Lys Phe Tyr Pro Gln Arg Leu Gln Leu Thr Trp Leu Glu
                275                 280                 285
Asn Gly Asn Val Ser Arg Thr Glu Thr Ala Ser Thr Val Thr Glu Asn
                290                 295                 300
Lys Asp Gly Thr Tyr Asn Trp Met Ser Trp Leu Leu Val Asn Val Ser
305                 310                 315                 320
Ala His Arg Asp Asp Val Lys Leu Thr Cys Gln Val Glu His Asp Gly
                325                 330                 335
Gln Pro Ala Val Ser Lys Ser His Asp Leu Lys Val Ser Ala His Pro
                340                 345                 350
Lys Glu Gln Gly Ser Asn Thr Ala Ala Glu Asn Thr Gly Ser Asn Glu
                355                 360                 365
Arg Asn Ile Tyr Ile Val Val Gly Val Val Cys Thr Leu Leu Val Ala
                370                 375                 380
Leu Leu Met Ala Ala Leu Tyr Leu Val Arg Ile Arg Gln Lys Lys Ala
385                 390                 395                 400
Gln Gly Ser Thr Ser Ser Thr Arg Leu His Glu Pro Glu Lys Asn Ala
                405                 410                 415
Arg Glu Ile Thr Gln Val Gln Ser Leu Asp Thr Asn Asp Ile Thr Tyr
                420                 425                 430
```

```
Ala Asp Leu Asn Leu Pro Lys Gly Lys Pro Ala Pro Gln Ala Ala
        435                 440                 445

Glu Pro Asn Asn His Thr Glu Tyr Ala Ser Ile Gln Thr Ser Pro Gln
450                 455                 460

Pro Ala Ser Glu Asp Thr Leu Thr Tyr Ala Asp Leu Asp Met Val His
465                 470                 475                 480

Leu Asn Arg Thr Pro Lys Gln Pro Ala Pro Lys Pro Glu Pro Ser Phe
                485                 490                 495

Ser Glu Tyr Ala Ser Val Gln Val Pro Arg Lys
                500                 505
```

<210> SEQ ID NO 3
<211> LENGTH: 330
<212> TYPE: PRT
<213> ORGANISM: Artificial Sequence
<220> FEATURE:
<223> OTHER INFORMATION: Fc domain

<400> SEQUENCE: 3

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285
```

```
Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 4
<211> LENGTH: 330
<212> TYPE: PRT
<213> ORGANISM: Artificial Sequence
<220> FEATURE:
<223> OTHER INFORMATION: Fc domain

<400> SEQUENCE: 4

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Ala Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320
```

```
                        Gln Lys Ser Leu Ser Leu Ser Pro Gly Lys
                                        325                 330

<210> SEQ ID NO 5
<211> LENGTH: 11
<212> TYPE: PRT
<213> ORGANISM: Artificial Sequence
<220> FEATURE:
<223> OTHER INFORMATION: CDR-L1

<400> SEQUENCE: 5

Gln Ser Leu Leu His Gly Asn Gly Phe Asn Tyr
1               5                   10

<210> SEQ ID NO 6
<211> LENGTH: 508
<212> TYPE: PRT
<213> ORGANISM: Homo sapiens

<400> SEQUENCE: 6

Met Glu Pro Ala Gly Pro Ala Pro Gly Arg Leu Gly Pro Leu Leu Cys
1               5                   10                  15

Leu Leu Leu Ala Ala Ser Cys Ala Trp Ser Gly Val Ala Gly Glu Glu
                20                  25                  30

Glu Leu Gln Val Ile Gln Pro Asp Lys Ser Val Leu Val Ala Ala Gly
            35                  40                  45

Glu Thr Ala Thr Leu Arg Cys Thr Ala Thr Ser Leu Ile Pro Val Gly
        50                  55                  60

Pro Ile Gln Trp Phe Arg Gly Ala Gly Pro Gly Arg Glu Leu Ile Tyr
65                  70                  75                  80

Asn Gln Lys Glu Gly His Phe Pro Arg Val Thr Thr Val Ser Asp Leu
                85                  90                  95

Thr Lys Arg Asn Asn Met Asp Phe Ser Ile Arg Ile Gly Asn Ile Thr
            100                 105                 110

Pro Ala Asp Ala Gly Thr Tyr Tyr Cys Val Lys Phe Arg Lys Gly Ser
        115                 120                 125

Pro Asp Asp Val Glu Phe Lys Ser Gly Ala Gly Thr Glu Leu Ser Val
    130                 135                 140

Arg Ala Lys Pro Ser Ala Pro Val Val Ser Gly Pro Ala Ala Arg Ala
145                 150                 155                 160

Thr Pro Gln His Thr Val Ser Phe Thr Cys Glu Ser His Gly Phe Ser
                165                 170                 175

Pro Arg Asp Ile Thr Leu Lys Trp Phe Lys Asn Gly Asn Glu Leu Ser
            180                 185                 190

Asp Phe Gln Thr Asn Val Asp Pro Val Gly Glu Ser Val Ser Tyr Ser
        195                 200                 205

Ile His Ser Thr Ala Lys Val Val Leu Thr Arg Glu Asp Val His Ser
    210                 215                 220

Gln Val Ile Cys Glu Val Ala His Val Thr Leu Gln Gly Asp Pro Leu
225                 230                 235                 240

Arg Gly Thr Ala Asn Leu Ser Glu Thr Ile Arg Val Pro Pro Thr Leu
                245                 250                 255

Glu Val Thr Gln Gln Pro Val Arg Ala Glu Asn Gln Val Asn Val Thr
            260                 265                 270

Cys Gln Val Arg Lys Phe Tyr Pro Gln Arg Leu Gln Leu Thr Trp Leu
        275                 280                 285
```

```
Glu Asn Gly Asn Val Ser Arg Thr Glu Thr Ala Ser Thr Val Thr Glu
290                 295                 300
Asn Lys Asp Gly Thr Tyr Asn Trp Met Ser Trp Leu Leu Val Asn Val
305                 310                 315                 320
Ser Ala His Arg Asp Val Lys Leu Thr Cys Gln Val Glu His Asp
                325                 330                 335
Gly Gln Pro Ala Val Ser Lys Ser His Asp Leu Lys Val Ser Ala His
            340                 345                 350
Pro Lys Glu Gln Gly Ser Asn Thr Ala Ala Glu Asn Thr Gly Ser Asn
        355                 360                 365
Glu Arg Asn Ile Tyr Ile Val Val Gly Val Val Cys Thr Leu Leu Val
    370                 375                 380
Ala Leu Leu Met Ala Ala Leu Tyr Leu Val Arg Ile Arg Gln Lys Lys
385                 390                 395                 400
Ala Gln Gly Ser Thr Ser Ser Thr Arg Leu His Glu Pro Glu Lys Asn
                405                 410                 415
Ala Arg Glu Ile Thr Gln Val Gln Ser Leu Asp Thr Asn Asp Ile Thr
            420                 425                 430
Tyr Ala Asp Leu Asn Leu Pro Lys Gly Lys Lys Pro Ala Pro Gln Ala
        435                 440                 445
Ala Glu Pro Asn Asn His Thr Glu Tyr Ala Ser Ile Gln Thr Ser Pro
    450                 455                 460
Gln Pro Ala Ser Glu Asp Thr Leu Thr Tyr Ala Asp Leu Asp Met Val
465                 470                 475                 480
His Leu Asn Arg Thr Pro Lys Gln Pro Ala Pro Lys Pro Glu Pro Ser
                485                 490                 495
Phe Ser Glu Tyr Ala Ser Val Gln Val Pro Arg Lys
                500                 505

<210> SEQ ID NO 7
<211> LENGTH: 6
<212> TYPE: PRT
<213> ORGANISM: Artificial Sequence
<220> FEATURE:
<223> OTHER INFORMATION: CDR-L1

<400> SEQUENCE: 7

Gln Gly Ile Ser Gly Tyr
1               5

<210> SEQ ID NO 8
<211> LENGTH: 6
<212> TYPE: PRT
<213> ORGANISM: Artificial Sequence
<220> FEATURE:
<223> OTHER INFORMATION: CDR-L1

<400> SEQUENCE: 8

Gln Asp Phe Ser Asn Tyr
1               5

<210> SEQ ID NO 9
<211> LENGTH: 398
<212> TYPE: PRT
<213> ORGANISM: Homo sapiens

<400> SEQUENCE: 9

Met Pro Val Pro Ala Ser Trp Pro His Leu Pro Ser Pro Phe Leu Leu
1               5                   10                  15
```

Met Thr Leu Leu Leu Gly Arg Leu Thr Gly Val Ala Gly Glu Asp Glu
            20                  25                  30

Leu Gln Val Ile Gln Pro Glu Lys Ser Val Ser Val Ala Ala Gly Glu
         35                  40                  45

Ser Ala Thr Leu Arg Cys Ala Met Thr Ser Leu Ile Pro Val Gly Pro
 50                  55                  60

Ile Met Trp Phe Arg Gly Ala Gly Ala Gly Arg Glu Leu Ile Tyr Asn
 65                  70                  75                  80

Gln Lys Glu Gly His Phe Pro Arg Val Thr Thr Val Ser Glu Leu Thr
                 85                  90                  95

Lys Arg Asn Asn Leu Asp Phe Ser Ile Ser Ile Ser Asn Ile Thr Pro
            100                 105                 110

Ala Asp Ala Gly Thr Tyr Tyr Cys Val Lys Phe Arg Lys Gly Ser Pro
        115                 120                 125

Asp Asp Val Glu Phe Lys Ser Gly Ala Gly Thr Glu Leu Ser Val Arg
130                 135                 140

Ala Lys Pro Ser Ala Pro Val Val Ser Gly Pro Ala Val Arg Ala Thr
145                 150                 155                 160

Pro Glu His Thr Val Ser Phe Thr Cys Glu Ser His Gly Phe Ser Pro
                165                 170                 175

Arg Asp Ile Thr Leu Lys Trp Phe Lys Asn Gly Asn Glu Leu Ser Asp
            180                 185                 190

Phe Gln Thr Asn Val Asp Pro Ala Gly Asp Ser Val Ser Tyr Ser Ile
        195                 200                 205

His Ser Thr Ala Arg Val Val Leu Thr Arg Gly Asp Val His Ser Gln
210                 215                 220

Val Ile Cys Glu Ile Ala His Ile Thr Leu Gln Gly Asp Pro Leu Arg
225                 230                 235                 240

Gly Thr Ala Asn Leu Ser Glu Ala Ile Arg Val Pro Pro Thr Leu Glu
                245                 250                 255

Val Thr Gln Gln Pro Met Arg Ala Glu Asn Gln Ala Asn Val Thr Cys
            260                 265                 270

Gln Val Ser Asn Phe Tyr Pro Arg Gly Leu Gln Leu Thr Trp Leu Glu
        275                 280                 285

Asn Gly Asn Val Ser Arg Thr Glu Thr Ala Ser Thr Leu Ile Glu Asn
290                 295                 300

Lys Asp Gly Thr Tyr Asn Trp Met Ser Trp Leu Leu Val Asn Thr Cys
305                 310                 315                 320

Ala His Arg Asp Asp Val Val Leu Thr Cys Gln Val Glu His Asp Gly
                325                 330                 335

Gln Gln Ala Val Ser Lys Ser Tyr Ala Leu Glu Ile Ser Ala His Gln
            340                 345                 350

Lys Glu His Gly Ser Asp Ile Thr His Glu Ala Ala Leu Ala Pro Thr
        355                 360                 365

Ala Pro Leu Leu Val Ala Leu Leu Gly Pro Lys Leu Leu Leu Val
370                 375                 380

Val Gly Val Ser Ala Ile Tyr Ile Cys Trp Lys Gln Lys Ala
385                 390                 395

<210> SEQ ID NO 10
<211> LENGTH: 387
<212> TYPE: PRT
<213> ORGANISM: Homo sapiens

<400> SEQUENCE: 10

Met Pro Val Pro Ala Ser Trp Pro His Pro Gly Pro Phe Leu Leu
1               5                   10                  15

Leu Thr Leu Leu Leu Gly Leu Thr Glu Val Ala Gly Glu Glu Leu
            20                  25                  30

Gln Met Ile Gln Pro Glu Lys Leu Leu Leu Val Thr Val Gly Lys Thr
            35                  40                  45

Ala Thr Leu His Cys Thr Val Thr Ser Leu Leu Pro Val Gly Pro Val
50                  55                  60

Leu Trp Phe Arg Gly Val Gly Pro Gly Arg Glu Leu Ile Tyr Asn Gln
65                  70                  75                  80

Lys Glu Gly His Phe Pro Arg Val Thr Thr Val Ser Asp Leu Thr Lys
                85                  90                  95

Arg Asn Asn Met Asp Phe Ser Ile Arg Ile Ser Ser Ile Thr Pro Ala
                100                 105                 110

Asp Val Gly Thr Tyr Tyr Cys Val Lys Phe Arg Lys Gly Ser Pro Glu
            115                 120                 125

Asn Val Glu Phe Lys Ser Gly Pro Gly Thr Glu Met Ala Leu Gly Ala
            130                 135                 140

Lys Pro Ser Ala Pro Val Val Leu Gly Pro Ala Ala Arg Thr Thr Pro
145                 150                 155                 160

Glu His Thr Val Ser Phe Thr Cys Glu Ser His Gly Phe Ser Pro Arg
                165                 170                 175

Asp Ile Thr Leu Lys Trp Phe Lys Asn Gly Asn Glu Leu Ser Asp Phe
                180                 185                 190

Gln Thr Asn Val Asp Pro Thr Gly Gln Ser Val Ala Tyr Ser Ile Arg
            195                 200                 205

Ser Thr Ala Arg Val Val Leu Asp Pro Trp Asp Val Arg Ser Gln Val
210                 215                 220

Ile Cys Glu Val Ala His Val Thr Leu Gln Gly Asp Pro Leu Arg Gly
225                 230                 235                 240

Thr Ala Asn Leu Ser Glu Ala Ile Arg Val Pro Pro Thr Leu Glu Val
                245                 250                 255

Thr Gln Gln Pro Met Arg Val Gly Asn Gln Val Asn Val Thr Cys Gln
            260                 265                 270

Val Arg Lys Phe Tyr Pro Gln Ser Leu Gln Leu Thr Trp Ser Glu Asn
            275                 280                 285

Gly Asn Val Cys Gln Arg Glu Thr Ala Ser Thr Leu Thr Glu Asn Lys
290                 295                 300

Asp Gly Thr Tyr Asn Trp Thr Ser Trp Phe Leu Val Asn Ile Ser Asp
305                 310                 315                 320

Gln Arg Asp Asp Val Val Leu Thr Cys Gln Val Lys His Asp Gly Gln
                325                 330                 335

Leu Ala Val Ser Lys Arg Leu Ala Leu Glu Val Thr Val His Gln Lys
                340                 345                 350

Asp Gln Ser Ser Asp Ala Thr Pro Gly Pro Ala Ser Ser Leu Thr Ala
            355                 360                 365

Leu Leu Leu Ile Ala Val Leu Leu Gly Pro Ile Tyr Val Pro Trp Lys
            370                 375                 380

Gln Lys Thr
385

<210> SEQ ID NO 11
<211> LENGTH: 6

```
<212> TYPE: PRT
<213> ORGANISM: Artificial Sequence
<220> FEATURE:
<223> OTHER INFORMATION: CDR-L1

<400> SEQUENCE: 11

Asn Ile Gly Ser Lys Ser
1               5

<210> SEQ ID NO 12
<211> LENGTH: 6
<212> TYPE: PRT
<213> ORGANISM: Artificial Sequence
<220> FEATURE:
<223> OTHER INFORMATION: CDR-L1

<400> SEQUENCE: 12

Lys Leu Gly Asp Lys Tyr
1               5

<210> SEQ ID NO 13
<211> LENGTH: 6
<212> TYPE: PRT
<213> ORGANISM: Artificial Sequence
<220> FEATURE:
<223> OTHER INFORMATION: CDR-L1

<400> SEQUENCE: 13

Lys Leu Gly Asp Arg Tyr
1               5

<210> SEQ ID NO 14
<211> LENGTH: 6
<212> TYPE: PRT
<213> ORGANISM: Artificial Sequence
<220> FEATURE:
<223> OTHER INFORMATION: CDR-L1

<400> SEQUENCE: 14

Gln Asp Ile Ser Ser Trp
1               5

<210> SEQ ID NO 15
<211> LENGTH: 6
<212> TYPE: PRT
<213> ORGANISM: Artificial Sequence
<220> FEATURE:
<223> OTHER INFORMATION: CDR-L1

<400> SEQUENCE: 15

Gln Ser Val Ser Ser Asn
1               5

<210> SEQ ID NO 16
<211> LENGTH: 6
<212> TYPE: PRT
<213> ORGANISM: Artificial Sequence
<220> FEATURE:
<223> OTHER INFORMATION: CDR-L1

<400> SEQUENCE: 16

Gln Ser Val Ser Arg Asn
1               5

<210> SEQ ID NO 17
<211> LENGTH: 12
<212> TYPE: PRT
```

```
<213> ORGANISM: Artificial Sequence
<220> FEATURE:
<223> OTHER INFORMATION: CDR-L1

<400> SEQUENCE: 17

Gln Thr Val Leu Asn Ser Ser Asn Asn Lys Asn Tyr
1               5                   10

<210> SEQ ID NO 18
<211> LENGTH: 6
<212> TYPE: PRT
<213> ORGANISM: Artificial Sequence
<220> FEATURE:
<223> OTHER INFORMATION: CDR-L1

<400> SEQUENCE: 18

Gln Asp Ile Asn Arg Tyr
1               5

<210> SEQ ID NO 19
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 19

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Ala Glu Pro Lys Ser Cys Asp Lys Thr His Thr Cys Pro Pro Cys
            100                 105                 110

Pro Ala Pro Glu Leu Leu Ala Gly Pro Asp Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Glu Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255
```

```
Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 20
<211> LENGTH: 330
<212> TYPE: PRT
<213> ORGANISM: Artificial Sequence
<220> FEATURE:
<223> OTHER INFORMATION: IgG1 Fc domain
<220> FEATURE:
<221> NAME/KEY: SITE
<222> LOCATION: (98)..(98)
<223> OTHER INFORMATION: Xaa is Val or Ala

<400> SEQUENCE: 20

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Xaa Glu Pro Lys Ser Cys Asp Lys Thr His Thr Cys Pro Pro Cys
            100                 105                 110

Pro Ala Pro Glu Leu Leu Gly Pro Asp Val Phe Leu Phe Pro Pro
        115                 120                 125

Lys Pro Lys Asp Thr Leu Met Ile Ser Arg Thr Pro Glu Val Thr Cys
        130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Glu Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
```

```
                    260                 265                 270
Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 21
<211> LENGTH: 330
<212> TYPE: PRT
<213> ORGANISM: Artificial Sequence
<220> FEATURE:
<223> OTHER INFORMATION: IgG1 Fc domain
<220> FEATURE:
<221> NAME/KEY: SITE
<222> LOCATION: (98)..(98)
<223> OTHER INFORMATION: Xaa is Val or Ala
<220> FEATURE:
<221> NAME/KEY: SITE
<222> LOCATION: (119)..(119)
<223> OTHER INFORMATION: Xaa is Gly or Ala
<220> FEATURE:
<221> NAME/KEY: SITE
<222> LOCATION: (122)..(122)
<223> OTHER INFORMATION: Xaa is Ser or Asp
<220> FEATURE:
<221> NAME/KEY: SITE
<222> LOCATION: (215)..(215)
<223> OTHER INFORMATION: Xaa is Ile or Glu

<400> SEQUENCE: 21

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Xaa Glu Pro Lys Ser Cys Asp Lys Thr His Thr Cys Pro Pro Cys
            100                 105                 110

Pro Ala Pro Glu Leu Leu Xaa Gly Pro Xaa Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205
```

-continued

```
Lys Ala Leu Pro Ala Pro Xaa Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 22
<211> LENGTH: 330
<212> TYPE: PRT
<213> ORGANISM: Artificial Sequence
<220> FEATURE:
<223> OTHER INFORMATION: IgG1 Fc domain
<220> FEATURE:
<221> NAME/KEY: SITE
<222> LOCATION: (98)..(98)
<223> OTHER INFORMATION: Xaa is Val or Ala

<400> SEQUENCE: 22

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Xaa Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220
```

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
            245                 250                 255

Pro Ser Asp Ile Ala Val Glu Trp Glu Ser Asn Gly Gln Pro Glu Asn
        260                 265                 270

Asn Tyr Lys Thr Thr Pro Pro Val Leu Asp Ser Asp Gly Ser Phe Phe
    275                 280                 285

Leu Tyr Ser Lys Leu Thr Val Asp Lys Ser Arg Trp Gln Gln Gly Asn
        290                 295                 300

Val Phe Ser Cys Ser Val Leu His Glu Ala Leu His Ser His Tyr Thr
305                 310                 315                 320

Gln Lys Ser Leu Ser Leu Ser Pro Gly Lys
            325                 330

<210> SEQ ID NO 23
<211> LENGTH: 3
<212> TYPE: PRT
<213> ORGANISM: Artificial Sequence
<220> FEATURE:
<223> OTHER INFORMATION: CDR-L2

<400> SEQUENCE: 23

Leu Gly Ser
1

<210> SEQ ID NO 24
<211> LENGTH: 3
<212> TYPE: PRT
<213> ORGANISM: Artificial Sequence
<220> FEATURE:
<223> OTHER INFORMATION: CDR-L2

<400> SEQUENCE: 24

Ala Ala Ser
1

<210> SEQ ID NO 25
<211> LENGTH: 330
<212> TYPE: PRT
<213> ORGANISM: Artificial Sequence
<220> FEATURE:
<223> OTHER INFORMATION: IgG1 Fc domain
<220> FEATURE:
<221> NAME/KEY: SITE
<222> LOCATION: (98)..(98)
<223> OTHER INFORMATION: Xaa is Val or Ala
<220> FEATURE:
<221> NAME/KEY: SITE
<222> LOCATION: (311)..(311)
<223> OTHER INFORMATION: Xaa is Met or Leu
<220> FEATURE:
<221> NAME/KEY: SITE
<222> LOCATION: (317)..(317)
<223> OTHER INFORMATION: Xaa is Asn or Ser

<400> SEQUENCE: 25

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

```
Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
 65                  70                  75                  80

Tyr Ile Cys Asn Val Asn His Lys Pro Ser Asn Thr Lys Val Asp Lys
                     85                  90                  95

Lys Xaa Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                    165                 170                 175

Glu Gln Tyr Asn Ser Thr Tyr Arg Val Val Ser Val Leu Thr Val Leu
                180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
        210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                    245                 250                 255

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
        290                 295                 300

Val Phe Ser Cys Ser Val Xaa His Glu Ala Leu His Xaa His Tyr Thr
305                 310                 315                 320

Gln Lys Ser Leu Ser Leu Ser Pro Gly Lys
                    325                 330

<210> SEQ ID NO 26
<211> LENGTH: 330
<212> TYPE: PRT
<213> ORGANISM: Artificial Sequence
<220> FEATURE:
<223> OTHER INFORMATION: IgG1 Fc domain
<220> FEATURE:
<221> NAME/KEY: SITE
<222> LOCATION: (97)..(97)
<223> OTHER INFORMATION: Xaa is Lys or Arg
<220> FEATURE:
<221> NAME/KEY: SITE
<222> LOCATION: (239)..(239)
<223> OTHER INFORMATION: Xaa is Asp or Glu
<220> FEATURE:
<221> NAME/KEY: SITE
<222> LOCATION: (241)..(241)
<223> OTHER INFORMATION: Xaa is Leu or Met

<400> SEQUENCE: 26

Ala Ser Thr Lys Gly Pro Ser Val Phe Pro Leu Ala Pro Ser Ser Lys
1               5                   10                  15
```

-continued

```
Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Xaa Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Xaa Glu
225                 230                 235                 240

Xaa Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330
```

<210> SEQ ID NO 27
<211> LENGTH: 3
<212> TYPE: PRT
<213> ORGANISM: Artificial Sequence
<220> FEATURE:
<223> OTHER INFORMATION: CDR-L2

<400> SEQUENCE: 27

Asp Asp Ser
1

<210> SEQ ID NO 28
<211> LENGTH: 3
<212> TYPE: PRT
<213> ORGANISM: Artificial Sequence
<220> FEATURE:

```
<223> OTHER INFORMATION: CDR-L2

<400> SEQUENCE: 28

His Asp Asp
1

<210> SEQ ID NO 29
<211> LENGTH: 3
<212> TYPE: PRT
<213> ORGANISM: Artificial Sequence
<220> FEATURE:
<223> OTHER INFORMATION: CDR-L2

<400> SEQUENCE: 29

Gln Asp Asp
1

<210> SEQ ID NO 30
<211> LENGTH: 3
<212> TYPE: PRT
<213> ORGANISM: Artificial Sequence
<220> FEATURE:
<223> OTHER INFORMATION: CDR-L2

<400> SEQUENCE: 30

Gln Asp Thr
1

<210> SEQ ID NO 31
<211> LENGTH: 3
<212> TYPE: PRT
<213> ORGANISM: Artificial Sequence
<220> FEATURE:
<223> OTHER INFORMATION: CDR-L2

<400> SEQUENCE: 31

Gly Ala Ser
1

<210> SEQ ID NO 32
<211> LENGTH: 3
<212> TYPE: PRT
<213> ORGANISM: Artificial Sequence
<220> FEATURE:
<223> OTHER INFORMATION: CDR-L2

<400> SEQUENCE: 32

Trp Ala Ser
1

<210> SEQ ID NO 33
<211> LENGTH: 3
<212> TYPE: PRT
<213> ORGANISM: Artificial Sequence
<220> FEATURE:
<223> OTHER INFORMATION: CDR-L2

<400> SEQUENCE: 33

Arg Ala Asn
1

<210> SEQ ID NO 34
<211> LENGTH: 327
<212> TYPE: PRT
<213> ORGANISM: Artificial Sequence
<220> FEATURE:
<223> OTHER INFORMATION: IgG4 Fc domain
```

<400> SEQUENCE: 34

```
Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
                100                 105                 110

Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
                180                 185                 190

Trp Leu Asn Gly Lys Glu Tyr Lys Cys Lys Val Ser Asn Lys Gly Leu
            195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
                260                 265                 270

Thr Thr Pro Pro Val Leu Asp Ser Asp Gly Ser Phe Phe Leu Tyr Ser
            275                 280                 285

Arg Leu Thr Val Asp Lys Ser Arg Trp Gln Glu Gly Asn Val Phe Ser
        290                 295                 300

Cys Ser Val Met His Glu Ala Leu His Asn His Tyr Thr Gln Lys Ser
305                 310                 315                 320

Leu Ser Leu Ser Leu Gly Lys
                325
```

<210> SEQ ID NO 35
<211> LENGTH: 327
<212> TYPE: PRT
<213> ORGANISM: Artificial Sequence
<220> FEATURE:
<223> OTHER INFORMATION: IgG4 Fc domain

<400> SEQUENCE: 35

```
Ala Ser Thr Lys Gly Pro Ser Val Phe Pro Leu Ala Pro Cys Ser Arg
1               5                   10                  15
```

-continued

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Glu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 36
<211> LENGTH: 9
<212> TYPE: PRT
<213> ORGANISM: Artificial Sequence
<220> FEATURE:
<223> OTHER INFORMATION: CDR-L3

<400> SEQUENCE: 36

Met Gln Gly Leu Gln Thr Pro Arg Thr
1               5

<210> SEQ ID NO 37
<211> LENGTH: 327
<212> TYPE: PRT
<213> ORGANISM: Artificial Sequence
<220> FEATURE:

<223> OTHER INFORMATION: IgG4 Fc domain
<220> FEATURE:
<221> NAME/KEY: SITE
<222> LOCATION: (108)..(108)
<223> OTHER INFORMATION: Xaa is Ser or Pro
<220> FEATURE:
<221> NAME/KEY: SITE
<222> LOCATION: (115)..(115)
<223> OTHER INFORMATION: Xaa is Leu or Glu

<400> SEQUENCE: 37

Ala Ser Thr Lys Gly Pro Ser Val Phe Pro Leu Ala Pro Cys Ser Arg
 1               5                  10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Xaa Cys Pro Ala Pro
            100                 105                 110

Glu Phe Xaa Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 38
<211> LENGTH: 9
<212> TYPE: PRT

```
<213> ORGANISM: Artificial Sequence
<220> FEATURE:
<223> OTHER INFORMATION: CDR-L3

<400> SEQUENCE: 38

Gln Gln Phe Thr Ser Asp Leu Ile Thr
1               5

<210> SEQ ID NO 39
<211> LENGTH: 9
<212> TYPE: PRT
<213> ORGANISM: Artificial Sequence
<220> FEATURE:
<223> OTHER INFORMATION: CDR-L3

<400> SEQUENCE: 39

Gln Gln Tyr Asp Asn Leu Pro Tyr Thr
1               5

<210> SEQ ID NO 40
<211> LENGTH: 503
<212> TYPE: PRT
<213> ORGANISM: Homo sapiens

<400> SEQUENCE: 40

Met Glu Pro Ala Gly Pro Ala Pro Gly Arg Leu Gly Pro Leu Leu Cys
1               5                   10                  15

Leu Leu Leu Ala Ala Ser Cys Ala Trp Ser Gly Val Ala Gly Glu Glu
                20                  25                  30

Glu Leu Gln Val Ile Gln Pro Asp Lys Ser Val Leu Val Ala Ala Gly
            35                  40                  45

Glu Thr Ala Thr Leu Arg Cys Thr Ala Thr Ser Leu Ile Pro Val Gly
        50                  55                  60

Pro Ile Gln Trp Phe Arg Gly Ala Gly Pro Gly Arg Glu Leu Ile Tyr
65                  70                  75                  80

Asn Gln Lys Glu Gly His Phe Pro Arg Val Thr Thr Val Ser Asp Leu
                85                  90                  95

Thr Lys Arg Asn Asn Met Asp Phe Ser Ile Arg Ile Gly Asn Ile Thr
            100                 105                 110

Pro Ala Asp Ala Gly Thr Tyr Tyr Cys Val Lys Phe Arg Lys Gly Ser
        115                 120                 125

Pro Asp Val Glu Phe Lys Ser Gly Ala Gly Thr Glu Leu Ser Val Arg
    130                 135                 140

Ala Lys Pro Ser Ala Pro Val Val Ser Gly Pro Ala Ala Arg Ala Thr
145                 150                 155                 160

Pro Gln His Thr Val Ser Phe Thr Cys Glu Ser His Gly Phe Ser Pro
                165                 170                 175

Arg Asp Ile Thr Leu Lys Trp Phe Lys Asn Gly Asn Glu Leu Ser Asp
            180                 185                 190

Phe Gln Thr Asn Val Asp Pro Val Gly Glu Ser Val Ser Tyr Ser Ile
        195                 200                 205

His Ser Thr Ala Lys Val Val Leu Thr Arg Glu Asp Val His Ser Gln
    210                 215                 220

Val Ile Cys Glu Val Ala His Val Thr Leu Gln Gly Asp Pro Leu Arg
225                 230                 235                 240

Gly Thr Ala Asn Leu Ser Glu Thr Ile Arg Val Pro Pro Thr Leu Glu
                245                 250                 255

Val Thr Gln Gln Pro Val Arg Ala Glu Asn Gln Val Asn Val Thr Cys
```

```
                    260                 265                 270
        Gln Val Arg Lys Phe Tyr Pro Gln Arg Leu Gln Leu Thr Trp Leu Glu
                    275                 280                 285
        Asn Gly Asn Val Ser Arg Thr Glu Thr Ala Ser Thr Val Thr Glu Asn
                    290                 295                 300
        Lys Asp Gly Thr Tyr Asn Trp Met Ser Trp Leu Leu Val Asn Val Ser
        305                 310                 315                 320
        Ala His Arg Asp Asp Val Lys Leu Thr Cys Gln Val Glu His Asp Gly
                                325                 330                 335
        Gln Pro Ala Val Ser Lys Ser His Asp Leu Lys Val Ser Ala His Pro
                    340                 345                 350
        Lys Glu Gln Gly Ser Asn Thr Ala Ala Glu Asn Thr Gly Ser Asn Glu
                    355                 360                 365
        Arg Asn Ile Tyr Ile Val Gly Val Val Cys Thr Leu Leu Val Ala
                    370                 375                 380
        Leu Leu Met Ala Ala Leu Tyr Leu Val Arg Ile Arg Gln Lys Lys Ala
        385                 390                 395                 400
        Gln Gly Ser Thr Ser Ser Thr Arg Leu His Glu Pro Glu Lys Asn Ala
                                405                 410                 415
        Arg Glu Ile Thr Gln Asp Thr Asn Asp Ile Thr Tyr Ala Asp Leu Asn
                    420                 425                 430
        Leu Pro Lys Gly Lys Lys Pro Ala Pro Gln Ala Ala Glu Pro Asn Asn
                    435                 440                 445
        His Thr Glu Tyr Ala Ser Ile Gln Thr Ser Pro Gln Pro Ala Ser Glu
                    450                 455                 460
        Asp Thr Leu Thr Tyr Ala Asp Leu Asp Met Val His Leu Asn Arg Thr
        465                 470                 475                 480
        Pro Lys Gln Pro Ala Pro Lys Pro Glu Pro Ser Phe Ser Glu Tyr Ala
                                485                 490                 495
        Ser Val Gln Val Pro Arg Lys
                    500

<210> SEQ ID NO 41
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 41

Ala Ser Thr Lys Gly Pro Ser Val Phe Pro Leu Ala Pro Ser Ser Lys
        1               5                   10                  15
        Ser Thr Ser Gly Gly Thr Ala Ala Leu Gly Cys Leu Val Lys Asp Tyr
                    20                  25                  30
        Phe Pro Glu Pro Val Thr Val Ser Trp Asn Ser Gly Ala Leu Thr Ser
                    35                  40                  45
        Gly Val His Thr Phe Pro Ala Val Leu Gln Ser Ser Gly Leu Tyr Ser
                    50                  55                  60
        Leu Ser Ser Val Val Thr Val Pro Ser Ser Leu Gly Thr Gln Thr
        65                  70                  75                  80
        Tyr Ile Cys Asn Val Asn His Lys Pro Ser Asn Thr Lys Val Asp Lys
                                85                  90                  95
        Lys Val Glu Pro Lys Ser Cys Asp Lys Thr His Thr Cys Pro Pro Cys
                    100                 105                 110
        Pro Ala Pro Glu Leu Leu Ala Gly Pro Asp Val Phe Leu Phe Pro Pro
```

```
              115                 120                 125
Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Glu Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 42
<211> LENGTH: 11
<212> TYPE: PRT
<213> ORGANISM: Artificial Sequence
<220> FEATURE:
<223> OTHER INFORMATION: CDR-L3

<400> SEQUENCE: 42

Gln Val Trp Asp Ser Ser Ser Asp His Tyr Val
1               5                   10

<210> SEQ ID NO 43
<211> LENGTH: 9
<212> TYPE: PRT
<213> ORGANISM: Artificial Sequence
<220> FEATURE:
<223> OTHER INFORMATION: CDR-L3

<400> SEQUENCE: 43

Gln Thr Trp Asp Ser Ser Thr Val Val
1               5

<210> SEQ ID NO 44
<211> LENGTH: 9
<212> TYPE: PRT
<213> ORGANISM: Artificial Sequence
<220> FEATURE:
<223> OTHER INFORMATION: CDR-L3

<400> SEQUENCE: 44

Gln Ala Trp Asp Ser Ser Thr Ala Val
1               5
```

```
<210> SEQ ID NO 45
<211> LENGTH: 9
<212> TYPE: PRT
<213> ORGANISM: Artificial Sequence
<220> FEATURE:
<223> OTHER INFORMATION: CDR-L3

<400> SEQUENCE: 45

Gln Ala Cys Asp Ser Ser Thr Ala Val
1               5

<210> SEQ ID NO 46
<211> LENGTH: 9
<212> TYPE: PRT
<213> ORGANISM: Artificial Sequence
<220> FEATURE:
<223> OTHER INFORMATION: CDR-L3

<400> SEQUENCE: 46

Gln Glu Ala Asn Ser Phe Pro Tyr Thr
1               5

<210> SEQ ID NO 47
<211> LENGTH: 9
<212> TYPE: PRT
<213> ORGANISM: Artificial Sequence
<220> FEATURE:
<223> OTHER INFORMATION: CDR-L3

<400> SEQUENCE: 47

Gln Gln Tyr Asn Asn Trp Pro Tyr Thr
1               5

<210> SEQ ID NO 48
<211> LENGTH: 10
<212> TYPE: PRT
<213> ORGANISM: Artificial Sequence
<220> FEATURE:
<223> OTHER INFORMATION: CDR-L3

<400> SEQUENCE: 48

Gln Gln Tyr Tyr Asn Thr Pro Pro Trp Thr
1               5                   10

<210> SEQ ID NO 49
<211> LENGTH: 9
<212> TYPE: PRT
<213> ORGANISM: Artificial Sequence
<220> FEATURE:
<223> OTHER INFORMATION: CDR-L3

<400> SEQUENCE: 49

Leu Gln Tyr Asp Glu Phe Pro Phe Thr
1               5

<210> SEQ ID NO 50
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 50

Ala Ser Thr Lys Gly Pro Ser Val Phe Pro Leu Ala Pro Ser Ser Lys
1               5                   10                  15
```

-continued

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Asp Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Glu Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 51
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 51

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

```
Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Glu Glu Lys Thr Ile Ser Lys Ala Lys Gly
210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 52
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 52

Ala Ser Thr Lys Gly Pro Ser Val Phe Pro Leu Ala Pro Ser Ser Lys
 1               5                  10                  15

Ser Thr Ser Gly Gly Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
 65                  70                  75                  80
```

```
Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Asp Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
            210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 53
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 53

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Ala Glu Pro Lys Ser Cys Asp Lys Thr His Thr Cys Pro Pro Cys
            100                 105                 110
```

```
Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 54
<211> LENGTH: 9
<212> TYPE: PRT
<213> ORGANISM: Artificial Sequence
<220> FEATURE:
<223> OTHER INFORMATION: CDR-H1

<400> SEQUENCE: 54

Gly Gly Ser Ile Ser Ser Ser Asn Trp
1               5

<210> SEQ ID NO 55
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 55

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80
```

```
Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Leu His Glu Ala Leu His Asn His Tyr Thr
305                 310                 315                 320

Gln Lys Ser Leu Ser Leu Ser Pro Gly Lys
                325                 330

<210> SEQ ID NO 56
<211> LENGTH: 9
<212> TYPE: PRT
<213> ORGANISM: Artificial Sequence
<220> FEATURE:
<223> OTHER INFORMATION: CDR-H1

<400> SEQUENCE: 56

Asp Tyr Ser Ile Ser Ser Gly Tyr Tyr
1               5

<210> SEQ ID NO 57
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 57

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
```

35                  40                  45
Gly Val His Thr Phe Pro Ala Val Leu Gln Ser Ser Gly Leu Tyr Ser
                50                  55                  60
Leu Ser Ser Val Val Thr Val Pro Ser Ser Ser Leu Gly Thr Gln Thr
65                  70                  75                  80
Tyr Ile Cys Asn Val Asn His Lys Pro Ser Asn Thr Lys Val Asp Lys
                85                  90                  95
Lys Val Glu Pro Lys Ser Cys Asp Lys Thr His Thr Cys Pro Pro Cys
            100                 105                 110
Pro Ala Pro Glu Leu Leu Gly Gly Pro Ser Val Phe Leu Phe Pro Pro
        115                 120                 125
Lys Pro Lys Asp Thr Leu Met Ile Ser Arg Thr Pro Glu Val Thr Cys
    130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                165                 170                 175
Glu Gln Tyr Asn Ser Thr Tyr Arg Val Val Ser Val Leu Thr Val Leu
            180                 185                 190
His Gln Asp Trp Leu Asn Gly Lys Glu Tyr Lys Cys Lys Val Ser Asn
        195                 200                 205
Lys Ala Leu Pro Ala Pro Ile Glu Lys Thr Ile Ser Lys Ala Lys Gly
    210                 215                 220
Gln Pro Arg Glu Pro Gln Val Tyr Thr Leu Pro Pro Ser Arg Asp Glu
225                 230                 235                 240
Leu Thr Lys Asn Gln Val Ser Leu Thr Cys Leu Val Lys Gly Phe Tyr
                245                 250                 255
Pro Ser Asp Ile Ala Val Glu Trp Glu Ser Asn Gly Gln Pro Glu Asn
            260                 265                 270
Asn Tyr Lys Thr Thr Pro Pro Val Leu Asp Ser Asp Gly Ser Phe Phe
        275                 280                 285
Leu Tyr Ser Lys Leu Thr Val Asp Lys Ser Arg Trp Gln Gln Gly Asn
    290                 295                 300
Val Phe Ser Cys Ser Val Met His Glu Ala Leu His Ser His Tyr Thr
305                 310                 315                 320
Gln Lys Ser Leu Ser Leu Ser Pro Gly Lys
                325                 330

<210> SEQ ID NO 58
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 58

Ala Ser Thr Lys Gly Pro Ser Val Phe Pro Leu Ala Pro Ser Ser Lys
1               5                   10                  15
Ser Thr Ser Gly Gly Thr Ala Ala Leu Gly Cys Leu Val Lys Asp Tyr
                20                  25                  30
Phe Pro Glu Pro Val Thr Val Ser Trp Asn Ser Gly Ala Leu Thr Ser
            35                  40                  45
Gly Val His Thr Phe Pro Ala Val Leu Gln Ser Ser Gly Leu Tyr Ser
        50                  55                  60
Leu Ser Ser Val Val Thr Val Pro Ser Ser Ser Leu Gly Thr Gln Thr

```
                65                  70                  75                  80
Tyr Ile Cys Asn Val Asn His Lys Pro Ser Asn Thr Lys Val Asp Lys
                    85                  90                  95
Lys Ala Glu Pro Lys Ser Cys Asp Lys Thr His Thr Cys Pro Pro Cys
                100                 105                 110
Pro Ala Pro Glu Leu Leu Gly Pro Ser Val Phe Leu Phe Pro Pro
            115                 120                 125
Lys Pro Lys Asp Thr Leu Met Ile Ser Arg Thr Pro Glu Val Thr Cys
        130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                165                 170                 175
Glu Gln Tyr Asn Ser Thr Tyr Arg Val Val Ser Val Leu Thr Val Leu
                180                 185                 190
His Gln Asp Trp Leu Asn Gly Lys Glu Tyr Lys Cys Lys Val Ser Asn
            195                 200                 205
Lys Ala Leu Pro Ala Pro Ile Glu Lys Thr Ile Ser Lys Ala Lys Gly
        210                 215                 220
Gln Pro Arg Glu Pro Gln Val Tyr Thr Leu Pro Pro Ser Arg Asp Glu
225                 230                 235                 240
Leu Thr Lys Asn Gln Val Ser Leu Thr Cys Leu Val Lys Gly Phe Tyr
                245                 250                 255
Pro Ser Asp Ile Ala Val Glu Trp Glu Ser Asn Gly Gln Pro Glu Asn
                260                 265                 270
Asn Tyr Lys Thr Thr Pro Pro Val Leu Asp Ser Asp Gly Ser Phe Phe
            275                 280                 285
Leu Tyr Ser Lys Leu Thr Val Asp Lys Ser Arg Trp Gln Gln Gly Asn
        290                 295                 300
Val Phe Ser Cys Ser Val Leu His Glu Ala Leu His Asn His Tyr Thr
305                 310                 315                 320
Gln Lys Ser Leu Ser Leu Ser Pro Gly Lys
                325                 330

<210> SEQ ID NO 59
<211> LENGTH: 8
<212> TYPE: PRT
<213> ORGANISM: Artificial Sequence
<220> FEATURE:
<223> OTHER INFORMATION: CDR-H1

<400> SEQUENCE: 59

Gly Phe Thr Phe Ser Lys Phe Gly
1               5

<210> SEQ ID NO 60
<211> LENGTH: 8
<212> TYPE: PRT
<213> ORGANISM: Artificial Sequence
<220> FEATURE:
<223> OTHER INFORMATION: CDR-H1

<400> SEQUENCE: 60

Gly Gly Ser Phe Ser Gly Tyr Tyr
1               5

<210> SEQ ID NO 61
<211> LENGTH: 8
```

```
<212> TYPE: PRT
<213> ORGANISM: Artificial Sequence
<220> FEATURE:
<223> OTHER INFORMATION: CDR-H1

<400> SEQUENCE: 61

Gly Gly Ser Phe Ser Thr Tyr Tyr
1               5

<210> SEQ ID NO 62
<211> LENGTH: 8
<212> TYPE: PRT
<213> ORGANISM: Artificial Sequence
<220> FEATURE:
<223> OTHER INFORMATION: CDR-H1

<400> SEQUENCE: 62

Gly Phe Thr Phe Ser Ser Tyr Ala
1               5

<210> SEQ ID NO 63
<211> LENGTH: 8
<212> TYPE: PRT
<213> ORGANISM: Artificial Sequence
<220> FEATURE:
<223> OTHER INFORMATION: CDR-H1

<400> SEQUENCE: 63

Gly Phe Thr Phe Ser Ser Tyr Trp
1               5

<210> SEQ ID NO 64
<211> LENGTH: 8
<212> TYPE: PRT
<213> ORGANISM: Artificial Sequence
<220> FEATURE:
<223> OTHER INFORMATION: CDR-H1

<400> SEQUENCE: 64

Gly Phe Ile Phe Ser Asn Tyr Gly
1               5

<210> SEQ ID NO 65
<211> LENGTH: 8
<212> TYPE: PRT
<213> ORGANISM: Artificial Sequence
<220> FEATURE:
<223> OTHER INFORMATION: CDR-H1

<400> SEQUENCE: 65

Gly Tyr Thr Phe Arg Asn Phe Gly
1               5

<210> SEQ ID NO 66
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 66

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
```

```
            35                  40                  45
Gly Val His Thr Phe Pro Ala Val Leu Gln Ser Ser Gly Leu Tyr Ser
 50                  55                  60

Leu Ser Ser Val Val Thr Val Pro Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Lys Ala Glu Pro Lys Ser Cys Asp Lys Thr His Thr Cys Pro Pro Cys
                100                 105                 110

Pro Ala Pro Glu Leu Leu Gly Gly Pro Ser Val Phe Leu Phe Pro Pro
                115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
                180                 185                 190

His Gln Asp Trp Leu Asn Gly Lys Glu Tyr Lys Cys Lys Val Ser Asn
                195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
                275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Ser His Tyr Thr
305                 310                 315                 320

Gln Lys Ser Leu Ser Leu Ser Pro Gly Lys
                325                 330

<210> SEQ ID NO 67
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 67

Ala Ser Thr Lys Gly Pro Ser Val Phe Pro Leu Ala Pro Ser Ser Lys
 1                   5                  10                  15

Ser Thr Ser Gly Gly Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
                 35                  40                  45

Gly Val His Thr Phe Pro Ala Val Leu Gln Ser Ser Gly Leu Tyr Ser
 50                  55                  60

Leu Ser Ser Val Val Thr Val Pro Ser Ser Ser Leu Gly Thr Gln Thr
```

```
                65                  70                  75                  80
Tyr Ile Cys Asn Val Asn His Lys Pro Ser Asn Thr Lys Val Asp Lys
                    85                  90                  95
Arg Val Glu Pro Lys Ser Cys Asp Lys Thr His Thr Cys Pro Pro Cys
                    100                 105                 110
Pro Ala Pro Glu Leu Leu Gly Gly Pro Ser Val Phe Leu Phe Pro Pro
                    115                 120                 125
Lys Pro Lys Asp Thr Leu Met Ile Ser Arg Thr Pro Glu Val Thr Cys
                    130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                    165                 170                 175
Glu Gln Tyr Asn Ser Thr Tyr Arg Val Val Ser Val Leu Thr Val Leu
                    180                 185                 190
His Gln Asp Trp Leu Asn Gly Lys Glu Tyr Lys Cys Lys Val Ser Asn
                    195                 200                 205
Lys Ala Leu Pro Ala Pro Ile Glu Lys Thr Ile Ser Lys Ala Lys Gly
                    210                 215                 220
Gln Pro Arg Glu Pro Gln Val Tyr Thr Leu Pro Pro Ser Arg Asp Glu
225                 230                 235                 240
Leu Thr Lys Asn Gln Val Ser Leu Thr Cys Leu Val Lys Gly Phe Tyr
                    245                 250                 255
Pro Ser Asp Ile Ala Val Glu Trp Glu Ser Asn Gly Gln Pro Glu Asn
                    260                 265                 270
Asn Tyr Lys Thr Thr Pro Pro Val Leu Asp Ser Asp Gly Ser Phe Phe
                    275                 280                 285
Leu Tyr Ser Lys Leu Thr Val Asp Lys Ser Arg Trp Gln Gln Gly Asn
                    290                 295                 300
Val Phe Ser Cys Ser Val Met His Glu Ala Leu His Asn His Tyr Thr
305                 310                 315                 320
Gln Lys Ser Leu Ser Leu Ser Pro Gly Lys
                    325                 330

<210> SEQ ID NO 68
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 68

Ala Ser Thr Lys Gly Pro Ser Val Phe Pro Leu Ala Pro Ser Ser Lys
1               5                   10                  15
Ser Thr Ser Gly Gly Thr Ala Ala Leu Gly Cys Leu Val Lys Asp Tyr
                    20                  25                  30
Phe Pro Glu Pro Val Thr Val Ser Trp Asn Ser Gly Ala Leu Thr Ser
                    35                  40                  45
Gly Val His Thr Phe Pro Ala Val Leu Gln Ser Ser Gly Leu Tyr Ser
                    50                  55                  60
Leu Ser Ser Val Val Thr Val Pro Ser Ser Leu Gly Thr Gln Thr
65                  70                  75                  80
Tyr Ile Cys Asn Val Asn His Lys Pro Ser Asn Thr Lys Val Asp Lys
                    85                  90                  95
Arg Val Glu Pro Lys Ser Cys Asp Lys Thr His Thr Cys Pro Pro Cys
```

```
                100                 105                 110
Pro Ala Pro Glu Leu Leu Gly Gly Pro Ser Val Phe Leu Phe Pro Pro
            115                 120                 125
Lys Pro Lys Asp Thr Leu Met Ile Ser Arg Thr Pro Glu Val Thr Cys
            130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                165                 170                 175
Glu Gln Tyr Asn Ser Thr Tyr Arg Val Val Ser Val Leu Thr Val Leu
            180                 185                 190
His Gln Asp Trp Leu Asn Gly Lys Glu Tyr Lys Cys Lys Val Ser Asn
            195                 200                 205
Lys Ala Leu Pro Ala Pro Ile Glu Lys Thr Ile Ser Lys Ala Lys Gly
            210                 215                 220
Gln Pro Arg Glu Pro Gln Val Tyr Thr Leu Pro Pro Ser Arg Glu Glu
225                 230                 235                 240
Leu Thr Lys Asn Gln Val Ser Leu Thr Cys Leu Val Lys Gly Phe Tyr
                245                 250                 255
Pro Ser Asp Ile Ala Val Glu Trp Glu Ser Asn Gly Gln Pro Glu Asn
            260                 265                 270
Asn Tyr Lys Thr Thr Pro Pro Val Leu Asp Ser Asp Gly Ser Phe Phe
            275                 280                 285
Leu Tyr Ser Lys Leu Thr Val Asp Lys Ser Arg Trp Gln Gln Gly Asn
            290                 295                 300
Val Phe Ser Cys Ser Val Met His Glu Ala Leu His Asn His Tyr Thr
305                 310                 315                 320
Gln Lys Ser Leu Ser Leu Ser Pro Gly Lys
                325                 330

<210> SEQ ID NO 69
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 69

Ala Ser Thr Lys Gly Pro Ser Val Phe Pro Leu Ala Pro Ser Ser Lys
1               5                   10                  15
Ser Thr Ser Gly Gly Thr Ala Ala Leu Gly Cys Leu Val Lys Asp Tyr
            20                  25                  30
Phe Pro Glu Pro Val Thr Val Ser Trp Asn Ser Gly Ala Leu Thr Ser
        35                  40                  45
Gly Val His Thr Phe Pro Ala Val Leu Gln Ser Ser Gly Leu Tyr Ser
    50                  55                  60
Leu Ser Ser Val Val Thr Val Pro Ser Ser Ser Leu Gly Thr Gln Thr
65                  70                  75                  80
Tyr Ile Cys Asn Val Asn His Lys Pro Ser Asn Thr Lys Val Asp Lys
                85                  90                  95
Lys Val Glu Pro Lys Ser Cys Asp Lys Thr His Thr Cys Pro Pro Cys
            100                 105                 110
Pro Ala Pro Glu Leu Leu Gly Gly Pro Ser Val Phe Leu Phe Pro Pro
            115                 120                 125
Lys Pro Lys Asp Thr Leu Met Ile Ser Arg Thr Pro Glu Val Thr Cys
```

-continued

```
                130                 135                 140
Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
                180                 185                 190

His Gln Asp Trp Leu Asn Gly Lys Glu Tyr Lys Cys Lys Val Ser Asn
                195                 200                 205

Lys Ala Leu Pro Ala Pro Ile Glu Lys Thr Ile Ser Lys Ala Lys Gly
                210                 215                 220

Gln Pro Arg Glu Pro Gln Val Tyr Thr Leu Pro Pro Ser Arg Glu Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
                275                 280                 285

Leu Tyr Ser Lys Leu Thr Val Asp Lys Ser Arg Trp Gln Gln Gly Asn
                290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330
```

<210> SEQ ID NO 70
<211> LENGTH: 7
<212> TYPE: PRT
<213> ORGANISM: Artificial Sequence
<220> FEATURE:
<223> OTHER INFORMATION: CDR-H2

<400> SEQUENCE: 70

```
Ile Tyr His Ser Gly Ser Thr
1               5
```

<210> SEQ ID NO 71
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 71

```
Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95
```

```
Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
            130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
210                 215                 220

Gln Pro Arg Glu Pro Gln Val Tyr Thr Leu Pro Pro Ser Arg Asp Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 72
<211> LENGTH: 7
<212> TYPE: PRT
<213> ORGANISM: Artificial Sequence
<220> FEATURE:
<223> OTHER INFORMATION: CDR-H2

<400> SEQUENCE: 72

Ile Tyr His Ser Gly Asn Thr
1               5

<210> SEQ ID NO 73
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 73

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60
```

-continued

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Ala Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
210                 215                 220

Gln Pro Arg Glu Pro Gln Val Tyr Thr Leu Pro Pro Ser Arg Asp Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 74
<211> LENGTH: 330
<212> TYPE: PRT
<213> ORGANISM: Artificial Sequence
<220> FEATURE:
<223> OTHER INFORMATION: IgG1 Fc domain

<400> SEQUENCE: 74

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

```
            Lys Ala Glu Pro Lys Ser Cys Asp Lys Thr His Thr Cys Pro Pro Cys
                            100                 105                 110

Pro Ala Pro Glu Leu Leu Gly Gly Pro Ser Val Phe Leu Phe Pro Pro
                        115                 120                 125

Lys Pro Lys Asp Thr Leu Met Ile Ser Arg Thr Pro Glu Val Thr Cys
            130                 135                 140

Val Val Val Asp Val Ser His Glu Asp Pro Glu Val Lys Phe Asn Trp
            145                 150                 155                 160

Tyr Val Asp Gly Val Glu Val His Asn Ala Lys Thr Lys Pro Arg Glu
                            165                 170                 175

Glu Gln Tyr Asn Ser Thr Tyr Arg Val Val Ser Val Leu Thr Val Leu
                        180                 185                 190

His Gln Asp Trp Leu Asn Gly Lys Glu Tyr Lys Cys Lys Val Ser Asn
                    195                 200                 205

Lys Ala Leu Pro Ala Pro Glu Glu Lys Thr Ile Ser Lys Ala Lys Gly
                210                 215                 220

Gln Pro Arg Glu Pro Gln Val Tyr Thr Leu Pro Pro Ser Arg Asp Glu
            225                 230                 235                 240

Leu Thr Lys Asn Gln Val Ser Leu Thr Cys Leu Val Lys Gly Phe Tyr
                            245                 250                 255

Pro Ser Asp Ile Ala Val Glu Trp Glu Ser Asn Gly Gln Pro Glu Asn
                        260                 265                 270

Asn Tyr Lys Thr Thr Pro Pro Val Leu Asp Ser Asp Gly Ser Phe Phe
                    275                 280                 285

Leu Tyr Ser Lys Leu Thr Val Asp Lys Ser Arg Trp Gln Gln Gly Asn
                290                 295                 300

Val Phe Ser Cys Ser Val Met His Glu Ala Leu His Asn His Tyr Thr
            305                 310                 315                 320

Gln Lys Ser Leu Ser Leu Ser Pro Gly Lys
                            325                 330

<210> SEQ ID NO 75
<211> LENGTH: 8
<212> TYPE: PRT
<213> ORGANISM: Artificial Sequence
<220> FEATURE:
<223> OTHER INFORMATION: CDR-H2

<400> SEQUENCE: 75

Ile Ser Tyr Asp Gly Asn Asn Lys
1               5

<210> SEQ ID NO 76
<211> LENGTH: 7
<212> TYPE: PRT
<213> ORGANISM: Artificial Sequence
<220> FEATURE:
<223> OTHER INFORMATION: CDR-H2

<400> SEQUENCE: 76

Ile Asn His Ser Gly Ser Thr
1               5

<210> SEQ ID NO 77
<211> LENGTH: 8
<212> TYPE: PRT
<213> ORGANISM: Artificial Sequence
<220> FEATURE:
<223> OTHER INFORMATION: CDR-H2
```

```
<400> SEQUENCE: 77

Ile Ser Gly Ser Gly Gly Asp Thr
1               5

<210> SEQ ID NO 78
<211> LENGTH: 8
<212> TYPE: PRT
<213> ORGANISM: Artificial Sequence
<220> FEATURE:
<223> OTHER INFORMATION: CDR-H2

<400> SEQUENCE: 78

Ile His Asn Asp Gly Ser Arg Thr
1               5

<210> SEQ ID NO 79
<211> LENGTH: 8
<212> TYPE: PRT
<213> ORGANISM: Artificial Sequence
<220> FEATURE:
<223> OTHER INFORMATION: CDR-H2

<400> SEQUENCE: 79

Ile Ser Gly Ser Gly Ser Ser Thr
1               5

<210> SEQ ID NO 80
<211> LENGTH: 8
<212> TYPE: PRT
<213> ORGANISM: Artificial Sequence
<220> FEATURE:
<223> OTHER INFORMATION: CDR-H2

<400> SEQUENCE: 80

Ile Ser Tyr Asp Gly Arg Asn Glu
1               5

<210> SEQ ID NO 81
<211> LENGTH: 8
<212> TYPE: PRT
<213> ORGANISM: Artificial Sequence
<220> FEATURE:
<223> OTHER INFORMATION: CDR-H2

<400> SEQUENCE: 81

Ile Asp Thr Asn Thr Gly Glu Pro
1               5

<210> SEQ ID NO 82
<211> LENGTH: 327
<212> TYPE: PRT
<213> ORGANISM: Artificial Sequence
<220> FEATURE:
<223> OTHER INFORMATION: IgG4 Fc Domain

<400> SEQUENCE: 82

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60
```

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Glu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 83
<211> LENGTH: 327
<212> TYPE: PRT
<213> ORGANISM: Artificial Sequence
<220> FEATURE:
<223> OTHER INFORMATION: IgG4 Fc Domain

<400> SEQUENCE: 83

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
100                 105                 110

Glu Phe Leu Gly Gly Pro Ser Val Phe Leu Phe Pro Pro Lys Pro Lys
115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
                180                 185                 190

Trp Leu Asn Gly Lys Glu Tyr Lys Cys Lys Val Ser Asn Lys Gly Leu
                195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
                260                 265                 270

Thr Thr Pro Pro Val Leu Asp Ser Asp Gly Ser Phe Phe Leu Tyr Ser
                275                 280                 285

Arg Leu Thr Val Asp Lys Ser Arg Trp Gln Glu Gly Asn Val Phe Ser
                290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 84
<211> LENGTH: 327
<212> TYPE: PRT
<213> ORGANISM: Artificial Sequence
<220> FEATURE:
<223> OTHER INFORMATION: IgG4 Fc Domain

<400> SEQUENCE: 84

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
                35                  40                  45

Gly Val His Thr Phe Pro Ala Val Leu Gln Ser Ser Gly Leu Tyr Ser
                50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
                100                 105                 110

Glu Ala Leu Gly Gly Pro Ser Val Phe Leu Phe Pro Pro Lys Pro Lys
                115                 120                 125

```
Asp Thr Leu Met Ile Ser Arg Thr Pro Glu Val Thr Cys Val Val Val
            130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 85
<211> LENGTH: 327
<212> TYPE: PRT
<213> ORGANISM: Artificial Sequence
<220> FEATURE:
<223> OTHER INFORMATION: IgG4 Fc Domain

<400> SEQUENCE: 85

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Ala Ala Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160
```

```
Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 86
<211> LENGTH: 11
<212> TYPE: PRT
<213> ORGANISM: Artificial Sequence
<220> FEATURE:
<223> OTHER INFORMATION: CDR-H3

<400> SEQUENCE: 86

Ala Arg Arg Gly Ile Trp Phe Gly Val Gly Pro
1               5                   10

<210> SEQ ID NO 87
<211> LENGTH: 327
<212> TYPE: PRT
<213> ORGANISM: Artificial Sequence
<220> FEATURE:
<223> OTHER INFORMATION: IgG4 Fc Domain

<400> SEQUENCE: 87

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Ala Gly Gly Pro Ser Val Phe Leu Phe Pro Pro Lys Pro Lys
```

```
            115                 120                 125
Asp Thr Leu Met Ile Ser Arg Thr Pro Glu Val Thr Cys Val Val
    130                 135                 140
Asp Val Ser Gln Glu Asp Pro Glu Val Gln Phe Asn Trp Tyr Val Asp
145                 150                 155                 160
Gly Val Glu Val His Asn Ala Lys Thr Lys Pro Arg Glu Glu Gln Phe
                165                 170                 175
Asn Ser Thr Tyr Arg Val Val Ser Val Leu Thr Val Leu His Gln Asp
                180                 185                 190
Trp Leu Asn Gly Lys Glu Tyr Lys Cys Lys Val Ser Asn Lys Gly Leu
                195                 200                 205
Pro Ser Ser Ile Glu Lys Thr Ile Ser Lys Ala Lys Gly Gln Pro Arg
210                 215                 220
Glu Pro Gln Val Tyr Thr Leu Pro Pro Ser Gln Glu Glu Met Thr Lys
225                 230                 235                 240
Asn Gln Val Ser Leu Thr Cys Leu Val Lys Gly Phe Tyr Pro Ser Asp
                245                 250                 255
Ile Ala Val Glu Trp Glu Ser Asn Gly Gln Pro Glu Asn Asn Tyr Lys
                260                 265                 270
Thr Thr Pro Pro Val Leu Asp Ser Asp Gly Ser Phe Phe Leu Tyr Ser
                275                 280                 285
Arg Leu Thr Val Asp Lys Ser Arg Trp Gln Gln Gly Asn Val Phe Ser
                290                 295                 300
Cys Ser Val Met His Glu Ala Leu His Asn His Tyr Thr Gln Lys Ser
305                 310                 315                 320
Leu Ser Leu Ser Leu Gly Lys
                325

<210> SEQ ID NO 88
<211> LENGTH: 16
<212> TYPE: PRT
<213> ORGANISM: Artificial Sequence
<220> FEATURE:
<223> OTHER INFORMATION: CDR-H3

<400> SEQUENCE: 88

Ala Arg Glu Gly Ile Glu Gly Tyr Tyr Phe Tyr Tyr Gly Met Asp Val
1               5                   10                  15

<210> SEQ ID NO 89
<211> LENGTH: 14
<212> TYPE: PRT
<213> ORGANISM: Artificial Sequence
<220> FEATURE:
<223> OTHER INFORMATION: CDR-H3

<400> SEQUENCE: 89

Ala Arg Asp Lys Cys Ser Thr Thr Cys Ser Phe Asp Tyr
1               5                   10

<210> SEQ ID NO 90

<400> SEQUENCE: 90

000

<210> SEQ ID NO 91

<400> SEQUENCE: 91
```

```
<210> SEQ ID NO 92
<211> LENGTH: 9
<212> TYPE: PRT
<213> ORGANISM: Artificial Sequence
<220> FEATURE:
<223> OTHER INFORMATION: CDR-H3

<400> SEQUENCE: 92

Trp Ala Ala Ala Gly Ala Phe Tyr Ile
1               5

<210> SEQ ID NO 93
<211> LENGTH: 16
<212> TYPE: PRT
<213> ORGANISM: Artificial Sequence
<220> FEATURE:
<223> OTHER INFORMATION: CDR-H3

<400> SEQUENCE: 93

Ser Arg Val Asp Ser Gly Ser Tyr Pro Tyr Tyr Asp Gly Leu Asp Val
1               5                  10                  15

<210> SEQ ID NO 94
<211> LENGTH: 18
<212> TYPE: PRT
<213> ORGANISM: Artificial Sequence
<220> FEATURE:
<223> OTHER INFORMATION: CDR-H3

<400> SEQUENCE: 94

Ala Ser Ser His Tyr Gly Ser Gly Ser Phe Pro Asp Ser Tyr Gly Met
1               5                  10                  15

Asp Val

<210> SEQ ID NO 95
<211> LENGTH: 13
<212> TYPE: PRT
<213> ORGANISM: Artificial Sequence
<220> FEATURE:
<223> OTHER INFORMATION: CDR-H3

<400> SEQUENCE: 95

Ala Lys Asp Gly Gly Ser Tyr Tyr Pro Pro Phe Asp Tyr
1               5                  10

<210> SEQ ID NO 96
<211> LENGTH: 17
<212> TYPE: PRT
<213> ORGANISM: Artificial Sequence
<220> FEATURE:
<223> OTHER INFORMATION: CDR-H3

<400> SEQUENCE: 96

Thr Arg Asp Pro Pro Pro Tyr Asp Ile Leu Thr Gly Tyr Pro Phe Asp
1               5                  10                  15

Tyr

<210> SEQ ID NO 97
<211> LENGTH: 14
<212> TYPE: PRT
<213> ORGANISM: Artificial Sequence
<220> FEATURE:
<223> OTHER INFORMATION: CDR-H3
```

```
<400> SEQUENCE: 97

Ala Ala Tyr Ser Gly Ser Tyr Tyr Tyr Gly Met Asp Val
1               5                   10

<210> SEQ ID NO 98
<211> LENGTH: 11
<212> TYPE: PRT
<213> ORGANISM: Artificial Sequence
<220> FEATURE:
<223> OTHER INFORMATION: CDR-H3

<400> SEQUENCE: 98

Ala Lys Gly Ser Gly Ser Tyr Tyr Phe Asp Tyr
1               5                   10

<210> SEQ ID NO 99
<211> LENGTH: 12
<212> TYPE: PRT
<213> ORGANISM: Artificial Sequence
<220> FEATURE:
<223> OTHER INFORMATION: CDR-H3

<400> SEQUENCE: 99

Ala Arg Ser Arg Gly Asn Tyr Phe Ala Met Glu Tyr
1               5                   10

<210> SEQ ID NO 100

<400> SEQUENCE: 100

000

<210> SEQ ID NO 101

<400> SEQUENCE: 101

000

<210> SEQ ID NO 102

<400> SEQUENCE: 102

000

<210> SEQ ID NO 103

<400> SEQUENCE: 103

000

<210> SEQ ID NO 104
<211> LENGTH: 118
<212> TYPE: PRT
<213> ORGANISM: Artificial Sequence
<220> FEATURE:
<223> OTHER INFORMATION: VH sequence

<400> SEQUENCE: 104

Gln Val Gln Leu Gln Glu Ser Gly Pro Gly Leu Val Lys Pro Ser Gly
1               5                   10                  15

Thr Leu Ser Leu Thr Cys Ala Val Ser Gly Gly Ser Ile Ser Ser Ser
            20                  25                  30

Asn Trp Trp Ser Trp Val Arg Gln Pro Pro Gly Lys Gly Leu Glu Trp
        35                  40                  45

Ile Gly Glu Ile Tyr His Ser Gly Ser Thr Asn Tyr Asn Pro Ser Leu
```

```
                50                  55                  60
Lys Ser Arg Val Thr Ile Ser Val Asp Lys Ser Lys Asn Gln Phe Ser
 65                  70                  75                  80

Leu Lys Leu Ser Ser Val Thr Ala Ala Asp Thr Ala Val Tyr Tyr Cys
                 85                  90                  95

Ala Arg Arg Gly Ile Trp Phe Gly Val Gly Pro Trp Gly Gln Gly Thr
                100                 105                 110

Leu Val Thr Val Ser Ser
        115
```

<210> SEQ ID NO 105

<400> SEQUENCE: 105

000

<210> SEQ ID NO 106
<211> LENGTH: 123
<212> TYPE: PRT
<213> ORGANISM: Artificial Sequence
<220> FEATURE:
<223> OTHER INFORMATION: VH sequence

<400> SEQUENCE: 106

```
Gln Val Gln Leu Gln Glu Ser Gly Pro Gly Leu Val Lys Pro Ser Gly
  1               5                  10                  15

Thr Leu Ser Leu Thr Cys Ala Val Ser Gly Gly Ser Ile Ser Ser Ser
                 20                  25                  30

Asn Trp Trp Ser Trp Val Arg Gln Pro Pro Gly Lys Gly Leu Glu Trp
                 35                  40                  45

Ile Gly Glu Ile Tyr His Ser Gly Asn Thr Asn Tyr Asn Pro Ser Leu
             50                  55                  60

Lys Ser Arg Val Thr Ile Ser Val Asp Lys Ser Lys Asn Gln Phe Ser
 65                  70                  75                  80

Leu Lys Leu Ser Ser Val Thr Ala Ala Asp Thr Ala Val Tyr Tyr Cys
                 85                  90                  95

Ala Arg Glu Gly Ile Glu Gly Tyr Tyr Phe Tyr Tyr Gly Met Asp Val
                100                 105                 110

Trp Gly Gln Gly Thr Thr Val Thr Val Ser Ser
        115                 120
```

<210> SEQ ID NO 107
<211> LENGTH: 121
<212> TYPE: PRT
<213> ORGANISM: Artificial Sequence
<220> FEATURE:
<223> OTHER INFORMATION: VH sequence

<400> SEQUENCE: 107

```
Gln Val Gln Leu Gln Glu Ser Gly Pro Gly Leu Leu Lys Pro Ser Glu
  1               5                  10                  15

Thr Leu Ser Leu Thr Cys Ala Val Ser Asp Tyr Ser Ile Ser Ser Gly
                 20                  25                  30

Tyr Tyr Trp Gly Trp Ile Arg Gln Pro Pro Gly Lys Gly Leu Glu Trp
                 35                  40                  45

Ile Gly Ser Ile Tyr His Ser Gly Asn Thr Tyr Tyr Asn Pro Ser Leu
             50                  55                  60

Lys Ser Arg Val Thr Ile Leu Val Asp Thr Ser Lys Asn Gln Phe Ser
 65                  70                  75                  80
```

```
Leu Lys Leu Ser Ser Val Thr Ala Ala Asp Thr Ala Val Tyr Tyr Cys
                85                  90                  95
Ala Arg Asp Lys Cys Ser Thr Thr Cys Ser Phe Asp Tyr Trp Gly
            100                 105                 110
Gln Gly Thr Leu Val Thr Val Ser Ser
        115                 120
```

<210> SEQ ID NO 108

<400> SEQUENCE: 108

000

<210> SEQ ID NO 109

<400> SEQUENCE: 109

000

<210> SEQ ID NO 110
<211> LENGTH: 116
<212> TYPE: PRT
<213> ORGANISM: Artificial Sequence
<220> FEATURE:
<223> OTHER INFORMATION: VH sequence

<400> SEQUENCE: 110

```
Gln Val Gln Leu Val Glu Ser Gly Gly Gly Val Val Gln Pro Gly Arg
1               5                   10                  15
Ser Leu Arg Leu Ser Cys Ala Ala Ser Gly Phe Thr Phe Ser Lys Phe
            20                  25                  30
Gly Met His Trp Val Arg Gln Ala Pro Gly Lys Gly Leu Glu Trp Val
        35                  40                  45
Ala Val Ile Ser Tyr Asp Gly Asn Asn Lys Tyr Tyr Thr Asp Ser Val
    50                  55                  60
Lys Gly Arg Phe Thr Ile Ser Arg Asp Asn Ser Arg Asn Thr Leu Tyr
65                  70                  75                  80
Leu Gln Met Asp Ser Val Lys Pro Glu Asp Thr Ala Val Tyr Tyr Ser
                85                  90                  95
Trp Ala Ala Gly Ala Phe Tyr Ile Trp Gly Gln Gly Thr Met Val
            100                 105                 110
Thr Val Ser Ser
        115
```

<210> SEQ ID NO 111
<211> LENGTH: 122
<212> TYPE: PRT
<213> ORGANISM: Artificial Sequence
<220> FEATURE:
<223> OTHER INFORMATION: VH sequence

<400> SEQUENCE: 111

```
Gln Val Gln Leu Gln Gln Trp Gly Ala Gly Leu Leu Lys Pro Ser Glu
1               5                   10                  15
Thr Leu Ser Leu Thr Cys Ala Val Tyr Gly Gly Ser Phe Ser Gly Tyr
            20                  25                  30
Tyr Trp Ser Trp Ile Arg Gln Pro Pro Gly Lys Gly Leu Glu Trp Ile
        35                  40                  45
Gly Glu Ile Asn His Ser Gly Ser Thr Asn Phe Asn Pro Ser Leu Lys
    50                  55                  60
```

```
Ser Arg Val Thr Ile Ser Val Asp Thr Ser Lys Asn Gln Phe Ser Leu
 65                  70                  75                  80

Lys Leu Arg Ser Val Thr Ala Ala Asp Thr Ala Val Tyr Tyr Cys Ser
                 85                  90                  95

Arg Val Asp Ser Gly Ser Tyr Pro Tyr Tyr Asp Gly Leu Asp Val Trp
            100                 105                 110

Gly Gln Gly Thr Thr Val Thr Val Ser Ser
        115                 120

<210> SEQ ID NO 112
<211> LENGTH: 124
<212> TYPE: PRT
<213> ORGANISM: Artificial Sequence
<220> FEATURE:
<223> OTHER INFORMATION: VH sequence

<400> SEQUENCE: 112

Gln Val Gln Leu Gln Gln Trp Gly Ala Gly Leu Leu Lys Pro Ser Glu
 1               5                  10                  15

Thr Leu Ser Leu Thr Cys Ala Val Tyr Gly Gly Ser Phe Ser Thr Tyr
                 20                  25                  30

Tyr Trp Asn Trp Ile Arg Gln Pro Pro Gly Lys Gly Leu Glu Trp Ile
             35                  40                  45

Gly Glu Ile Asn His Ser Gly Ser Thr Asn Tyr Asn Pro Ser Leu Lys
         50                  55                  60

Ser Arg Val Ile Ile Ser Val Asp Thr Ser Lys Asn Gln Phe Ser Leu
 65                  70                  75                  80

Lys Leu Ser Ser Val Thr Ala Ala Asp Thr Ala Val Tyr Tyr Cys Ala
                 85                  90                  95

Ser Ser His Tyr Gly Ser Gly Ser Phe Pro Asp Ser Tyr Gly Met Asp
            100                 105                 110

Val Trp Gly Gln Gly Thr Thr Val Thr Val Ser Ala
        115                 120

<210> SEQ ID NO 113
<211> LENGTH: 120
<212> TYPE: PRT
<213> ORGANISM: Artificial Sequence
<220> FEATURE:
<223> OTHER INFORMATION: VH sequence

<400> SEQUENCE: 113

Glu Val Gln Leu Leu Glu Ser Gly Gly Gly Leu Val Gln Pro Gly Gly
 1               5                  10                  15

Ser Leu Arg Leu Ser Cys Ala Ala Ser Gly Phe Thr Phe Ser Ser Tyr
                 20                  25                  30

Ala Met Ser Trp Val Arg Gln Ala Pro Gly Lys Gly Leu Glu Trp Val
             35                  40                  45

Ser Ala Ile Ser Gly Ser Gly Gly Asp Thr Tyr Tyr Ala Asp Ser Val
         50                  55                  60

Lys Gly Arg Phe Thr Ile Ser Arg Asp Asn Ser Lys Ser Thr Leu Tyr
 65                  70                  75                  80

Leu Gln Met Asn Ser Leu Arg Ala Glu Asp Thr Ala Val Tyr Tyr Cys
                 85                  90                  95

Ala Lys Asp Gly Gly Ser Tyr Tyr Pro Pro Phe Asp Tyr Trp Gly Gln
            100                 105                 110

Gly Thr Leu Val Thr Val Ser Ser
```

```
                115                 120

<210> SEQ ID NO 114
<211> LENGTH: 124
<212> TYPE: PRT
<213> ORGANISM: Artificial Sequence
<220> FEATURE:
<223> OTHER INFORMATION: VH sequence

<400> SEQUENCE: 114

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Trp Met His Trp Val Arg Gln Ala Pro Gly Lys Gly Leu Val Trp Val
        35                  40                  45

Ser Arg Ile His Asn Asp Gly Ser Arg Thr Ser Tyr Ala Asp Ser Val
    50                  55                  60

Lys Gly Arg Phe Thr Ile Ser Arg Asp Asn Ala Lys Asn Thr Leu Tyr
65                  70                  75                  80

Leu Gln Met Ser Ser Leu Arg Ala Glu Asp Thr Ala Val Tyr Tyr Cys
                85                  90                  95

Thr Arg Asp Pro Pro Pro Tyr Asp Ile Leu Thr Gly Tyr Pro Phe Asp
            100                 105                 110

Tyr Trp Gly Gln Gly Thr Leu Val Thr Val Ser Ser
        115                 120

<210> SEQ ID NO 115
<211> LENGTH: 121
<212> TYPE: PRT
<213> ORGANISM: Artificial Sequence
<220> FEATURE:
<223> OTHER INFORMATION: VH sequence

<400> SEQUENCE: 115

Glu Val Gln Val Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Ser Gly Ser Ser Thr His Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala Tyr Ser Gly Ser Tyr Tyr Tyr Gly Met Asp Val Trp Gly
            100                 105                 110

Gln Gly Thr Thr Val Thr Val Ser Ser
        115                 120

<210> SEQ ID NO 116
<211> LENGTH: 121
<212> TYPE: PRT
<213> ORGANISM: Artificial Sequence
<220> FEATURE:
<223> OTHER INFORMATION: VH sequence

<400> SEQUENCE: 116
```

```
Glu Val Gln Met Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Ala Met Ser Trp Val Arg Gln Ala Pro Gly Lys Gly Leu Glu Trp Val
        35                  40                  45

Ser Ala Ile Ser Gly Gly Ser Ser Thr His Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
            85                  90                  95

Ala Ala Tyr Ser Gly Ser Tyr Tyr Tyr Gly Met Asp Val Trp Gly
            100                 105                 110

Gln Gly Thr Thr Val Thr Val Ser Ser
        115                 120

<210> SEQ ID NO 117
<211> LENGTH: 118
<212> TYPE: PRT
<213> ORGANISM: Artificial Sequence
<220> FEATURE:
<223> OTHER INFORMATION: VH sequence

<400> SEQUENCE: 117

Gln Val Gln Leu Val Glu Ser Gly Gly Gly Val Val Gln Pro Gly Arg
1               5                   10                  15

Ser Leu Arg Leu Ser Cys Val Ala Ser Gly Phe Ile Phe Ser Asn Tyr
            20                  25                  30

Gly Met His Trp Val Arg Gln Ala Pro Gly Lys Gly Leu Glu Trp Val
        35                  40                  45

Ala Val Ile Ser Tyr Asp Gly Arg Asn Glu Asp His Val Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
            85                  90                  95

Ala Lys Gly Ser Gly Ser Tyr Tyr Phe Asp Tyr Trp Gly Gln Gly Thr
            100                 105                 110

Leu Val Thr Val Ser Ser
        115

<210> SEQ ID NO 118
<211> LENGTH: 119
<212> TYPE: PRT
<213> ORGANISM: Artificial Sequence
<220> FEATURE:
<223> OTHER INFORMATION: VH sequence

<400> SEQUENCE: 118

Gln Ile Gln Leu Val Gln Ser Gly Pro Glu Leu Lys Lys Pro Gly Glu
1               5                   10                  15

Thr Val Lys Ile Ser Cys Lys Gly Ser Gly Tyr Thr Phe Arg Asn Phe
            20                  25                  30

Gly Met Asn Trp Val Lys Gln Ala Pro Gly Met Gly Leu Lys Trp Met
        35                  40                  45

Val Trp Ile Asp Thr Asn Thr Gly Glu Pro Thr Tyr Ala Glu Glu Phe
```

```
                    50                  55                  60
Lys Gly Arg Phe Ala Phe Ser Leu Glu Thr Ser Ala Ser Thr Ala Tyr
 65                  70                  75                  80

Leu Gln Ile Asn Asn Leu Lys Asn Glu Asp Thr Ala Thr Tyr Phe Cys
                 85                  90                  95

Ala Arg Ser Arg Gly Asn Tyr Phe Ala Met Glu Tyr Trp Gly Gln Gly
            100                 105                 110

Thr Ser Val Thr Val Ser Ser
            115
```

<210> SEQ ID NO 119

<400> SEQUENCE: 119

000

<210> SEQ ID NO 120

<400> SEQUENCE: 120

000

<210> SEQ ID NO 121

<400> SEQUENCE: 121

000

<210> SEQ ID NO 122

<400> SEQUENCE: 122

000

<210> SEQ ID NO 123
<211> LENGTH: 112
<212> TYPE: PRT
<213> ORGANISM: Artificial Sequence
<220> FEATURE:
<223> OTHER INFORMATION: VL sequence

<400> SEQUENCE: 123

```
Asp Ile Val Met Thr Gln Ser Pro Leu Ser Leu Pro Val Thr Pro Gly
 1               5                  10                  15

Glu Pro Ala Ser Ile Ser Cys Arg Ser Ser Gln Ser Leu Leu His Gly
             20                  25                  30

Asn Gly Phe Asn Tyr Leu Asp Trp Tyr Leu Gln Lys Pro Gly Gln Ser
         35                  40                  45

Pro Gln Leu Leu Ile Tyr Leu Gly Ser Asn Arg Ala Ser Gly Val Pro
     50                  55                  60

Asp Arg Phe Thr Gly Ser Gly Ser Gly Thr Asp Phe Thr Leu Lys Ile
 65                  70                  75                  80

Ser Arg Val Glu Ala Glu Asp Val Gly Val Tyr Tyr Cys Met Gln Gly
                 85                  90                  95

Leu Gln Thr Pro Arg Thr Phe Gly Gln Gly Thr Lys Val Glu Ile Lys
            100                 105                 110
```

<210> SEQ ID NO 124

<400> SEQUENCE: 124

000

```
<210> SEQ ID NO 125
<211> LENGTH: 107
<212> TYPE: PRT
<213> ORGANISM: Artificial Sequence
<220> FEATURE:
<223> OTHER INFORMATION: VL sequence

<400> SEQUENCE: 125

Asp Ile Gln Leu Thr Gln Ser Pro Ser Phe Leu Ser Ala Ser Val Gly
1               5                   10                  15

Asp Arg Val Thr Ile Thr Cys Arg Ala Ser Gln Gly Ile Ser Gly Tyr
            20                  25                  30

Leu Asp Trp Tyr Gln Gln Lys Pro Gly Lys Ala Pro Lys Leu Leu Ile
        35                  40                  45

Tyr Ala Ala Ser Thr Leu Gln Arg Gly Val Pro Ser Arg Phe Ser Gly
50                  55                  60

Ser Gly Ser Gly Thr Asp Phe Asn Leu Thr Ile Ser Ser Leu Gln Pro
65                  70                  75                  80

Glu Asp Phe Ala Thr Tyr Tyr Cys Gln Gln Phe Thr Ser Asp Leu Ile
                85                  90                  95

Thr Phe Gly Gln Gly Thr Arg Leu Glu Ile Lys
            100                 105

<210> SEQ ID NO 126
<211> LENGTH: 107
<212> TYPE: PRT
<213> ORGANISM: Artificial Sequence
<220> FEATURE:
<223> OTHER INFORMATION: VL sequence

<400> SEQUENCE: 126

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Phe Ser Asn Tyr
            20                  25                  30

Leu Asn Trp Tyr Gln Gln Lys Pro Gly Lys Ala Pro Lys Leu Leu Ile
        35                  40                  45

Tyr Ala Ala Ser Asn Leu Glu Thr Gly Val Pro Ser Arg Phe Ser Gly
50                  55                  60

Ser Gly Ser Gly Thr Asp Phe Thr Phe Thr Ile Ser Ser Leu Gln Pro
65                  70                  75                  80

Glu Asp Ile Ala Val Tyr Tyr Cys Gln Gln Tyr Asp Asn Leu Pro Tyr
                85                  90                  95

Thr Phe Gly Gln Gly Thr Lys Leu Glu Ile Lys
            100                 105

<210> SEQ ID NO 127

<400> SEQUENCE: 127

000

<210> SEQ ID NO 128

<400> SEQUENCE: 128

000

<210> SEQ ID NO 129
```

<211> LENGTH: 108
<212> TYPE: PRT
<213> ORGANISM: Artificial Sequence
<220> FEATURE:
<223> OTHER INFORMATION: VL sequence

<400> SEQUENCE: 129

Ser Tyr Val Leu Thr Gln Pro Pro Ser Val Ser Val Ala Pro Gly Gln
1               5                   10                  15

Thr Ala Arg Ile Thr Cys Gly Gly Tyr Asn Ile Gly Ser Lys Ser Val
            20                  25                  30

His Trp Tyr Gln Gln Lys Ala Gly Gln Ala Pro Val Leu Val Val Tyr
        35                  40                  45

Asp Asp Ser Gly Arg Pro Ser Gly Ile Pro Glu Arg Leu Ser Gly Ser
    50                  55                  60

Lys Ser Gly Asn Thr Ala Thr Leu Thr Ile Ser Arg Val Glu Ala Gly
65                  70                  75                  80

Asp Glu Ala Asp Tyr Tyr Cys Gln Val Trp Asp Ser Ser Ser Asp His
                85                  90                  95

Tyr Val Phe Gly Thr Gly Thr Lys Val Thr Val Leu
            100                 105

<210> SEQ ID NO 130
<211> LENGTH: 106
<212> TYPE: PRT
<213> ORGANISM: Artificial Sequence
<220> FEATURE:
<223> OTHER INFORMATION: VL sequence

<400> SEQUENCE: 130

Ser Ser Glu Leu Thr Gln Pro Pro Ser Val Ser Val Ser Pro Gly Gln
1               5                   10                  15

Thr Ala Ser Ile Thr Cys Ser Gly Asp Lys Leu Gly Asp Lys Tyr Val
            20                  25                  30

Tyr Trp Tyr Gln Gln Lys Pro Gly Gln Ser Pro Val Leu Val Ile Tyr
        35                  40                  45

His Asp Asp Arg Arg Pro Ala Gly Ile Pro Glu Arg Phe Ala Gly Ser
    50                  55                  60

Ala Ser Gly Asn Thr Ala Thr Leu Thr Ile Ser Gly Thr Gln Ala Met
65                  70                  75                  80

Asp Glu Ala Asp Tyr Tyr Cys Gln Thr Trp Asp Ser Ser Thr Val Val
                85                  90                  95

Phe Gly Gly Gly Thr Lys Leu Thr Val Leu
            100                 105

<210> SEQ ID NO 131
<211> LENGTH: 106
<212> TYPE: PRT
<213> ORGANISM: Artificial Sequence
<220> FEATURE:
<223> OTHER INFORMATION: VL sequence

<400> SEQUENCE: 131

Ser Tyr Glu Leu Thr Gln Ser Pro Ser Val Ser Val Ser Pro Gly Gln
1               5                   10                  15

Thr Ala Ser Ile Thr Cys Ser Gly Asp Lys Leu Gly Asp Arg Tyr Ala
            20                  25                  30

Trp Trp Tyr Gln Gln Lys Pro Gly Gln Ser Pro Val Leu Val Ile Tyr
        35                  40                  45

```
Gln Asp Asp Lys Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Met
65                  70                  75                  80

Asp Glu Ala Asp Tyr Tyr Cys Gln Ala Trp Asp Ser Ser Thr Ala Val
                85                  90                  95

Phe Gly Gly Gly Thr Lys Leu Thr Val Leu
            100                 105

<210> SEQ ID NO 132
<211> LENGTH: 106
<212> TYPE: PRT
<213> ORGANISM: Artificial Sequence
<220> FEATURE:
<223> OTHER INFORMATION: VL sequence

<400> SEQUENCE: 132

Ser Tyr Glu Leu Thr Gln Pro Pro Ser Val Ser Val Ser Pro Gly Gln
1               5                   10                  15

Thr Ala Ser Ile Thr Cys Ser Gly Asp Lys Leu Gly Asp Arg Tyr Ala
                20                  25                  30

Cys Trp Tyr Gln Gln Lys Pro Gly Gln Ser Pro Val Leu Val Ile Tyr
            35                  40                  45

Gln Asp Thr Lys Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Met
65                  70                  75                  80

Asp Glu Ala Asp Tyr Tyr Cys Gln Ala Cys Asp Ser Ser Thr Ala Val
                85                  90                  95

Phe Gly Gly Gly Thr Lys Leu Thr Val Leu
            100                 105

<210> SEQ ID NO 133
<211> LENGTH: 107
<212> TYPE: PRT
<213> ORGANISM: Artificial Sequence
<220> FEATURE:
<223> OTHER INFORMATION: VL sequence

<400> SEQUENCE: 133

Asp Ile Gln Met Thr Gln Ser Pro Ser Ser Val Ser Ala Ser Val Gly
1               5                   10                  15

Asp Arg Val Thr Ile Thr Cys Arg Ala Ser Gln Asp Ile Ser Ser Trp
                20                  25                  30

Leu Ala Trp Phe Gln Gln Lys Pro Gly Lys Ala Pro Lys Leu Leu Ile
            35                  40                  45

Tyr Gly Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Glu Ala Asn Ser Phe Pro Tyr
                85                  90                  95

Thr Phe Gly Gln Gly Thr Lys Leu Glu Ile Lys
            100                 105

<210> SEQ ID NO 134
<211> LENGTH: 107
<212> TYPE: PRT
<213> ORGANISM: Artificial Sequence
```

<220> FEATURE:
<223> OTHER INFORMATION: VL sequence

<400> SEQUENCE: 134

```
Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Ser Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Gly Tyr Tyr Cys Gln Gln Tyr Asn Asn Trp Pro Tyr
                85                  90                  95

Thr Phe Gly Gln Gly Thr Lys Leu Glu Ile Lys
            100                 105
```

<210> SEQ ID NO 135
<211> LENGTH: 107
<212> TYPE: PRT
<213> ORGANISM: Artificial Sequence
<220> FEATURE:
<223> OTHER INFORMATION: VL sequence

<400> SEQUENCE: 135

```
Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Ser Arg Asn
            20                  25                  30

Leu Ala Trp Tyr Gln Gln Lys Ser Gly Gln Ala Pro Arg Leu Leu Ile
        35                  40                  45

Tyr Gly Ala Ser Thr Arg Ala Thr Gly Ile Pro Ala Arg Phe Ser Gly
    50                  55                  60

Ser Gly Ser Gly Thr Glu Phe Thr Leu Thr Ile Ser Ser Leu Gln Ser
65                  70                  75                  80

Glu Asp Phe Ala Gly Tyr Tyr Cys Gln Gln Tyr Asn Asn Trp Pro Tyr
                85                  90                  95

Thr Phe Gly Gln Gly Thr Lys Leu Glu Ile Lys
            100                 105
```

<210> SEQ ID NO 136
<211> LENGTH: 114
<212> TYPE: PRT
<213> ORGANISM: Artificial Sequence
<220> FEATURE:
<223> OTHER INFORMATION: VL sequence

<400> SEQUENCE: 136

```
Asp Ile Val Leu Thr Gln Ser Pro Asp Ser Leu Ala Val Ser Leu Gly
1               5                   10                  15

Glu Arg Ala Thr Ile Asn Cys Lys Ser Ser Gln Thr Val Leu Asn Ser
            20                  25                  30

Ser Asn Asn Lys Asn Tyr Leu Ala Trp Tyr Gln Gln Lys Pro Gly Gln
        35                  40                  45

Pro Pro Lys Leu Leu Ile Tyr Trp Ala Ser Ile Arg Glu Ser Gly Val
    50                  55                  60
```

-continued

Pro Asp Arg Phe Ser Gly Ser Gly Ser Gly Thr Asp Phe Thr Leu Thr
 65                  70                  75                  80

Ile Ser Ser Leu Gln Ala Glu Asp Val Ala Val Tyr Tyr Cys Gln Gln
                 85                  90                  95

Tyr Tyr Asn Thr Pro Pro Trp Thr Phe Gly Gln Gly Thr Lys Val Glu
            100                 105                 110

Ile Lys

<210> SEQ ID NO 137
<211> LENGTH: 107
<212> TYPE: PRT
<213> ORGANISM: Artificial Sequence
<220> FEATURE:
<223> OTHER INFORMATION: VL sequence

<400> SEQUENCE: 137

Asp Ile Lys Met Thr Gln Ser Pro Ser Ser Met Tyr Ala Ser Leu Gly
1               5                   10                  15

Glu Arg Val Thr Val Thr Cys Lys Ala Ser Gln Asp Ile Asn Arg Tyr
                20                  25                  30

Leu Ser Trp Phe Gln Gln Lys Pro Gly Lys Ser Pro Lys Thr Leu Ile
            35                  40                  45

Tyr Arg Ala Asn Arg Leu Val Asp Gly Val Pro Ser Arg Phe Ser Gly
 50                 55                  60

Ser Gly Ser Gly Gln Asp Tyr Ser Leu Thr Ile Ser Ser Leu Glu Tyr
 65                 70                  75                  80

Glu Asp Met Gly Phe Tyr Tyr Cys Leu Gln Tyr Asp Glu Phe Pro Phe
                85                  90                  95

Thr Phe Gly Ser Gly Thr Lys Leu Glu Ile Lys
            100                 105

<210> SEQ ID NO 138

<400> SEQUENCE: 138

000

<210> SEQ ID NO 139

<400> SEQUENCE: 139

000

<210> SEQ ID NO 140

<400> SEQUENCE: 140

000

<210> SEQ ID NO 141

<400> SEQUENCE: 141

000

<210> SEQ ID NO 142
<211> LENGTH: 354
<212> TYPE: DNA
<213> ORGANISM: Artificial Sequence
<220> FEATURE:
<223> OTHER INFORMATION: VH sequence

<400> SEQUENCE: 142

```
caggtgcagc tgcaggagtc gggcccagga ctggtgaagc cttcggggac cctgtccctc    60
acctgcgctg tctctggtgg ctccatcagc agtagtaact ggtggagttg ggtccgccag   120
cccccaggga aggggctgga atggattggg gaaatctatc atagtgggag caccaactac   180
aacccgtccc tcaagagtcg agtcaccata tcagtagaca gtccaagaa ccagttctcc    240 ctgaagctga gttctgtgac cgccgcggac acggccgtgt attactgtgc gagaagggg   300 atatggttcg gggtcggtcc ctggggccag ggaaccctgg tcaccgtctc ctca         354
```

<210> SEQ ID NO 143

<400> SEQUENCE: 143

000

<210> SEQ ID NO 144
<211> LENGTH: 369
<212> TYPE: DNA
<213> ORGANISM: Artificial Sequence
<220> FEATURE:
<223> OTHER INFORMATION: VH sequence

<400> SEQUENCE: 144

```
caggtgcagc tgcaggagtc gggcccagga ctggtgaagc cttcggggac cctgtctctc    60
acctgcgctg tctctggtgg ctccatcagc agtagtaact ggtggagttg ggtccgccag   120
cccccaggga aggggctgga gtggattggg gaaatctatc atagtgggaa caccaactac   180
aacccgtccc tcaagagtcg agtcaccata tcagtagaca gtccaagaa ccagttctcc    240 ctgaagctga gctctgtgac cgccgcggac acggccgtgt attactgtgc gagagagggt   300
atagaggggt actacttcta ctacggtatg gacgtctggg gccaagggac cacggtcacc   360
gtctcctca                                                           369
```

<210> SEQ ID NO 145
<211> LENGTH: 363
<212> TYPE: DNA
<213> ORGANISM: Artificial Sequence
<220> FEATURE:
<223> OTHER INFORMATION: VH sequence

<400> SEQUENCE: 145

```
caggtgcagc tgcaggagtc gggcccagga ctgctgaagc cttcggagac cctgtccctc    60
acctgcgctg tctctgatta ctccatcagc agtggttact actggggctg gatccggcag   120
cccccgggga aggggctgga gtggattggg agtatctatc atagtgggaa tacctattat   180
aacccgtccc tcaagagtcg agtcaccata ttagtagaca cgtccaagaa ccagttctcc    240
ctgaagctga gctctgtgac cgccgcagac acggccgtgt attactgtgc gagagataaa   300
tgtagtacta aacctgctc ctttgactac tggggccagg gaaccctggt caccgtctcc    360
tca                                                                 363
```

<210> SEQ ID NO 146

<400> SEQUENCE: 146

000

<210> SEQ ID NO 147

<400> SEQUENCE: 147

000

<210> SEQ ID NO 148
<211> LENGTH: 348
<212> TYPE: DNA
<213> ORGANISM: Artificial Sequence
<220> FEATURE:
<223> OTHER INFORMATION: VH sequence

<400> SEQUENCE: 148
caggtgcagc tggtggagtc tgggggaggc gtggtccagc ctggagggtc cctgagactc    60
tcctgtgcag cctctggatt caccttcagt aaatttggca tgcactgggt ccgccaggct   120
ccaggcaagg ggctggagtg ggtggcagtt atatcatatg atggaaataa taaatactat   180
acagactccg tgaagggccg attcaccatc tccagagaca attccaggaa cacgctgtat   240
ctgcaaatgg acagcgtgaa acctgaggac acggctgtgt actattcctg ggcagcagct   300
ggtgcttttt atatctgggg ccaagggaca atggtcaccg tctcttca               348

<210> SEQ ID NO 149
<211> LENGTH: 366
<212> TYPE: DNA
<213> ORGANISM: Artificial Sequence
<220> FEATURE:
<223> OTHER INFORMATION: VH sequence

<400> SEQUENCE: 149
caggtgcagc tacagcagtg gggcgcagga ctgttgaagc cttcggagac cctgtccctc    60
acctgcgctg tctatggtgg gtccttcagt ggttactact ggagctggat tcgccagccc   120
ccagggaagg ggctggagtg gattggggaa atcaatcata gtggaagcac caacttcaac   180
ccgtccctca agagtcgagt caccatatca gtagacacgt ccaagaacca gttctccctg   240
aagctgaggt ctgtgaccgc cgcggacacg gctgtgtatt actgttcgag agtcgatagt   300
gggagctatc cctactacga cggttttgga cgtctggggcc aagggaccac ggtcaccgtc   360
tcctca                                                             366

<210> SEQ ID NO 150
<211> LENGTH: 372
<212> TYPE: DNA
<213> ORGANISM: Artificial Sequence
<220> FEATURE:
<223> OTHER INFORMATION: VH sequence

<400> SEQUENCE: 150
caggtgcagc tacagcagtg gggcgcagga ctgttgaagc cttcggagac cctgtccctc    60
acctgcgctg tctatggtgg gtccttcagt acttactact ggaactggat ccgccagccc   120
ccagggaagg ggctggagtg gattggggaa atcaatcata gtggaagcac caactacaac   180
ccgtccctca agagtcgagt catcatatca gtagacacgt ccaagaacca gttctccctg   240
aagctgagct ctgtgaccgc cgcggacacg gctgtgtatt actgtgcgag cagtcattat   300
ggttcgggga gttttcccga ctcctacggt atggacgtct ggggccaagg gaccacggtc   360
accgtctccg ca                                                      372

<210> SEQ ID NO 151
<211> LENGTH: 360
<212> TYPE: DNA
<213> ORGANISM: Artificial Sequence
<220> FEATURE:

<223> OTHER INFORMATION: VH sequence

<400> SEQUENCE: 151

| gaggtgcagc tgttggagtc tgggggaggc ttggtacagc ctggggggtc cctgagactc | 60 |
| tcctgtgcag cctctggatt cacgtttagc agctatgcca tgagctgggt ccgccaggct | 120 |
| ccagggaagg ggctggagtg ggtctcagct attagtggta gtggtggtga cacttactac | 180 |
| gcagactccg tgaagggccg gttcaccatc tccagagaca attccaagag cacgctgtat | 240 |
| ctgcaaatga acagcctgag agccgaggac acggccgtat attactgtgc gaaagacggt | 300 |
| gggagctact accccccctt tgactactgg ggccagggaa ccctggtcac cgtctcctca | 360 |

<210> SEQ ID NO 152
<211> LENGTH: 372
<212> TYPE: DNA
<213> ORGANISM: Artificial Sequence
<220> FEATURE:
<223> OTHER INFORMATION: VH sequence

<400> SEQUENCE: 152

| gaggtgcagc tggtggagtc cgggggaggc ttagttcagc ctggggggtc cctgagactc | 60 |
| tcttgtgcag cctctggatt caccttcagt agctactgga tgcactgggt ccgccaagct | 120 |
| ccagggaagg ggctggtgtg ggtctcacgt attcataatg atgggagtag aacaagttac | 180 |
| gcggactccg tgaagggccg attcactatc tccagagaca cgccaagaa cacgctgtat | 240 |
| ctgcaaatga gcagtctgcg agccgaggac acggctgtgt attactgtac aagagatccc | 300 |
| cctccttacg atattttgac tggttacccc tttgactact ggggccaggg aaccctggtc | 360 |
| accgtctcct ca | 372 |

<210> SEQ ID NO 153
<211> LENGTH: 363
<212> TYPE: DNA
<213> ORGANISM: Artificial Sequence
<220> FEATURE:
<223> OTHER INFORMATION: VH sequence

<400> SEQUENCE: 153

| gaggtgcagg tgttggagtc tgggggaggc ttggtacagc ctggggggtc cctgagactc | 60 |
| tcctgtgcag cctctggatt caccttagc agctatgcca tgagctgggt ccgccaggct | 120 |
| ccagggaagg ggctggagtg ggtctcagct attagtggta gtggtagtag cacacactac | 180 |
| gcagactccg tgaagggccg gttcaccatc tccagagaca attccaagaa cacgctgtat | 240 |
| ctgcaaatga acagcctgag agccgaggac acggccgtat attactgtgc ggcgtatagt | 300 |
| gggagctact actactatgg aatggacgtc tggggacaag gaccacggt caccgtctcc | 360 |
| tca | 363 |

<210> SEQ ID NO 154
<211> LENGTH: 363
<212> TYPE: DNA
<213> ORGANISM: Artificial Sequence
<220> FEATURE:
<223> OTHER INFORMATION: VH sequence

<400> SEQUENCE: 154

| gaggtgcaga tgttggagtc tgggggaggc ttggttcagc ctggggggtc cctgagactc | 60 |
| tcctgtgcag cctctggatt caccttagc agctatgcca tgagctgggt ccgccaggct | 120 |
| ccagggaagg ggctggagtg ggtctcagct attagtggta gtggtagtag cacacactac | 180 |

```
gcagactccg tgaagggccg gttcaccatc tccagagaca attccaagaa cacgctgtat    240
ctgcaaatga acagcctgag agccgaggac acggccgttt attactgtgc ggcgtatagt    300
gggagctact actactatgg aatggacgtc tggggacagg ggaccacggt caccgtctcc    360
tca                                                                  363
```

<210> SEQ ID NO 155
<211> LENGTH: 354
<212> TYPE: DNA
<213> ORGANISM: Artificial Sequence
<220> FEATURE:
<223> OTHER INFORMATION: VH sequence

<400> SEQUENCE: 155

```
caggtgcagc tggtggagtc tgggggaggc gtggtccagc ctgggaggtc cctgagactc    60
tcctgtgtag cctctggatt catcttcagt aactatggca tgcactgggt ccgccaggct    120
ccaggcaagg ggctggagtg ggtggcagtt atatcatatg atggaagaaa tgaagaccat    180
gtagactccg tgaagggccg attcaccatc tccagagaca attccaagaa cacgctgtat    240
ctgcaaatga acagcctgag agctgaggac acggctgtat attactgtgc gaaagggtcg    300
gggagctact actttgacta ctggggccag ggaaccctgg tcaccgtctc ctca          354
```

<210> SEQ ID NO 156
<211> LENGTH: 357
<212> TYPE: DNA
<213> ORGANISM: Artificial Sequence
<220> FEATURE:
<223> OTHER INFORMATION: VH sequence

<400> SEQUENCE: 156

```
cagatccagt tggtgcagtc tggacctgag ctgaagaagc ctggagagac agtcaagatc    60
tcctgcaagg gttctgggta taccttcaga aactttggaa tgaattgggt gaagcaggct    120
ccaggaatgg gtttaaagtg gatggtgtgg atagacacca cactgggaga gccaacatat    180
gctgaagagt tcaagggacg gtttgccttc tctttggaaa cctctgccag cactgcctat    240
ttgcagatca acaacctcaa aaatgaggac acggctacat atttctgtgc aagatcgaga    300
ggtaactact ttgctatgga gtattggggg caaggaacct cagtcaccgt ctcctca       357
```

<210> SEQ ID NO 157

<400> SEQUENCE: 157

000

<210> SEQ ID NO 158

<400> SEQUENCE: 158

000

<210> SEQ ID NO 159

<400> SEQUENCE: 159

000

<210> SEQ ID NO 160

<400> SEQUENCE: 160

000

<210> SEQ ID NO 161
<211> LENGTH: 336
<212> TYPE: DNA
<213> ORGANISM: Artificial Sequence
<220> FEATURE:
<223> OTHER INFORMATION: VL sequence

<400> SEQUENCE: 161

| gatattgtga tgactcagtc tccactctcc ctgcccgtca cccctggaga gccggcctcc | 60 |
| atctcctgca ggtctagtca gagcctccta catggtaatg gattcaacta tttggattgg | 120 |
| tacctgcaga agccagggca gtctccacag ctcctgatct atttgggttc taatcgggcc | 180 |
| tccggggtcc ctgacaggtt cactggcagt ggatcaggca cagattttac actgaaaatc | 240 |
| agcagagtgg aggctgagga tgttggggtt tattactgca tgcaaggtct acaaactcct | 300 |
| cggacgttcg gccaagggac caaggtggaa atcaaa | 336 |

<210> SEQ ID NO 162

<400> SEQUENCE: 162

000

<210> SEQ ID NO 163
<211> LENGTH: 321
<212> TYPE: DNA
<213> ORGANISM: Artificial Sequence
<220> FEATURE:
<223> OTHER INFORMATION: VL sequence

<400> SEQUENCE: 163

| gacatccagt tgacccagtc tccatccttc ctgtctgcat ctgtaggaga cagagtcacc | 60 |
| atcacttgcc gggccagtca gggcattagc ggttatttag actggtatca gcaaaaacca | 120 |
| gggaaagccc ctaagctcct gatctatgct gcatccactt tacaaagagg ggtcccatca | 180 |
| aggttcagcg gcagtggatc tgggacagat ttcaatctca caatcagcag cctgcagcct | 240 |
| gaagattttg caacttatta ctgtcaacag tttactagtg acctcatcac cttcggccaa | 300 |
| gggacacgac tggagattaa a | 321 |

<210> SEQ ID NO 164
<211> LENGTH: 321
<212> TYPE: DNA
<213> ORGANISM: Artificial Sequence
<220> FEATURE:
<223> OTHER INFORMATION: VL sequence

<400> SEQUENCE: 164

| gacatccaga tgacccagtc tccatcctcc ctgtctgcat ctgtaggaga cagagtcacc | 60 |
| atcacttgcc aggcgagtca ggactttagc aactatttaa attggtatca gcagaaacca | 120 |
| gggaaagccc ctaagctcct gatctacgct gcatccaatt tggaaacagg ggtcccatcg | 180 |
| aggttcagtg gaagtggatc tgggacagat tttactttca ccatcagcag cctgcagcct | 240 |
| gaagatattg cagtatatta ctgtcaacag tatgataatc tcccgtacac ttttggccag | 300 |
| gggaccaagc tggagatcaa a | 321 |

<210> SEQ ID NO 165

<400> SEQUENCE: 165

000

<210> SEQ ID NO 166

<400> SEQUENCE: 166

000

<210> SEQ ID NO 167
<211> LENGTH: 324
<212> TYPE: DNA
<213> ORGANISM: Artificial Sequence
<220> FEATURE:
<223> OTHER INFORMATION: VL sequence

<400> SEQUENCE: 167

| tcctatgtgc tgactcagcc accctcggtg tcagtggccc caggacagac ggccaggatt | 60 |
| acctgtgggg gatacaacat tggaagtaaa agtgtgcact ggtaccagca gaaggcaggc | 120 |
| caggcccctg tgctggtcgt ctatgatgat agcggccggc cctcagggat ccctgagcga | 180 |
| ttgtctggct ccaagtctgg gaacacggcc accctgacca tcagcagggt cgaagccggg | 240 |
| gatgaggccg actattactg tcaggtgtgg gatagtagta gtgatcatta tgtcttcgga | 300 |
| actgggacca aggtcaccgt ccta | 324 |

<210> SEQ ID NO 168
<211> LENGTH: 318
<212> TYPE: DNA
<213> ORGANISM: Artificial Sequence
<220> FEATURE:
<223> OTHER INFORMATION: VL sequence

<400> SEQUENCE: 168

| tcctctgaat tgactcagcc accctcagtg tccgtgtccc caggacagac agccagcatc | 60 |
| acctgctctg gagataaatt gggggataaa tatgtttact ggtatcaaca gaagccaggc | 120 |
| cagtcccctg tgttggtcat ctatcatgat gatcggcggc cgctgggat ccctgagcga | 180 |
| ttcgctggct ccgcttctgg gaacacagcc actctgacca tcagcgggac ccaggctatg | 240 |
| gatgaggctg actattactg tcagacgtgg gacagcagca ctgtggtttt cggcggaggg | 300 |
| accaagctga ccgtccta | 318 |

<210> SEQ ID NO 169
<211> LENGTH: 318
<212> TYPE: DNA
<213> ORGANISM: Artificial Sequence
<220> FEATURE:
<223> OTHER INFORMATION: VL sequence

<400> SEQUENCE: 169

| tcctatgaat tgactcagtc accctcagtg tccgtgtccc caggacagac agccagcatc | 60 |
| acctgctctg gagataaatt gggggataga tatgcttggt ggtatcagca gaagccaggc | 120 |
| cagtcccctg tgctggtcat ctatcaagat gacaagcggc cctcagggat ccctgagcga | 180 |
| ttctctggct ccaactctgg gaacacagcc actctgacca tcagcgggac ccaggctatg | 240 |
| gatgaggctg actattactg tcaggcgtgg gacagcagca ctgcggtatt cggcggaggg | 300 |
| accaagctga ccgtccta | 318 |

<210> SEQ ID NO 170
<211> LENGTH: 318

```
<212> TYPE: DNA
<213> ORGANISM: Artificial Sequence
<220> FEATURE:
<223> OTHER INFORMATION: VL sequence

<400> SEQUENCE: 170
tcctatgagc tgactcagcc accctcagtg tccgtgtccc caggacagac agccagcatc      60
acctgctctg gagataaatt gggggataga tatgcttgct ggtatcagca gaagccaggc     120 cagtccctg tactggtcat ctatcaagat accaagcggc cctcagggat ccctgagcga      180
ttctctggct ccaactctgg gaacacagcc actctgacca tcagcgggac ccaggctatg     240
gatgaggctg actattactg tcaggcgtgc gacagcagca ctgcggtgtt cggcggaggg     300
accaagctga ccgtccta                                                    318

<210> SEQ ID NO 171
<211> LENGTH: 321
<212> TYPE: DNA
<213> ORGANISM: Artificial Sequence
<220> FEATURE:
<223> OTHER INFORMATION: VL sequence

<400> SEQUENCE: 171
gacatccaga tgacccagtc tccgtcttcc gtgtctgcat ctgtaggaga cagagtcacc      60
atcacttgtc gggcgagtca ggatattagc agctggttag cctggtttca gcagaaacca     120
gggaaagccc ctaagctcct gatctatggt gcatccagtt tgcaaagtgg ggtcccatca     180
aggttcagcg gcagtggatc tgggacagat ttcactctca ccatcagcag cctgcagcct     240
gaagattttg caacttacta ttgtcaagag gctaacagtt cccgtatac ttttggccag      300 gggaccaagc tggagatcaa a                                                321

<210> SEQ ID NO 172
<211> LENGTH: 321
<212> TYPE: DNA
<213> ORGANISM: Artificial Sequence
<220> FEATURE:
<223> OTHER INFORMATION: VL sequence

<400> SEQUENCE: 172
gaaatagtga tgacgcagtc tccagccacc ctgtctgtgt ctccagggga aagagccacc      60
ctctcctgca gggccagtca gagtgttagc agcaacttag cctggtacca gcagaaatct     120
ggccaggctc ccaggctcct catctatggt gcatccacca gggccactgg tatcccagcc     180
aggttcagtg gcagtgggtc tgggacagag ttcactctca ccatcagcag cctgcagtct     240
gaagattttg caggttatta ctgccagcag tataataact ggccgtacac ttttggccag     300
gggaccaagc tggagatcaa a                                                321

<210> SEQ ID NO 173
<211> LENGTH: 321
<212> TYPE: DNA
<213> ORGANISM: Artificial Sequence
<220> FEATURE:
<223> OTHER INFORMATION: VL sequence

<400> SEQUENCE: 173
gaaatagtga tgacgcagtc tccagccacc ctgtctgtgt ctccagggga aagagccacc      60
ctctcctgca gggccagtca gagtgttagt aggaatttag cctggtacca gcagaaatct     120
ggccaggctc ccaggctcct catctatggt gcatccacca gggccactgg tatcccagcc     180
```

```
aggttcagtg gcagtgggtc tgggacagag ttcactctca ccatcagcag cctgcagtct    240
gaagattttg caggttatta ctgccagcag tataataact ggccgtacac ttttggccag    300
gggaccaagc tggagatcaa a                                              321

<210> SEQ ID NO 174
<211> LENGTH: 342
<212> TYPE: DNA
<213> ORGANISM: Artificial Sequence
<220> FEATURE:
<223> OTHER INFORMATION: VL sequence

<400> SEQUENCE: 174
gacatcgtgc tgacccagtc tccagactcc ctggctgtgt ctctgggcga gagggccacc     60
atcaactgca gtccagcca gactgtttta aacagctcca acaataagaa ctacctagct    120
tggtaccagc agaaaccagg acagcctcct aagctgctca tttactgggc atctatccgg    180
gaatccgggg tccctgaccg attcagtggc agcgggtctg ggacagattt cactctcacc    240
atcagcagcc tgcaggctga agatgtggca gtttattact gtcagcaata ttataatact    300
cctccgtgga cgttcggcca agggaccaag gtggaaatca aa                       342

<210> SEQ ID NO 175
<211> LENGTH: 321
<212> TYPE: DNA
<213> ORGANISM: Artificial Sequence
<220> FEATURE:
<223> OTHER INFORMATION: VL sequence

<400> SEQUENCE: 175
gacatcaaga tgacccagtc tccatcttcc atgtatgcat ctctaggaga gagagtcact     60
gtcacttgca aggcgagtca ggacattaat cgctatttaa gctggttcca gcagaaacca    120
gggaaatctc ctaagaccct gatctatcgt gcaaacagat tggtagatgg ggtcccatca    180
aggttcagtg gcagtggatc tgggcaagat tattctctca ccatcagcag cctggagtat    240
gaagatatgg gattttatta ttgtctacag tatgatgagt ttccattcac gttcggctcg    300
gggacaaagt tggaaataaa a                                              321
```